US012596534B2

(12) United States Patent
Stachura

(10) Patent No.: US 12,596,534 B2
(45) Date of Patent: *Apr. 7, 2026

(54) SPREADSHEET-BASED SOFTWARE APPLICATION DEVELOPMENT

(71) Applicant: Thomas Stachura, Edmonton (CA)

(72) Inventor: Thomas Stachura, Edmonton (CA)

( * ) Notice: Subject to any disclaimer, the term of this patent is extended or adjusted under 35 U.S.C. 154(b) by 110 days.

This patent is subject to a terminal disclaimer.

(21) Appl. No.: 18/213,414

(22) Filed: Jun. 23, 2023

(65) Prior Publication Data

US 2023/0409297 A1 Dec. 21, 2023

Related U.S. Application Data

(63) Continuation of application No. 17/466,649, filed on Sep. 3, 2021, now Pat. No. 11,726,753, which is a (Continued)

(51) Int. Cl.
*G06F 8/38* (2018.01)
*G06F 8/34* (2018.01)
(Continued)

(52) U.S. Cl.
CPC .................. *G06F 8/38* (2013.01); *G06F 8/34* (2013.01); *G06F 40/18* (2020.01); *G06F 40/186* (2020.01)

(58) Field of Classification Search
CPC ...................................... G06F 8/34; G06F 8/38
See application file for complete search history.

(56) References Cited

U.S. PATENT DOCUMENTS 4,989,141 A 1/1991 Yons et al.
6,460,035 B1 10/2002 Siegwart
(Continued)

FOREIGN PATENT DOCUMENTS

CN 1704938 A 12/2005
CN 101167052 A 4/2008
(Continued)

OTHER PUBLICATIONS

Montes-Torres et al. "Advanced Online Survival Analysis Tool for Predictive Modelling in Clinical Data Science". PLoS One 11(8): e0161135. doi:10.1371/journal.pone.0161135 (2016).
(Continued)

*Primary Examiner* — Duy Khuong T Nguyen
(74) *Attorney, Agent, or Firm* — Banner & Witcoff, Ltd.

(57) ABSTRACT

Aspects described herein may be used with local spreadsheet applications, web, and/or cloud-based spreadsheet solutions, to create complex custom software applications. Spreadsheets themselves lack the conceptual framework to be used as a platform tool to build custom or complex software applications. Using the methods and systems described herein using low-code/no-code techniques, a designer can create custom and/or complex software applications using one or more spreadsheets as the underlying blueprints for the software application. The resultant software application may be static/read-only, or may be interactive to allow users to dynamically add, delete, edit, or otherwise amend application data, e.g., via one or more online web pages or via a mobile application. Data transfer may be one-way or bi-directional between the blueprint spreadsheets and the resultant software application, thereby allowing amended data to be transferred from the software application back into spreadsheet form.

30 Claims, 99 Drawing Sheets

Related U.S. Application Data continuation of application No. 16/745,976, filed on Jan. 17, 2020, now Pat. No. 11,113,041, which is a continuation of application No. 15/829,979, filed on Dec. 3, 2017, now Pat. No. 10,540,153, which is a continuation-in-part of application No. 15/455,909, filed on Mar. 10, 2017, now Pat. No. 10,216,494.

(60) Provisional application No. 62/429,749, filed on Dec. 3, 2016.

(51) Int. Cl.
G06F 40/18 (2020.01)
G06F 40/186 (2020.01)

(56) References Cited

U.S. PATENT DOCUMENTS

| | | | |
|---|---|---|---|
| 7,225,189 | B1 | 5/2007 | McCormack et al. |
| 7,251,776 | B2 | 7/2007 | Handsaker et al. |
| 7,406,200 | B1 | 7/2008 | Syeda-Mahmood et al. |
| 7,523,395 | B1 | 4/2009 | Namait et al. |
| 7,533,420 | B2 | 5/2009 | Battagin et al. |
| 7,783,966 | B2 | 8/2010 | Mitsui |
| 7,962,512 | B1 | 6/2011 | Sholtis et al. |
| 8,145,725 | B2 | 3/2012 | Dawson et al. |
| 8,190,987 | B2 | 5/2012 | Campbell et al. |
| 8,489,982 | B2 | 7/2013 | Davis |
| 8,510,266 | B1 | 8/2013 | Ho et al. |
| 8,843,814 | B2 | 9/2014 | Lord |
| 9,009,582 | B2 | 4/2015 | Rochelle et al. |
| 9,052,908 | B2 | 6/2015 | Fu et al. |
| 9,298,454 | B2 | 3/2016 | Tuvian et al. |
| 9,389,840 | B2 | 7/2016 | Mun |
| 9,959,098 | B1 | 5/2018 | Smith Devine |
| 10,210,151 | B2 | 2/2019 | Mingot et al. |
| 10,885,067 | B2 | 1/2021 | Taylor, III et al. |
| 11,630,947 | B2 | 4/2023 | Campbell et al. |
| 2001/0047372 | A1 | 11/2001 | Gorelik et al. |
| 2004/0015783 | A1 | 1/2004 | Lennon et al. |
| 2004/0103365 | A1 | 5/2004 | Cox |
| 2004/0111666 | A1 | 6/2004 | Hollcraft |
| 2004/0205468 | A1 | 10/2004 | Lightner |
| 2004/0221233 | A1 | 11/2004 | Thielen |
| 2005/0060647 | A1 | 3/2005 | Doan et al. |
| 2005/0268215 | A1 | 12/2005 | Battagin et al. |
| 2006/0015805 | A1 | 1/2006 | Humenansky et al. |
| 2006/0015806 | A1 | 1/2006 | Wallace |
| 2006/0190815 | A1 | 8/2006 | Jones et al. |
| 2007/0061698 | A1 | 3/2007 | Megiddo et al. |
| 2007/0162840 | A1 | 7/2007 | Rochelle et al. |
| 2007/0237086 | A1* | 10/2007 | Tulac ............... G06F 16/2477 |
| | | | 370/244 |
| 2008/0104542 | A1 | 5/2008 | Cohen et al. |
| 2008/0134089 | A1 | 6/2008 | Adachi et al. |
| 2008/0177716 | A1 | 7/2008 | Hejlsberg et al. |
| 2009/0132347 | A1 | 5/2009 | Anderson et al. |
| 2009/0235087 | A1 | 9/2009 | Bird |
| 2009/0327339 | A1 | 12/2009 | Berger et al. |
| 2010/0211862 | A1 | 8/2010 | Parish et al. |
| 2011/0066933 | A1 | 3/2011 | Ludwig |
| 2011/0225484 | A1 | 9/2011 | Lotan-Bolotnikoff et al. |
| 2012/0110428 | A1 | 5/2012 | Meijer |
| 2013/0117651 | A1 | 5/2013 | Waldman et al. |
| 2013/0124959 | A1 | 5/2013 | Miyahara |
| 2013/0145244 | A1 | 6/2013 | Rothschiller et al. |
| 2013/0166498 | A1 | 6/2013 | Aski et al. |
| 2013/0254183 | A1 | 9/2013 | Gorelik et al. |
| 2013/0290822 | A1 | 10/2013 | Chen |
| 2014/0006913 | A1 | 1/2014 | Gopalakrishna et al. |
| 2014/0108971 | A1 | 4/2014 | No et al. |
| 2014/0136936 | A1 | 5/2014 | Patel et al. |
| 2014/0164895 | A1 | 6/2014 | Matheson et al. |
| 2014/0236860 | A1 | 8/2014 | Camrass |
| 2014/0258972 | A1 | 9/2014 | Savage et al. |
| 2015/0106782 | A1 | 4/2015 | Tuvian et al. |
| 2015/0142740 | A1 | 5/2015 | Behuria et al. |
| 2015/0339106 | A1 | 11/2015 | Sos-Munoz et al. |
| 2016/0026616 | A1 | 1/2016 | Vogel |
| 2016/0092424 | A1 | 3/2016 | Kulkarni et al. |
| 2016/0173541 | A1 | 6/2016 | Gusain |
| 2016/0224536 | A1 | 8/2016 | Thomas |
| 2017/0098008 | A1 | 4/2017 | Kemmer |
| 2018/0101620 | A1 | 4/2018 | Rochelle et al. |
| 2018/0107671 | A1 | 4/2018 | Plenos et al. |
| 2019/0303434 | A1 | 10/2019 | Methner |

FOREIGN PATENT DOCUMENTS

| | | |
|---|---|---|
| CN | 102597994 A | 7/2012 |
| CN | 102656557 A | 9/2012 |
| CN | 104285209 A | 1/2015 |
| JP | 2005352634 A | 12/2005 |
| JP | 2005353058 A | 12/2005 |
| JP | 2006024021 A | 1/2006 |
| JP | 2009508237 A | 2/2009 |
| JP | 2014506350 A | 3/2014 |
| JP | 2014153751 A | 8/2014 |
| JP | 2014164548 A | 9/2014 |
| JP | 2016091244 A | 5/2016 |
| JP | 2017120610 A | 7/2017 |
| WO | 2002005065 A2 | 1/2002 |
| WO | 03/007118 A2 | 1/2003 |
| WO | 03/098500 A1 | 11/2003 |
| WO | 2014190031 A2 | 11/2014 |

OTHER PUBLICATIONS

Hao Luo et al. "A Web Data Management Technology Integrated with RIA". Journal of Beijing Science and Technology Institute. pp. 55-62. (2010).
Jul. 25, 2023—(EP) Extended European Search Report—App 23171520.2.
Solutions, Vena. "Complete Planning Software: Excel Interface: Vena Solutions." Trusted by Finance, Loved by Business, www. venasolutions.com/.
Jul. 1, 2021—(JP) Office Action—App. No. 2020-160370.
Takeshita, "GdForm achieving creation of Web applications without codes," NEC Technical Journal, vol. 62, No. 4, pp. 112-115 (Dec. 25, 2009).
Open as App, "Automatic app creation for every spreadsheet user". https://www.openasapp.com/feature-updates-2016/. 12 pages as printed, accessed Jan. 26, 2022.
Open as App, "Product Feature Updates 2016". https://www. openasapp.com/feature-updates-2016/. 13 pages as printed, bearing date of Dec. 25, 2016, accessed Jan. 26, 2022.
Edward Benson et al., Spreadsheet-Driven Web Applications, UIST'14, Proceedings of the 27th annual ACM symposium on User interface software and technology, Oct. 8, 201, p. 97-106, <URL> https://dl. acm.org/doi/10.1145/2642918.2647387.
Like to designate a user who can edit a specific cell, Wani-chan no pasokon warudo, Jun. 30, 2012, <URL> https://web.archive.org/web/20120630032122/https://www.wanichan.com/pc/excel/2003/09/383.html.
"Make Your Dynamic Spreadsheets Web and Mobile;" PleasantSolutions.com; Accessed Dec. 2, 2016.
"Webifier for Excel: Create a Web App From Your Own Spreadsheets;" http://pleasantsolutions.com/webifier; Accessed Dec. 2, 2016.
"Online Database Software for Easy Database Creation—Knack;" https://www.knack.com/; Accessed Dec. 2, 2016.
"Business Applications Development & Database Solutions—QuickBase;" http://www.quickbase.com/; Accessed Dec. 2, 2016.
"Caspio a 'Strong Performer' in Low-Code Platforms;" https://www. caspio.com; Accessed Dec. 2, 2016.
"PowerBuilder" from Wikipedia; https://en.wikipedia.org/wiki/PowerBuilder; Accessed Dec. 2, 2016.
"Mobile Forms Solutions;" ProntoForms; https://www.prontoforms. com/; Accessed Dec. 2, 2016.

(56)          References Cited

OTHER PUBLICATIONS

"Build an Access Database to Share on the Web;" Microsoft; https://support.office.com/en-us/article/Build-an-Access-database-to-share-on-the-web . . . ; Accessed Dec. 2, 2016.
"Convert Excel Spreadsheets to Online Calculators for Web Pages;" http:www.spreadsheetconverter.com; Accessed Dec. 2, 2016.
"The #1 Low-Code Platform for Digital Transformation;" Outsystems; https://www.outsystems.com/; Accessed Dec. 2, 2016.
"Workflow Software: Work Management & Automation;" TrackVia; http://www.trackvia.com/; Accessed Dec. 2, 2016.
"BadBlue Excel Advanced Sharing;" http://web.archive.org/web/2016417011422/http://www.badblue.com/helpxlssu.htm; Accessed Dec. 2, 2016.
"BadBlue Tutorial: Excel Sharing General Use;" http://web.archive.org/web/2016416105506/http://www.badblue.com/tuxls2.htm; Accessed Dec. 2, 2016.
"Business Intelligence and Analytics;" Tableau Software; http://www.tableua.com/; Accessed Dec. 2, 2016.
"Business Intelligence: Dashboards, Reporting and Analytics;" Domo; https://www.domo.com/; Accessed Dec. 2, 2016.
"Fieldbook: Create a database, as easily as a spreadsheet;" https://fieldbook.com/; Accessed Dec. 2, 2016.
"QuerySmith: SQL Queries & Reports in Excel;" http://www.querysmith.com/; Accessed Dec. 2, 2016.
"SpreadsheetWEB—Turn Spreadsheets into Business Innovations;" http://www.spreadsheetweb.com; Accessed Dec. 2, 2016.
Apple Numbers; http://www.apple.com/numbers/; Accessed Dec. 2, 2016.
"Spreadsheet Software Programs—Excel;" Microsoft; https://www.products.office.com/en-us/excel; Accessed Dec. 2, 2016.
"Microsoft Cloud;" https://cloud.microsoft.com/en-us; Accessed Dec. 2, 2016.
"CRM Software, Customer Relationship Management—Zoho CRM;" https://www.zoho.com/crm/lp/general-crm.html?gclid=CLai-J351dACFc1LDQodUxKLA; Accessed Dec. 2, 2016.
"Database Software and Applications—Microsoft Access;" https://products.office.com/en-us/access; Accessed Dec. 2, 2016.
"SpreasheetGear—Microsoft Excel Compatible Spreadsheet Component for Microsoft;" http:www.spreadsheetgear.com/; Accessed Dec. 2, 2016.
"ThinkFree Office;" Wikipedia; https://en.wikipedia.org/wiki/ThinkFree_Office; Accessed Dec. 2, 2016.
"JavaScript Framework& HTML5 UI Library for Web App Development;" Webix; http://webix.com; Accessed Dec. 2, 2016.
"Gnumeric;" Wikipedia; https://en.wikipedia.org/wiki/Gnumeric; Accessed Dec. 2, 2016.
"EditGrid;" Wikipedia; https://en.wikipedia.org/wiki/EditGrid; Accessed Dec. 2, 2016.
"ZK Spreadsheet:" https://www.zkoss.org/product/zkspreadsheet; Accessed Dec. 2, 2016.
"Web-Based JavaScript Spreadsheet Software—dhtmlxSpreadsheet;" https://dhtmlx.com/docs/products.dhtmlxSpreadsheet/; Accessed Dec. 2, 2016.

"Smartsheet: Work Management and Automation Solutions;" https://www.smartsheet.com/; Accessed Dec. 2, 2016.
"EXpresso Spreadsheet;" Wikipedia; https://wn.wikipedia.org/wiki/Express_spreadsheet; Accessed Dec. 2, 2016.
"Sheetster;" Wikipedia; https://en.wikipedia.org/wiki/Sheetster; Accessed Dec. 2, 2016.
Jun. 2, 2017—(US) Non-Final Office Action—U.S. Appl. No. 15/455,909.
Caspio, "Convert Excel Spreadsheets into Web Database Applications," Sep. 5, 2015, pp. 1-4.
Goproductivity, "Are you managing your spreadsheets or are they managing you?", Mar. 9, 2015, pp. 1-3.
Pagos, "SpreadsheetWEB Architectural Overview", Dec. 2015, pp. 1-8.
"Excel 2016 Get it now with an Office 365 subscription;" https://products.office.com/en-us/excel; Accessed Mar. 6, 2018.
"Power Pivot: Powerful data analysis and data modeling in Excel;" https://support.office.com/en-us/article/power-pivot-powerful-data-analysis-and-data-modeling-in-excel-a9c2c6e2-cc49-4976-a7d7-40896795d045; Accessed Mar. 6, 2018.
Feb. 12, 2018—(WO) International Search Report—App PCT/CA2017/051457.
Feb. 12, 2018—(WO) Written Opinion of the International Searching Authority—App PCT/CA2017/051457.
Jan. 31, 2019—(WO) Written Opinion of the International Searching Authority—App PCT/CA2018/051547.
Jan. 31, 2019—(WO) International Search Report—App PCT/CA2018/051547.
Microsoft, "Lock or unlock specific areas of a protected worksheet Excel for Office 365, Excel 2019, Excel 2016, Excel 2013, Excel 2010, Excel 2007", Jan. 2020,pp. 13 (Year: 2020).
Jul. 3, 2020—(EP) Extended European Search Report—17876834.7.
Edward Benson et al: "Spreadsheet driven web applications", User Interface Software and Technology, ACM, 2 Penn Plaza, Suite 701 New York NY 10121-0701 USA, Oct. 5, 2014 (Oct. 5, 2014) pp. 97-106, XP058058544, DOI: 10.1145/2642918.2647387, ISBN: 978-1-4503-3069-5.
Kerry Shih-Ping Chang et al: "Creating interactive web data applications with spreadsheets", User Interface Software and Technology, ACM, 2 Penn Plaza, Suite 701 New York NY 10121-0701 USA, Oct. 5, 2014 (Oct. 5, 2014), pp. 87-96, XP058058528, DOI: 10.1145/2642918.2647371 ISBN: 978-1-4503-3069-5.
Jul. 30, 2020—(JP) Decision to Grant—2019-549616.
"Make an App with No-Code. Start building today for free." https://www.appsheet.com/. Retrieved Aug. 14, 2020, pp. 1-3.
"Create an App Instantly Using Your Data—Appsheet." <https://web.archive.org/web/20161202214920/https://www.appsheet.com/> Archive.org capture dated Dec. 2, 206. Retrieved Aug. 14, 2020, pp. 1-5.
Nov. 1, 2025—(CN) Office Action—App No. 202310128491.7.

* cited by examiner

=

Insert Function                                                    ?     ✕

Search for a function:

| Type a brief description of what you want to do and then click Go | Go |

Or select a category: | Webifier Functions | ∨ |

Select a function:

| ISLOGGEDINWEBUSER | ∧ |
| WEBIFIERFILEATTRIBUTES | |
| WEBIFIERINSERTCHAT | |
| WEBIFIERINSERTFILE | |
| WEBIFIERLINK | |
| WEBIFIERSOURCENAME | |
| WEBIFIERSOURCEVALUE | ∨ |

ISLOGGEDINWEBUSER(username)

On the website, checks whether a text string case-insensitively matches the current user's
username and returns TRUE or FALSE. In Excel, returns TRUE for a text string and returns TRUE
or FALSE for a cell reference.

Help on this function                                      | OK |      | Cancel |

Insert Function         ?    ✕

Search for a function:

| Type a brief description of what you want to do and then click Go | Go |

Or select a category: | Webifier Functions | ⌄ |

Select a function:

| ISLOGGEDINWEBUSER | ⌃ |
| WEBIFIERFILEATTRIBUTES | |
| WEBIFIERINSERTCHAT | |
| WEBIFIERINSERTFILE | |
| WEBIFIERLINK | |
| WEBIFIERSOURCENAME | |
| WEBIFIERSOURCEVALUE | ⌄ |

WEBIFIERFILEATTRIBUTES(key,attribute_type)

Displays specified information about a file that was previously uploaded to Webifier.

Help on this function         | OK | | Cancel |

Insert Function                                    ?     ×

Search for a function:

| Type a brief description of what you want to do and then click Go | Go |

Or select a category: | Webifier Functions          ∨ |

Select a function:

| ISLOGGEDINWEBUSER |
| WEBIFIERFILEATTRIBUTES |
| WEBIFIERINSERTCHAT |
| WEBIFIERINSERTFILE |
| WEBIFIERLINK |
| WEBIFIERSOURCENAME |
| WEBIFIERSOURCEVALUE |

WEBIFIERINSERTCHAT(key)

In excel, returns the key. On the web, generates a webifier chat.

Help on this function                    OK          Cancel

FIG. 6

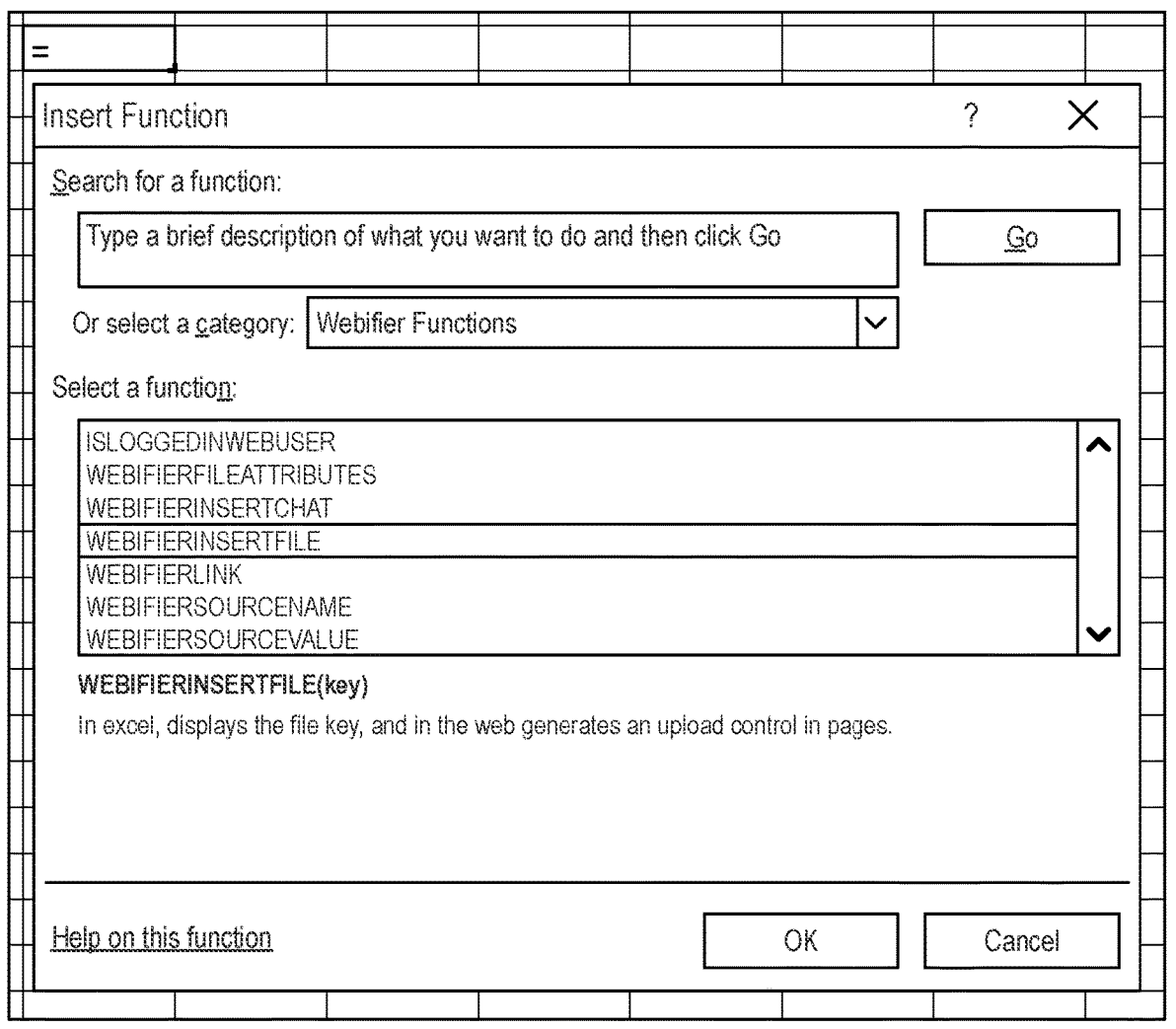

Insert Function                                    ?      ✕

Search for a function:

Type a brief description of what you want to do and then click Go            Go

Or select a category:  Webifier Functions  ⌄

Select a function:

ISLOGGEDINWEBUSER
WEBIFIERFILEATTRIBUTES
WEBIFIERINSERTCHAT
WEBIFIERINSERTFILE
WEBIFIERLINK
WEBIFIERSOURCENAME
WEBIFIERSOURCEVALUE

WEBIFIERINSERTFILE(key)

In excel, displays the file key, and in the web generates an upload control in pages.

Help on this function            OK            Cancel

Insert Function                                                    ?    ✕

Search for a function:

| Type a brief description of what you want to do and then click Go | | Go |

Or select a category: | Webifier Functions | ▼ |

Select a function:

| ISLOGGEDINWEBUSER | ∧ |
| WEBIFIERFILEATTRIBUTES | |
| WEBIFIERINSERTCHAT | |
| WEBIFIERINSERTFILE | |
| WEBIFIERLINK | |
| WEBIFIERSOURCENAME | |
| WEBIFIERSOURCEVALUE | ∨ |

WEBIFIERLINK( )

On the website, creates a link to a detailed record for the current row in the current Details Report page. In Excel, displays a placeholder describing what will be displayed on the website. Not useable from within view mode or template mode.

Help on this function                                    OK          Cancel

Insert Function        ?    ✕

Search for a function:

| Type a brief description of what you want to do and then click Go | Go |

Or select a category: | Webifier Functions | ▾ |

Select a function:

```
ISLOGGEDINWEBUSER                                      ∧
WEBIFIERFILEATTRIBUTES
WEBIFIERINSERTCHAT
WEBIFIERINSERTFILE
WEBIFIERLINK
WEBIFIERSOURCENAME
WEBIFIERSOURCEVALUE                                    ∨
```

WEBIFIERSOURCENAME(column_index,additional_source_type,...)

On the website, displays the header for the current Details Report page, based on a column. In Excel, displays a placeholder describing what will be displayed on the website. Only usable from within template mode.

Help on this function             | OK | | Cancel |

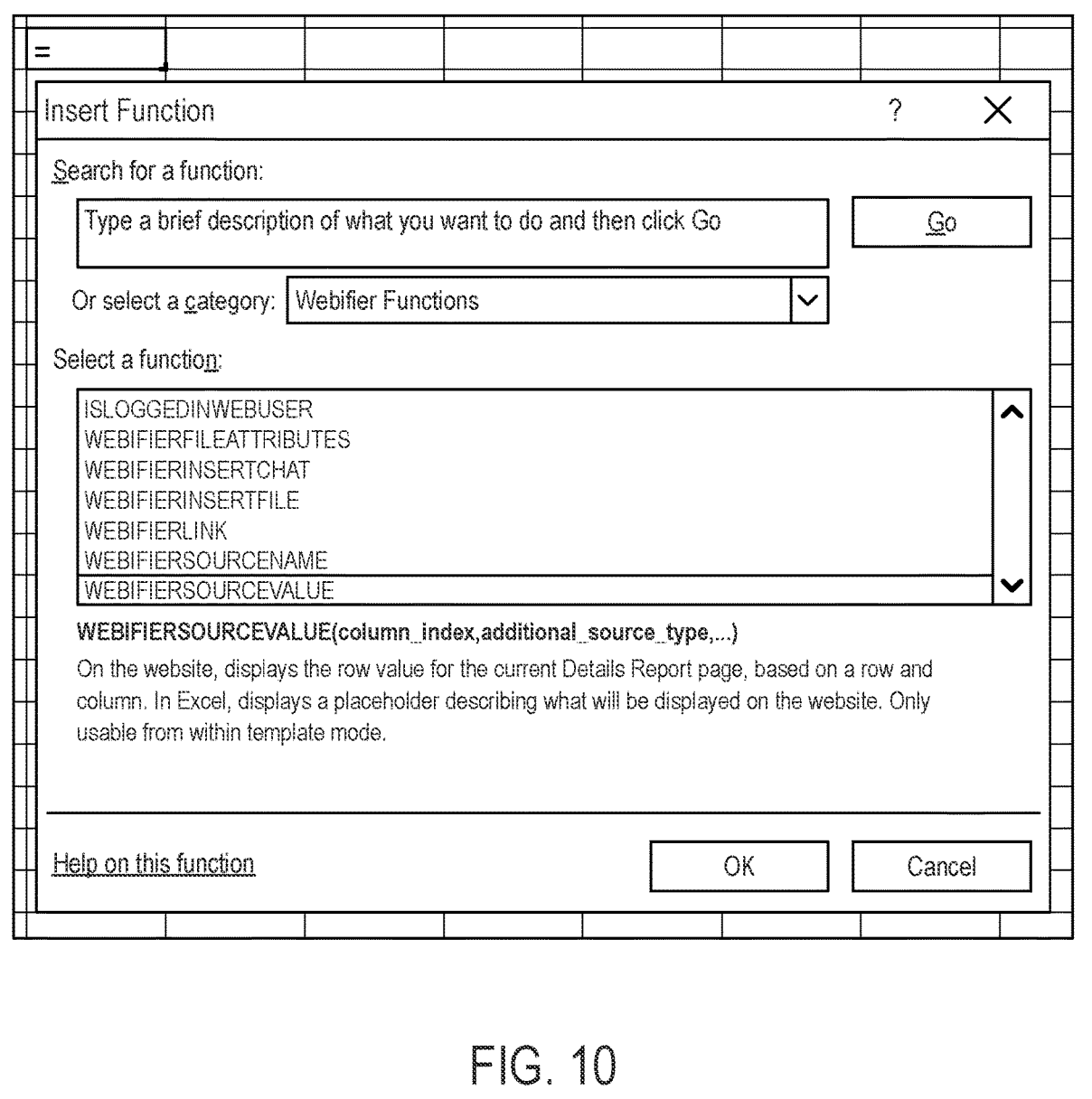

Insert Function                                                    ?     ✕

Search for a function:

| Type a brief description of what you want to do and then click Go | Go |

Or select a category: | Webifier Functions        ⌄ |

Select a function:

| ISLOGGEDINWEBUSER | ⌃ |
| WEBIFIERFILEATTRIBUTES | |
| WEBIFIERINSERTCHAT | |
| WEBIFIERINSERTFILE | |
| WEBIFIERLINK | |
| WEBIFIERSOURCENAME | |
| WEBIFIERSOURCEVALUE | ⌄ |

WEBIFIERSOURCEVALUE(column_index,additional_source_type,...)

On the website, displays the row value for the current Details Report page, based on a row and column. In Excel, displays a placeholder describing what will be displayed on the website. Only usable from within template mode.

Help on this function                          | OK |     | Cancel |

FIG. 10

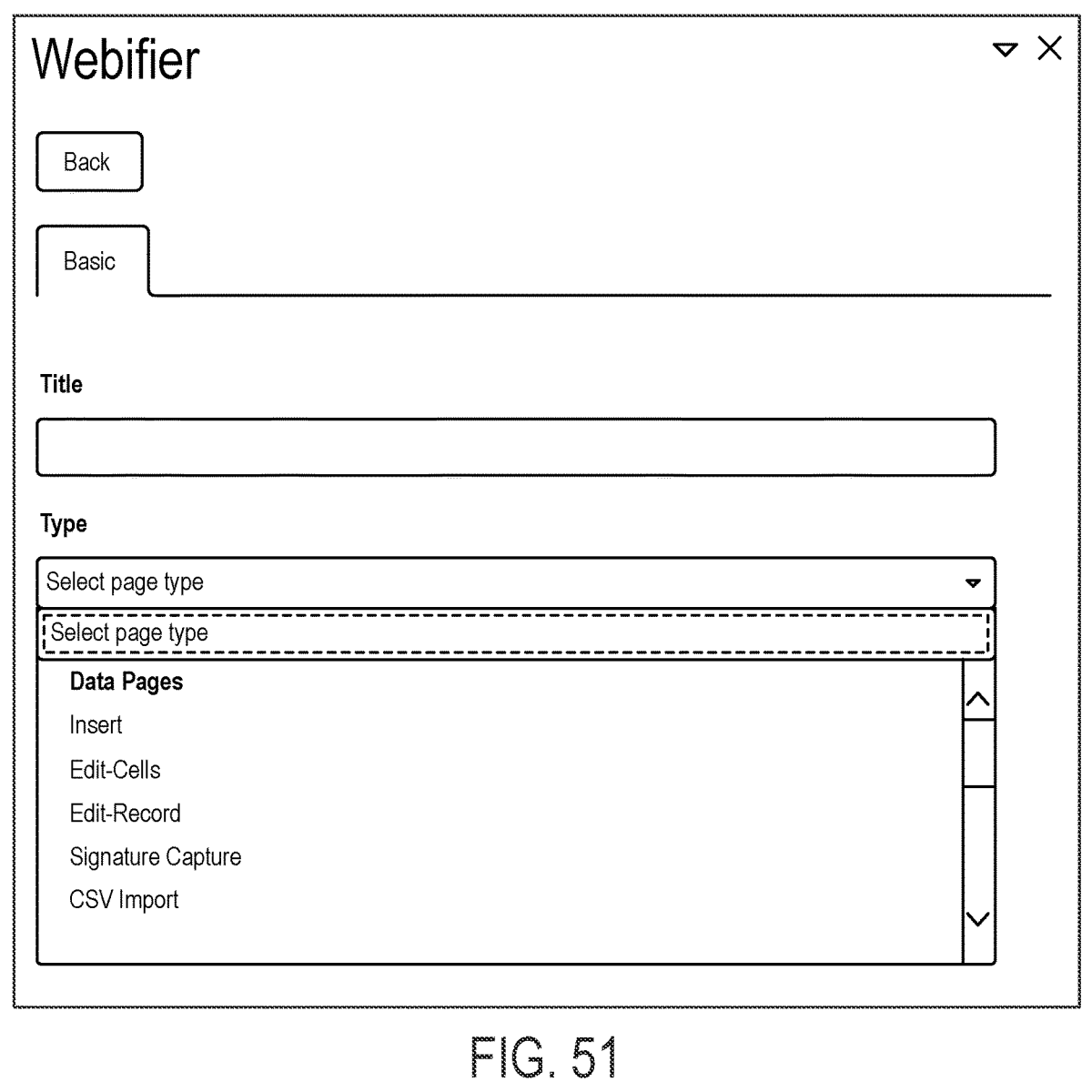

Webifier ▽ ✕

Back

Basic

Title

Type

Select page type ▼

Select page type

Data Pages

Insert

Edit-Cells

Edit-Record

Signature Capture

CSV Import

FIG. 51

Webifier                                                    ▽ ✕

[ Back ]

┌─ Basic ─┐

Title

[                                                                    ]

Type

[ Report                                                          ▼ ]

Source

[ Chart                        ▼ ]    [                            ▼ ]

[ Add Page ]  [ ⟳ ]

[ Make a Suggestion To Improve This Software ]

FIG. 52

| E4 | ▾ | : | ✕ | ✔ | *f*ₓ | =WEBIFIERINSERTCHAT("6ea6cc7f-6587-4b3e-86e3-30998d5a6154") |

| ◿ | A | B | C | D | E | F | G | H | I |
|---|---|---|---|---|---|---|---|---|---|
| 1 | Row Labels | Count of Hours | | | | | | | |
| 2 | Adobe | 6 | | | | | | | |
| 3 | Altavista | 100 | | | Discussion | | | | |
| 4 | Borland | 5 | | | 6ea6cc7f-6587-4b3e-86e3-30998d5a6154 | | | | |

FIG. 59

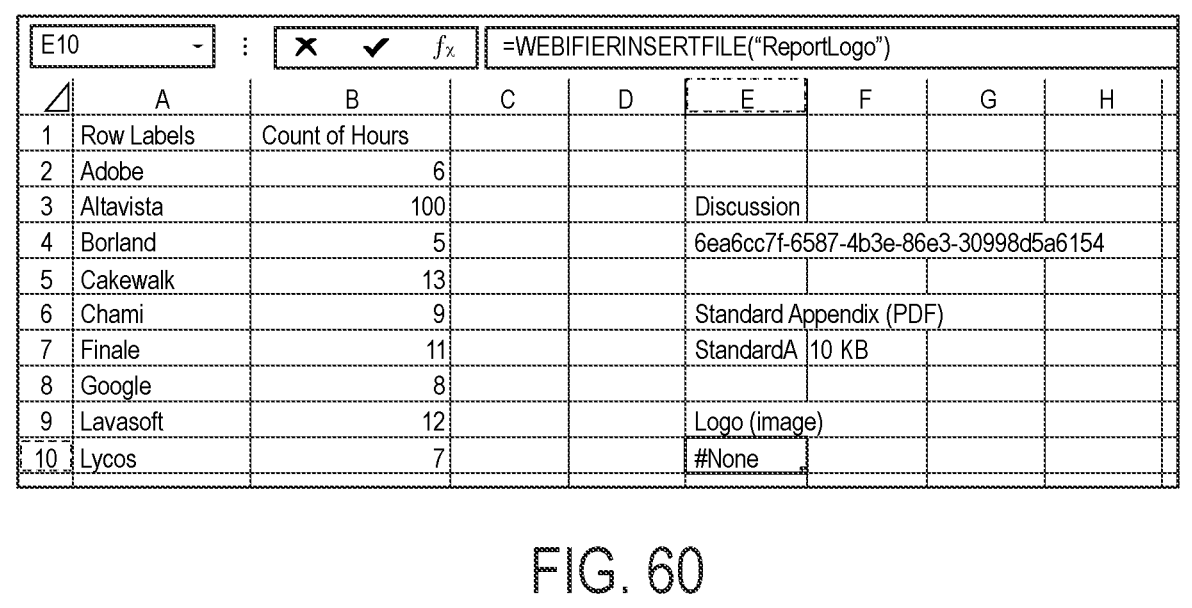

| E10 | ▾ | : | ✗ | ✓ | *fx* | =WEBIFIERINSERTFILE("ReportLogo") |

| △ | A | B | C | D | E | F | G | H |
|---|---|---|---|---|---|---|---|---|
| 1 | Row Labels | Count of Hours | | | | | | |
| 2 | Adobe | 6 | | | | | | |
| 3 | Altavista | 100 | | | Discussion | | | |
| 4 | Borland | 5 | | | 6ea6cc7f-6587-4b3e-86e3-30998d5a6154 | | | |
| 5 | Cakewalk | 13 | | | | | | |
| 6 | Chami | 9 | | | Standard Appendix (PDF) | | | |
| 7 | Finale | 11 | | | StandardA | 10 KB | | |
| 8 | Google | 8 | | | | | | |
| 9 | Lavasoft | 12 | | | Logo (image) | | | |
| 10 | Lycos | 7 | | | #None | | | |

FIG. 60

| E10 | ▾ | : | ✖ | ✔ | *f*x | =WEBIFIERINSERTFILE("ReportLogo") |

| ◢ | A | B | C | D | E | F | G | H |
|---|---|---|---|---|---|---|---|---|
| 1 | Row Labels | Count of Hours | | | | | | |
| 2 | Adobe | 6 | | | | | | |
| 3 | Altavista | 100 | | | Discussion | | | |
| 4 | Borland | 5 | | | 6ea6cc7f-6587-4b3e-86e3-30998d5a6154 | | | |
| 5 | Cakewalk | 13 | | | | | | |
| 6 | Chami | 9 | | | Standard Appendix (PDF) | | | |
| 7 | Finale | 11 | | | StandardA | 10 KB | | |
| 8 | Google | 8 | | | | | | |
| 9 | Lavasoft | 12 | | | Logo (image) | | | |
| 10 | Lycos | 7 | | | ReportLogo | | | |

FIG. 64

Webifier

👤 Hello, Administrator ▼

| Design an App ▼ | Test ▼ | Example_Timesheet ▼ | App 1 ▼ | Admin ▼ |

Back

Basic    More    Shares    Containers

| Employee | |
|---|---|
| Supervisor | |
| Project | |
| Date | |
| Time Start | |
| Time End | |
| Approval | |
| Hours | |

Save

Title    | Insert |

Type    | Insert                ▼ |

● Row   ○ Column

Source    | Works... ▼ |            ↻ |

Save Page    [ ↻ ]   [ ⚙ ]

Make a Suggestion To Improve This Software

Version 1.0.0.0 © 2016 Pleasant Solutions software built by
Pleasant Solutions

FIG. 70

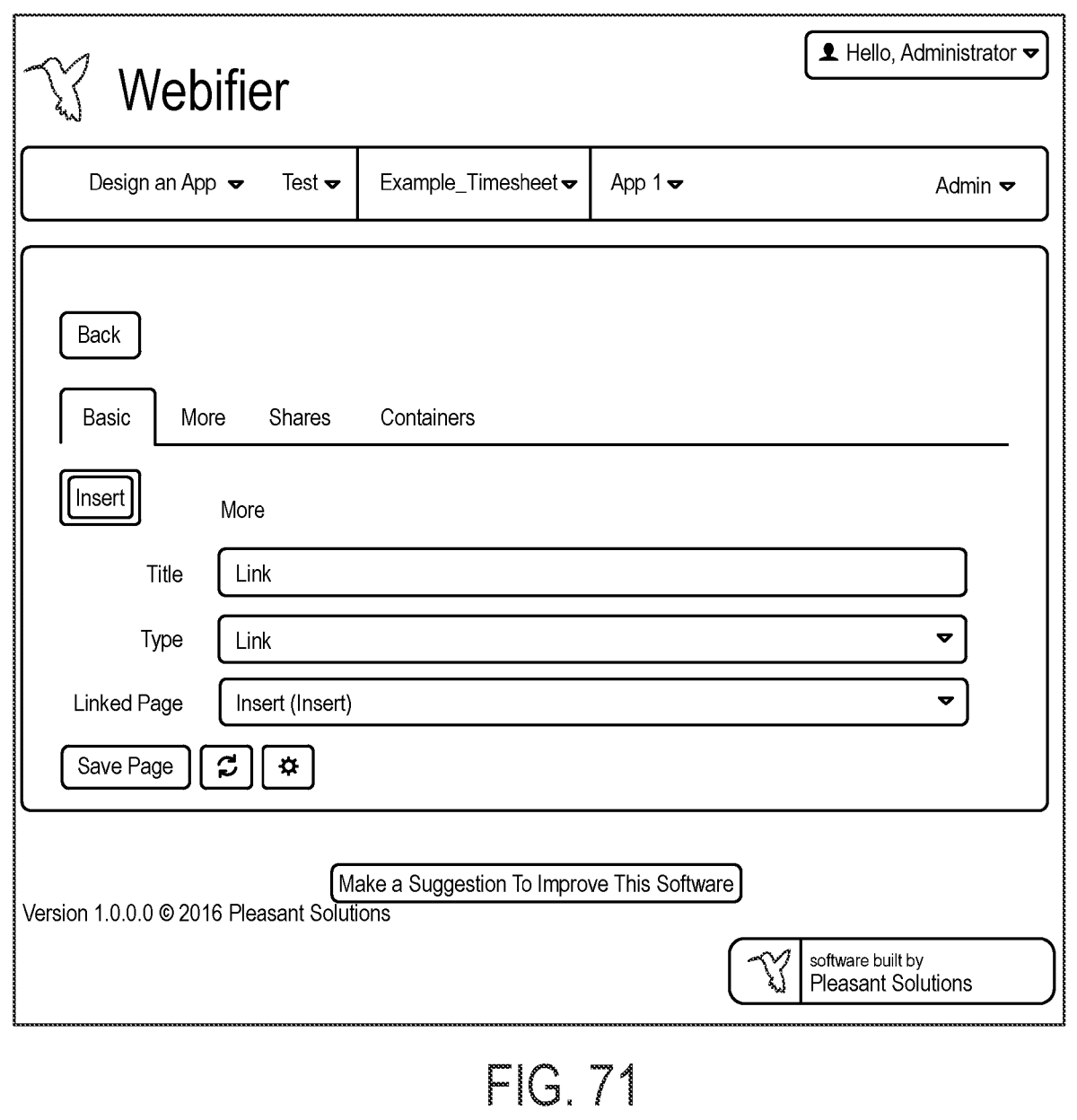

Webifier

👤 Hello, Administrator ▾

| Design an App ▾ | Test ▾ | Example_Timesheet ▾ | App 1 ▾ | Admin ▾ |

Back

Basic    More    Shares    Containers

Insert

More

Title    | Link |

Type    | Link ▾ |

Linked Page    | Insert (Insert) ▾ |

Save Page   ⟳   ⚙

Make a Suggestion To Improve This Software

Version 1.0.0.0 © 2016 Pleasant Solutions software built by
Pleasant Solutions

FIG. 71

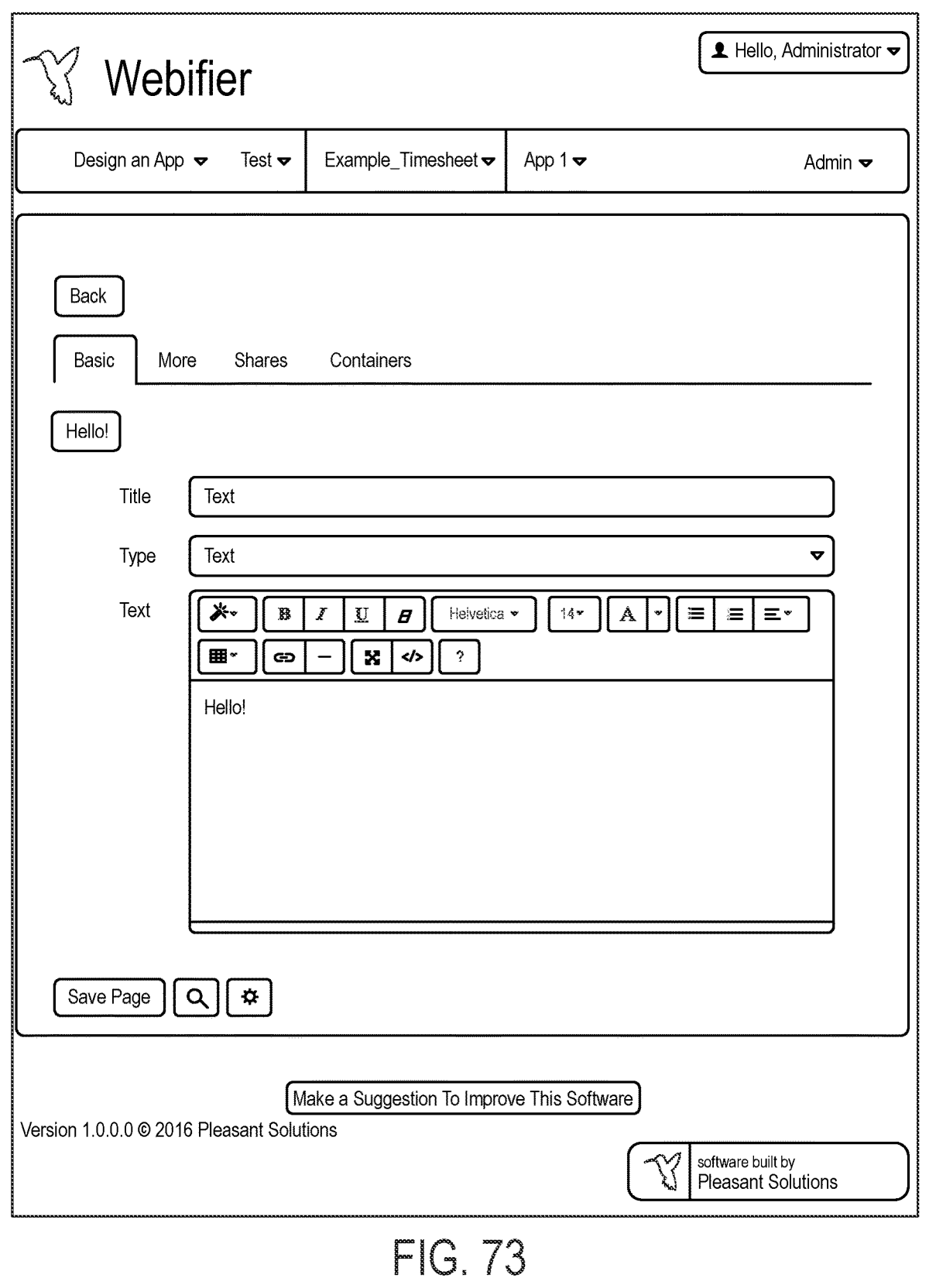

Webifier

👤 Hello, Administrator ▾

Design an App ▾    Test ▾    Example_Timesheet ▾    App 1 ▾       Admin ▾

Back

Basic    More    Shares    Containers

Hello!

Title    Text

Type    Text ▾

Text

⚒▾   B   *I*   U̲   𝐵   Helvetica ▾   14▾   A ▾   ☰   ☰   ☰▾

▦▾   🔗   —   ✕   </>   ?

Hello!

Save Page   🔍   ⚙

Make a Suggestion To Improve This Software

Version 1.0.0.0 © 2016 Pleasant Solutions software built by
Pleasant Solutions

FIG. 73

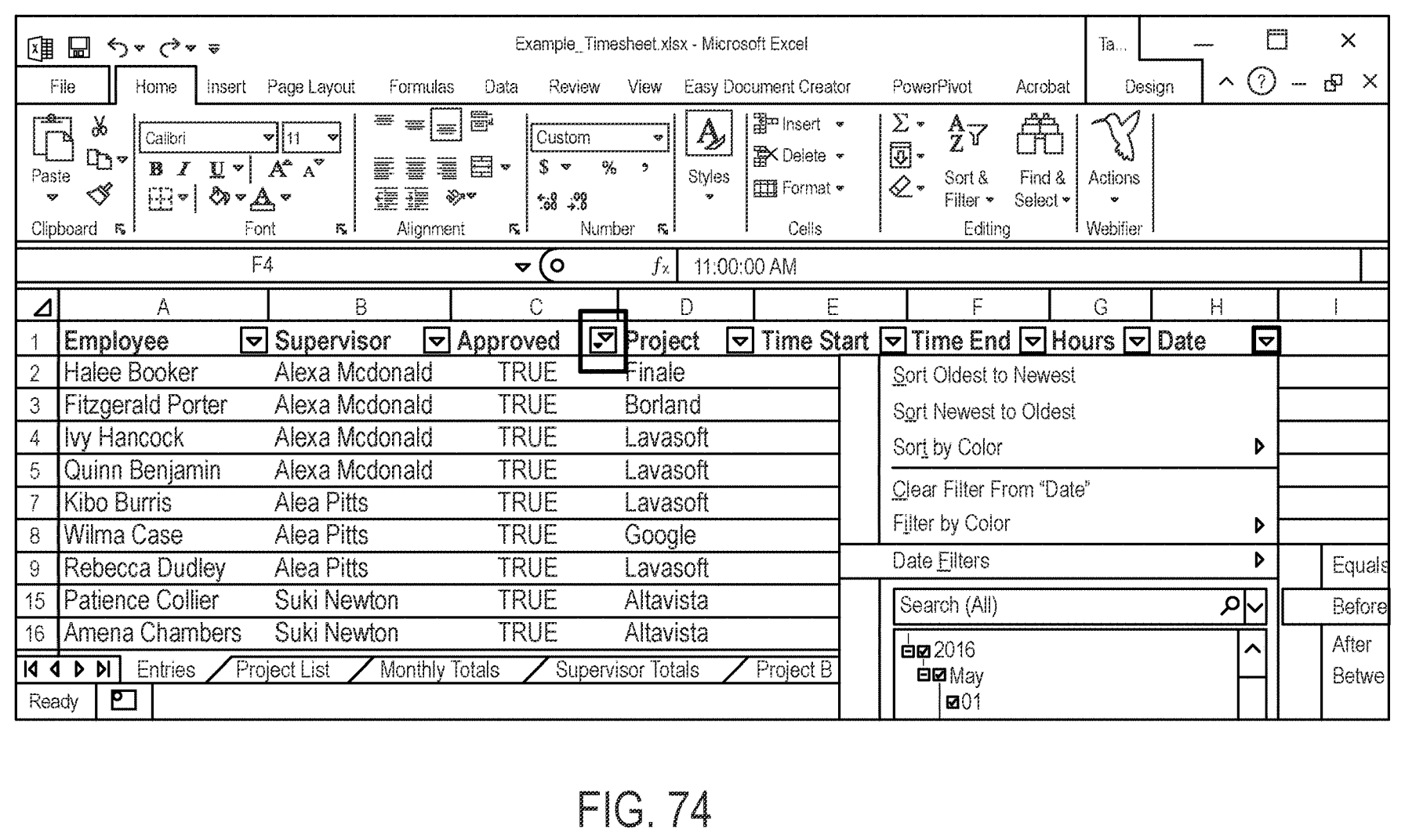

Example_Timesheet.xlsx - Microsoft Excel

| | File | Home | Insert | Page Layout | Formulas | Data | Review | View | Easy Document Creator | PowerPivot | Acrobat | Design |

F4

| △ | A | B | C | D | E | F | G | H | I |
|---|---|---|---|---|---|---|---|---|---|
| 1 | Employee | Supervisor | Approved | Project | Time Start | Time End | Hours | Date | |
| 2 | Halee Booker | Alexa Mcdonald | TRUE | Finale | | | | | |
| 3 | Fitzgerald Porter | Alexa Mcdonald | TRUE | Borland | | | | | |
| 4 | Ivy Hancock | Alexa Mcdonald | TRUE | Lavasoft | | | | | |
| 5 | Quinn Benjamin | Alexa Mcdonald | TRUE | Lavasoft | | | | | |
| 7 | Kibo Burris | Alea Pitts | TRUE | Lavasoft | | | | | |
| 8 | Wilma Case | Alea Pitts | TRUE | Google | | | | | |
| 9 | Rebecca Dudley | Alea Pitts | TRUE | Lavasoft | | | | | |
| 15 | Patience Collier | Suki Newton | TRUE | Altavista | | | | | |
| 16 | Amena Chambers | Suki Newton | TRUE | Altavista | | | | | |

11:00:00 AM

Sort Oldest to Newest
Sort Newest to Oldest
Sort by Color
Clear Filter From "Date"
Filter by Color
Date Filters          Equals
                      Before
Search (All)          After
                      Betwe
  2016
    May
      01

Entries / Project List / Monthly Totals / Supervisor Totals / Project B

Ready

FIG. 74

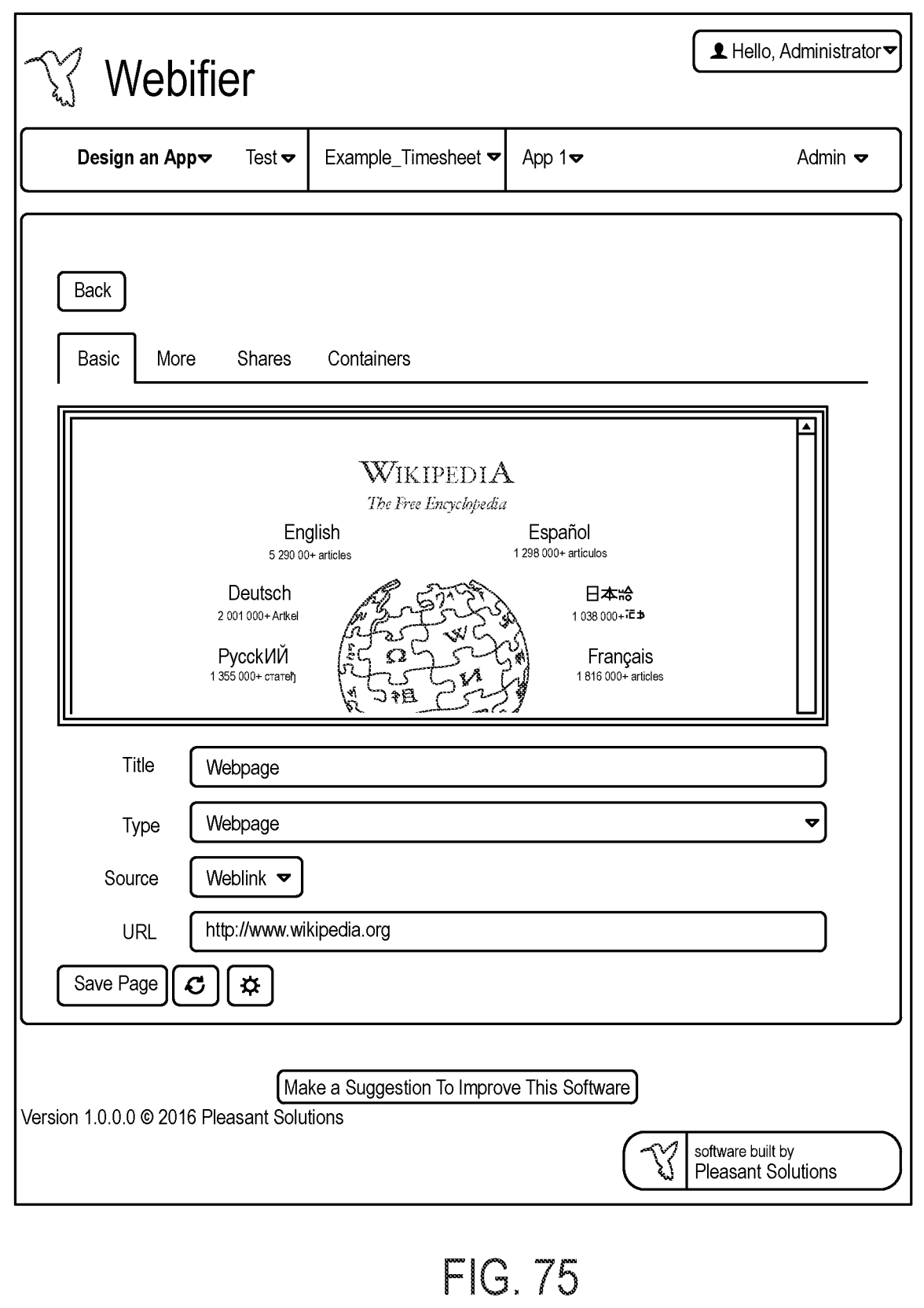

Webifier

👤 Hello, Administrator ▼

Design an App▼    Test ▼    Example_Timesheet ▼    App 1▼                    Admin ▼

Back

| Basic | More | Shares | Containers |

WIKIPEDIA
The Free Encyclopedia

English
5 290 00+ articles

Español
1 298 000+ artículos

Deutsch
2 001 000+ Artkel

日本語
1 038 000+ 記事

Русский
1 355 000+ статей

Français
1 816 000+ articles

Title        Webpage

Type        Webpage                                                ▼

Source      Weblink ▼

URL         http://www.wikipedia.org

Save Page   ↻   ☼

Make a Suggestion To Improve This Software

Version 1.0.0.0 © 2016 Pleasant Solutions software built by
Pleasant Solutions

FIG. 75

Webifier

👤 Hello, Administrator ▼

Design an App ▼    Test ▼    Example_Timesheet ▼    App 1 ▼                Admin ▼

Back    Insert

Basic    More    Shares    Containers

| Employee | |
|---|---|
| Supervisor | |
| Project | |
| Date | |
| Time Start | |
| Time End | |
| Approval | |
| Hours | |
| Save | |

Header Range    [ Use First Item ▼ ]

Show page after insert    After a web user has inserted data, this is the page that will be shown to them

[ None ▼ ]

☑ Show Page Title

Restrict User Input

Employee    [ ▼ ]

Supervisor    [ ▼ ]

Project    [ ▼ ]

Date    [ ▼ ]

Time Start    [ ▼ ]

Time End    [ ▼ ]

Approval    [ ▼ ]

Hours    [ ▼ ]

Save    🔄    Reset View

Make a Suggestion To Improve This Software

Version 1.0.0.0 © 2016 Pleasant Solutions software built by
Pleasant Solutions

FIG. 78

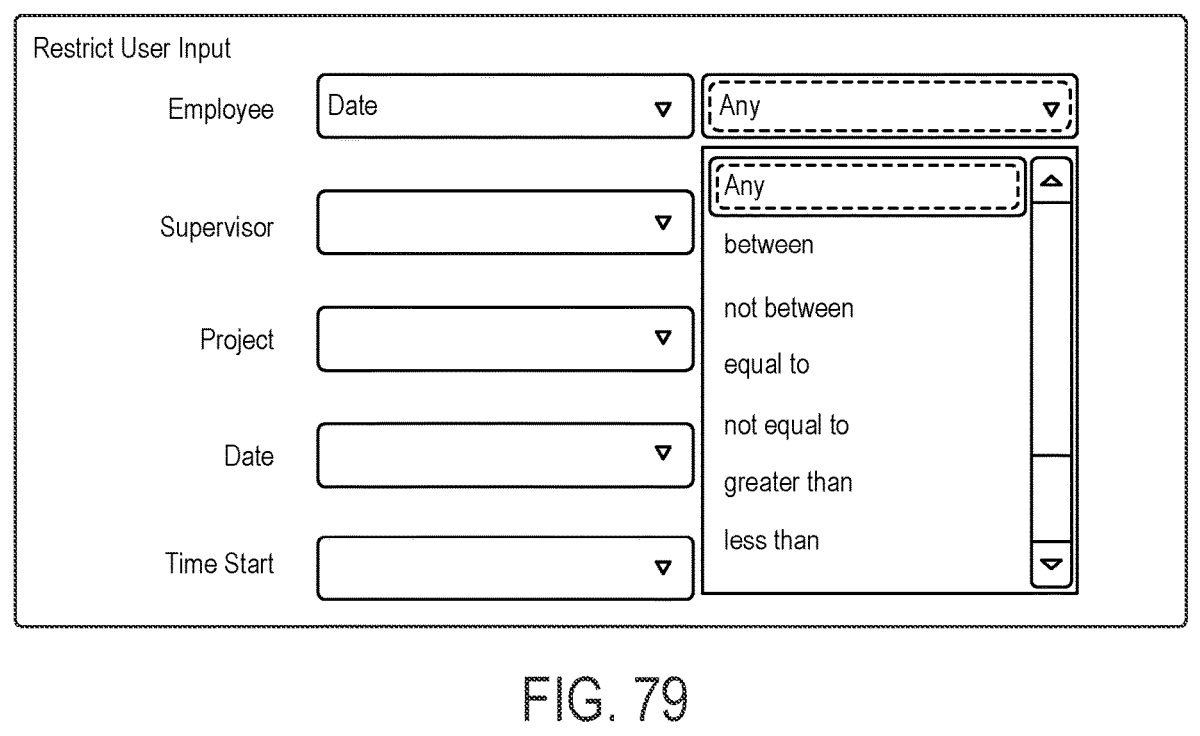

Restrict User Input

Employee    [ Date ▽ ]    [ Any ▽ ]

Any           ▲

Supervisor    [ ▽ ]       between not between

Project    [ ▽ ]       equal to not equal to

Date    [ ▽ ]       greater than less than

Time Start    [ ▽ ]       ▽

FIG. 79

Restrict User Input

Employee | List ▼ | Source ▼ | Project List: Project ▼

Source
Custom

Supervisor | ▼ |

FIG. 80

Editable Range   Everything          ▽

Everything

Defined Name

Custom Range

☐   Display Row and Clum

FIG. 81

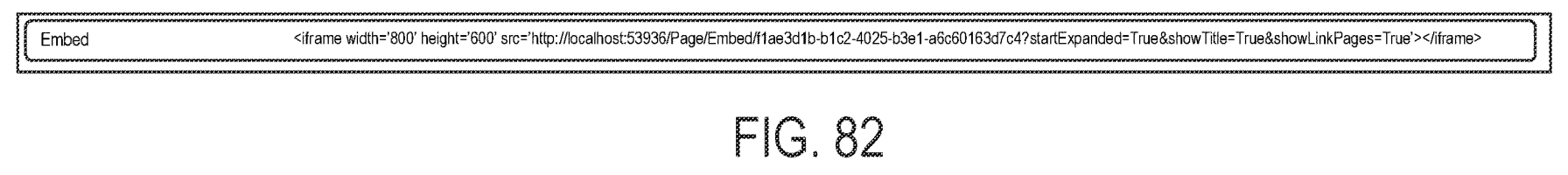

Embed

`<iframe width='800' height='600' src='http://localhost:53936/Page/Embed/f1ae3d1b-b1c2-4025-b3e1-a6c60163d7c4?startExpanded=True&showTitle=True&showLinkPages=True'></iframe>`

FIG. 82

Notification settings for admin

Add Setting

| Admin? | Disabled? | Notification Type | App/Page | Email? | Web Hook? | Delayed? | URL | | |
|---|---|---|---|---|---|---|---|---|---|
| | | Page Edit | myEditRow (Page) | Yes | Yes | | example.com/receive-page-edit-events | Edit | Delete |
| | Yes | Page Insert | myInsertPage (Page) | | Yes | | example.com/receive-page-insert-events | Edit | Delete |
| | Yes | Page Changed | myEditRow (Page) | | Yes | | example.com/receive-page-changed-events | Edit | Delete |
| | | App Changed | row_wise_data (App) | Yes | | | | Edit | Delete |
| | | App Changed | row_wise_data (App) | Yes | | | | Edit | Delete |

FIG. 83

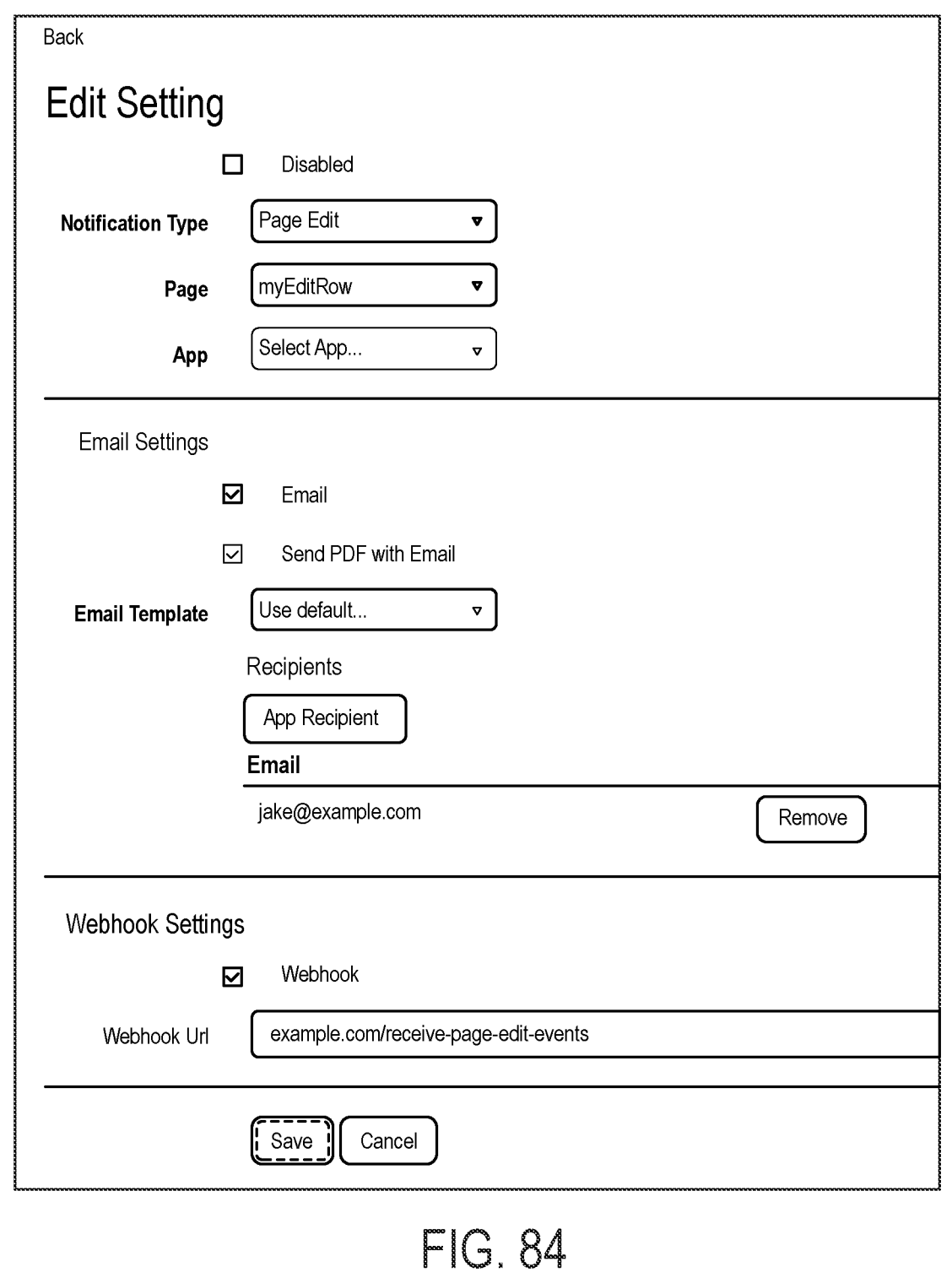

Back

Edit Setting

☐    Disabled

Notification Type    | Page Edit    ▾ |

Page    | myEditRow    ▾ |

App    | Select App...    ▾ |

Email Settings

☑    Email

☑    Send PDF with Email

Email Template    | Use default...    ▾ |

Recipients

| App Recipient |

Email jake@example.com    | Remove |

Webhook Settings

☑    Webhook

Webhook Url    | example.com/receive-page-edit-events |

| Save | | Cancel |

FIG. 84

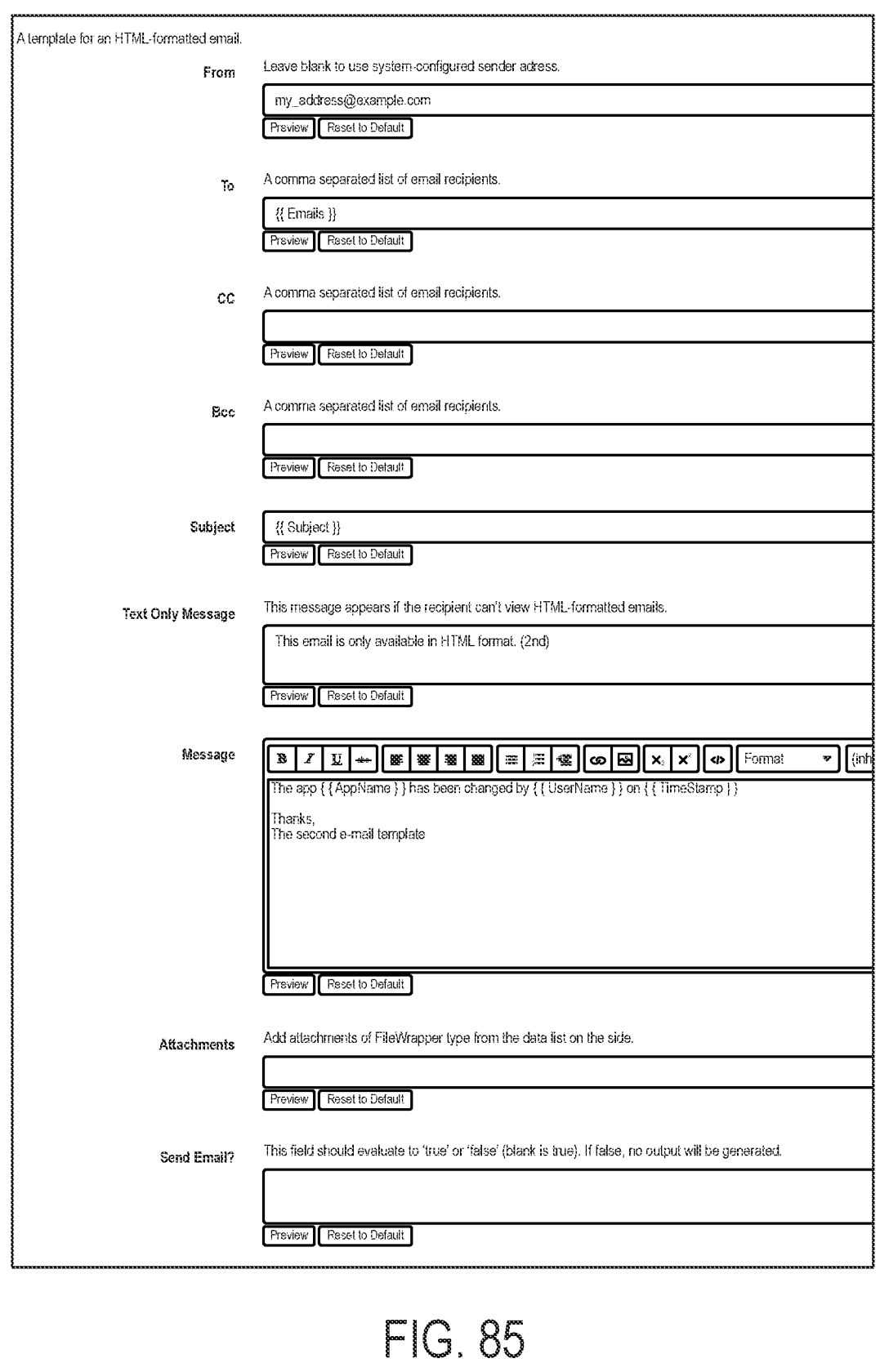

A template for an HTML-formatted email.

From

Leave blank to use system-configured sender adress.

my_address@example.com

[ Preview ] [ Reset to Default ]

To

A comma separated list of email recipients.

{{ Emails }}

[ Preview ] [ Reset to Default ]

CC

A comma separated list of email recipients.

[ Preview ] [ Reset to Default ]

Bcc

A comma separated list of email recipients.

[ Preview ] [ Reset to Default ]

Subject

{{ Subject }}

[ Preview ] [ Reset to Default ]

Text Only Message

This message appears if the recipient can't view HTML-formatted emails.

This email is only available in HTML format. (2nd)

[ Preview ] [ Reset to Default ]

Message

[ B ] [ I ] [ U ] [ ⇌ ] [ ▦ ] [ ▦ ] [ ▦ ] [ ▦ ] [ ≡ ] [ ≣ ] [ ✖ ] [ ◉ ] [ ⊠ ] [ x₂ ] [ x² ] [ </> ] [ Format ▾ ] [ (inh The app {{ AppName }} has been changed by {{ UserName }} on {{ TimeStamp }}

Thanks,
The second e-mail template

[ Preview ] [ Reset to Default ]

Attachments

Add attachments of FileWrapper type from the data list on the side.

[ Preview ] [ Reset to Default ]

Send Email?

This field should evaluate to 'true' or 'false' (blank is true). If false, no output will be generated.

[ Preview ] [ Reset to Default ]

FIG. 85

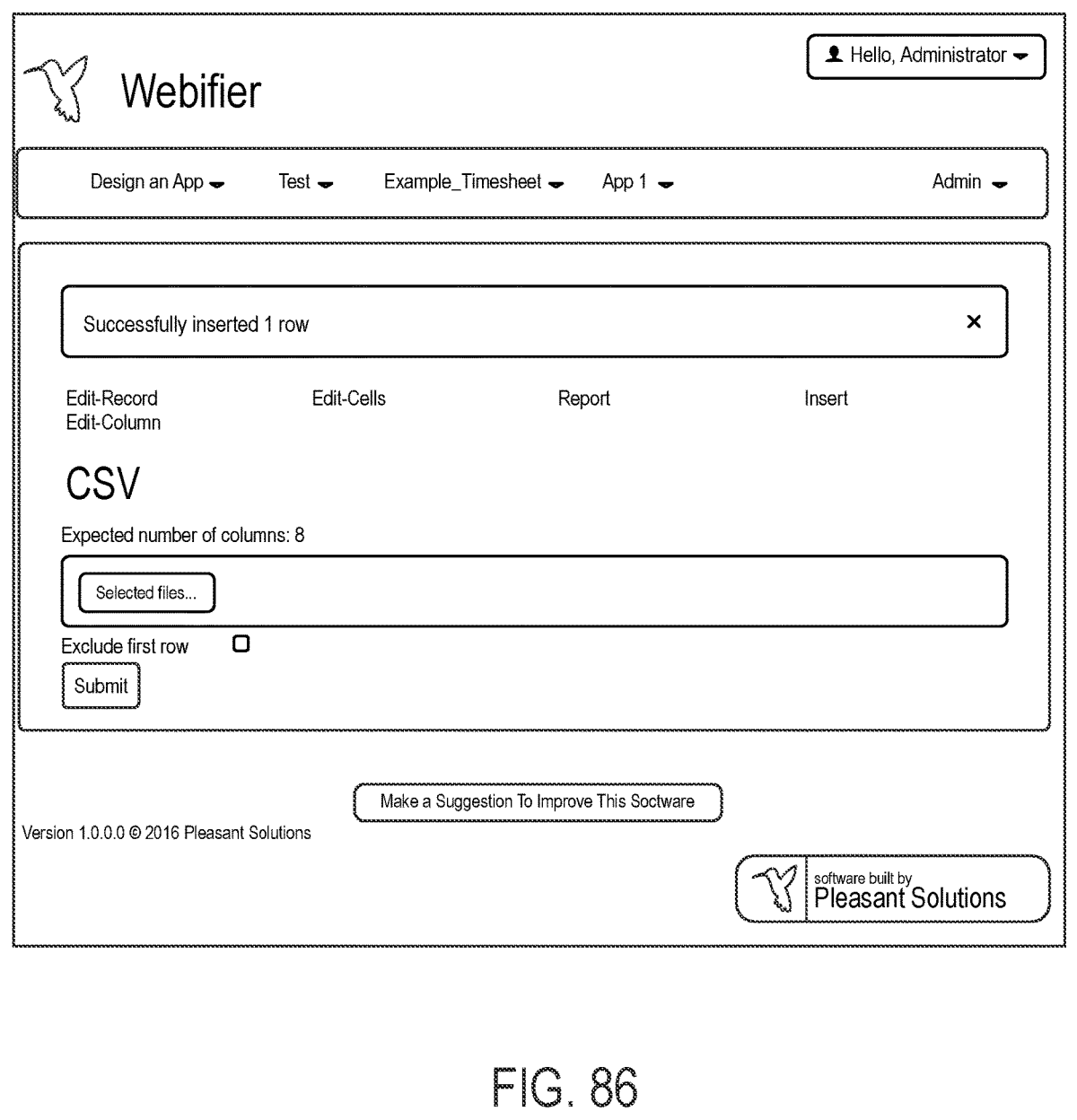

👤 Hello, Administrator ▼

Webifier

Design an App ▼     Test ▼     Example_Timesheet ▼     App 1 ▼          Admin ▼

Successfully inserted 1 row                                                        ✕

Edit-Record               Edit-Cells               Report               Insert
Edit-Column

CSV

Expected number of columns: 8

Selected files...

Exclude first row     ☐

Submit

Make a Suggestion To Improve This Soctware

Version 1.0.0.0 © 2016 Pleasant Solutions software built by
Pleasant Solutions

FIG. 86

Webifier

👤 Hello, Administrator ▼

Design an App ▼    Test ▼    Example_Timesheet ▼    App 1 ▼         Admin ▼

Successfully deleted                                       ✕

CSV            Report          Insert          Edit-Column
Edit-Cells

Edit -Record

| Employee | Supervisor | Project | Date | Time | Start Time | End | Approval | Hours | | |
|---|---|---|---|---|---|---|---|---|---|---|
| Fitzgerald Porter | Alexa Mcdonald | Borland | 1-May-16 | 8:03 | | 12:03 | yes | 4:00 | Edit Row 1 | Delete Row 1 |
| Ivy Hancock | Alexa Mcdonald | Lavasoft | 1-May-16 | 7:00 | | 11:00 | yes | 4:00 | Edit Row 2 | Delete Row 2 |
| Quinn Benjamin | Alexa Mcdonald | Lavasoft | 1-May-16 | 1:00 | | 4:30 | yes | 3:30 | Edit Row 3 | Delete Row 3 |
| Olivia Battle | Alexa Mcdonald | Cakewalk | 1-May-16 | 1:00 | | 5:15 | no | 4:15 | Edit Row 4 | Delete Row 4 |
| | | | | | | | | | Edit Row 5 | Delete Row 5 |

FIG. 89

Webifier

👤 Hello, Administrator▾

Design an App ▾    Test ▾    Example_Timesheet ▾    App 1 ▾    Admin ▾

Edit-Record

Back to edit-record page

| | |
|---|---|
| Employee | Test Name |
| Supervisor | Test Supervisor |
| Project | Finale ▾ |
| Date | 1-May-16 |
| Time Start | 8:05 |
| Time End | 11:55 |
| Approval | yes |
| Hours | 3:50 |

Save

FIG. 90

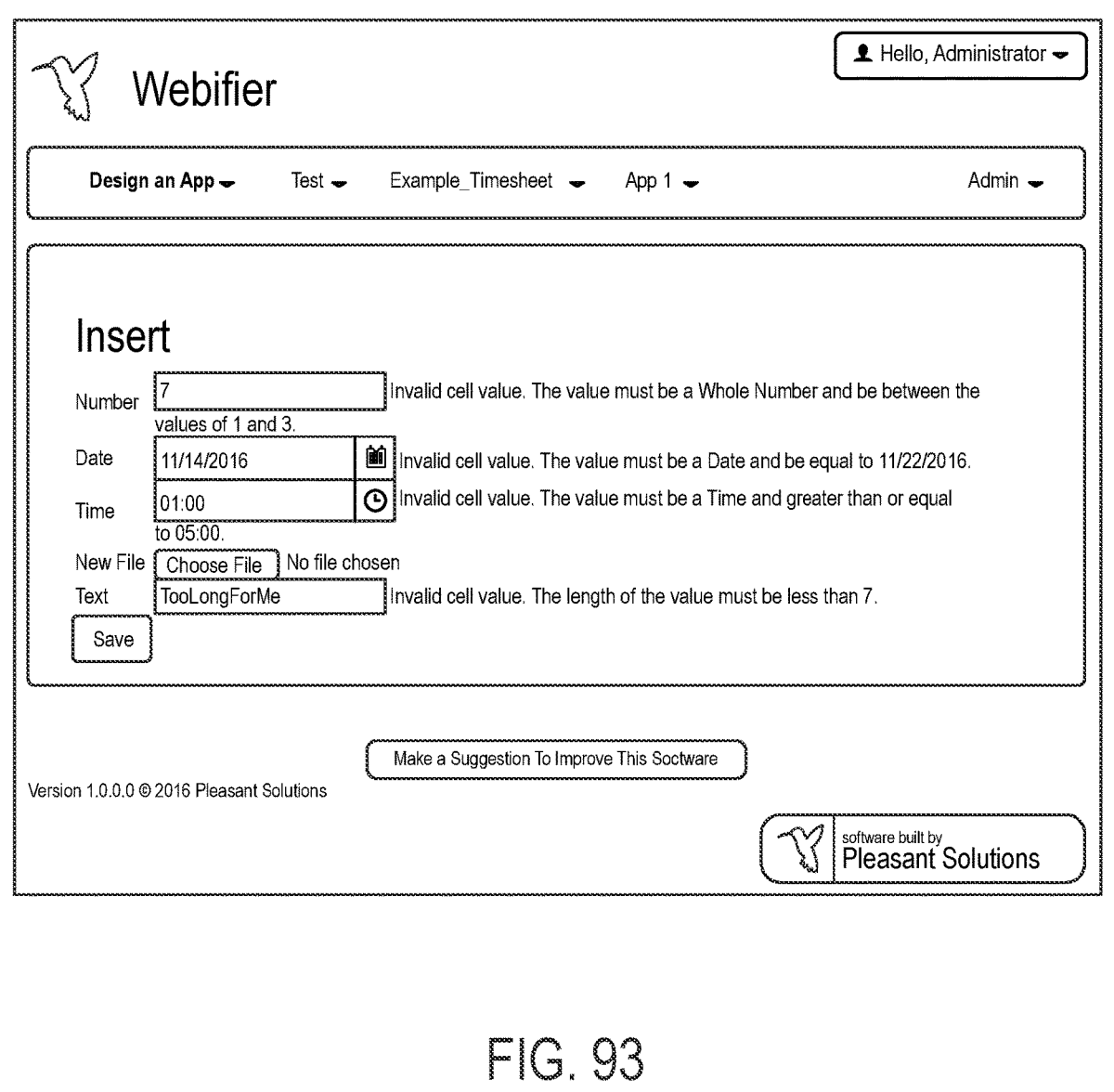

Webifier

👤 Hello, Administrator ▾

Design an App ▾   Test ▾   Example_Timesheet ▾   App 1 ▾   Admin ▾

Insert

Number | 7 | Invalid cell value. The value must be a Whole Number and be between the values of 1 and 3.

Date | 11/14/2016 📅 | Invalid cell value. The value must be a Date and be equal to 11/22/2016.

Time | 01:00 🕐 | Invalid cell value. The value must be a Time and greater than or equal to 05:00.

New File | Choose File | No file chosen

Text | TooLongForMe | Invalid cell value. The length of the value must be less than 7.

Save

Make a Suggestion To Improve This Soctware

Version 1.0.0.0 © 2016 Pleasant Solutions software built by
Pleasant Solutions

FIG. 93

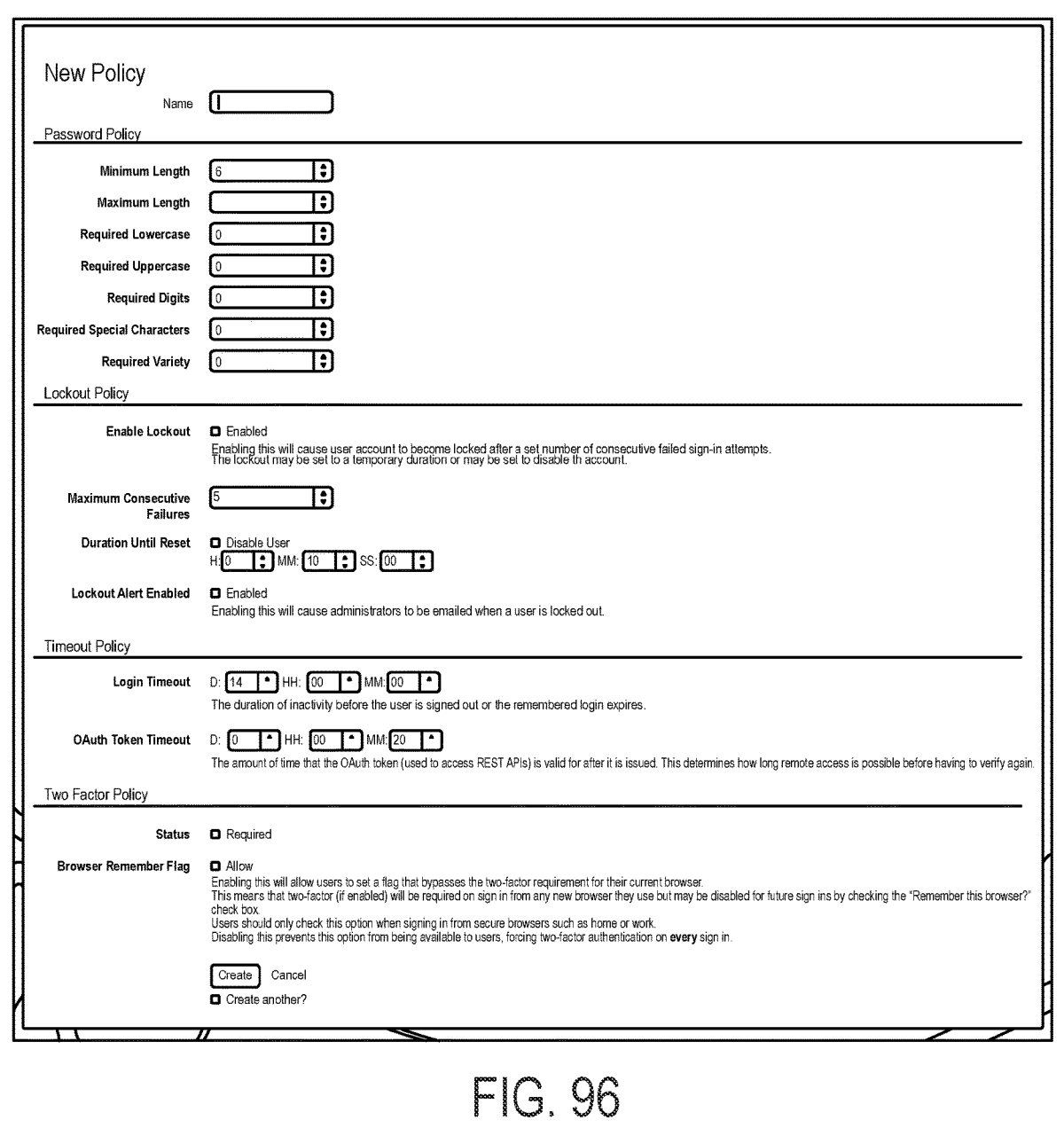

New Policy

Name [I_____]

Password Policy
_____

Minimum Length [6_____] [↕]

Maximum Length [_____] [↕]

Required Lowercase [0_____] [↕]

Required Uppercase [0_____] [↕]

Required Digits [0_____] [↕]

Required Special Characters [0_____] [↕]

Required Variety [0_____] [↕]

Lockout Policy
_____

Enable Lockout         ☐ Enabled
                       Enabling this will cause user account to become locked after a set number of consecutive failed sign-in attempts.
                       The lockout may be set to a temporary duration or may be set to disable th account.

Maximum Consecutive    [5_____] [↕]
Failures

Duration Until Reset   ☐ Disable User
                       H:[0  ][↕] MM:[10  ][↕] SS:[00  ][↕]

Lockout Alert Enabled  ☐ Enabled
                       Enabling this will cause administrators to be emailed when a user is locked out.

Timeout Policy
_____

Login Timeout          D:[14  ][▲] HH:[00  ][▲] MM:[00  ][▲]
                       The duration of inactivity before the user is signed out or the remembered login expires.

OAuth Token Timeout    D:[0  ][▲] HH:[00  ][▲] MM:[20  ][▲]
                       The amount of time that the OAuth token (used to access REST APIs) is valid for after it is issued. This determines how long remote access is possible before having to verify again.

Two Factor Policy
_____

Status                 ☐ Required

Browser Remember Flag  ☐ Allow
                       Enabling this will allow users to set a flag that bypasses the two-factor requirement for their current browser.
                       This means that two-factor (if enabled) will be required on sign in from any new browser they use but may be disabled for future sign ins by checking the "Remember this browser?"
                       check box.
                       Users should only check this option when signing in from secure browsers such as home or work.
                       Disabling this prevents this option from being available to users, forcing two-factor authentication on every sign in.

[Create]  Cancel
                       ☐ Create another?

FIG. 96

SPREADSHEET-BASED SOFTWARE APPLICATION DEVELOPMENT

CROSS-REFERENCE TO RELATED CASES

This application is a continuation of U.S. patent application Ser. No. 17/466,649 filed on Sep. 3, 2021, which is a continuation of U.S. patent application Ser. No. 16/745,976 filed on Jan. 17, 2020, which is a continuation of U.S. patent application Ser. No. 15/829,979 filed on Dec. 3, 2017, entitled "Spreadsheet-Based Software Application Development," which is a continuation-in-part of U.S. patent application Ser. No. 15/455,909 filed on Mar. 10, 2017, entitled "Spreadsheet-Based Software Application Development," which claimed priority to U.S. Provisional Patent Application No. 62/429,749 filed on Dec. 3, 2016, entitled "Spreadsheet-Based Software Application Development," each of which is herein incorporated by reference in its entirety for all purposes.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

Aspects described herein generally relate to application and software development for computers and computer networks. More specifically, aspects described herein provide systems and methods for low-code and no-code software development of custom, complex software such as interactive web applications, among others.

BACKGROUND

Software development can be a difficult and time consuming process. Specialized training and knowledge are generally required, and often years of experience is needed, before an individual can develop a complex and/or custom software application. Those who do not possess these skills must employ a software developer or software development company to do the software development, often at great expense. In addition, once the software development process has started, it can take weeks, months, or even years to develop custom and/or complex software.

Developing custom software applications to be used online or with mobile devices generally involves programming in a high-level programming language such as C# or Java. The more flexibility and power a software application has, the more time consuming and cost prohibitive it becomes for many organizations to fund or build. Even when software application developers utilize pre-built components to cost share among several clients, many projects remain time consuming to build due to unique requirements of each organization.

In some cases, software applications can be purchased off-the-shelf, but then an organization is limited to the features of the off-the-shelf product. Customization is often difficult, time consuming, and/or expensive, just as original software development would be.

Based on their incredibly powerful business analysis, record keeping and organizational capabilities, spreadsheets are now ubiquitous in business. Spreadsheets are used in business more than any category of software, except perhaps word processors. However, spreadsheets themselves lack the conceptual framework to be used as a platform tool to build software applications. At best, existing spreadsheet software may allow a user to include program code to perform one or more custom functions. However, that program code still must be written in an advanced language, such as Visual Basic, which again requires advanced programming skill, capabilities, and resources.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Spreadsheets are a popular tool and unique conceptual model for non-technical users to perform tasks such as calculations and printing reports. Spreadsheets are often used in two ways: a table where each row is a record, or having each record comprise an entire sheet or file. While spreadsheets and spreadsheet applications themselves lack the conceptual framework to act as a platform tool to build software applications, aspects described herein include tools and functionality operative to automatically generate complex interactive software and/or web applications using one or more spreadsheets as the underlying blueprints for such a system. Such tools and functionality, or methods and/or systems configured with one or more tools and/or functionality described herein, may also be referred to as a webifier, webifier system, webifier software, or the like.

To overcome limitations in the prior art as described above, and to overcome other limitations that will be apparent upon reading and understanding the present specification, one or more aspects described herein are directed to facilitating the creation of interactive web applications based on data and formatting templates included in a spreadsheet.

A first aspect described herein provides methods, systems, and computer readable media for generating an interactive web application comprising at least one web page. Techniques described herein may comprise analyzing a spreadsheet to identify one or more data sources each having one or more data records, and to identify one or more user interface templates each comprising a data format for one or more of the data sources. The spreadsheet may comprise a plurality of worksheets (also referred to herein as simply "sheets"), and a data source may comprise at least a portion of a first spreadsheet while a user interface template may comprise at least a portion of a second spreadsheet. A web data store may be generated based on extracting data records from the data sources identified within the spreadsheet and storing the data records in the web data store. The system may generate a particular web page of the interactive web application based on the extracted data records of the web data store, and the particular web page may comprise data records and/or references to data records identified by and formatted according to one or more user interface templates corresponding to the particular web page. The system may generate a presentation of the particular web page responsive to a request for a page. Further, the system may update the web data store responsive to receiving user input via the web application.

The user interface templates may define and/or comprise data formats for corresponding data sources and/or records, such as font formats, cell size, and/or any other suitable display formatting. In some embodiments, the user interface templates may define one or more data restrictions associated with a data source. Such data restrictions may be used to select data records from the data source. Alternatively and/or additionally, the user interface templates may define one or more input validation controls associated with a data source. The system may evaluate user input against an input validation control as part of or in addition to updating the web data store. According to some aspects, the one or more user interface templates may be stored in separate worksheets from the one or more data sources. In other aspects, the one or more user interface templates may be stored in the same worksheet as the one or more data sources.

According to some aspects, the system may update the interactive web application based on identifying one or more changes to at least one data format and/or data record in the spreadsheet. Changes to data formats in user interface templates may be implemented in the interactive web application without affecting the web data store. Changes to content of data records may automatically be reflected in pages of the interactive web application. The system may operate automatically to detect and/or analyze changes made to data records and/or data formats in the spreadsheet. According to some aspects, the system may update the underlying spreadsheet based on updates made to the web data store. Additionally and/or alternatively, the system may update the web data store based on changes made to data records in the spreadsheet. Similarly, the system may update the interactive web application based on changes made to data formats in user interface templates of the spreadsheet.

According to some aspects, the system may implement permission controls to limit the ability of users to view and/or modify data stored in the web data store and/or spreadsheet. Security permissions for users may be defined in the spreadsheet, such as in the one or more user interface templates. Security permissions may be defined using native formulas of a spreadsheet application associated with the spreadsheet. Additionally and/or alternatively, security permissions may be retrieved from sources other than the spreadsheet such as an administrative policy server. The system may prevent modification of the web data store by a first user having first security permissions. The system may allow modification of the web data store responsive to input received from a second user having second security permissions.

The spreadsheet may be generated using spreadsheet application software. For example, in some embodiments the spreadsheet may be generated using MICROSOFT EXCEL. The spreadsheet may comprise a data file and/or collection of files that conform to any conventional spreadsheet data format. For example, the spreadsheet may conform to the XLSX, MS-XLS and/or MS-XLSB binary data formats utilized in MICROSOFT EXCEL. In some embodiments, the generated web data store may comprise the spreadsheet, or vice versa.

According to some aspects, the interactive web application may generate input and/or output web pages based on the data records and/or user interface templates. In some embodiments, the system may generate a web input form based on the data sources identified in one or more user interface templates and may receive the user input to modify one or more records via the web input form. The system may generate a data output web page for outputting data from the web data store based on a first user interface template, and may generate a data editing web page usable to edit data in the web data store based on a second user interface template. In some embodiments, generating a particular web page may comprise selecting a user interface template corresponding to a client device characteristic associated with the particular web page.

According to another aspect or embodiment, a webifier system may be configured to generate an interactive web application comprising at least one web page by determining one or more data sources within a (or multiple) spreadsheet, each data source having zero or more data records, wherein the data sources comprise a first portion of the spreadsheet; determining one or more user interface templates from within the spreadsheet, each user interface template comprising a data format for one or more of the data sources, wherein the user interface templates comprise a second portion of the spreadsheet; generating a web data store comprising data records from the data sources identified within the spreadsheet; generating a particular web page of the interactive web application based on one or more user interface templates corresponding to the particular web page, wherein the particular web page references one or more data sources identified based on the one or more user interface templates corresponding to the particular web page; responsive to a request for a presentation of the particular web page of the interactive web application, generating the presentation of the particular web page including one or more data records identified by and formatted according to the one or more user interface templates corresponding to the particular web page; and updating the web data store responsive to receiving user input via a web page of the interactive web application generated based on the spreadsheet.

In some aspects, any combination of the following may be included within or by a webifier system: the web page of the interactive web application generated based on the spreadsheet is the particular web page; the spreadsheet comprises a plurality of worksheets, and the first portion of the spreadsheet is on a different worksheet than the second portion of the spreadsheet; the spreadsheet comprises a plurality of worksheets, and the one or more user interface templates are stored in the same worksheet as the one or more data sources; at least one data format of the user interface templates comprises a font format of a corresponding data source; at least one data format of the user interface templates is based on a cell size of a corresponding data source; the method may further include updating the spreadsheet based on updating the web data store; the method may further include analyzing the spreadsheet to identify one or more changes to at least one data format associated with the one or more user interface templates, and updating the interactive web application based on the changed data formats without affecting the web data store; the method may further include analyzing the spreadsheet to identify one or more changes made to the data records of the one or more data sources, and updating the web data store based on the changed data records (where such modification may occur automatically, at intervals, based on user input, etc.); the method may further include analyzing the spreadsheet to identify one or more changes made to at least one data record associated with the one or more data sources, and updating the web data store based on the changed data records (where such modification may further occur automatically, at intervals, based on user input, etc.)

In one or more embodiments, and in combination with any other embodiment, a webifier system may include security controls to prevent modification of the web data store by a first user having first security permissions, and allow modification of the web data store responsive to input received from a second user having second security permissions. The first and second security permissions may be determined based on the one or more user interface templates. A security permission may optionally be defined by a formula native to a spreadsheet application that generated the spreadsheet.

In one or more embodiments, and in combination with any other embodiment, the spreadsheet may comprise the generated web data store, or the web data store may be separate from the spreadsheet. Identification or generation of the web data store may include storing a record of the applicable spreadsheet(s) or portions thereof as storing the applicable data.

In one or more embodiments, and in combination with any other embodiment, a webifier system may use spreadsheets that conform to the XLSX, MS-XLS binary data format or MS-XLSB binary data format.

In one or more embodiments, and in combination with any other embodiment, a webifier system may, after generating the web data store, subsequently update the web data store based on one or more changes made to one or more data records in the spreadsheet.

In one or more embodiments, and in combination with any other embodiment, a webifier system may, after generating the particular web page, update the particular web page based on one or more changes made to one or more user interface templates in the spreadsheet.

In one or more embodiments, and in combination with any other embodiment, a webifier system may include at least one user interface template that identifies one or more data restrictions associated with a data source, and the system may generate the presentation of the particular webpage based on selecting data records that satisfy the one or more data restrictions. The one or more data restrictions may optionally comprise a user-level security restriction identified in the spreadsheet. Optionally, at least one of the one or more data restrictions may be defined by a formula native to a spreadsheet application associated with the spreadsheet.

In one or more embodiments, and in combination with any other embodiment, a webifier system may include at least one user interface template that identifies one or more input validation rules associated with a particular data source, and the system may further evaluate the user input against the one or more input validation rules. Optionally, when the web data store identifies one or more input validation rules associated with the particular web page, and system may evaluate the user input against the one or more input validation rules.

In one or more embodiments, and in combination with any other embodiment, a webifier system may receive user input via the web application, and the system may generate a web input form based on the data sources identified in one or more user interface templates, and receive the user input via the web input form.

In one or more embodiments, and in combination with any other embodiment, the interactive web application may generate a data output web page for outputting data from the web data store based on a first user interface template, and generate a data editing web page usable to edit data in the web data store based on a second user interface template.

In one or more embodiments, and in combination with any other embodiment, a webifier system may generate the particular web page by selecting a user interface template corresponding to a client device characteristic associated with the particular web page, e.g., to modify pages particular to mobile devices, among others.

According to another aspect, a webifier system may include one or more processors, and memory storing instructions that, when executed by the one or more processors, cause the system to generate an interactive software application (e.g., a web application). The webifier system may obtain, based on evaluating a spreadsheet, one or more data sources within the spreadsheet each having one or more data records, wherein the data sources comprise at least a portion of a first worksheet of the spreadsheet. The system may obtain, based on evaluating the spreadsheet, one or more user interface templates within the spreadsheet each comprising a data format for one or more of the data sources, wherein the user interface templates comprise at least a portion of a second worksheet of the spreadsheet. The system may optionally generate a web data store by extracting data records from the data sources identified within the spreadsheet and storing the data records in the web data store, or the system may use the spreadsheet as a web data store (in this or any other embodiment). The system may generate a particular web page of the interactive software application based the extracted data records of the web data store, wherein the particular web page comprises references to data records identified based on and formatted according to one or more user interface templates corresponding to the particular web page. Responsive to a request for a presentation of the particular web page of the interactive software application, the system may generate the presentation of the particular web page. The system may also update the web data store responsive to receiving user input via the interactive software application.

In one or more embodiments, and in combination with any other embodiment, a webifier system may include at least one user interface template that identifies one or more data restrictions associated with a data source. The instructions, when executed by the one or more processors, may further cause the system to generate the presentation of the particular webpage based on selecting data records that satisfy the one or more data restrictions.

According to another aspect or embodiment, a webifier system may generate an interactive web application. The webifier system may obtain, based on evaluating a spreadsheet, one or more data sources within the spreadsheet each having zero or more data records, wherein the data sources comprise at least a portion of a first worksheet of spreadsheet. The system may obtain, based on evaluating the spreadsheet, one or more user interface templates within the spreadsheet each comprising a data format for one or more of the data sources, wherein the user interface templates comprise at least a portion of a second worksheet of the spreadsheet. The system may generate a web data store comprising data records from the data sources identified within the spreadsheet. The system may generate a particular web page of the interactive web application based on one or more user interface templates corresponding to the particular web page, wherein the particular web page comprises references to at least one data source of the data sources and formatting based on the one or more user interface templates corresponding to the particular web page. The system may, responsive to a request for a presentation of the particular web page of the interactive web application, generate the presentation of the particular web page including one or more data records associated with the at least one data source and formatted according to the one or more user interface templates corresponding to the particular web page. The system may update the web data store responsive to receiving user input via the interactive web application.

The first worksheet may be the same worksheet or a different worksheet than the second worksheet.

According to another aspect, any one or more embodiments may further include generating a spreadsheet user interface presenting at least a portion of the spreadsheet for display, wherein the spreadsheet user interface comprises one or more controls allowing a user to identify one or more data sources within the spreadsheet and identify one or more user interface templates within the spreadsheet. Generating a particular web page of the interactive web application may then be performed in response to receiving user input via the one or more controls identifying at least the one or more user interface templates corresponding to the particular web page.

In one or more embodiments, and in combination with any other embodiment, the spreadsheet user interface comprises a two-dimensional arrangement of cells. Cells of the spreadsheet user interface may support numeric values, text values, and formulas. Cell formulas in the spreadsheet user interface may allow the user to specify math calculations. Cell formulas in the spreadsheet user interface may allow reference to multiple other cells. Cell formulas in the spreadsheet user interface may also support mathematical and string manipulation functions.

Optionally, cell formulas in the spreadsheet user interface may support references to named functions; cells of the spreadsheet user interface may support heterogeneous formats and formulas within a given row, a given column, or a given region of the spreadsheet user interface; and/or cell formulas in the spreadsheet user interface may support references to other cells containing other formulas, numeric values, or text values.

In some aspects, the spreadsheet user interface provides a visual editing user interface allowing users to edit and format cells of the spreadsheet user interface, and the visual editing user interface may provide visual feedback to users based on format changes, formula changes, and format evaluation values and/or rules.

In some aspects, the spreadsheet user interface may allow a user to indicate that contents of a single cell may visually span across multiple rows or multiple columns without affecting whether the contents of other cells may visually span across multiple rows or multiple columns.

In some aspects, the spreadsheet user interface may allow users to select cells and move cell contents to other cells by interacting with them to highlight a single cell or range of cells.

In some aspects, the spreadsheet user interface may allow users to select one or more cells in order to automatically insert a reference to those cells into a formula of a cell currently being edited.

In some embodiments user input may comprise a signature and metadata associated with the signature.

In some aspects, a webifier system may generate mobile software applications and/or content for display by a mobile device or mobile application. The webifier system may determine one or more data sources within a spreadsheet, each data source having one or more data records. The webifier system may determine one or more user interface templates within the spreadsheet, each template comprising a data format for one or more of the data sources. The webifier system may optionally generate a data store comprising data records from the data sources identified within the spreadsheet, or may use the spreadsheet as the data store. The webifier system may generate a plurality of versions of a particular web page based on one or more user interface templates corresponding to the particular web page, wherein the particular web page references one or more data sources identified based on the one or more user interface templates corresponding to the particular web page, and wherein at least one of the versions of the particular web page is a mobile version based on one or more user interface templates associated with mobile clients. The webifier system may receive a request for a presentation of the particular web page of the interactive web application from a mobile device, e.g., where the request identifies a user device as a mobile client or device. Responsive to the request, the webifier system may generate the presentation of the mobile version of the particular web page including one or more data records identified by and formatted according to the one or more user interface templates corresponding to the particular web page and the one or more user interface templates associated with mobile clients. The webifier system may update the data store responsive to receiving user input from the mobile device.

According to another aspect, and in combination with any other aspect or embodiment, a webifier system may generate a spreadsheet user interface presenting data records of a data file, wherein the spreadsheet user interface displays the data records in a row and column tabular format comprising a plurality of cells, and wherein the spreadsheet user interface allows users to define formulas to calculate the value of a first cell of the spreadsheet user interface based on a value of a second cell of the spreadsheet user interface.

The spreadsheet user interface may include a two-dimensional arrangement of cells supporting numeric values, text values, and formulas. Cell formulas in the spreadsheet user interface allow the user to specify math calculations, reference to multiple other cells, references to named functions (and/or regions), and/or mathematical and string manipulation functions.

In some aspects, the cells of the spreadsheet user interface may support heterogeneous formats within a given row, a given column, or a given region of the spreadsheet user interface and/or references to other cells containing other formulas, numeric values, or text values.

In some aspects, the spreadsheet user interface provides a visual editing user interface allowing users to edit and format cells of the spreadsheet user interface, and the visual editing user interface may provide visual feedback to users based on format changes, formula changes, and format evaluation values.

In some aspects, the spreadsheet user interface may allow a user to indicate that contents of a single cell may visually span across multiple rows or multiple columns without affecting whether the contents of other cells may visually span across multiple rows or multiple columns.

In some aspects, the spreadsheet user interface may allow users to select cells and move cell contents to other cells by interacting with them to highlight a single cell or range of cells, and/or allow users to select one or more cells in order to automatically insert a reference to those cells into a formula of a cell currently being edited.

According to another aspect or embodiment, a webifier system may generate an interaction software application. The webifier system may analyze (or process, determine, obtain, or the like) a (or multiple) spreadsheet to identify a one or more data sources each having one or more data records. The webifier system may analyze (or process, determine, obtain, or the like) the spreadsheet(s) to identify one or more user interface templates each comprising a data format for one or more data sources. The webifier system may optionally generate a web data store by extracting data records from the data sources identified within the spreadsheet, and store the data records in the web data store, or the webifier system may use the spreadsheet(s) as the web data store. Responsive to a request to create a particular web page within the interactive software application, the webifier system may identify one or more user interface templates corresponding to the particular web page, identify one or more data sources corresponding to the particular web page, and generate the particular web page based on the identified one or more user interface templates and based on the one or more identified data sources. The webifier system may, responsive to a request from a client device for the particular web page, retrieve one or more data records from the web data store based on the one or more identified data sources, and serve the particular web page including the one more retrieved data records formatted according to the one or more identified user interface templates. The webifier system may update the web data store (or spreadsheet, as applicable) responsive to receiving user input via the web application.

According to another aspect or embodiment, a webifier system may generate an interactive web application. The webifier system may analyze (or process, determine, obtain, etc.) a spreadsheet (or multiple spreadsheets) to identify a one or more data sources each having one or more data records. The webifier system may also identify within the spreadsheet(s) one or more user interface templates each comprising a data format for one or more data sources. The webifier system may optionally generate a web data store by extracting data records from the data sources identified within the spreadsheet, and storing the data records in the web data store, or the webifier system may use the spreadsheet(s) as the web data store. The webifier system, responsive to a first request for a particular web page within the interactive web application, may compose the particular web page using the data records from the web data store (or spreadsheet(s)), where the data records are identified by and formatted according to the one or more user interface templates corresponding to the particular web page. The webifier system may analyze the spreadsheet to identify one or more changes made after generating the web data store, and update the interactive web application using the one or more changes made to the spreadsheet. Responsive to a second request for the particular web page, the webifier system may compose the particular web page incorporating the one or more changes made to the spreadsheet.

In some aspects, the one or more changes made to the spreadsheet may include edits to the user interface templates, and composing the particular web page incorporating the one or more changes made to the spreadsheet includes generating the particular web page incorporating the edits to the user interface templates, without altering the data records.

In some aspects, where the one or more changes made to the spreadsheet include edits to the data records, then composing the particular web page incorporating the one or more changes made to the spreadsheet may include generating the particular web page incorporating the edits to the data records without altering the user interface templates.

Some aspects may provide a computer implemented method for generating an interactive web application comprising at least one web page. The method may comprise determining at least one primary data source within a spreadsheet. The primary data source may correspond to a first worksheet of the spreadsheet. At least one secondary data source may be determined within the spreadsheet corresponding to a different second worksheet of the spreadsheet. The method may determine a relationship between records of the primary data source and records of the secondary data source. Automatically and based on this determined relationship, the method may generate a third worksheet comprising at least a portion of the records of the primary data source and at least a portion of the records of the secondary data source. The third worksheet may comprise an indirect view of the records of the primary data source and/or the records of the secondary data source. Content of the third worksheet may be synchronized with content of the first worksheet and content of the second worksheet. The method may generate a particular web page of the interactive web application based on at least one user interface template corresponding to the particular web page. The particular web page may reference records of the third worksheet identified based on the at least one user interface template corresponding to the particular web page. The method may receive user input via an input control associated with the particular web page of the interactive web application and update at least one record of the primary data source and/or secondary data source based on the received user input and based on the determined relationship.

In some implementations, the method may determine a first user interface template within the spreadsheet that identifies the primary data source and the secondary data source. In response, the method may determine a relationship based on the first user interface template and generate the third worksheet based on that relationship. The method may comprise other ways of identifying relationships between the primary data source and the secondary data source, such as by receiving additional information from a user and/or by automatically detecting relationships based on information corresponding to one or more characteristics of the data, such as clues as described further herein. Corresponding systems and computer-readable media are also disclosed.

It should be noted that any feature described above may be used with any particular aspect or embodiment. Many combinations, modifications, or alterations to the features of the above embodiments and those described herein will be readily apparent to the skilled person and are intended to form part of the invention. Any of the features described specifically relating to one embodiment or example may be used in any other embodiment.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 4-98 are screenshots of a spreadsheet-based software application development system according to one or more illustrative aspects described herein.

DETAILED DESCRIPTION

Figure 1:
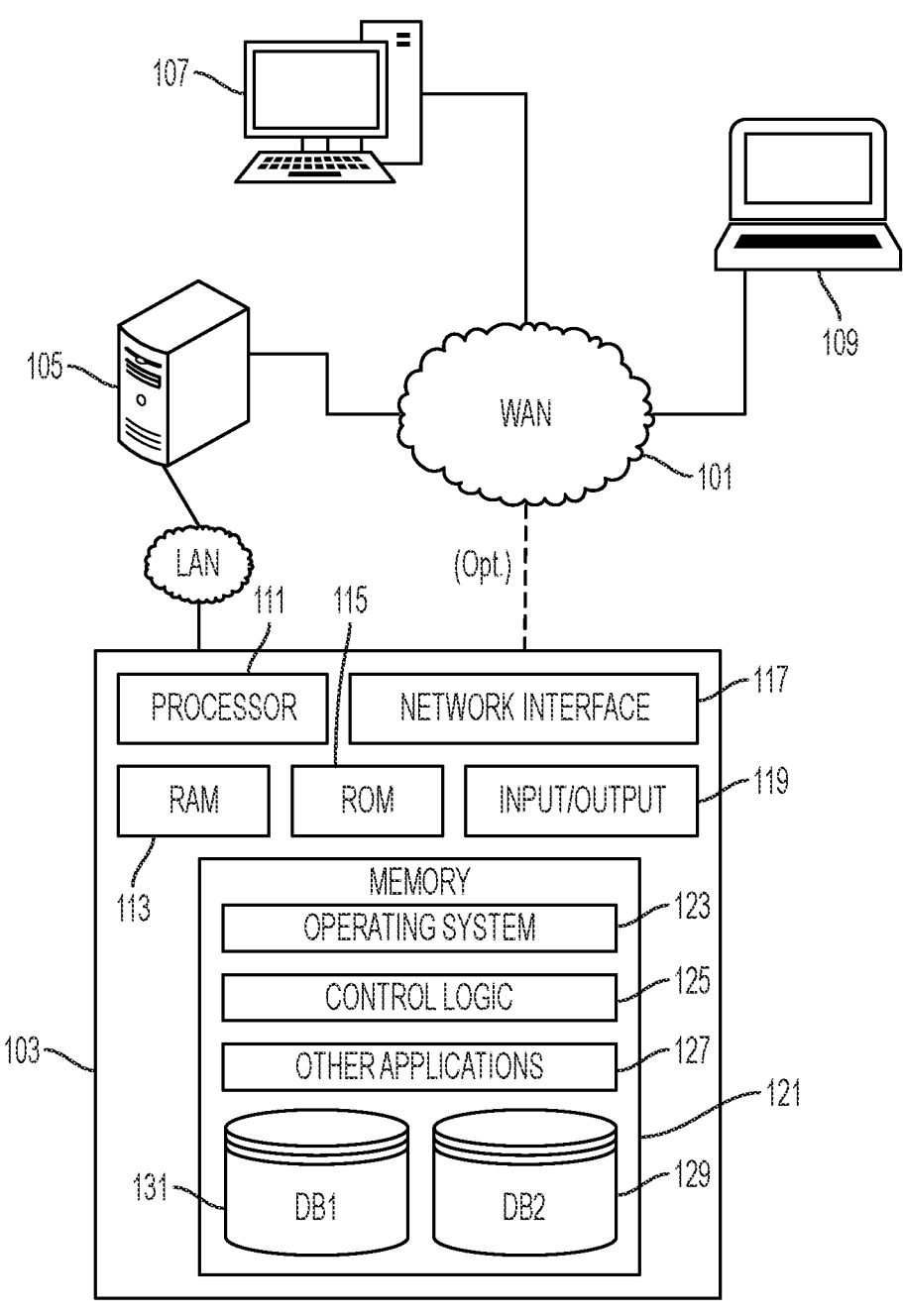
FIG. 1 illustrates a system architecture that may be used with one or more illustrative aspects described herein.

As a general introduction, aspects described herein may provide low-code/no-code methods and systems operative to automatically generate complex software applications using one or more spreadsheets as the underlying blueprints for the software application. According to some aspects, the resultant software application may be static (read-only), or may be interactive (read/write) to allow users to dynamically add, delete, edit, or otherwise amend application data, e.g., via one or more online web pages. Data transfer may be one-way or bi-directional between the blueprint spreadsheets and the resultant software application, in some embodiments, thereby allowing amended data to be transferred to and from the software application and the spreadsheet form, either back to the original spreadsheet(s) or new spreadsheet(s).

A spreadsheet as used herein refers to the logical arrangement of data for presentation to a user, regardless of the form that the data is stored. Spreadsheet software applications (e.g., MICROSOFT EXCEL, APPLE NUMBERS, and GNOME GNUMERIC) are a well-known type of software that allow users to create and edit spreadsheets in which data is arranged in rows and columns of a grid and can be manipulated and used in calculations. A spreadsheet software application may also refer to an interactive computer application for organization, analysis and storage of data in tabular form, either locally on a computer or usable in a cloud-based architecture. Spreadsheets have also been referred to as computerized simulations of paper accounting worksheets. Spreadsheet software applications generally operate on data entered in cells of a spreadsheet, where each cell of the spreadsheet may contain numeric data, text data, or the results of formulas that automatically calculate and display a value based on math equations, the contents of one or more other cells, or even externally linked data. According to one illustrative aspect, a spreadsheet may be defined as a data file usable by a particular spreadsheet software application. One or more spreadsheet documents or data files may comprise multiple individual and/or separate spreadsheets (e.g., worksheets, tabs), which may or may not reference data in other spreadsheets/worksheets from the same and/or different files. In one respect, spreadsheets differ from databases insofar as databases typically require data to be stored in one or more indexed tables, whereas spreadsheets support both database and non-database uses. Illustrative aspects described herein may relate to local spreadsheet application software. However, in other illustrative aspects a spreadsheet may be presented to a user via a user interface of a cloud-based system, presenting the user with spreadsheet functionality and features through a web browser or other networked user interface, irrespective of the back-end system architecture providing the functionality or the format in which the data is ultimately stored (e.g., GOOGLE SHEETS, MICROSOFT OFFICE ONLINE, EditGrid, ZK Spreadsheet, Sheetster, Smartsheet, DHTMLX Spreadsheet, Webix, eXpresso, ThinkFree Cell). Aspects described herein may be applied to both local spreadsheet application software implementations as well as cloud-based spreadsheet implementations, or any other spreadsheet implementation.

Spreadsheet applications typically have in common a characteristic two dimensional arrangement of cells in rows and columns when viewed by a user, potentially any additional dimensions represented as additional two dimensional arrangements, cells that are able to contain a numeric value or text value or formula input by a user, and cell formulas that allow the user to specify math calculations and/or to reference multiple other cells by the cells' position within the two dimensional arrangement. Some modern, complex, spreadsheet applications, including MICROSOFT EXCEL and GOOGLE SHEETS, sometimes have in common one or more of the further characteristics of cell formulas that can be mathematical or string manipulation formulas, cell formulas that can reference other cell's that contain other formulas or numeric values or text values, the ability for the user to format cells in a visual WYSIWYG ("What You See Is What You Get") editor, immediate visual feedback to the user of format changes and formula changes and formula evaluation resultant values, cell formulas that can call named functions such as "sum( )" or "concatenate( )", cell references that can be a single cell or a range of cells such as "A1:B10" or "A1:A10,C1:C10", cell ranges that can be assigned a text alias to be used in other cell references, a user interface that allows the user to select cells and move cell contents to other cells by interacting with them to first highlight a single cell or range of cells, a user interface that allows the user to select one or more cells in order to automatically insert a reference to those cells into the formula of the cell currently being edited, allowing the user to specify that a single cell or single cell's contents may visually span across multiple rows and/or columns without requiring other cells to span as well, minimal or no restrictions on the logical orientation of data such that the rows and columns are interchangeable and data could therefore be input in a pivoted orientation, cells where the format and values and formulas do not need to be consistent across an entire row or entire column or entire region of cells, and columns that can be changed in width as a group. Not all these features are required for an application to be a spreadsheet software application.

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope of the described aspects and embodiments. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing devices that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data— attributable to a single entity—which resides across all physical networks, e.g., using a storage area network (SAN, not shown).

The components may include a data server 103, web server 105, and client computers 107, 109. Data server 103 provides overall access, control and administration of databases and control software for performing one or more illustrative aspects described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 and/or web server 105 using remote computers 107, 109, e.g., using a web browser. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or other data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, webifier control logic 125 for instructing data server 103 to perform one or more aspects described herein, and other application software 127 providing secondary, support, and/or other functionality which may be used in conjunction with other aspects described herein, e.g., a spreadsheet software application. The webifier control logic may also be referred to herein as data server software, webifier system, webifier software, webifier plugin, or simply webifier. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including first data 129 (e.g., a spreadsheet document or file) and second data

131 (e.g., web data store, as further described below). Devices 105, 107, 109 may have similar or different architecture as described with respect to device 103. The functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects described herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a tangible and non-transitory computer readable medium such as a hard disk, optical disk, removable storage media, solid state memory, USB drive, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

According to one aspect, the webifier software may comprise a plug-in or module for use within an existing spreadsheet software application, e.g., a plugin within MICROSOFT EXCEL. Alternatively, the webifier software may comprise a standalone software application that accepts as input and generates as output one or more spreadsheet data files (e.g., a MICROSOFT EXCEL .xls/.xlsx workbook file or any other spreadsheet data file) and one or more software and/or web applications as described herein. MICROSOFT EXCEL is used for illustrative purposes only. The principles described herein are also applicable with other spreadsheet software applications, and other spreadsheet storage formats, schemas, and/or standards. For example, COREL QUATTRO PRO, GOOGLE SHEETS, GNUMERIC, OPENOFFICE CALC, or any other spreadsheet software, application, and/or document format may be used. As noted above, aspects herein may apply equally to both local spreadsheet application software implementations as well as cloud-based spreadsheet implementations.

Figure 2:
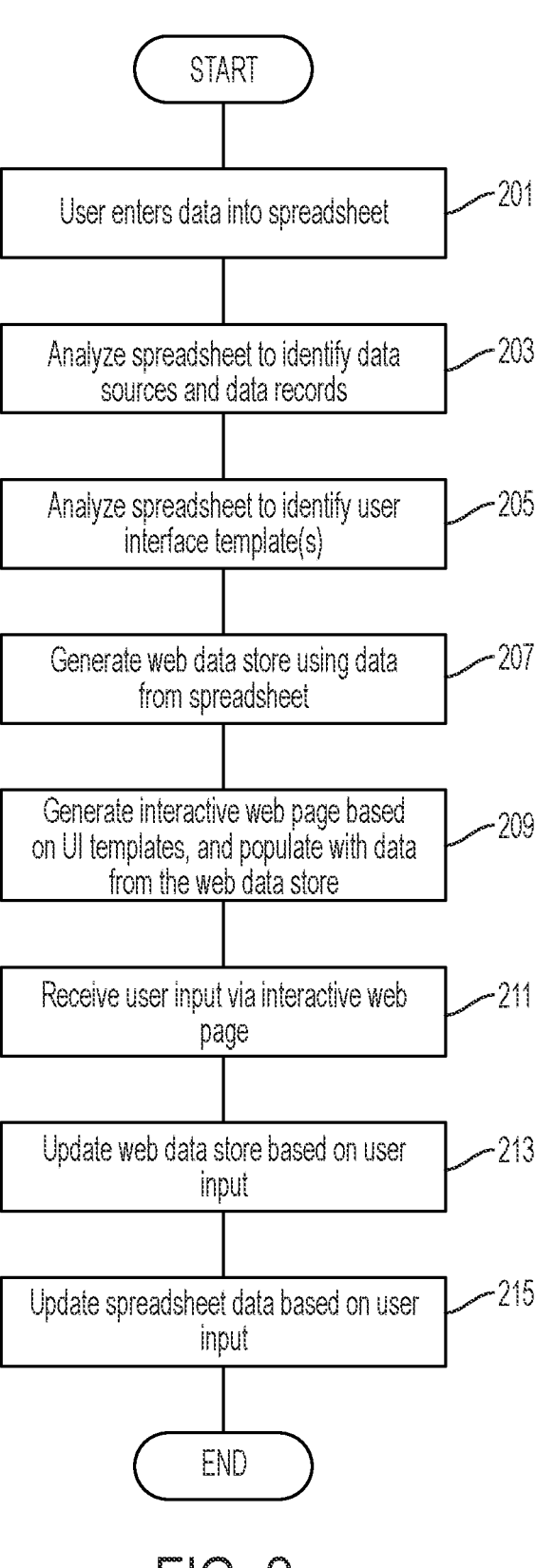
FIG. 2 is a method of performing rapid software application development according to one or more illustrative aspects described herein.

FIG. 2 shows an illustrative method of generating a software application, according to one or more aspects described herein. Initially, in step 201, a user (also referred to herein as a designer) may create and/or edit a spreadsheet using the spreadsheet software application of the designer's choice. The designer may set up and define a data source as a table where each row is a record of the data source, and/or define the data source as the spreadsheet file where each individual spreadsheet is a record of the data source. In this way the designer may define one or more data sources, and enter data records in the one or more data sources.

In step 203 the webifier software, either automatically or responsive to user input, may analyze the spreadsheet to identify data sources and data records. When responsive to user input, the webifier software may parse the spreadsheet in different ways depending on what type of user action is requested, as further described below.

In step 205 the webifier software may analyze the spreadsheet to identify one or more user interface templates. A user interface template may include a data format for one or more data sources, e.g., a font, size, color, style, etc., and/or may include a selection or identification of one or more data sources, each of which may include one or more data records. A user interface template may also include the data sources and records themselves.

Next, in step 207, the webifier software may generate a web data store using the data from the spreadsheet. The web data store may include all data from the spreadsheet, or only a subset of the data from the spreadsheet based on one or more criteria or limitations set by the designer, either in the spreadsheet itself or during the generation process. Alternatively, the web data store may comprise the spreadsheet itself or may be comprised in the spreadsheet.

In step 209 the webifier may generate one or more web pages as part of a dynamic interactive web application. Each web page may be based on one or more user interface templates identified in step 205. Each user interface template may define and/or identify a data format and/or one or more data sources for inclusion on a web page. Each web page, upon rendering or generation for transmission to an end-user browser, may be populated with data from the web data store meeting the criteria set forth in the user interface template. Where the user interface template comprises the data sources and records themselves, the resultant web page may appear as a simple web table based on the data in the spreadsheet.

One or more web pages may be generated as an interactive web page, for example as a result of the designer specifying an interactive capability as part of the user interface template, or as a result of the designer requesting interactive capabilities when instructing the webifier software to generate the corresponding web page.

In step 211, when a web page is interactive, the web application may receive user input to edit one or more data records via the web page, e.g., using form fields, input boxes, or any other user input mechanic. In step 213 the web application updates the web data store based on the user input, e.g., adding, editing, deleting, and/or otherwise amending the data previously stored in the web data store. In step 215, the webifier software and/or the web application may be used to update data in the original blueprint spreadsheet used to generate the web application in the first place, or may output the data to a new spreadsheet. When replacing the data in the blueprint spreadsheet, data formatting may be retained, and only the data is replaced/amended.

The above method is described with respect to a web software application. However, instead of web pages the webifier software may additionally and/or alternatively generate a standalone software application for direct use on a particular computer or computers, thereby alleviating the need for network access when using the software application. The above method may thereby be used to create custom and/or complex software applications. A "complex" application refers to an application having multiple features such as data input, reports, multiple users, per-user security access settings, workflows, automatic notification systems, saving of historic information, logging of changes by all users, and/or file attachments, among others. A "custom" application may refer to software built to fit a particular business's needs, no matter how unique the requirements.

Results of such a custom application are not off-the-shelf (out of the box) software designed to do one common thing, although custom applications can often do that too. Thus, the webifier software may not be tied to a single purpose. Rather, the webifier software is dynamic and flexible, and may be able to be used by anyone with average skill using sophisticated software applications such as a productivity suite of software, and thereby acts as a replacement to hiring a custom software developer.

In an illustrative implementation, there are at least two types of users or actors in the system. First is a designer, which is the person or persons designing a software, web or mobile application using the webifier software. A second is a visitor or end-user as the person(s) who visit the end result webpages, standalone application, or uses the resulting mobile application in ways largely intended by the designer.

Figure 3A:
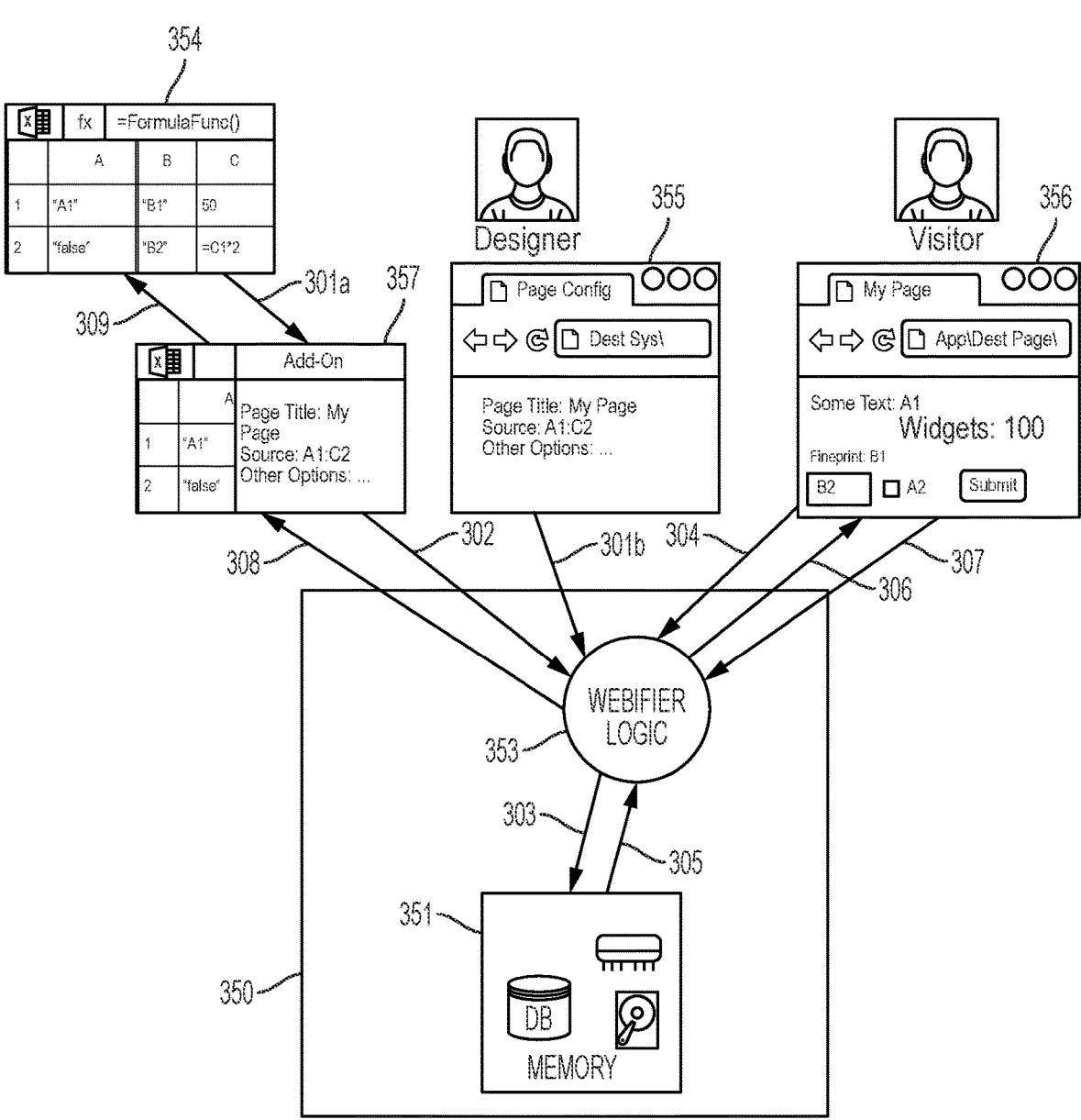
FIGS. 3A and 3B show illustrative software system architectures that each may be used to implement one or more illustrative aspects described herein.

FIG. 3A depicts an illustrative software architecture where the destination system 350 comprises the webifier logic 353 and memory 351, and an a spreadsheet client application 354 (e.g., MS EXCEL) with a webifier Add-On 357 installed. The Add-On 357 may load its interface from the destination system 350 using http requests.

As further illustrated by FIG. 3A, a designer may create or make record sheet and template sheet changes to familiar worksheets using the spreadsheet application 354 and the data changes are observed 301*a* by the Add-On 357, e.g., using Excel's COM Interop library. When the designer has completed a group of changes, the Add-On 357 may send 302 the updated partial, or alternatively full, spreadsheet definition to the destination system's 350 webifier logic 353 using web-service API calls. The webifier logic 353 may process the new data and update 303 data stored in memory 351 (e.g., a web data store). The designer may create or make changes to destination page configuration using the Add-on 357, which may be sent 302 to the webifier logic controller 353 as web-service API calls. Additionally, the designer may create or make changes in a browser 355 accessing the destination system, which may be sent 301*b* to the Webifier logic controller as http requests or web-service API calls.

Responsive to an http get request 304 from a visitor's browser 356 to the webifier logic 353 to provide a destination page, the webifier logic 353 may retrieve 305 the spreadsheet definition from memory 351. The webifier logic converts the spreadsheet definition into an html destination page by evaluating and referencing values and formatting from the template sheet and evaluating and referencing values from the record sheet identified based on the template sheets. The destination page may be sent 306 to the visitor's browser 356. FIG. 3A further illustrates the visitor sees a page having text labels found only in the template sheet and not in the record sheet, text labels originating from Record-Sheet!A1, values of "100" from evaluating RecordSheet!C2, and html input controls defined by the template sheet with values from the RecordSheet, RecordSheet!A2 for the checkbox and RecordSheet!B2 for the textbox. FIG. 3A illustrates the visitor checking the checkbox and clicking submit in the browser 356 resulting in the browser sending an http post request 307 to the webifier logic controller 353. The webifier logic 353 may reload the current spreadsheet definition from memory 305. The webifier logic 353 processes the post request and updates the memory 351 with an updated spreadsheet definition. If the designer's Add-On 357 still has an active session, webifier logic 353 may send 308 the updated partial spreadsheet definition, or change events sufficient to update the spreadsheet definition presented, to the Add-On 357, then using Excel's COM Interop library the Add-On 357 may present 309 an updated version to the designer in the spreadsheet application 354 such that the designer's worksheet would then display "true" in cell A2.

Figure 3B:
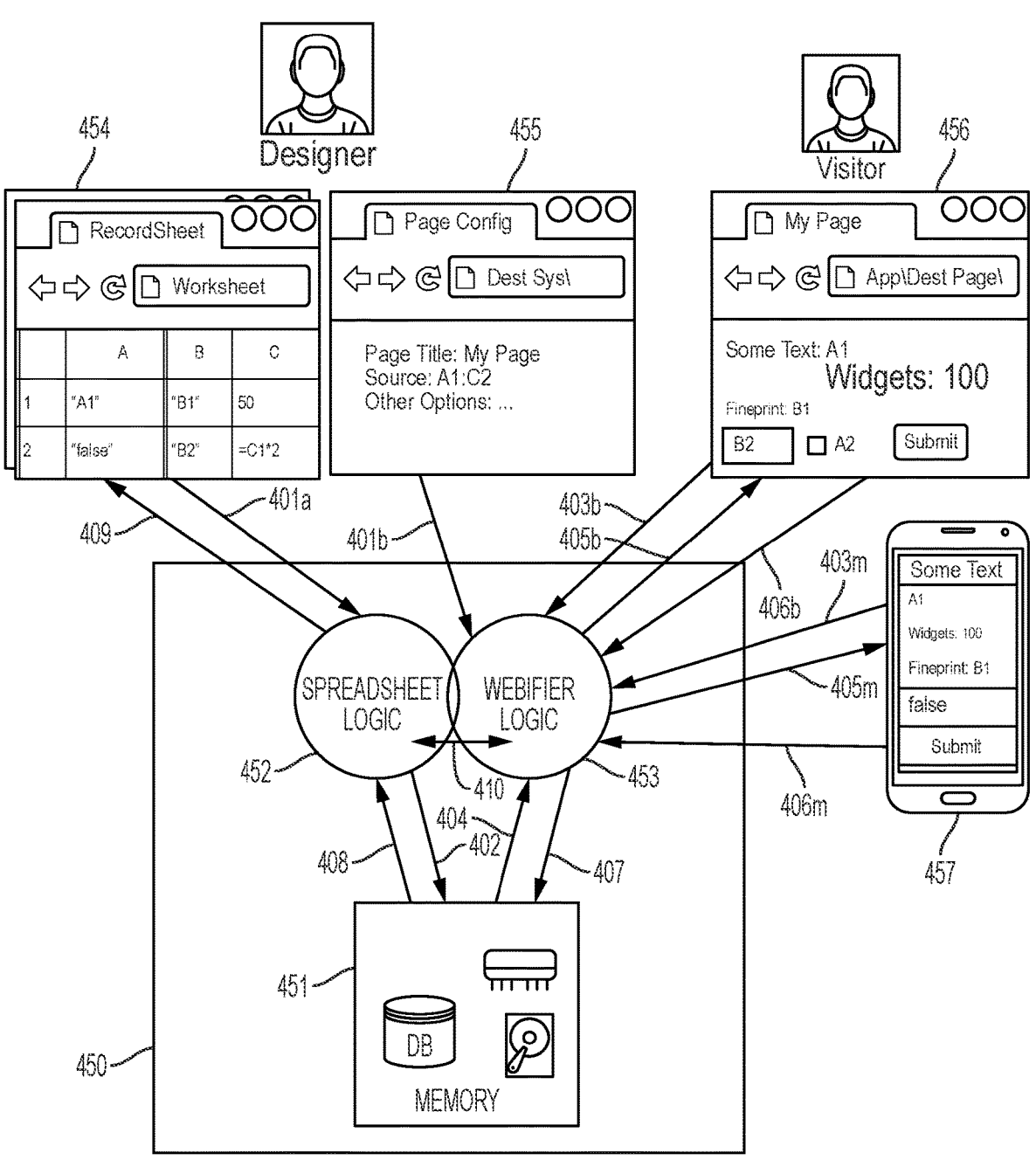

FIG. 3B depicts an alternative illustrative software architecture using tight integration between spreadsheet and webifier logic, described in more detail below in the section entitled Tight Integration.

Additional details regarding illustrative aspects of the webifier system will now be described in more detail below with additional reference to FIGS. 4-98, which show illustrative screenshots of a spreadsheet-based software application development system according to one or more illustrative aspects described herein. The depicted screenshots are illustrative in nature, and are not intended to limit the scope of any aspect described herein. The illustrative screenshots are not meant to limit a webifier to use with a particular spreadsheet application or with any particular system architecture. Rather, the screenshots illustrate various features and capabilities of the webifier system, regardless of whether used with local or cloud based spreadsheet applications.

FIGS. 4-10 are screenshots of a spreadsheet application, with the Add-On installed, having available formula functions specific to the Webifier.

Figure 11:
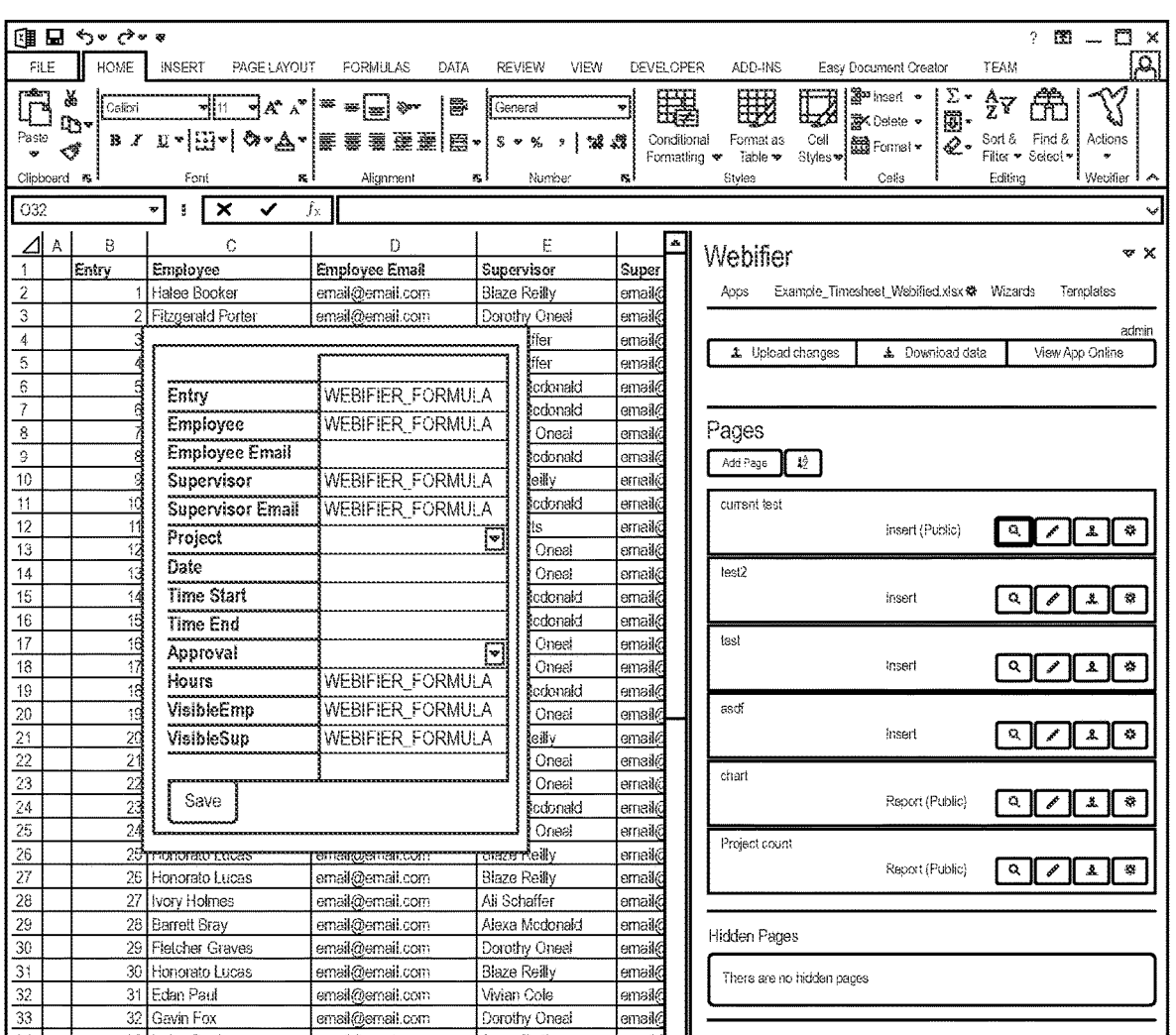

FIG. 11 is a screenshot of the Add-On's page list showing a popup thumbnail preview of the destination page that visitors may see when visiting that page.

Figure 12:
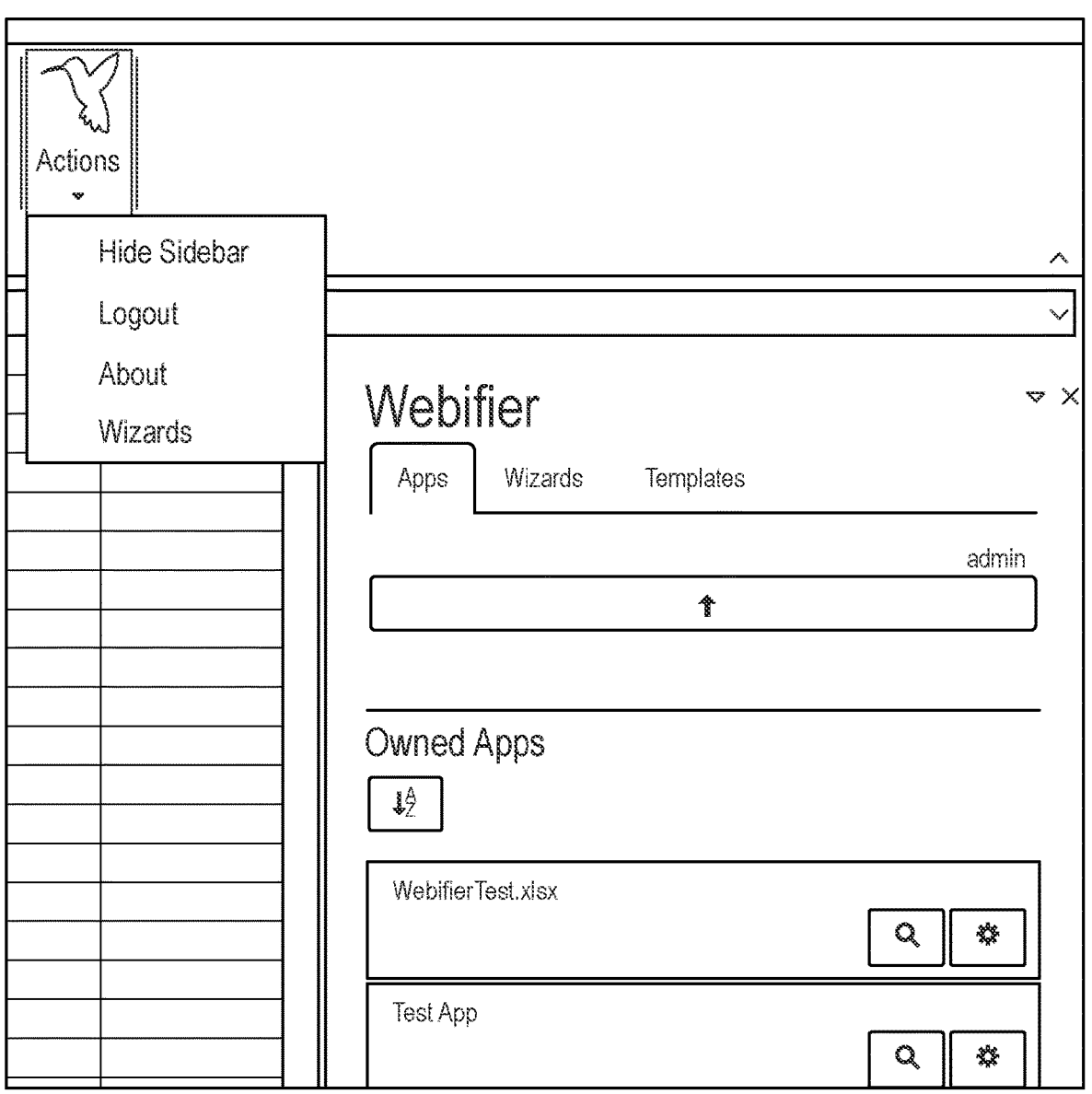

FIG. 12 is a screenshot of a spreadsheet application with the Add-On installed where an additional menu has been added to the spreadsheet application toolbar, where the user is logged in, and showing the Add-On interface within a frame on the side of the spreadsheet application with a list of web-apps available.

Figure 13:
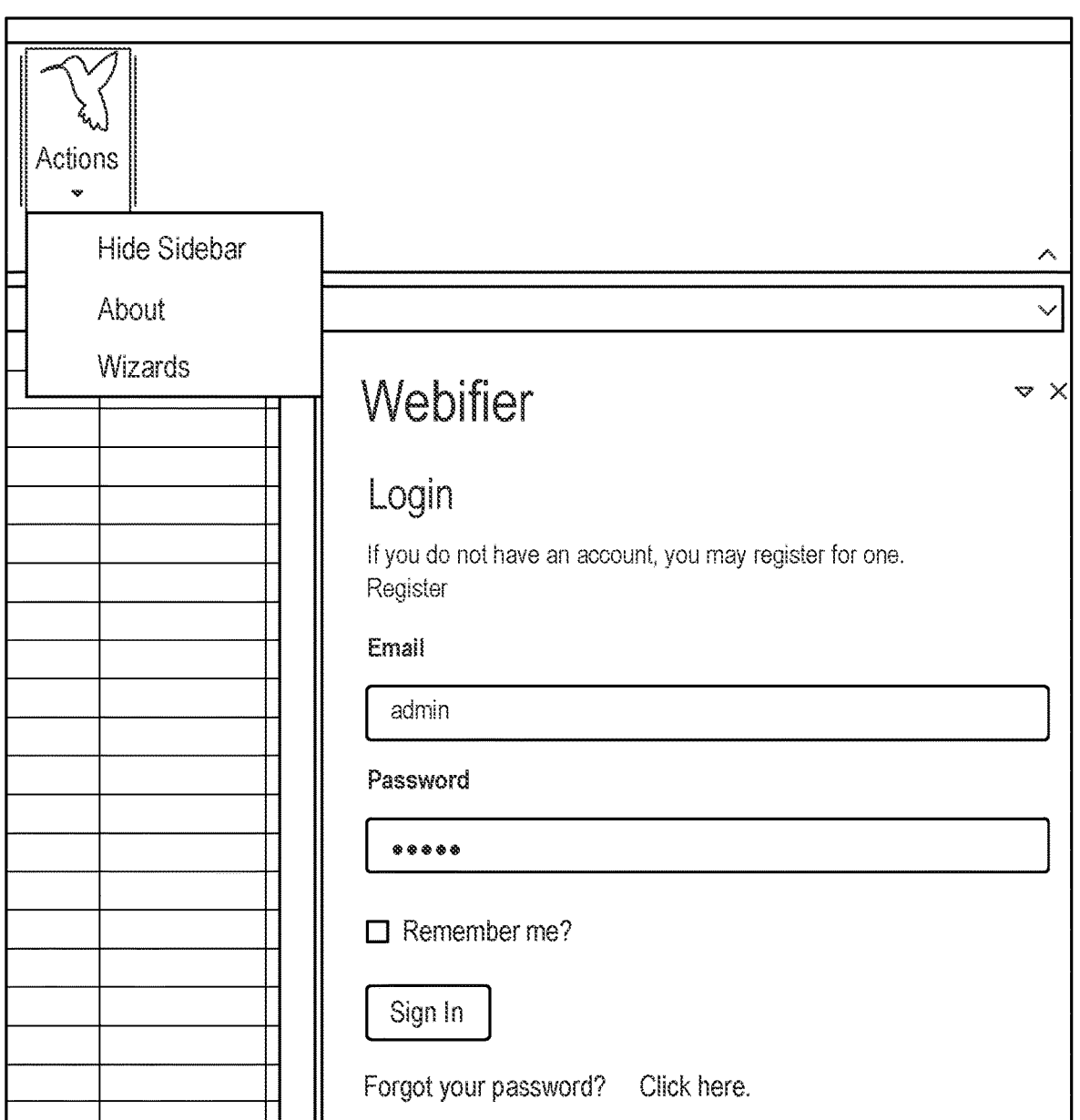

FIG. 13 is a screenshot of a spreadsheet application with the Add-On installed where an additional menu has been added to the spreadsheet application toolbar, where the user is not logged in, and showing the login page.

Figure 14:
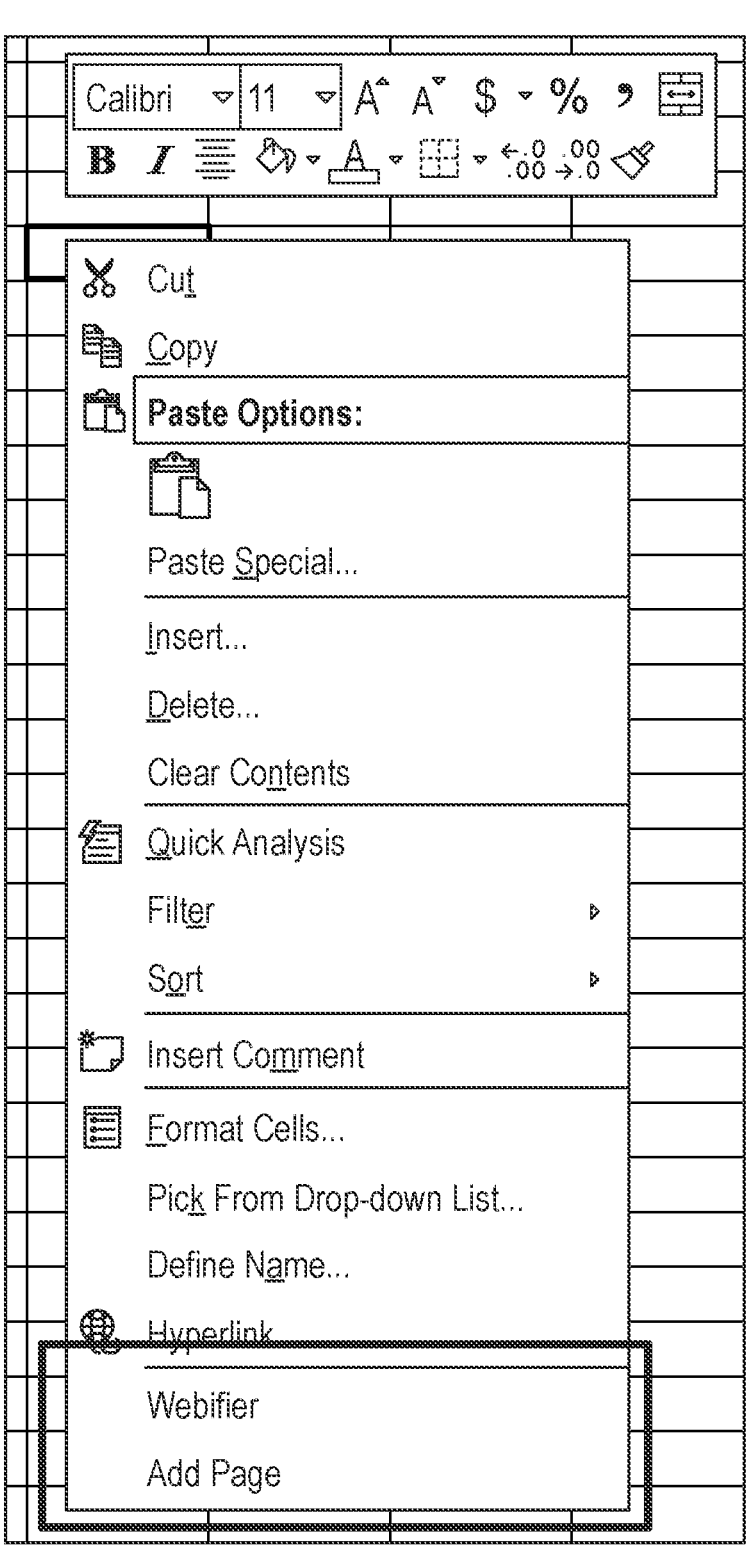

FIG. 14 is a screenshot of a spreadsheet application with the Add-On installed where an additional menu option has been added to the right click menu of a cell.

Figure 15:
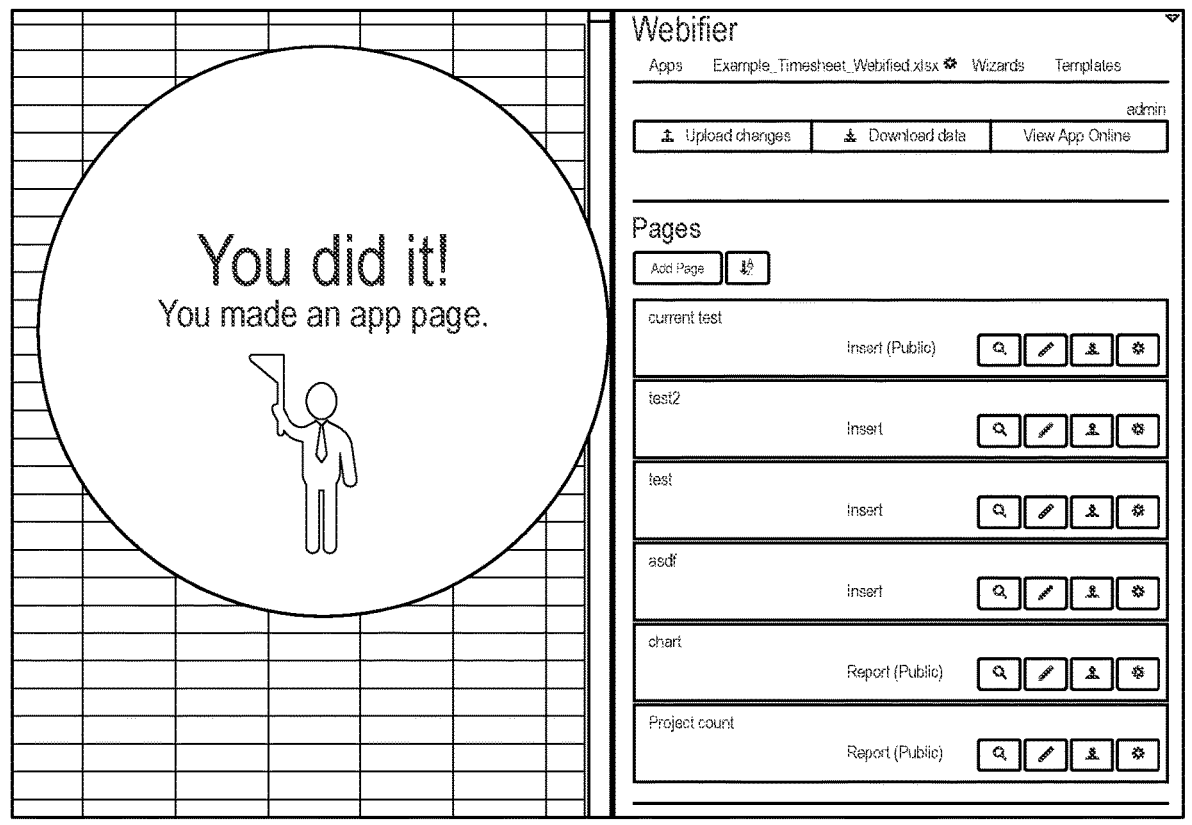

FIG. 15 is a screenshot of a gamification user notification popup.

Figure 16:
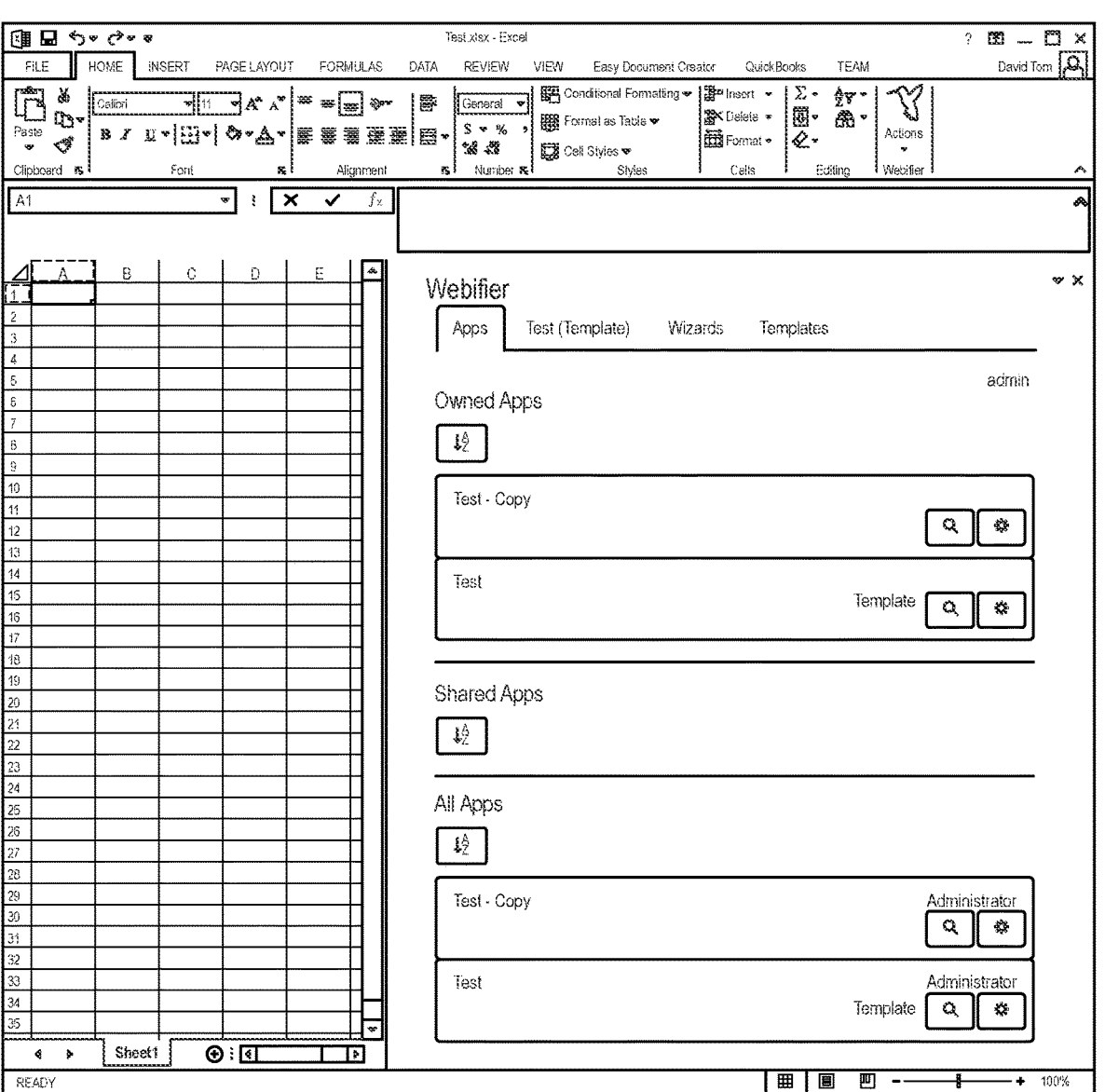

FIG. 16 is a screenshot of a list of web-apps, organized by source of the app.

Figure 17:
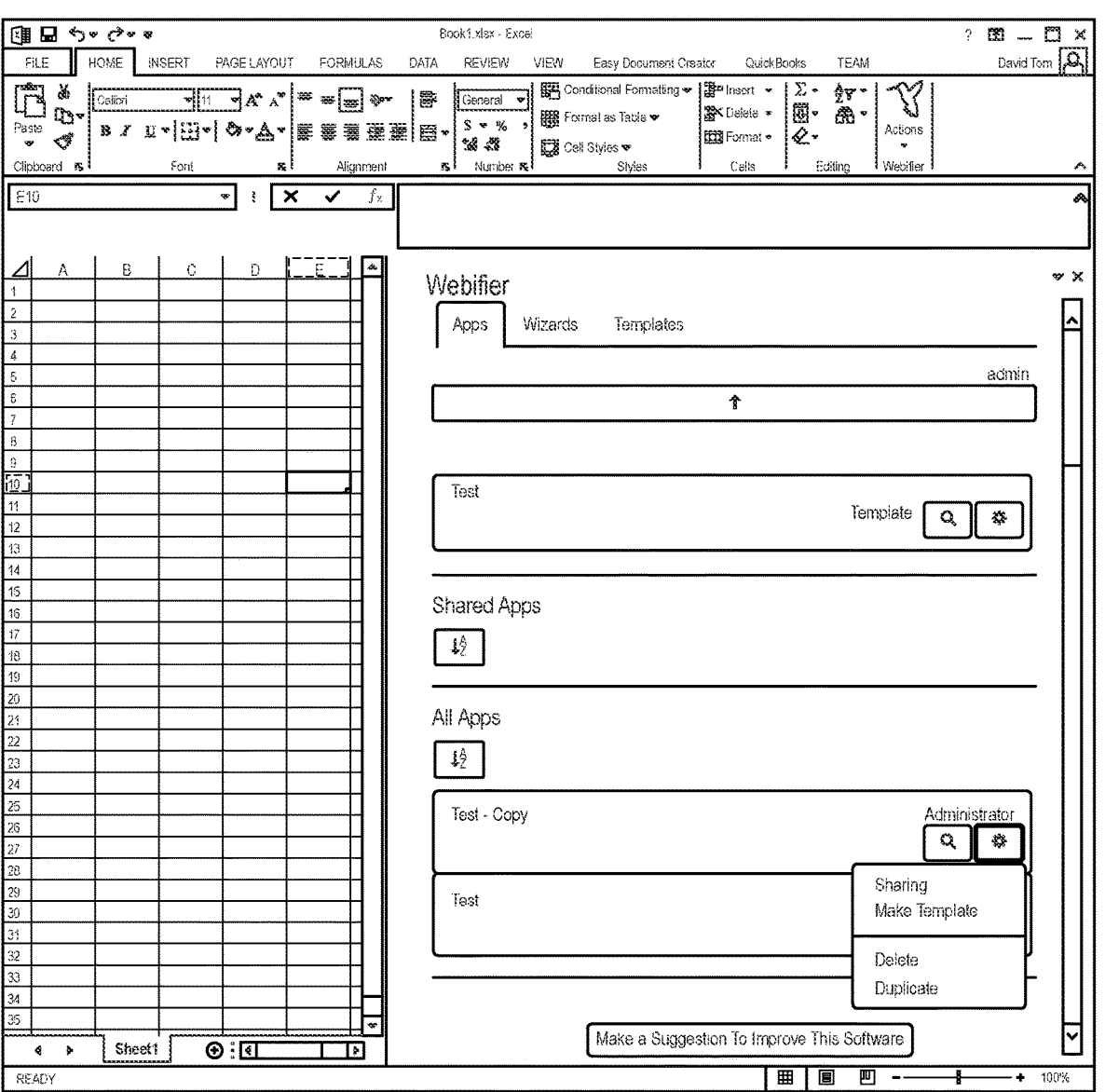

FIG. 17 is a screenshot of an activated actions menu for one app on the list of web-apps. The webifier has limited the available app manipulations because the web-app permissions were limited by the owned designer, as in FIG. 21.

Figure 18:
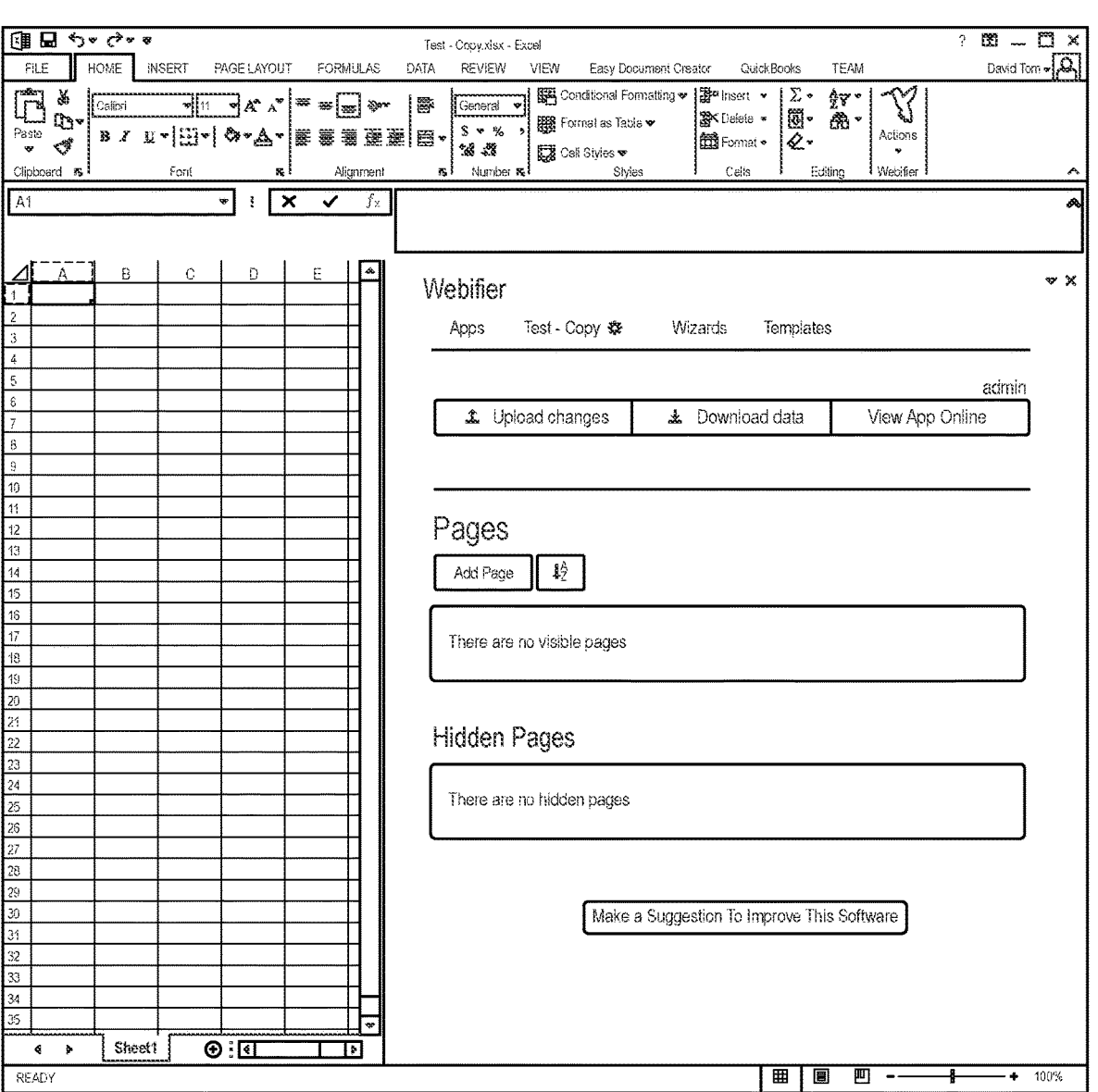

FIG. 18 is a screenshot of an empty list of pages for the currently selected app "Test-Copy".

Figure 19:
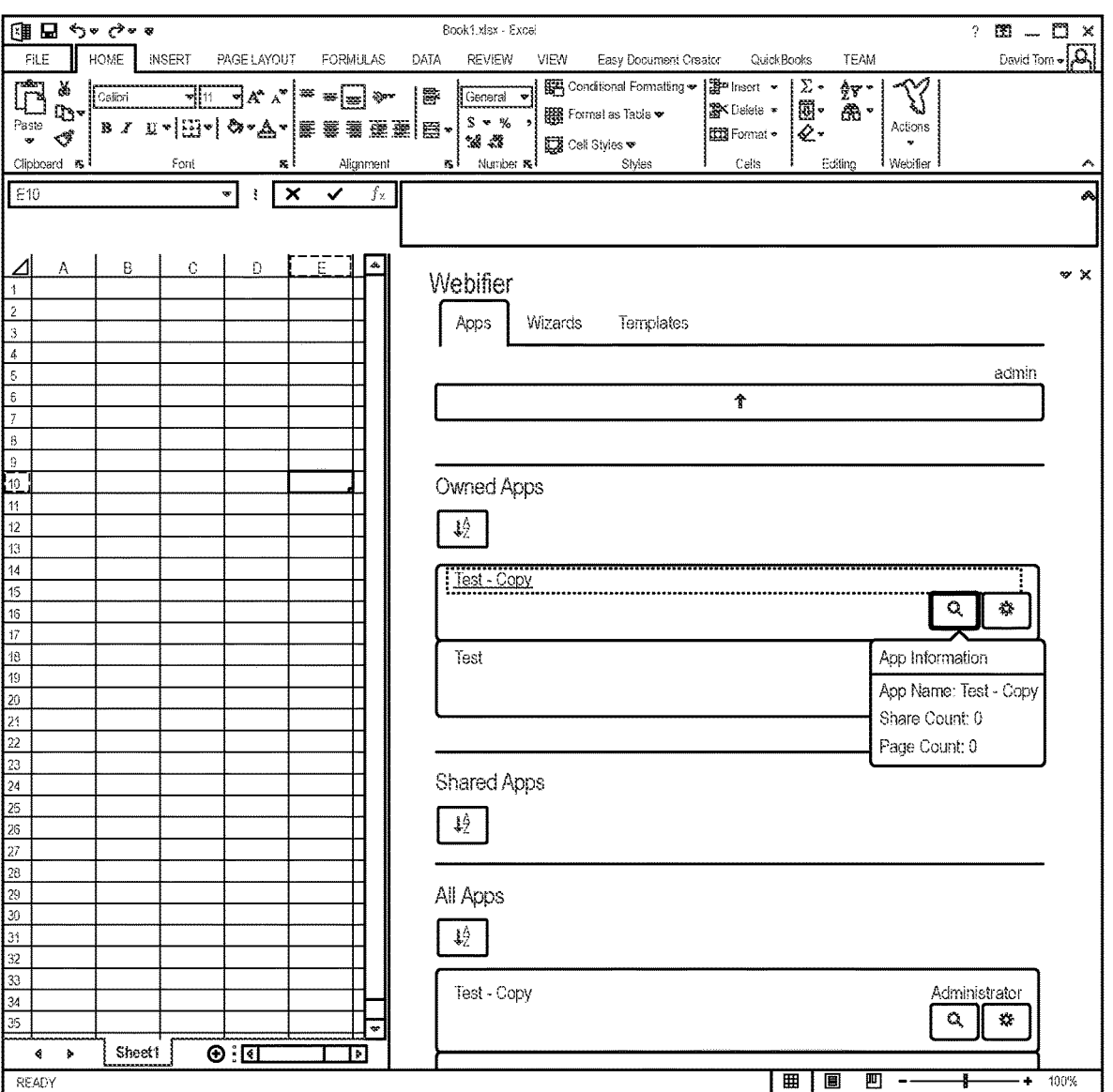

FIG. 19 is a screenshot of the activated "App Information" dialog on the list of web-apps, showing summary information about a specific web-app.

Figure 20:
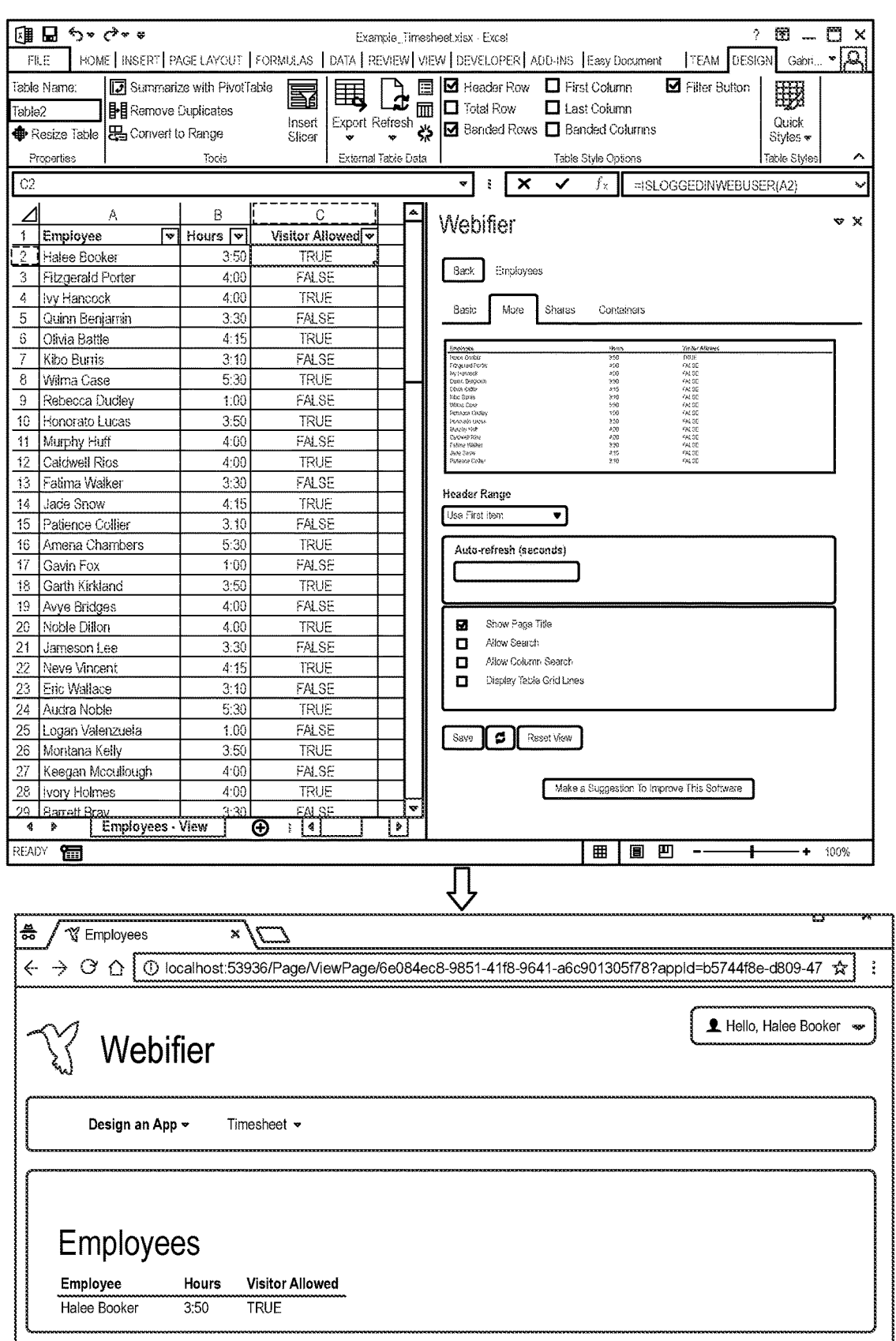

FIG. 20 is a diagram illustrating a source spreadsheet definition containing a traditional spreadsheet table and that table being referenced in a report page as a record source, and illustrating the resulting destination page which was defined using the spreadsheet definition. The diagram further illustrates that for the specific logged in visitor "Halee", the webifier has filtered the record set down to only row 2 where cell A2 matched the logged in username and the formula, as seen in the top-right of the screenshot, "=ISLOGGEDINWEBUSER(A2)" returned true when evaluated on the destination system. The diagram also illustrates that the function ISLOGGEDINWEBUSER returned alternating placeholder values during design-time but evaluated correctly when the logged in visitor was known when rendering the destination page.

Figure 21:
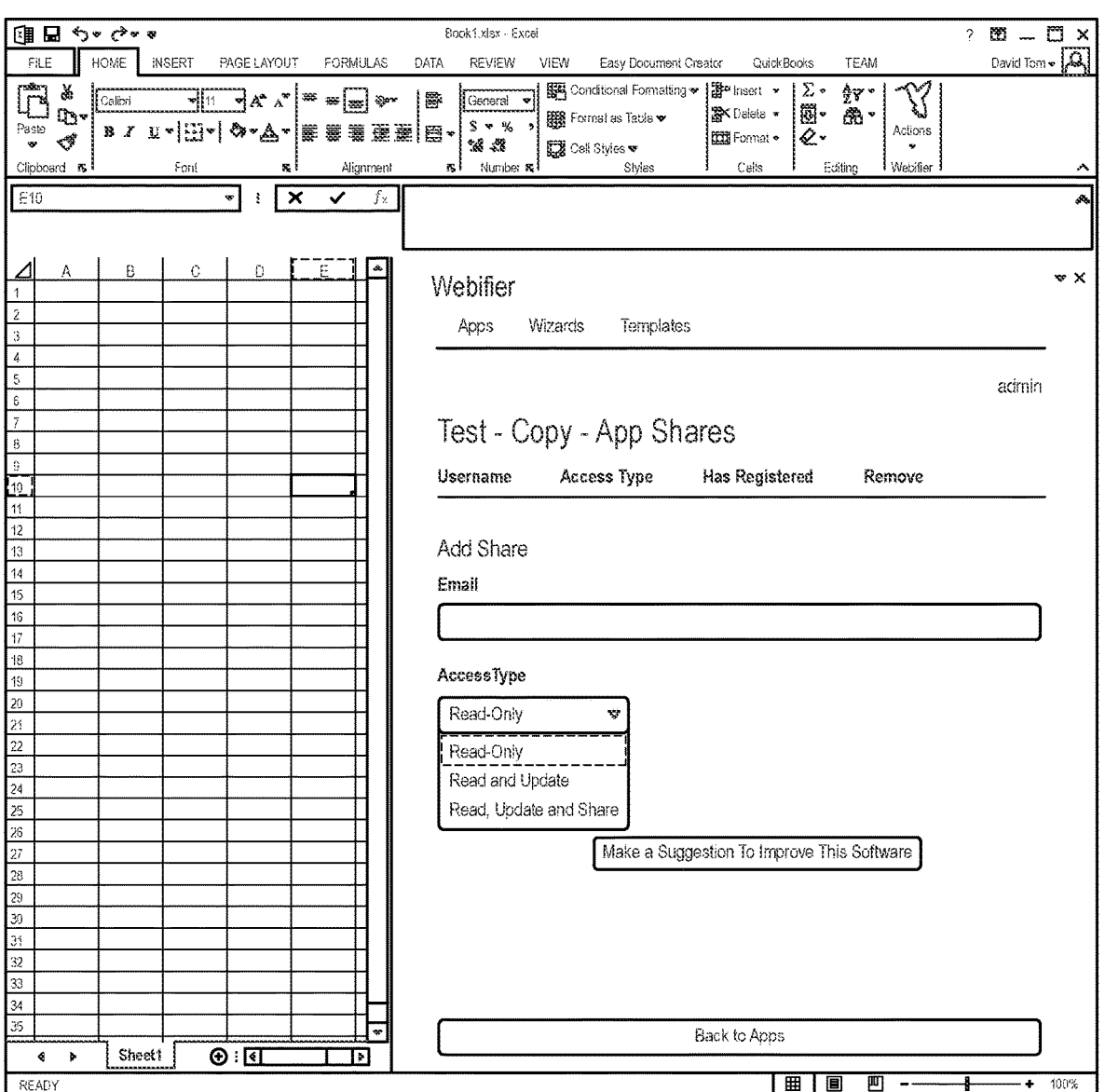

FIG. 21 is a screenshot of an app being shared with other users, and the designer specifying the permissions they would like the added designer to have for the web-app.

Figure 22:
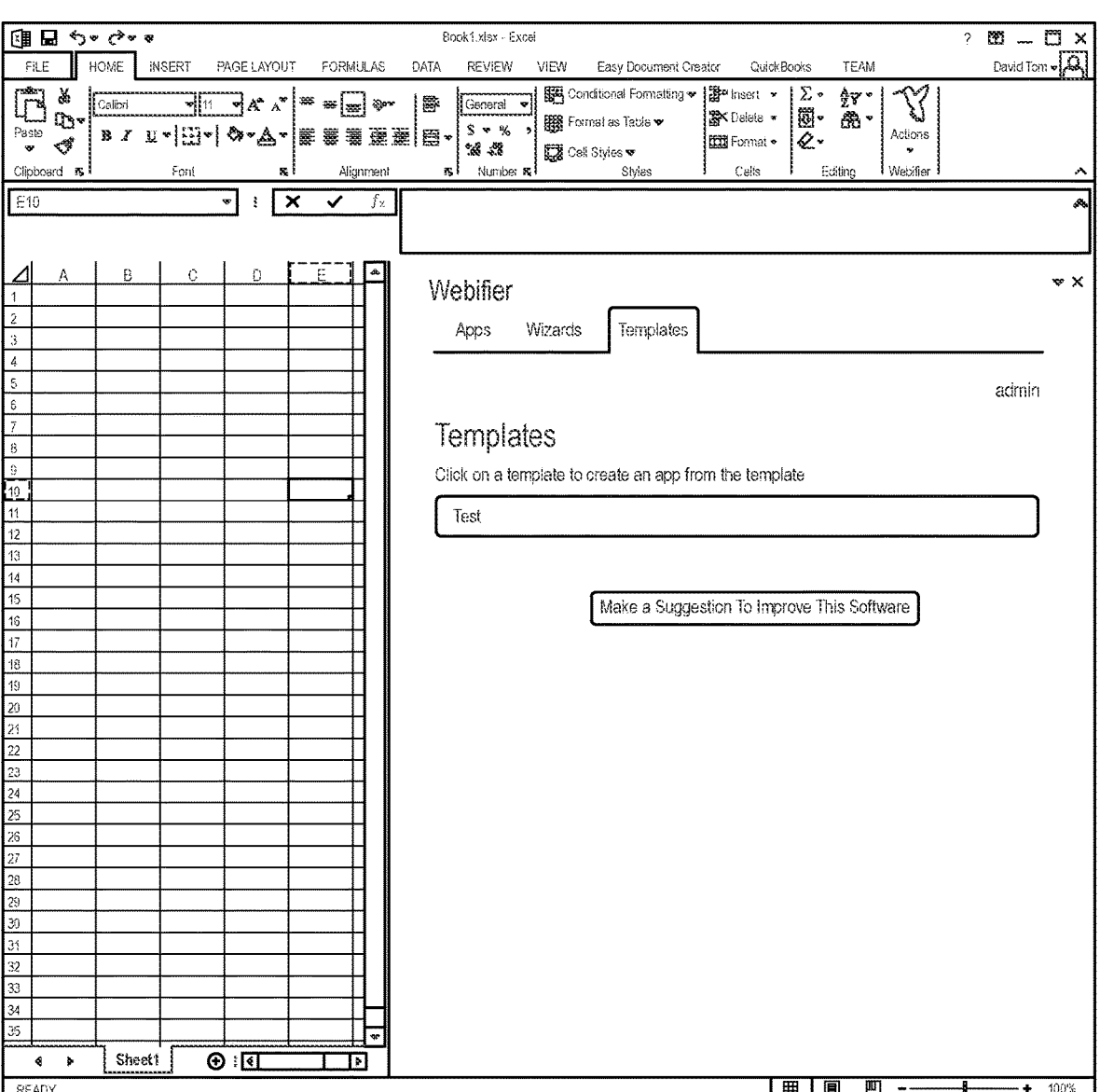

FIG. 22 is a screenshot of the template menu with an option to single-click copy a template into a new modifiable web-app.

Figure 23:
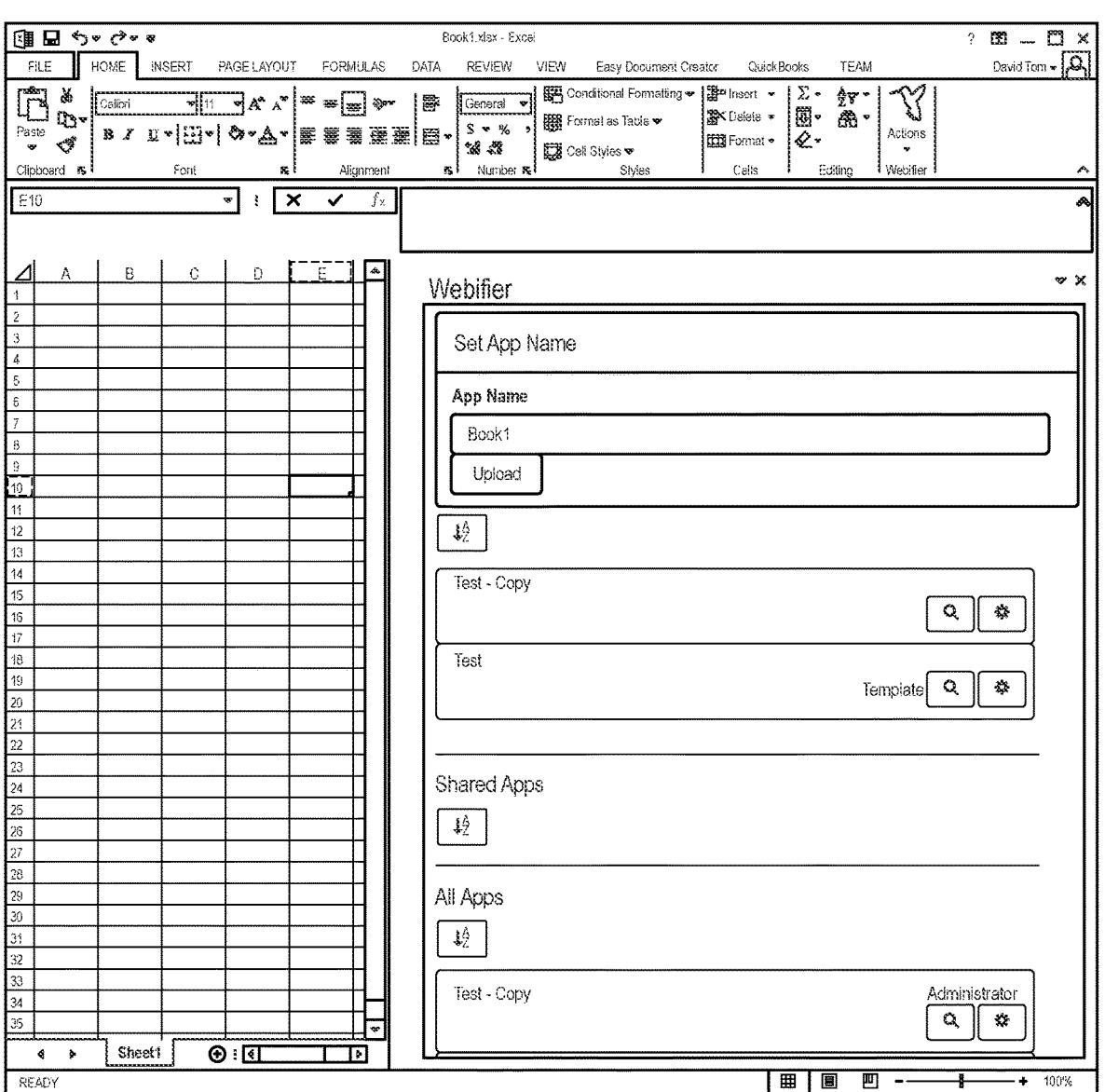

FIG. 23 is a screenshot of a user who has clicked the upload option after creating a new spreadsheet in a spreadsheet application, and is now presented with an upload dialog to name the new app and where the name is defaulted to the name of the spreadsheet file that was created earlier.

Figure 24:
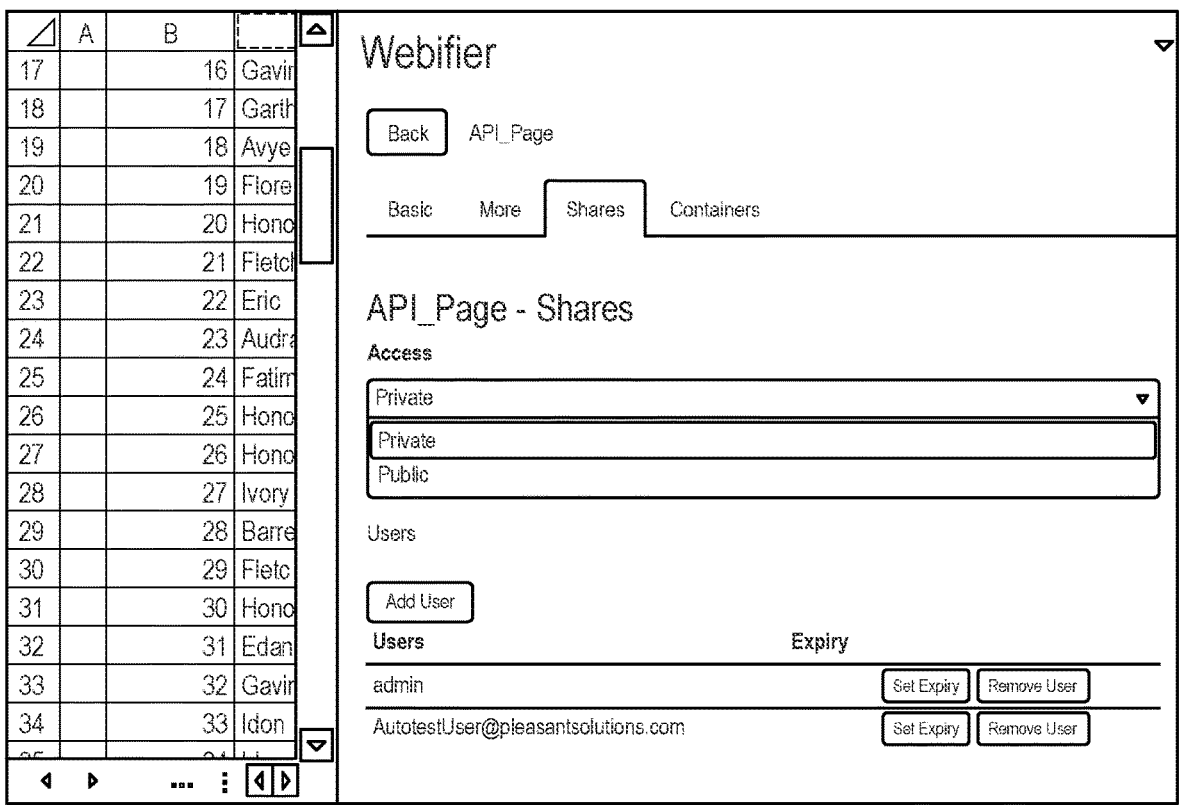

FIG. 24 is a screenshot of the Shares tab for a destination page named "API_Page", and the designer specifying whether that a login is required to access that page as well as a list of users allowed to access that page.

Figure 25:
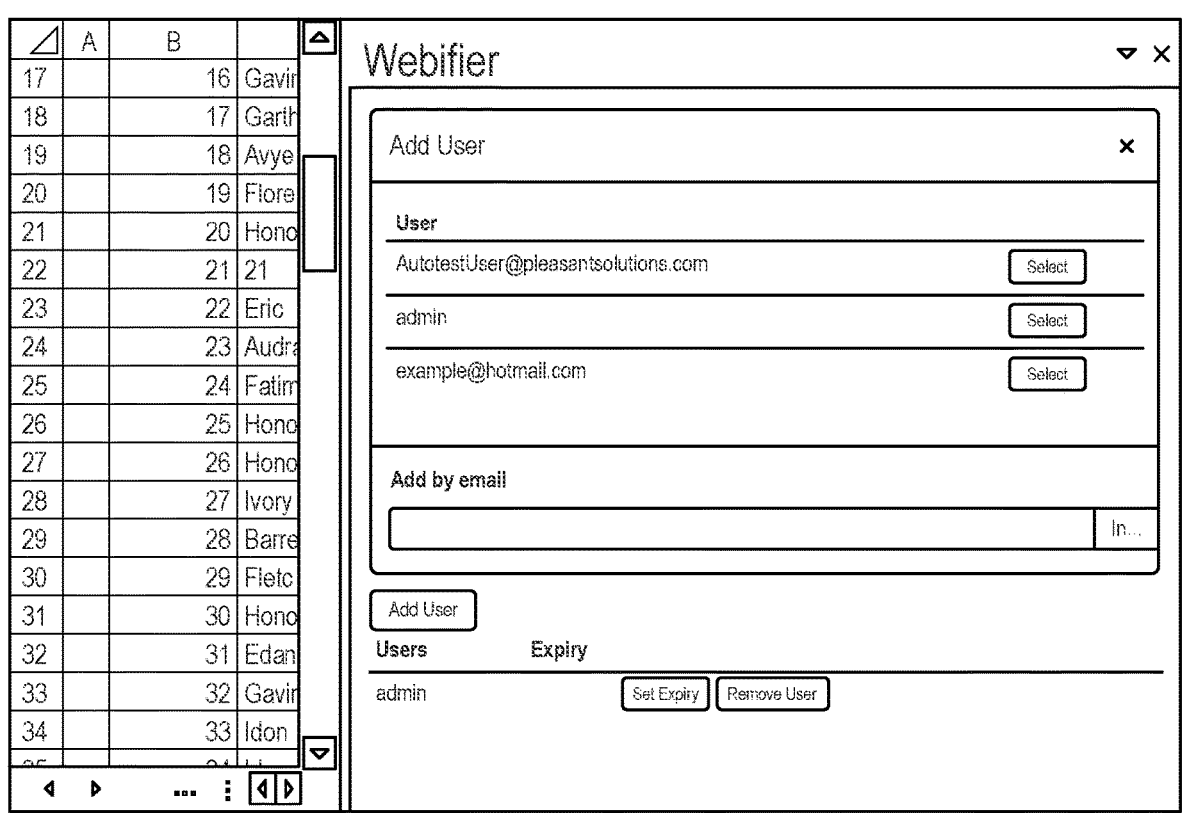

FIG. 25 is a screenshot of a dialog opened from the Shares tab to add a user, based on their email address, to the list of users allowed to access that page.

Figure 26:
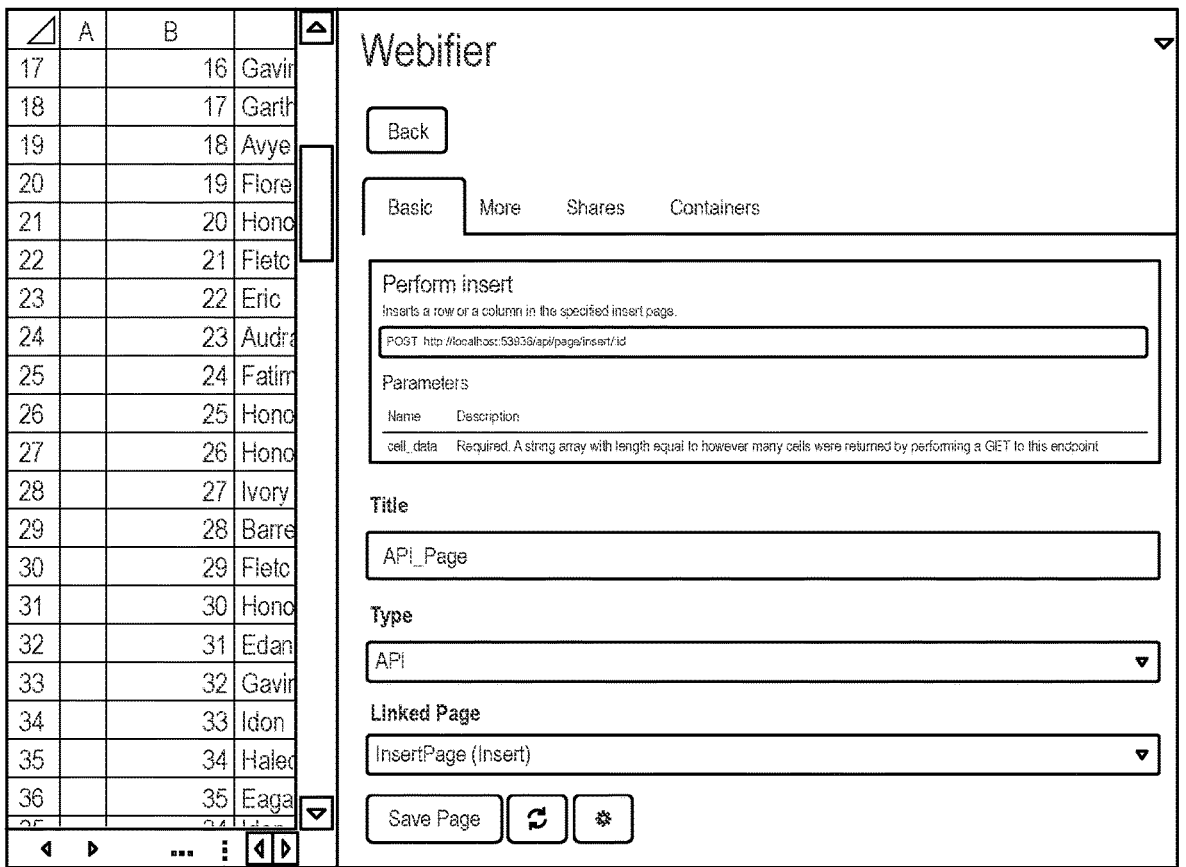

FIG. 26 is a screenshot of an API type of page being defined, which creates a web-service API page that can be access programmatically and which has inputs corresponding to a particular insert page specified by the designer.

Figure 27:
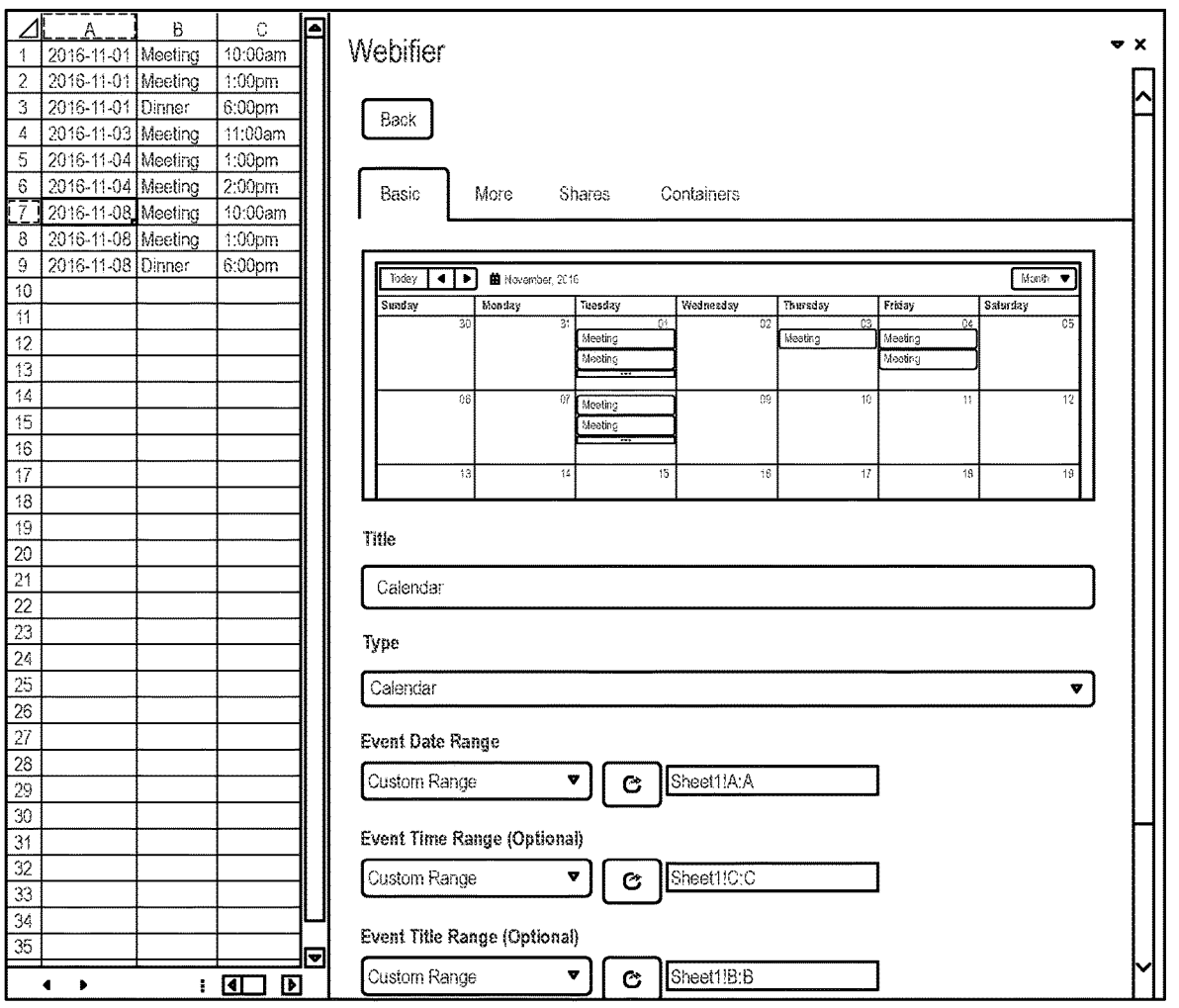

FIG. 27 is a screenshot of a calendar type of page being defined. The spreadsheet shows the record sheets and the thumbnail illustrates the complex control that visitors would see. The range controls are set to appropriate columns on the record sheets.

Figure 28:
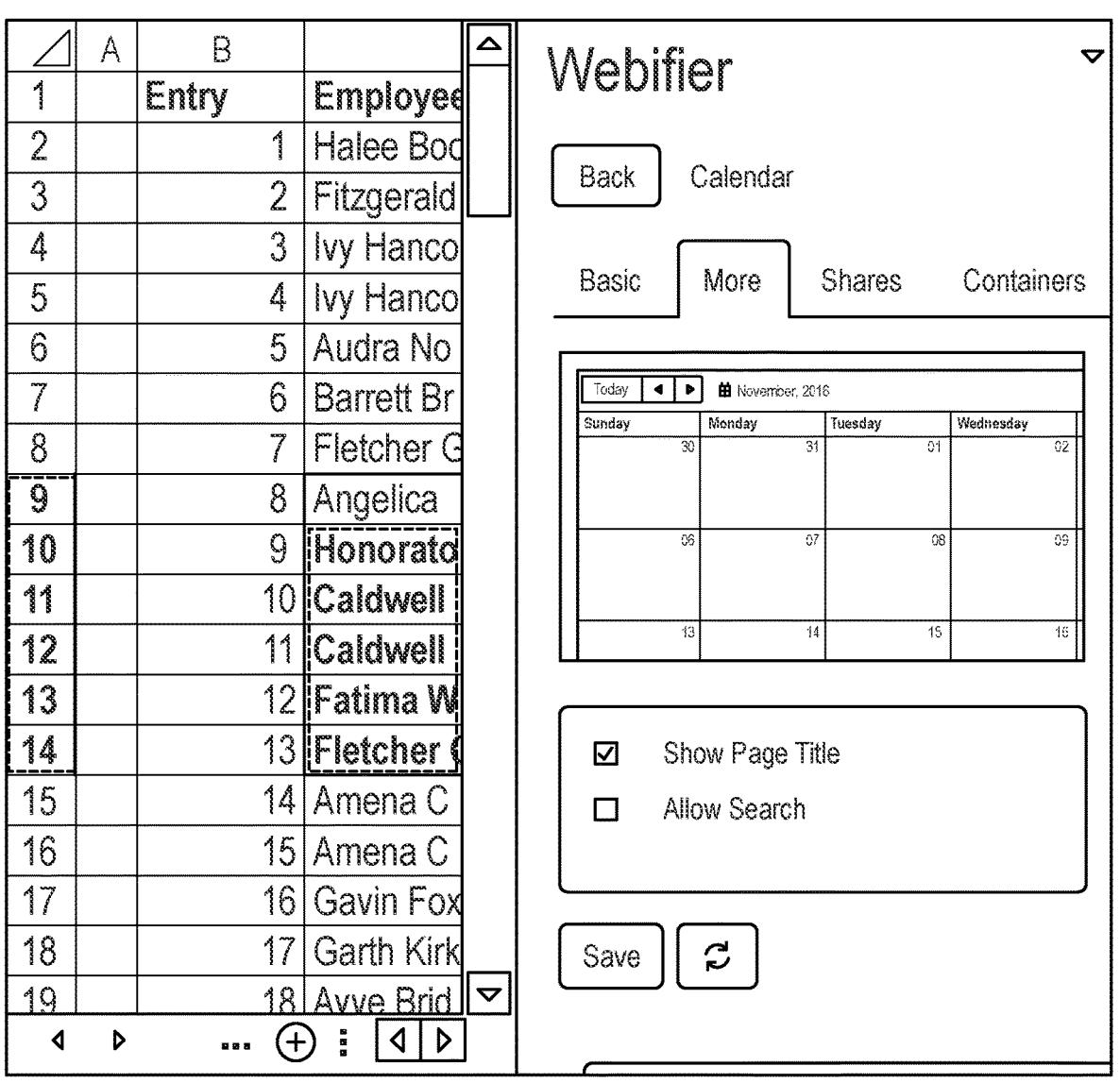

FIG. 28 is a screenshot of additional options available to define a calendar type of page.

Figure 29:
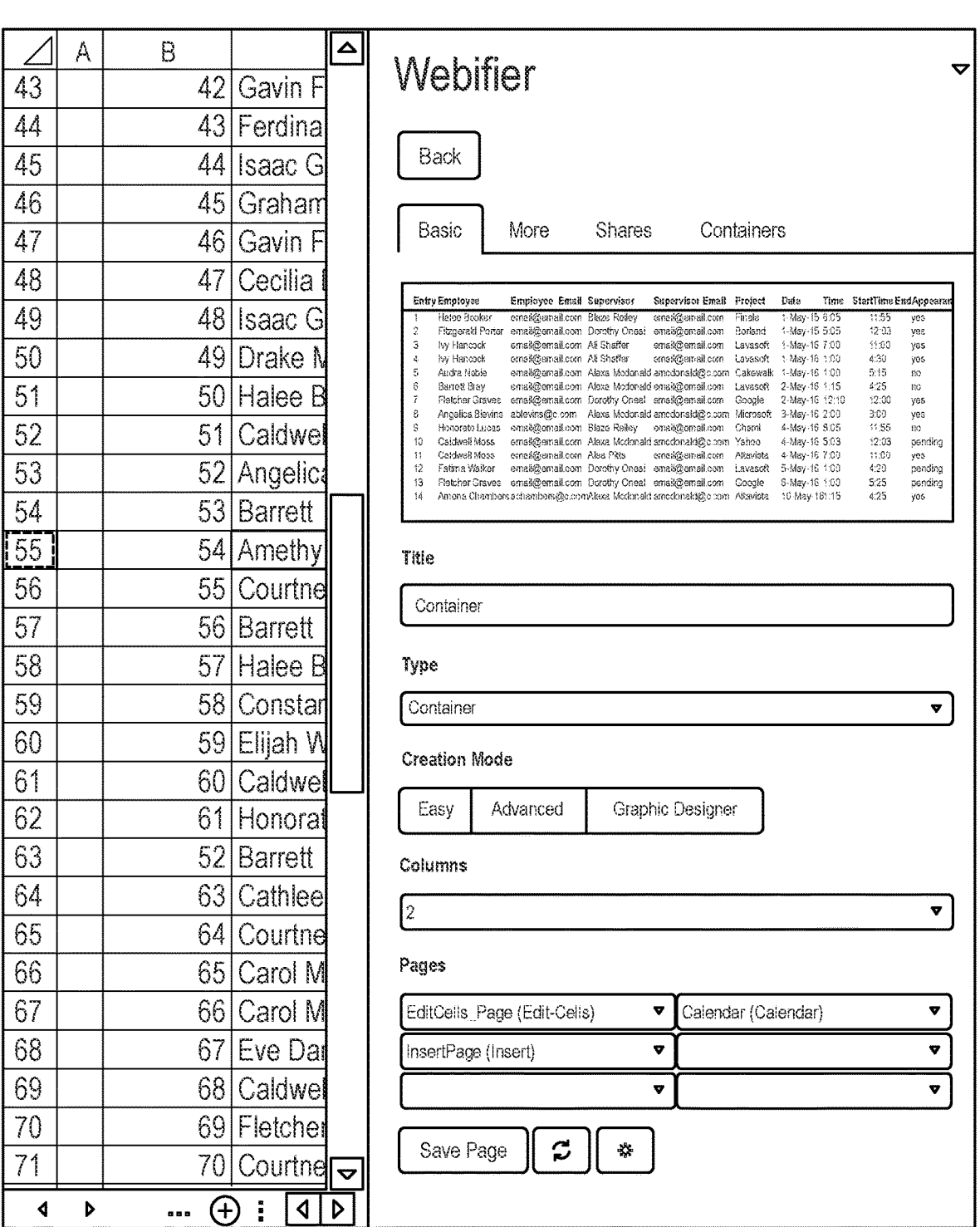

FIG. 29 is a screenshot of a container type of page being defined in easy mode.

Figure 30:
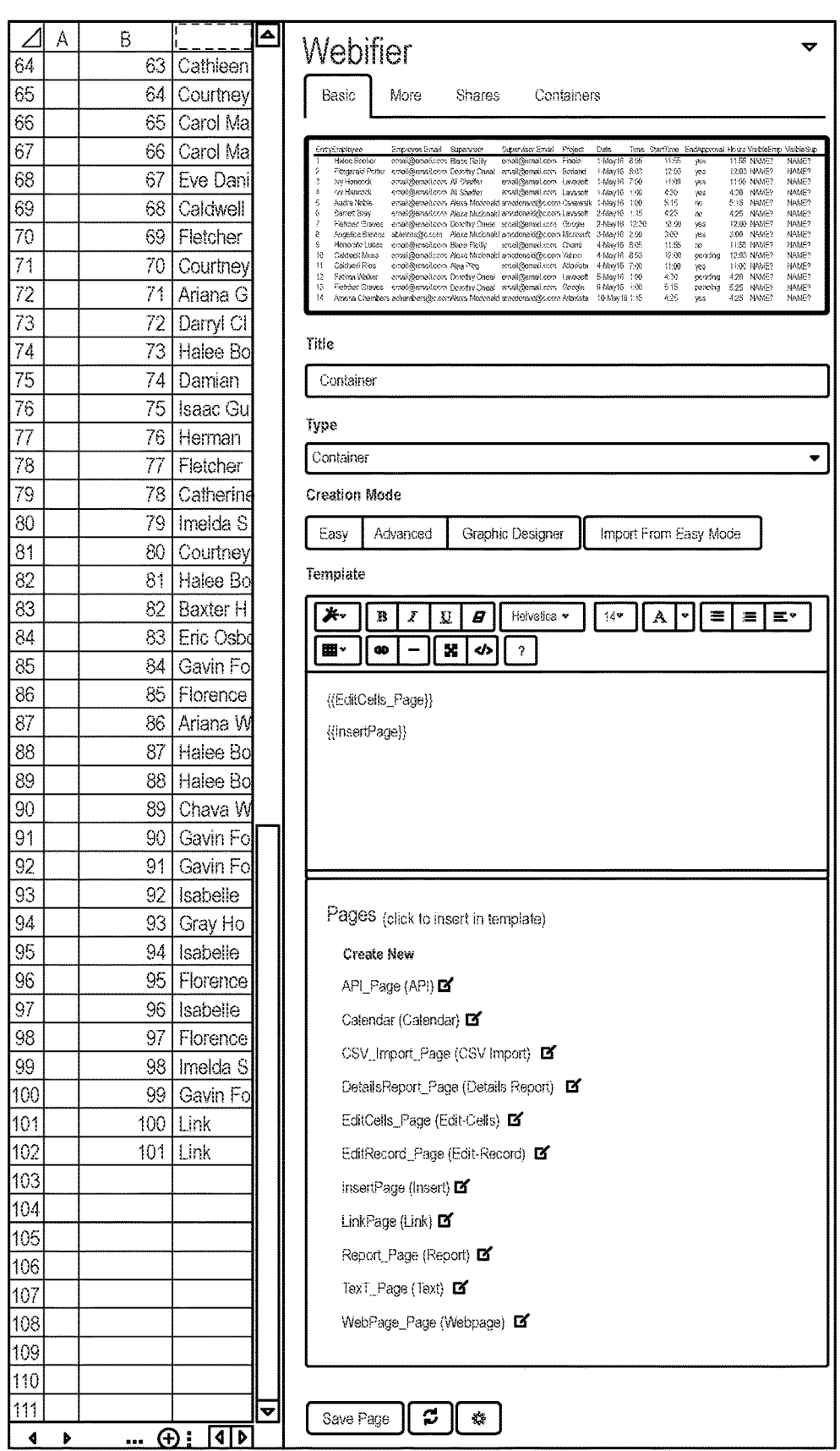

FIG. 30 is a screenshot of a container type of page being defined in advanced mode.

Figure 31:
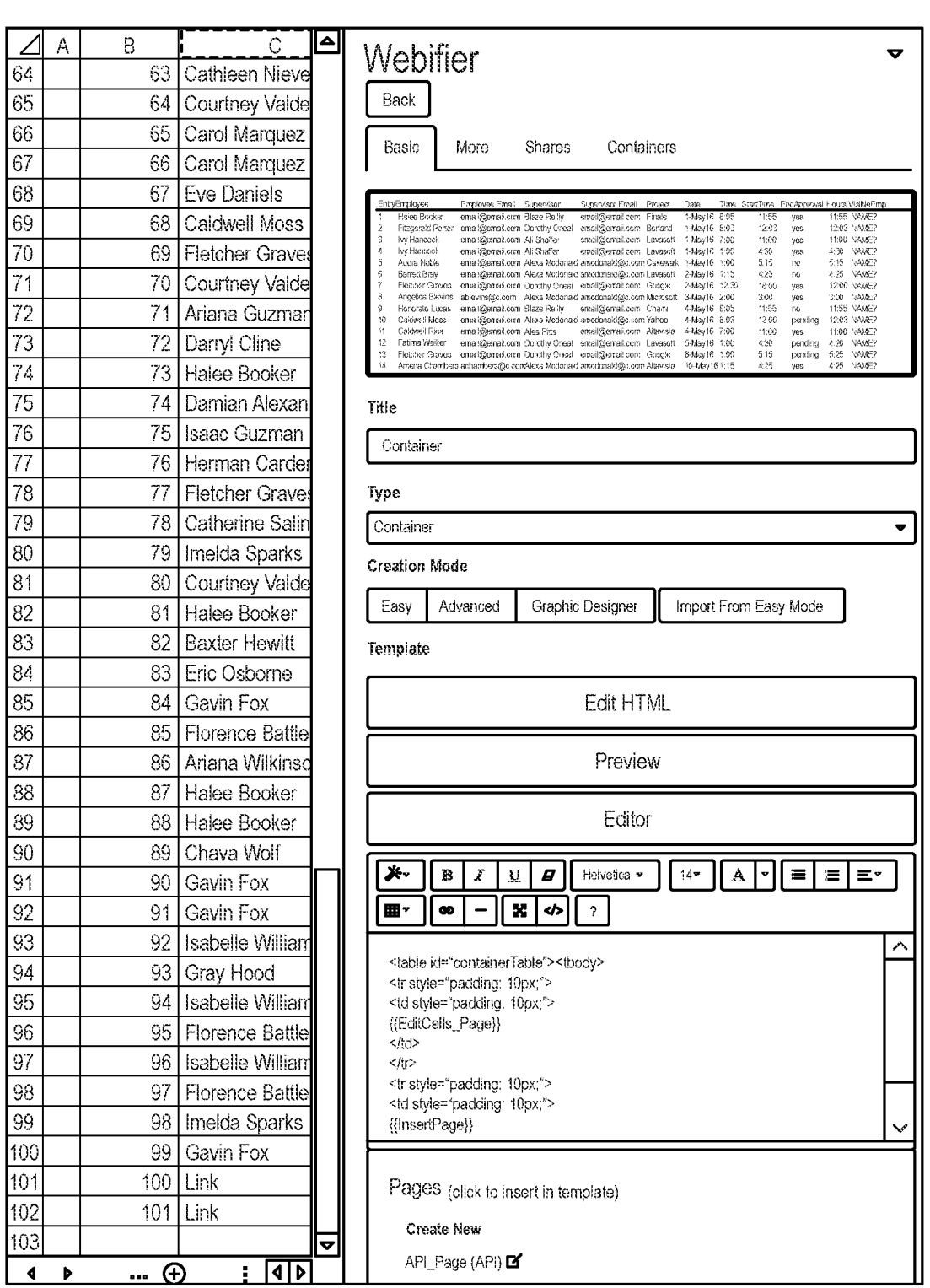

FIG. 31 is a screenshot of a container type of page being defined in graphic designer mode.

Figure 32:
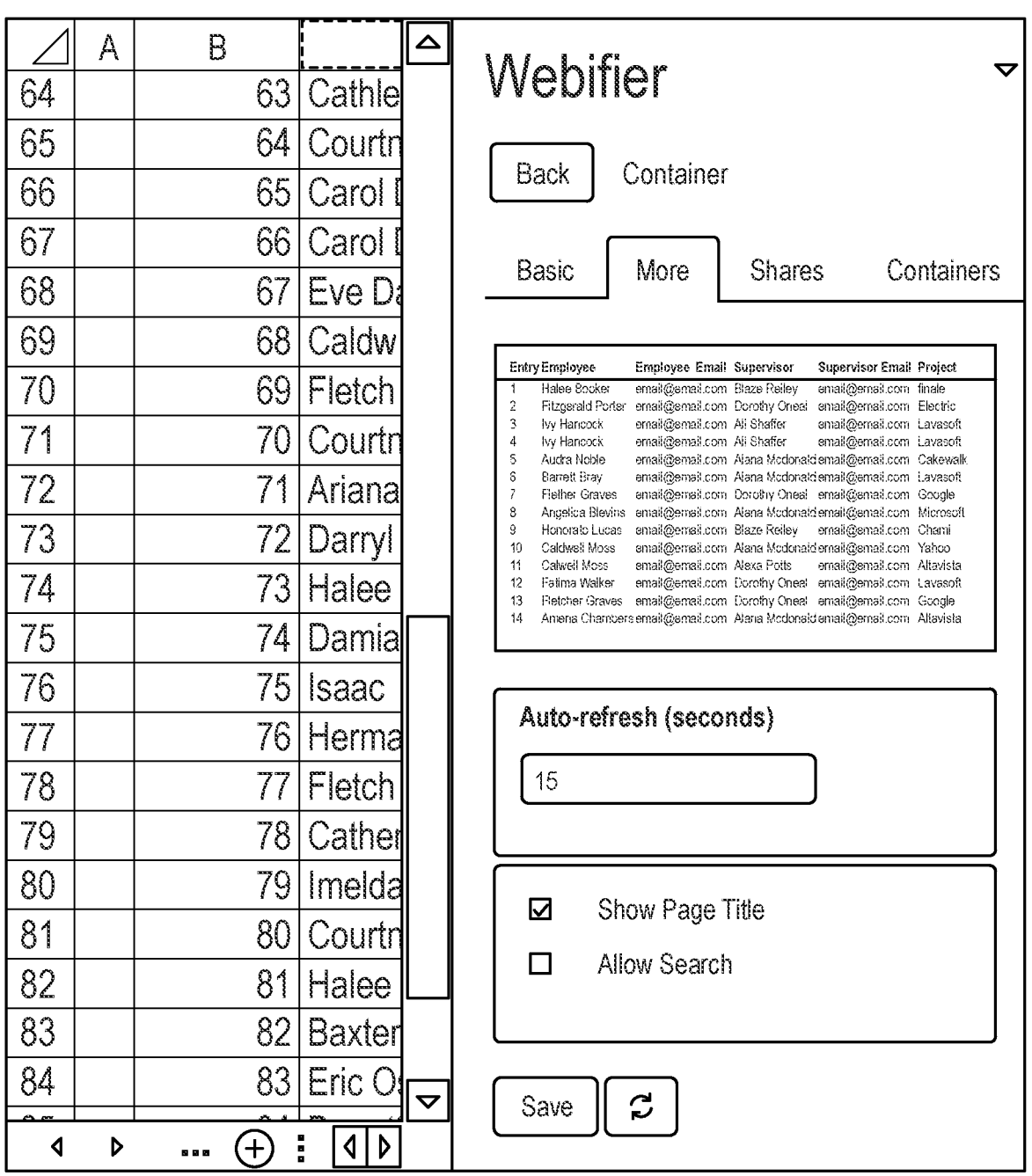

FIG. 32 is a screenshot of additional options available to define a container type of page.

Figure 33:
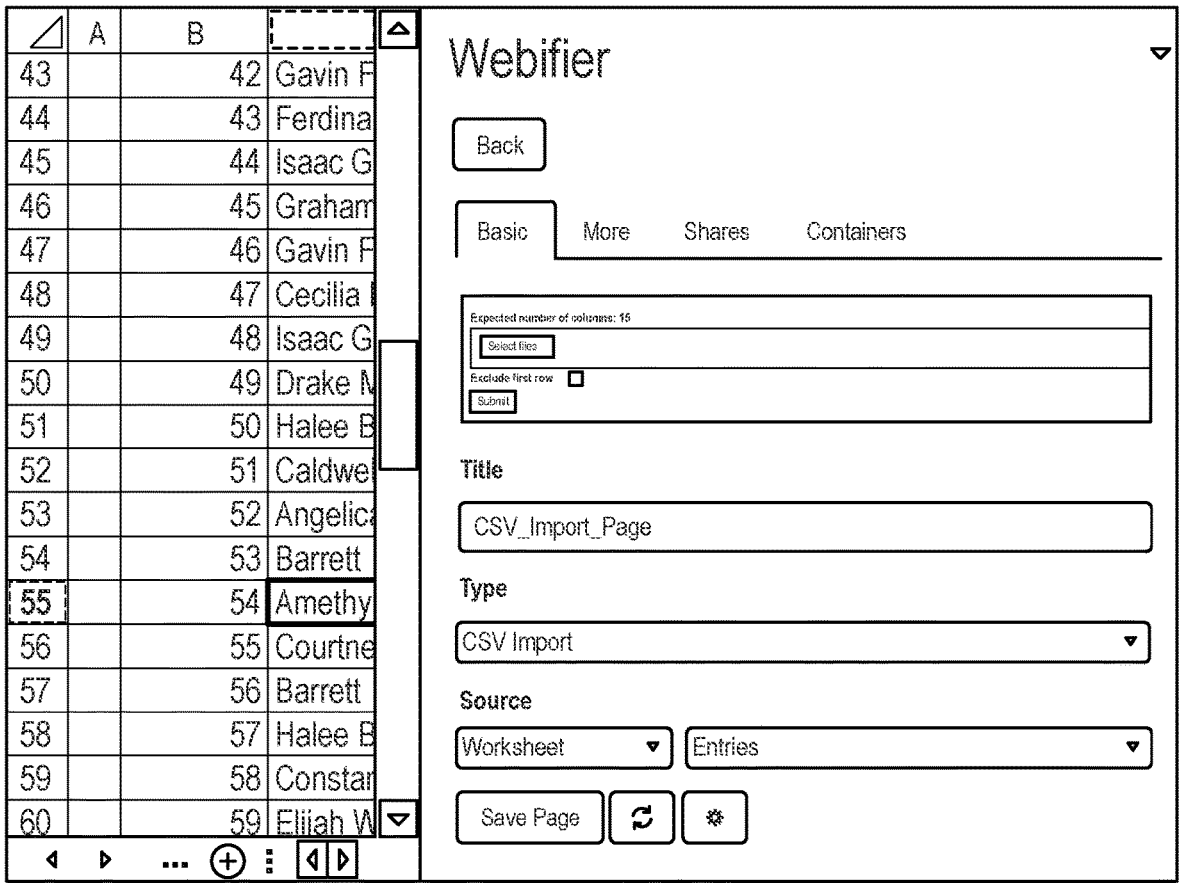

FIG. 33 is a screenshot of a CSV Import type of page being defined. The thumbnail demonstrates a complex set of controls that will be presented to visitors of the page and the source is set to an entire worksheet by name.

Figure 34:
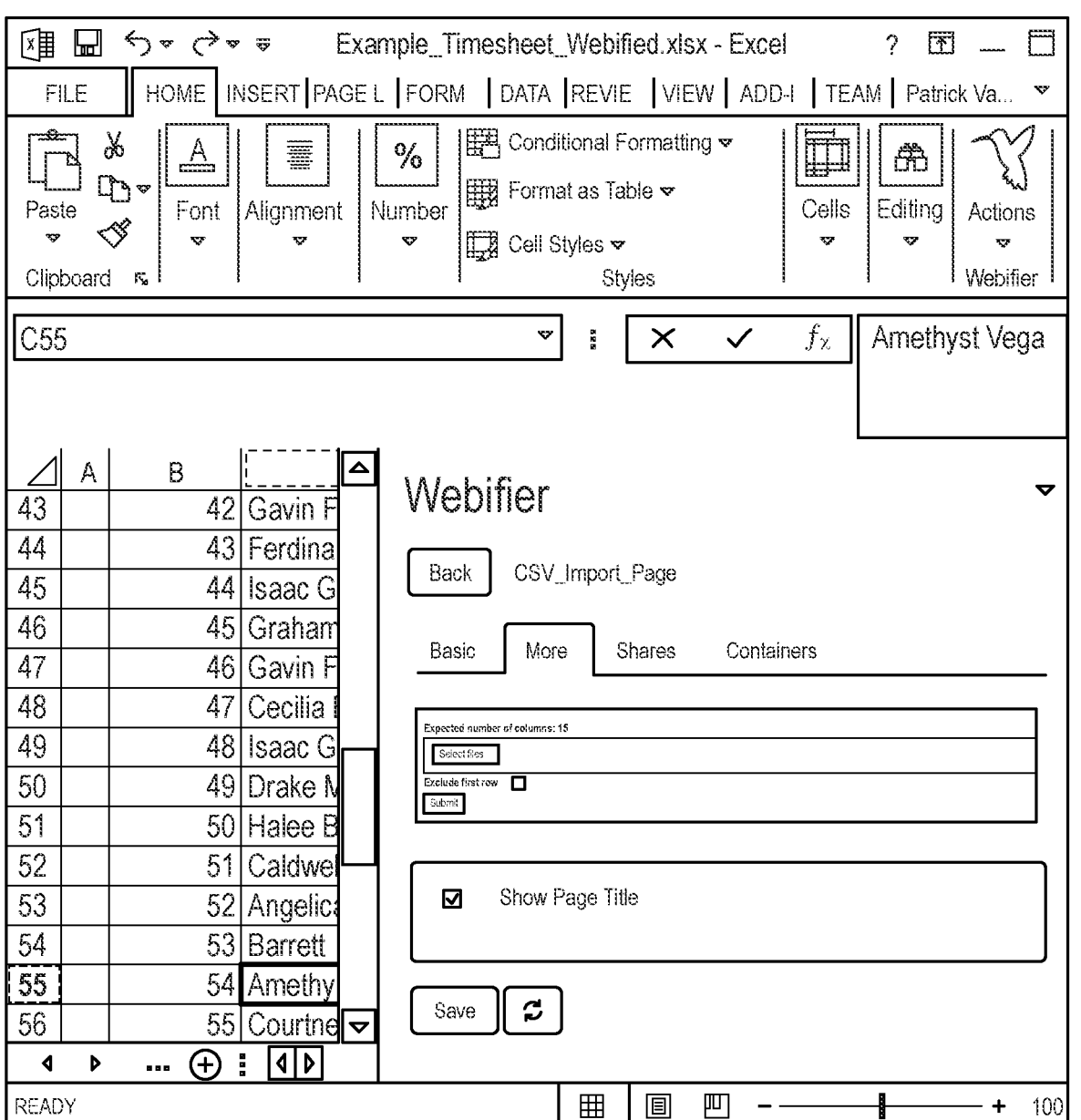

FIG. 34 is a screenshot of additional options available to define a CSV Import type of page.

Figure 35:
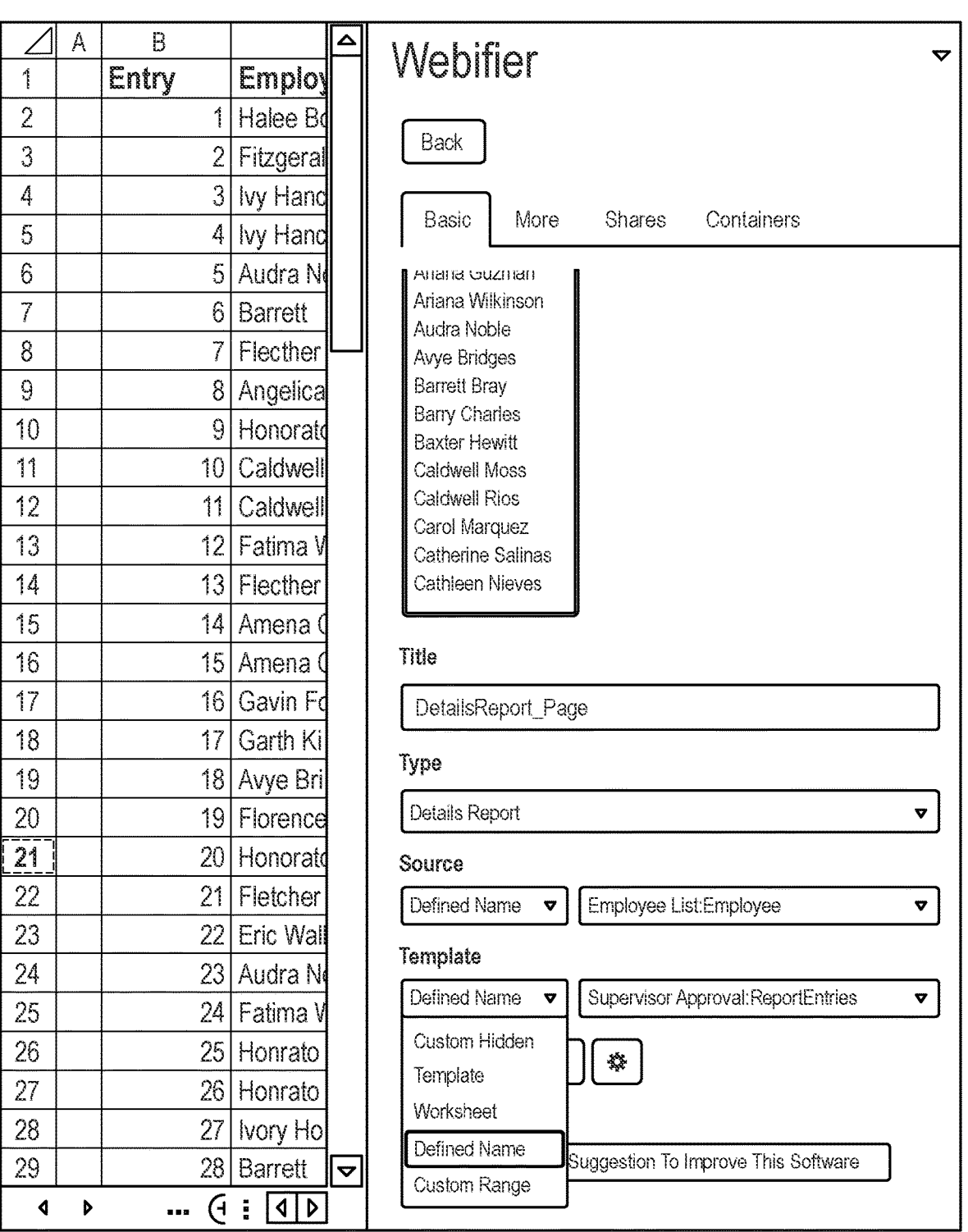

FIG. 35 is a screenshot of a Details Report type of page being defined, with the designer selecting a template sheet based on a Named Range/Defined Name. The screenshot shows the various options for template source referencing.

Figure 36:
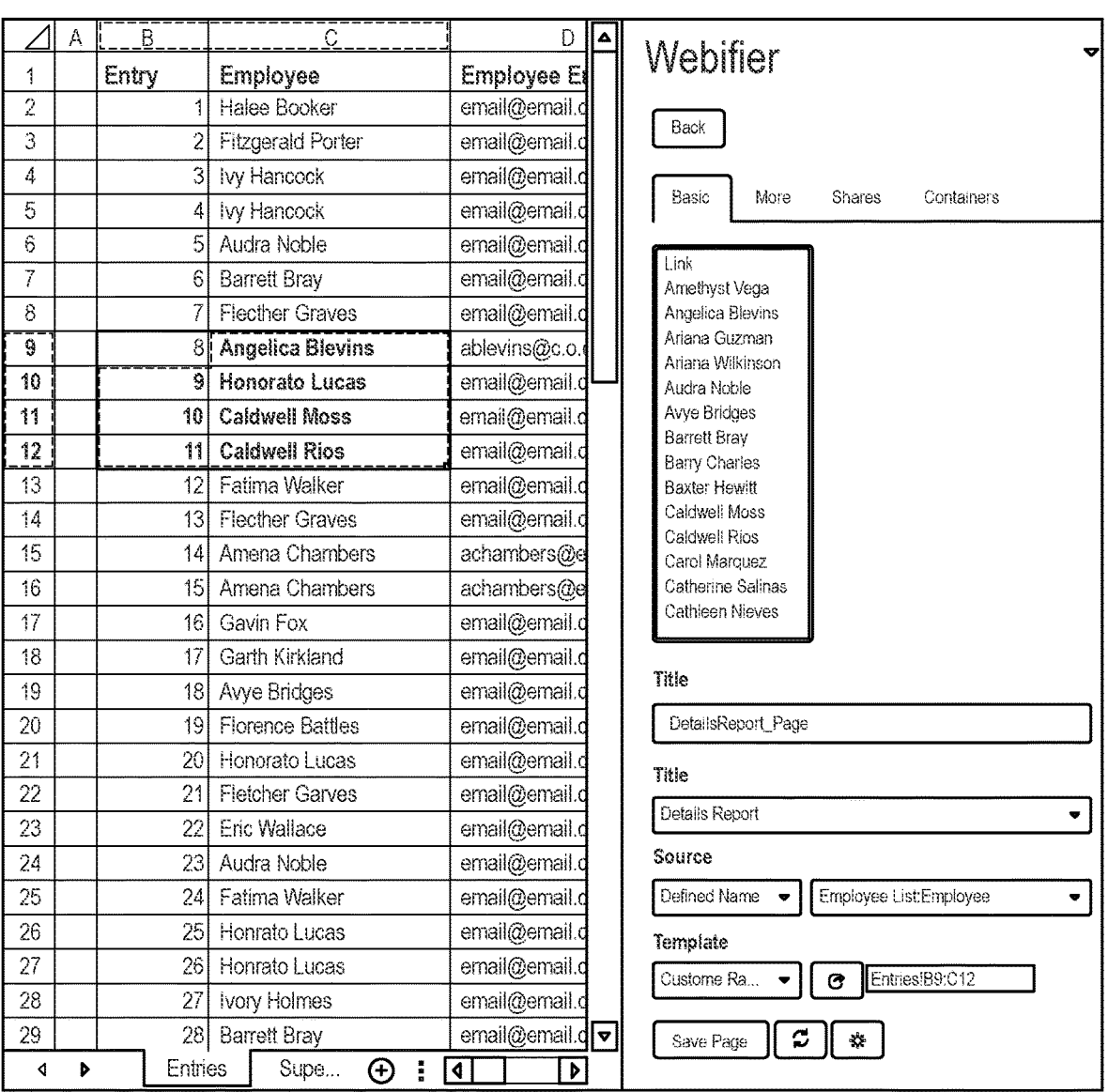

FIG. 36 is a screenshot of a Details Report type of page being defined, with the designer selecting a template sheet based on a custom range of B9:C12 that has been selected from the spreadsheet tool's cells and where the designer has clicked the "use selected" button in the template definition section.

Figure 37:
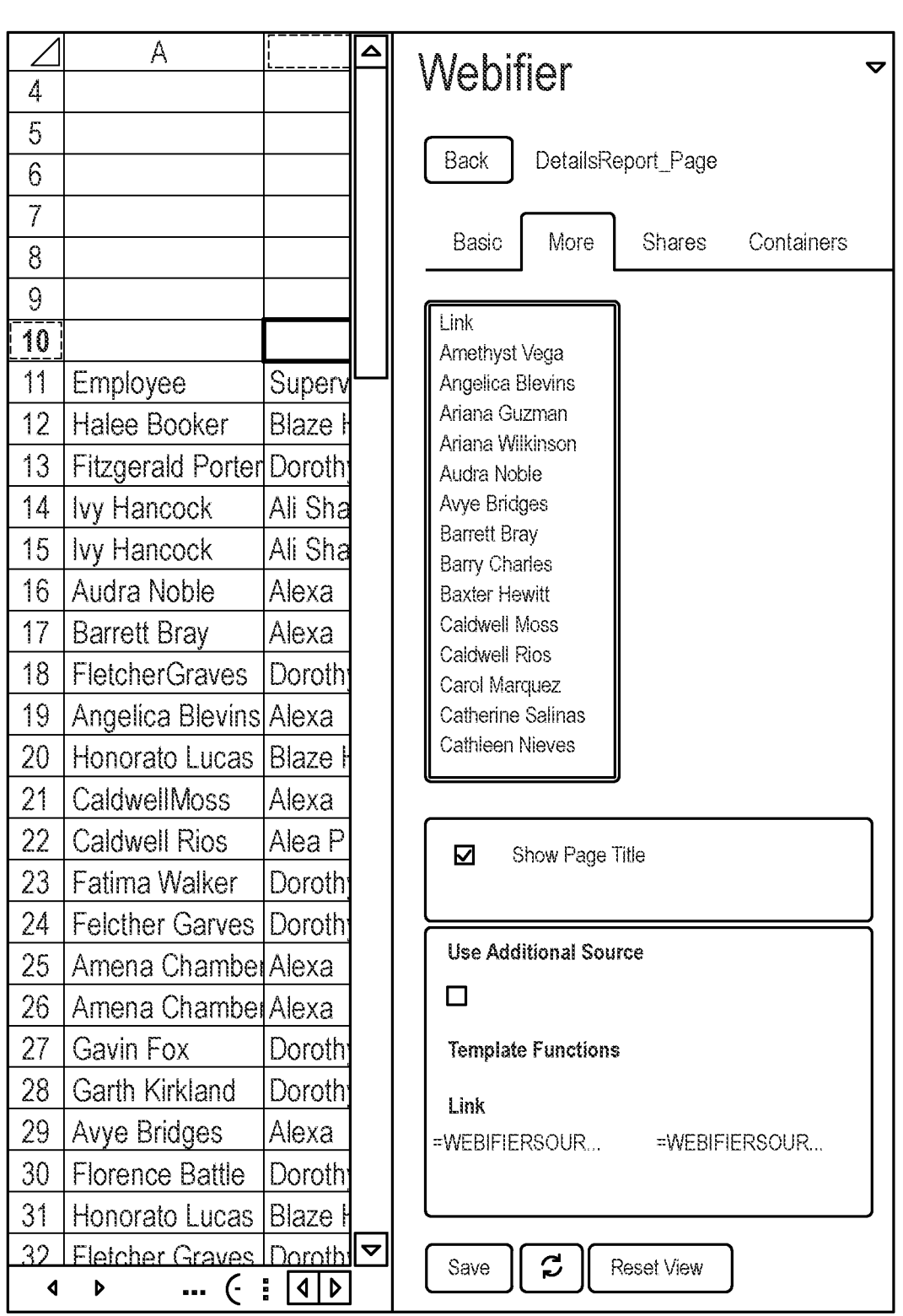

FIG. 37 is a screenshot of additional options available to define a Details Report type of page. The screenshot also illustrates a listing of functions that are available to the designer to use within the template definition. Function details are defined in FIGS. 4-10.

Figure 38:
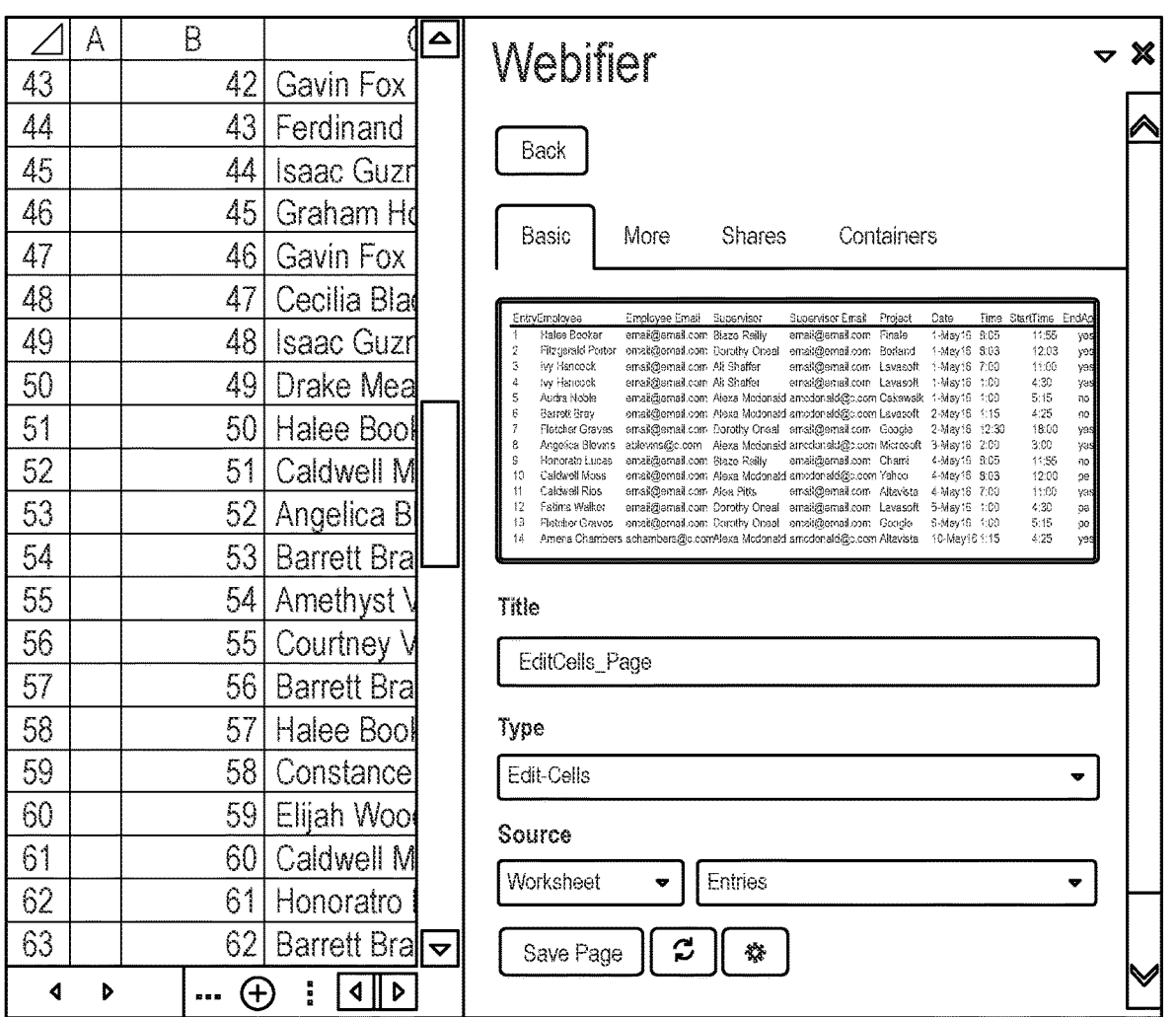

FIG. 38 is a screenshot of an Edit-Cells type of page being defined.

Figure 39:
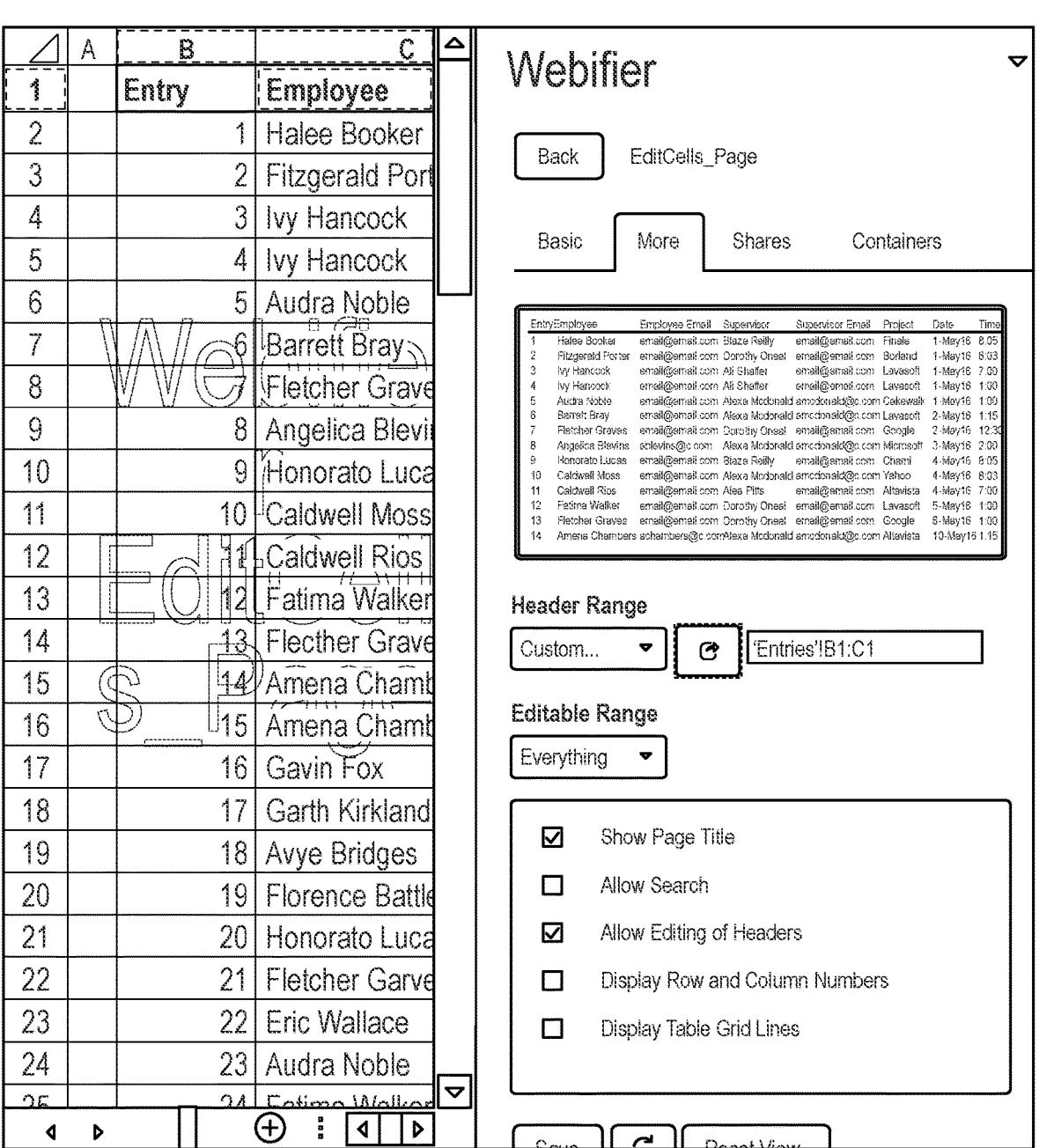

FIG. 39 is a screenshot of additional options available to define an Edit-Cells type of page. The screenshot also illustrates the header range being defined by a custom range based on the currently selected B1:C1 cells in the spreadsheet tool.

Figure 40:
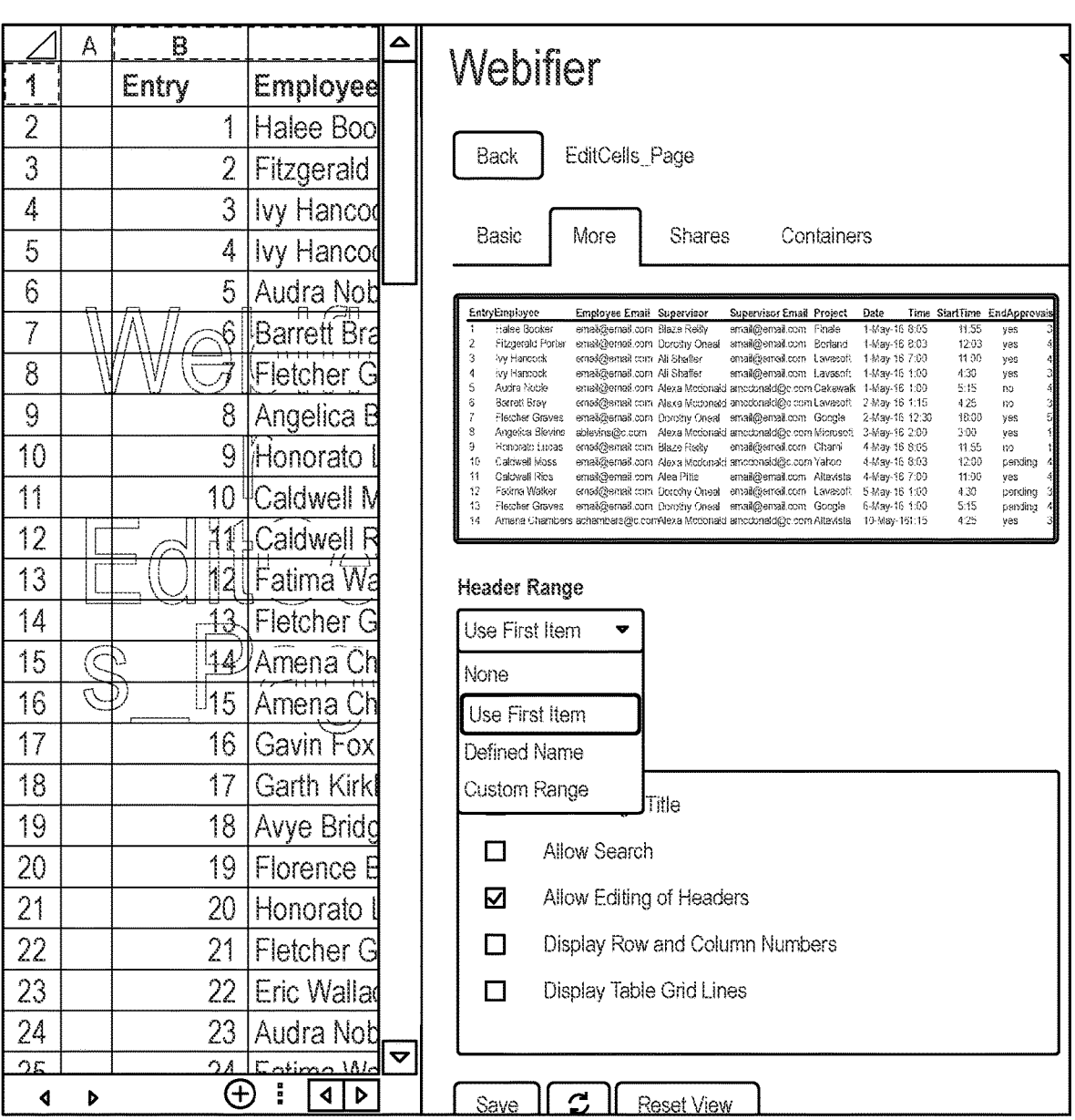

FIG. 40 is a screenshot of the various options to define the header range for an Edit-Cells type of page.

Figure 41:
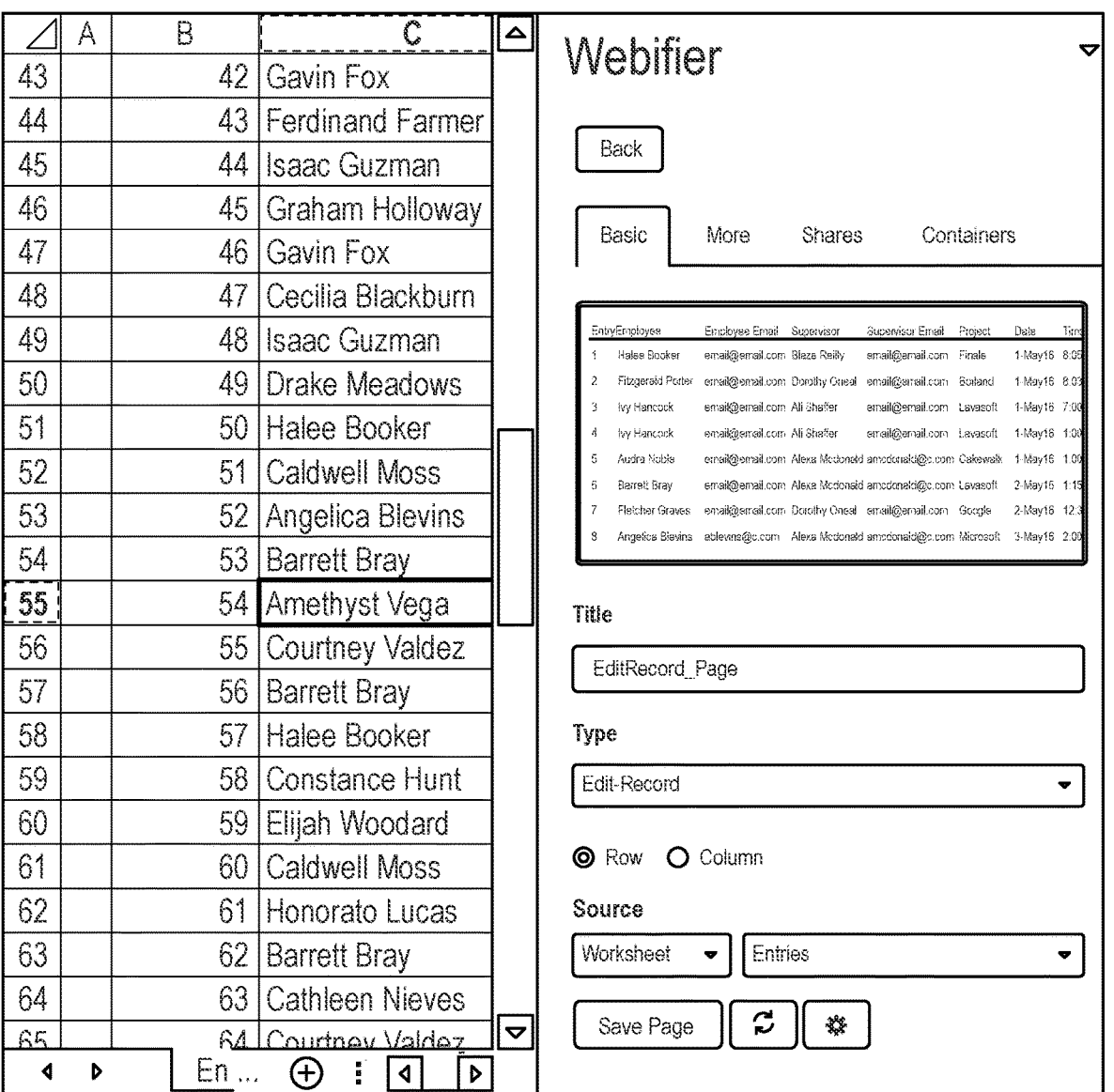

FIG. 41 is a screenshot of an Edit-Record type of page being defined, with the designer specifying that the orientation of the source record sheet is row-based such that each row represents a different record.

Figure 42:
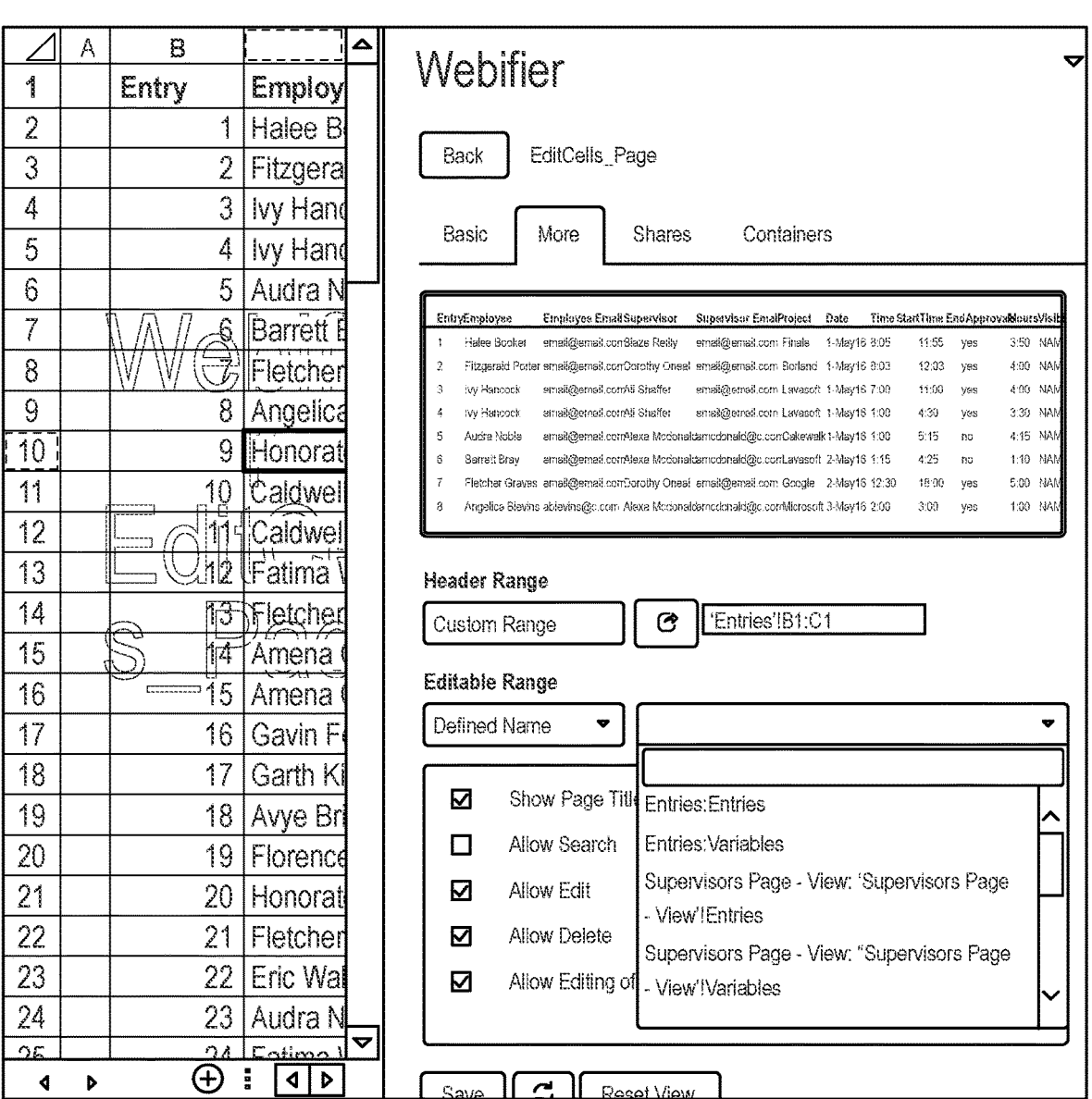

FIG. 42 is a screenshot of an Edit-Record type of page being defined, with the designer choosing More options such as page options, specifying a custom Header Range, and selecting an Editable Range from a dropdown menu.

Figure 43:
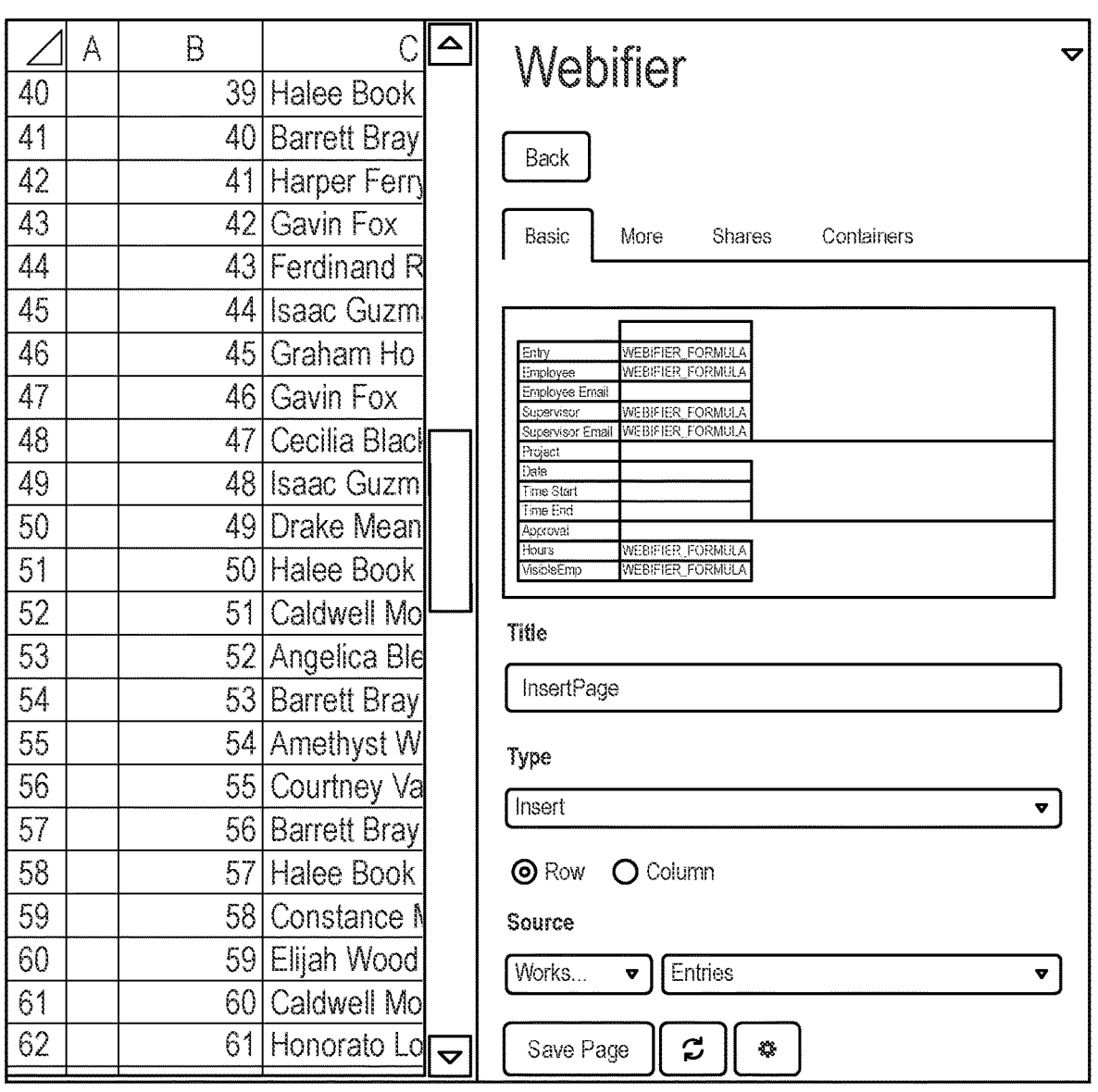

FIG. 43 is a screenshot of an Insert type of page being defined, with the thumbnail illustrating a preview of an automatically generated html form that may be seen by visitors of the destination page.

Figure 44:
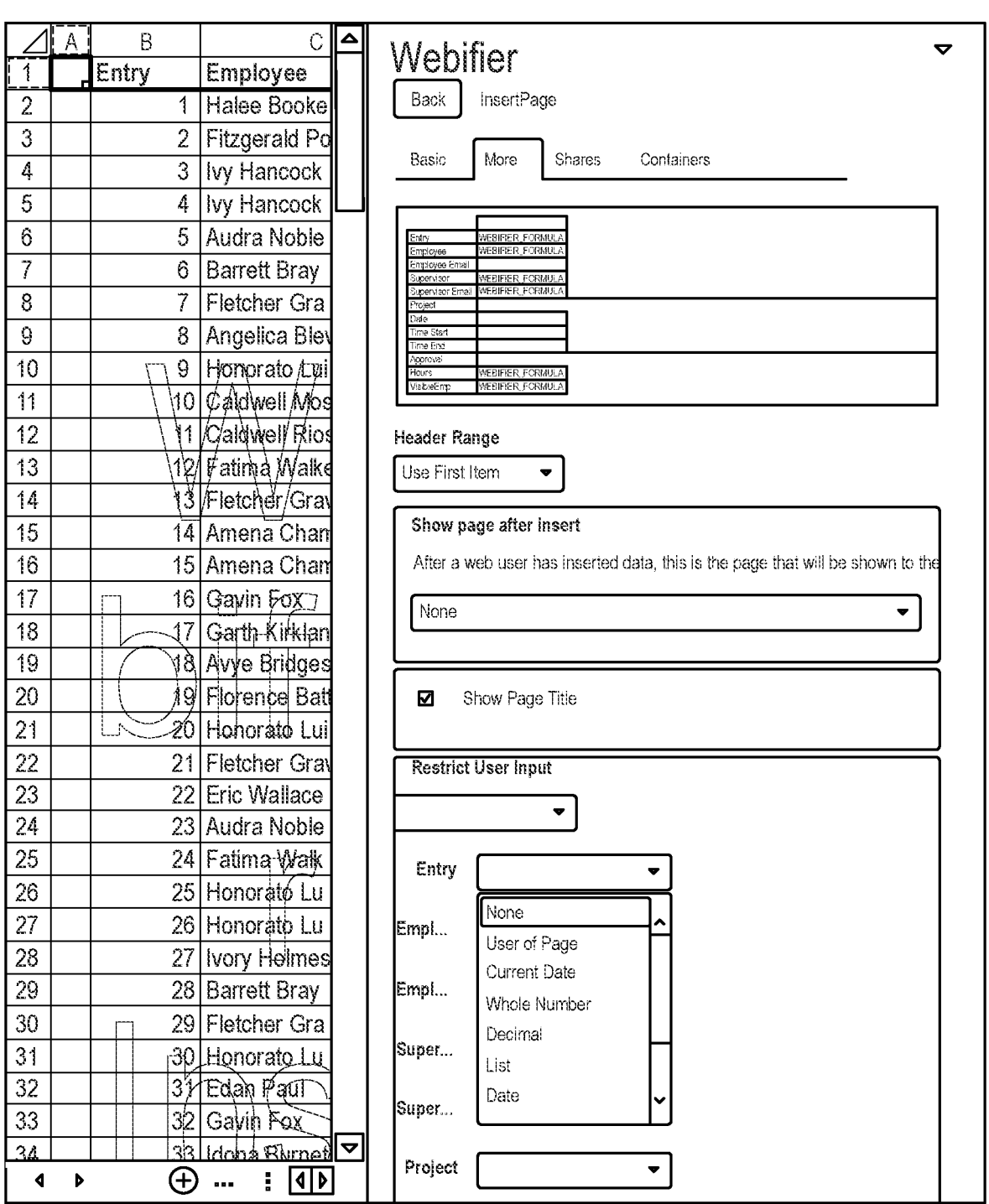

FIG. 44 is a screenshot of the various options for an Insert type of page. It further illustrates some of the data validators that the webifier supports.

Figure 45:
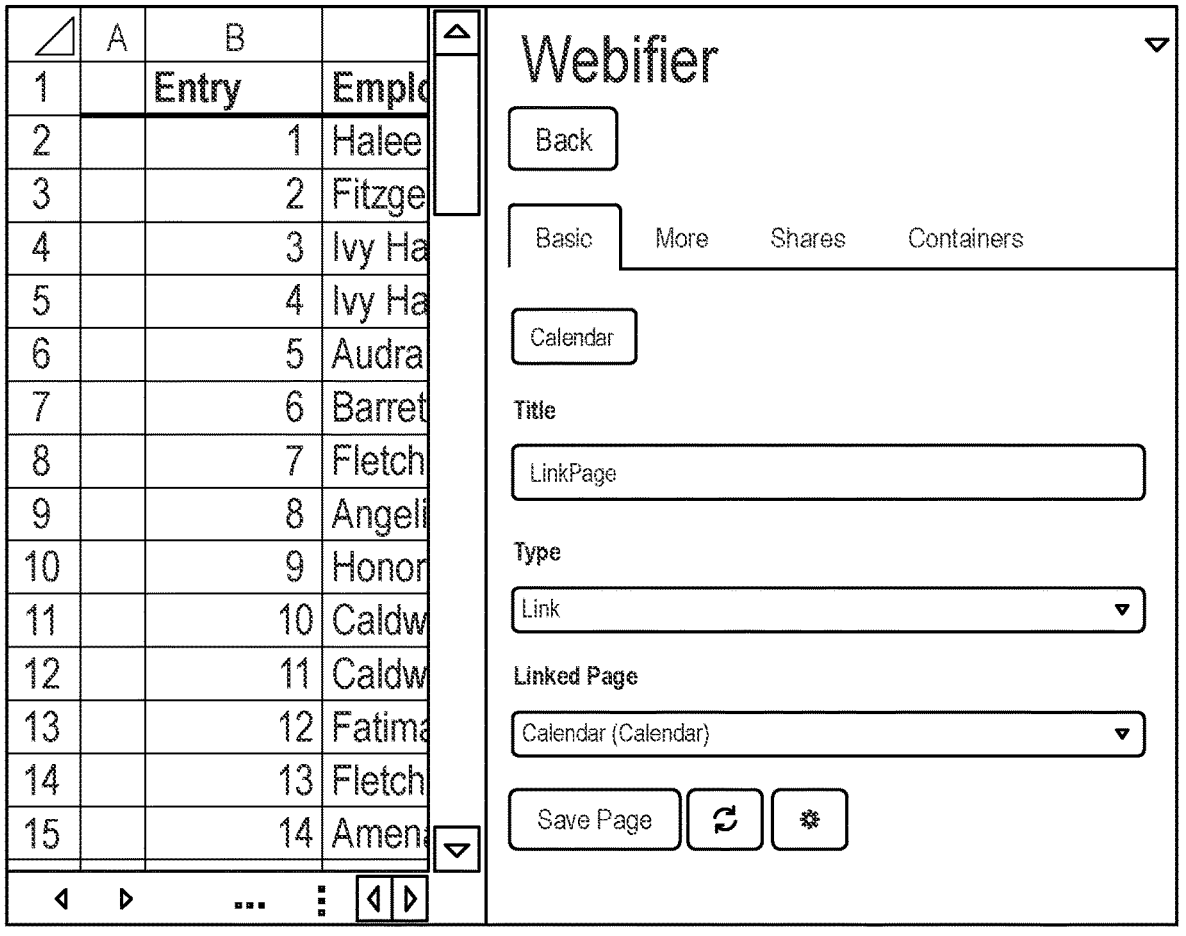

FIG. 45 is a screenshot of a Link type of page being defined, with a thumbnail illustrating a preview of a hyperlink that will be generated but with the formula functions showing placeholder values rather than actual values, and where the destination the visitor will be directed to upon clicking the link is specified as a specific calendar destination page.

Figure 46:
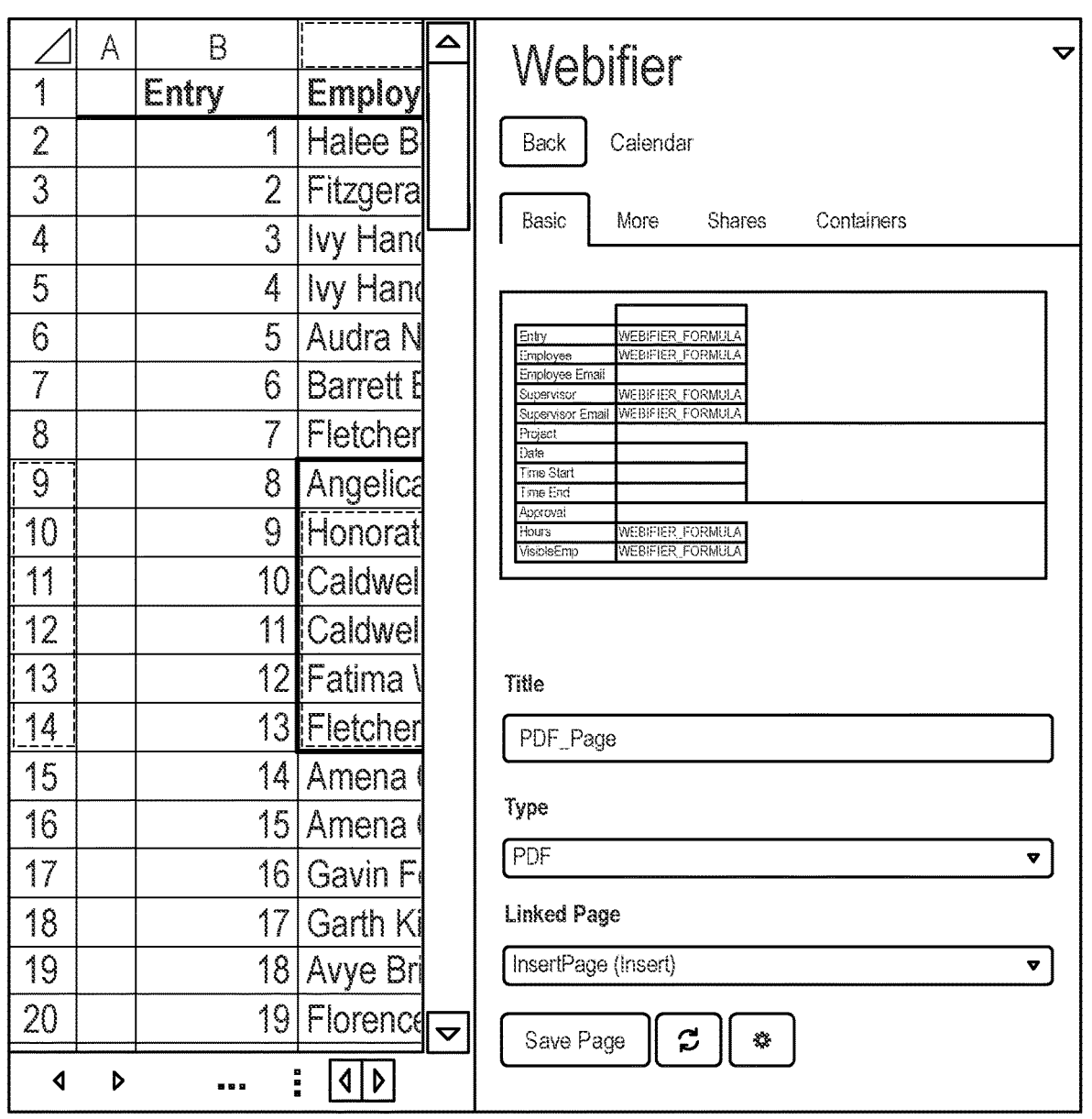

FIG. 46 is a screenshot of a PDF type of page being defined, with a thumbnail illustrating a preview of the PDF with a form embedded in the PDF that will be generated based on the designer selecting a previously created insert destination page as the basis for the PDF.

Figure 47:
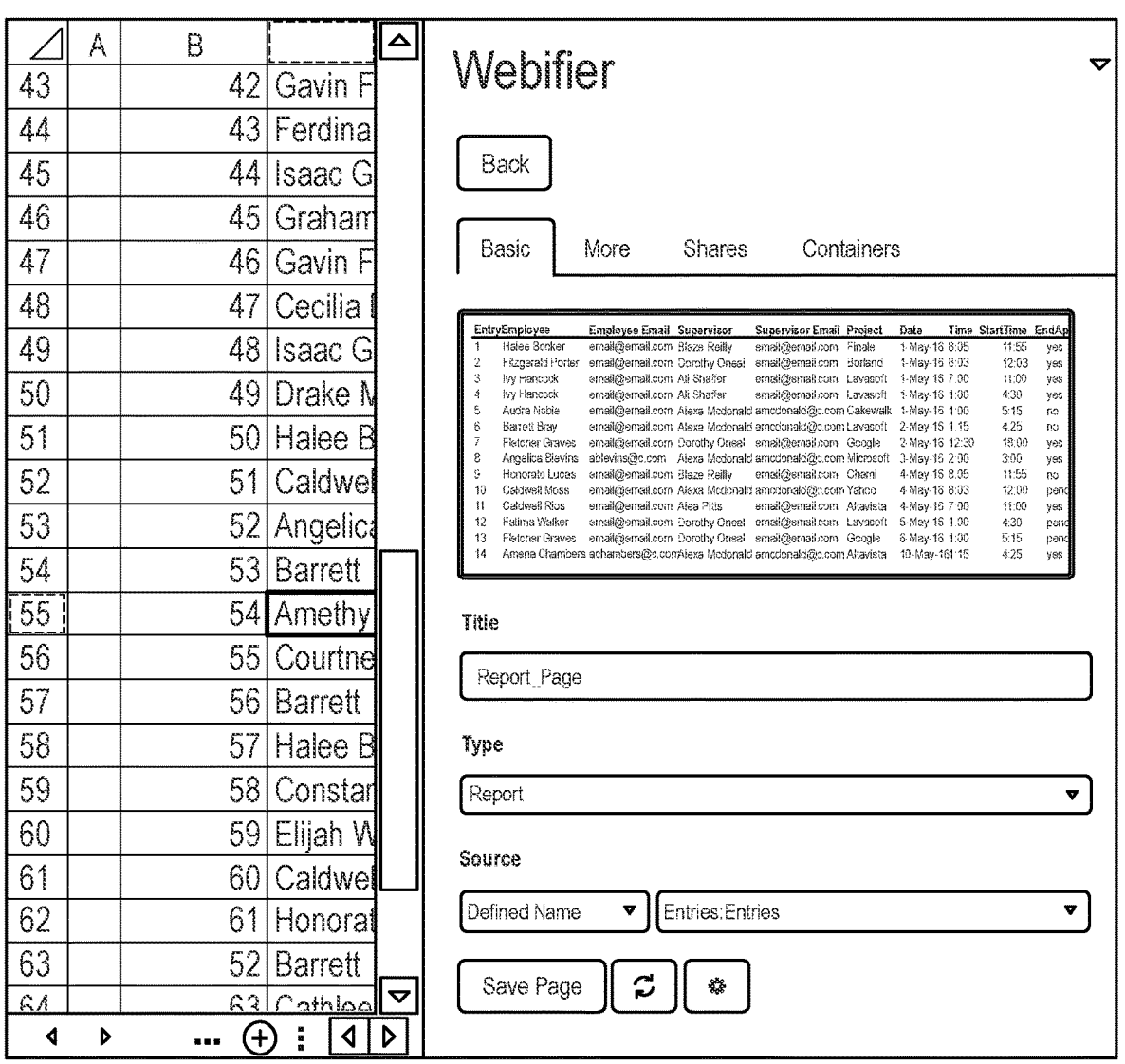

FIG. 47 is a screenshot of a Report type of page being defined, where the report does not have a separately defined template sheet. The thumbnail illustrates that the row-record sheet will result in a destination page that lists out all of the records with the same formatting as the cells of the row record sheet.

Figure 48:
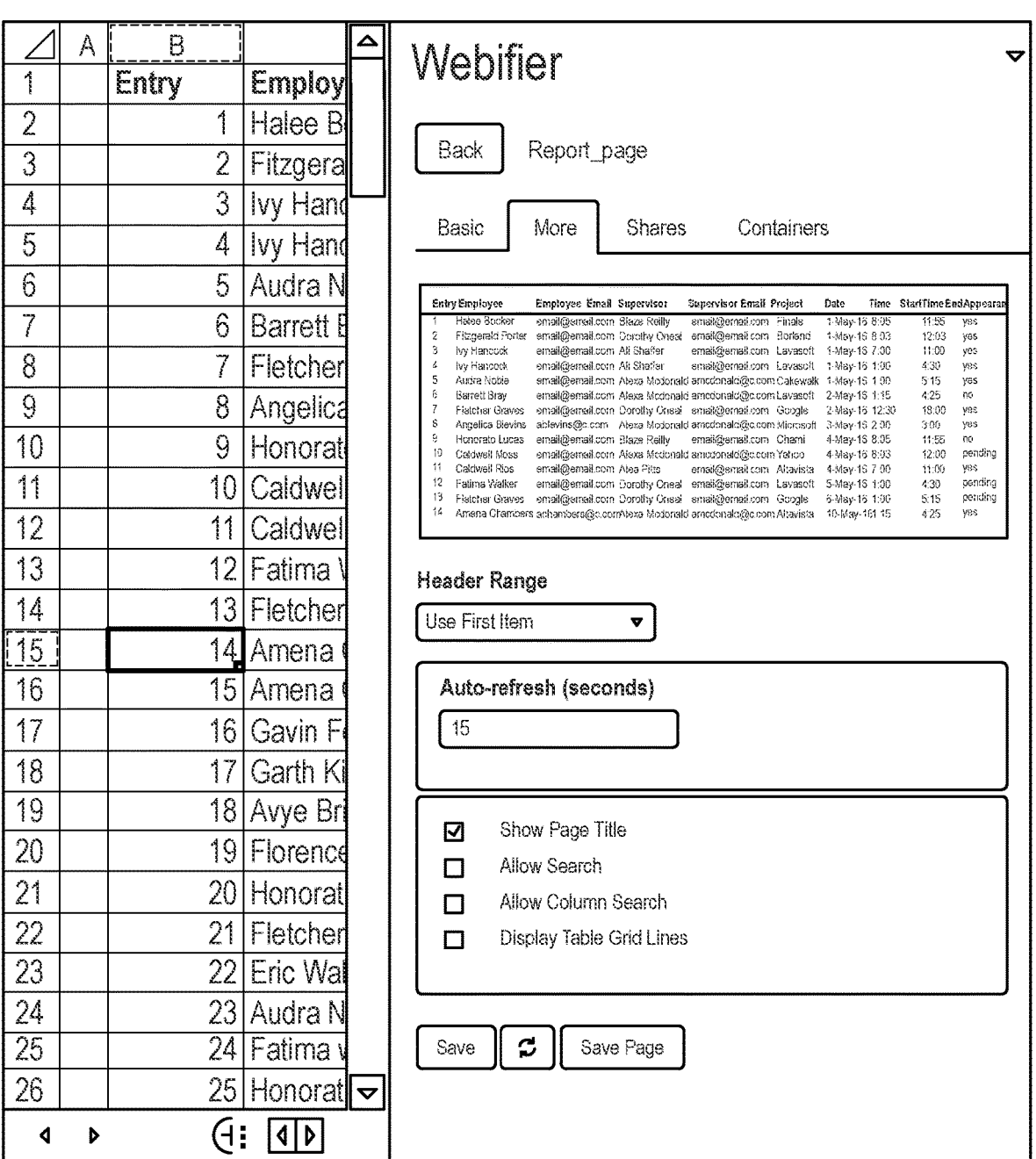

FIG. 48 is a screenshot of a Report type of page being defined, with the designer choosing More options such as a Header Range, Auto-refresh time, and page options.

Figure 49:
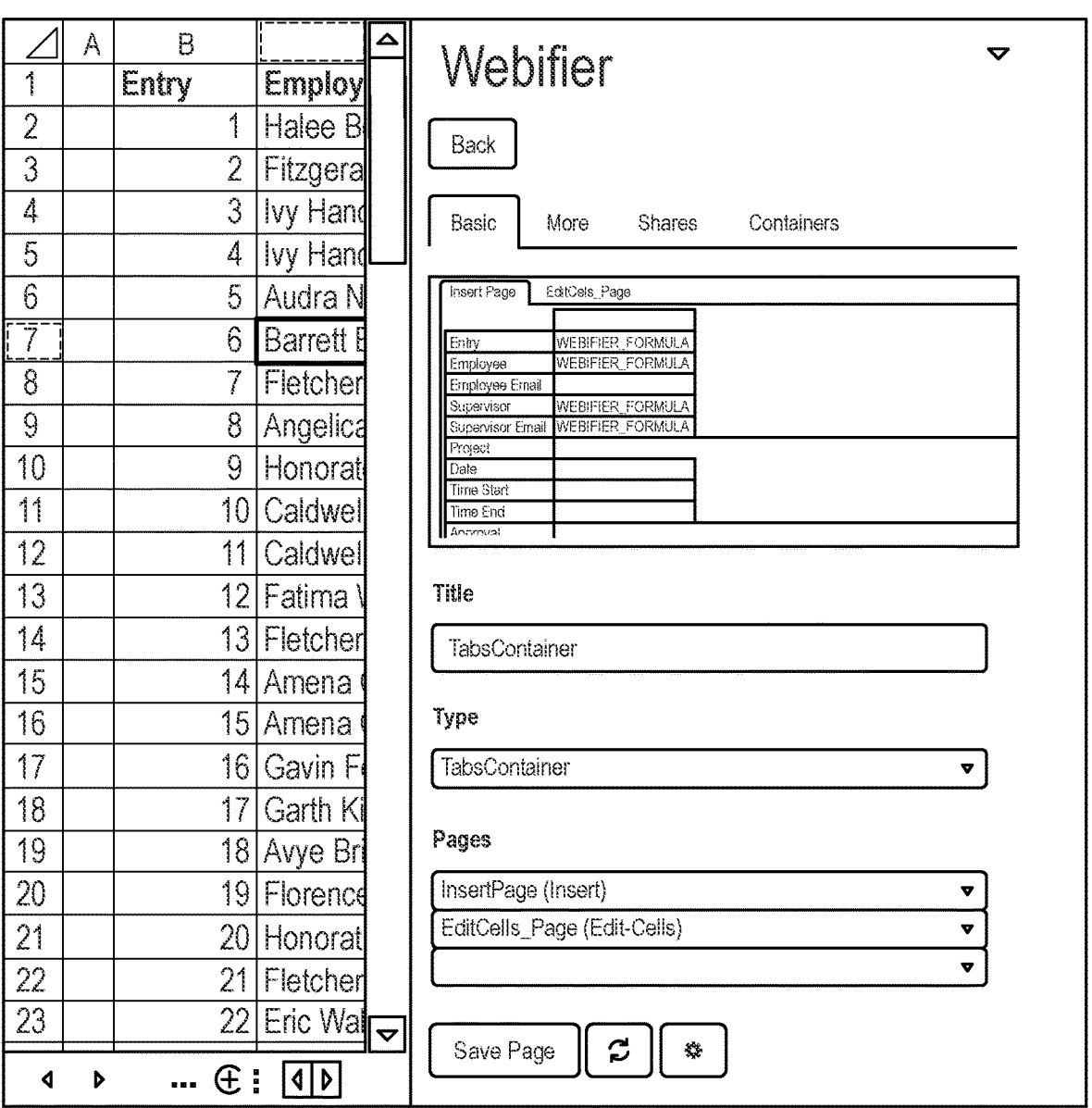

FIG. 49 is a screenshot of a Tabs Container type of page being defined, where the designer has selected two previously created destination pages to be contained within tabs. The thumbnail illustrates a destination page that will have two visual tabs at the top of the page, with each tab having one of the previously created pages as the basis for the content.

Figure 50:
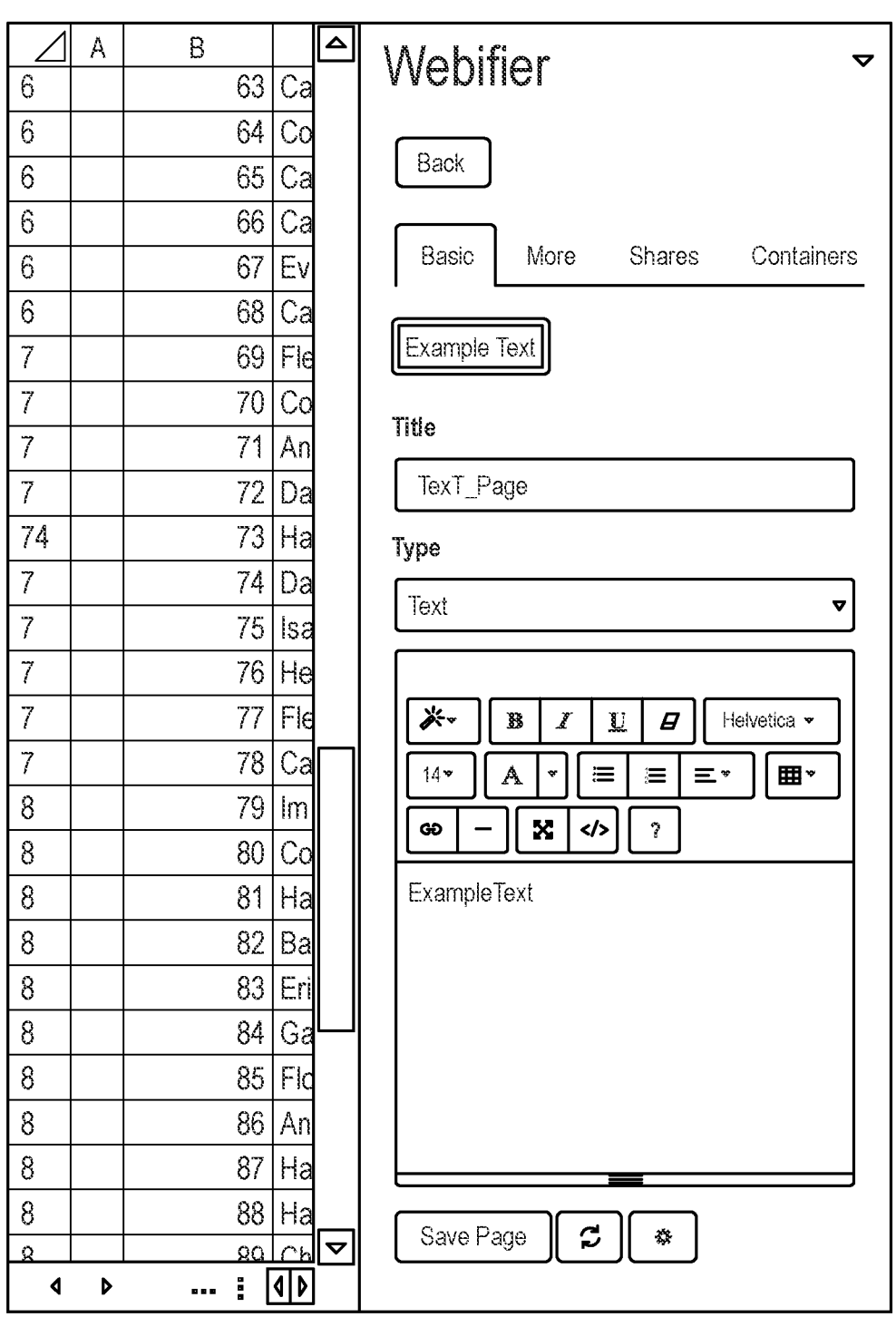

FIG. 50 is a screenshot of a Text type of page being defined, where the designer can input rich text using a WYSIWYG editor.

FIG. 51 is a screenshot of the system presenting options for the type of page to be added after receiving a request from the designer to add a page.

Figure 52:
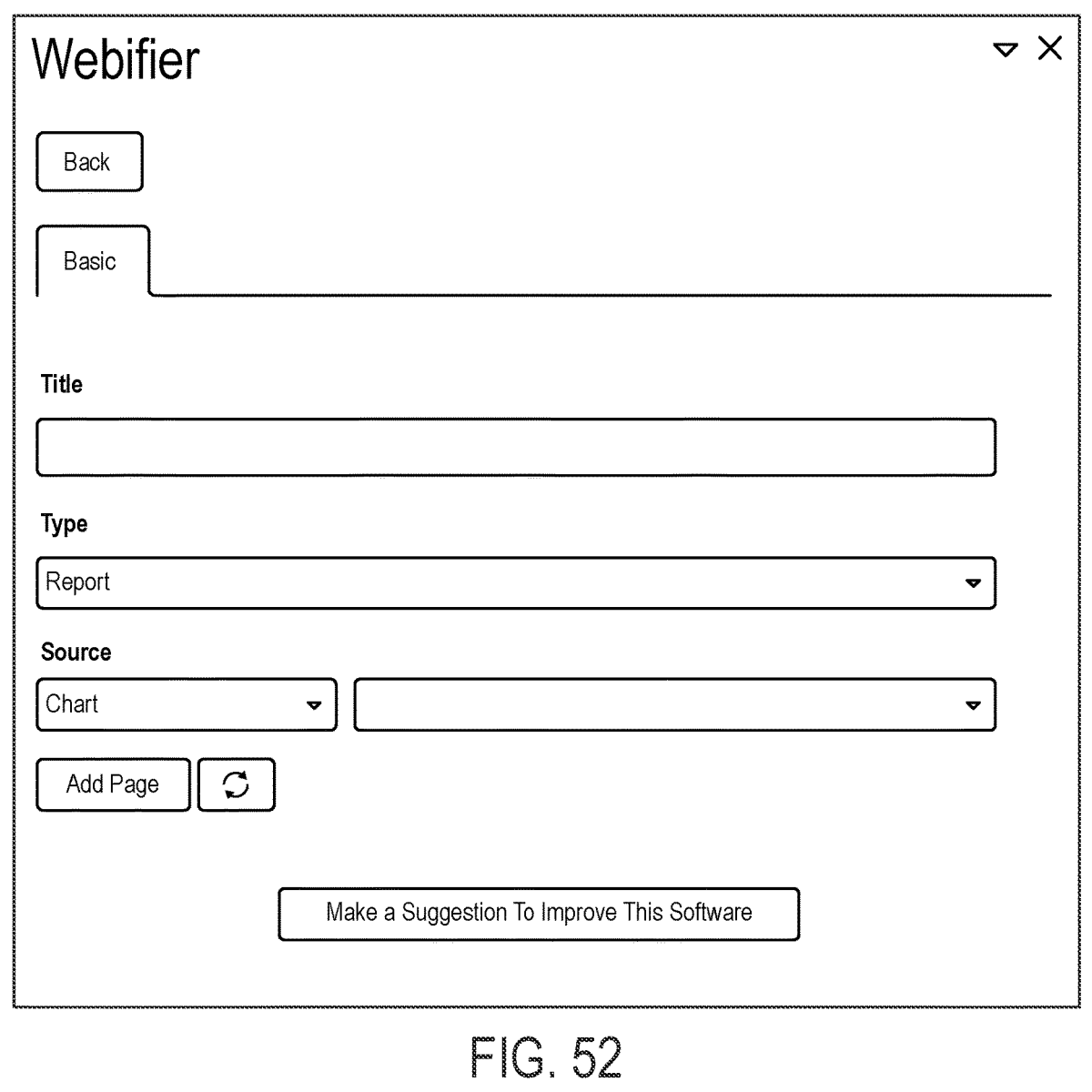

FIG. 52 is a screenshot of a Report type of page being defined, whereby the webifier has automatically detected that charts are available in the spreadsheet and the webifier displays a dropdown listing of charts that could be displayed on a report destination page.

Figure 53:
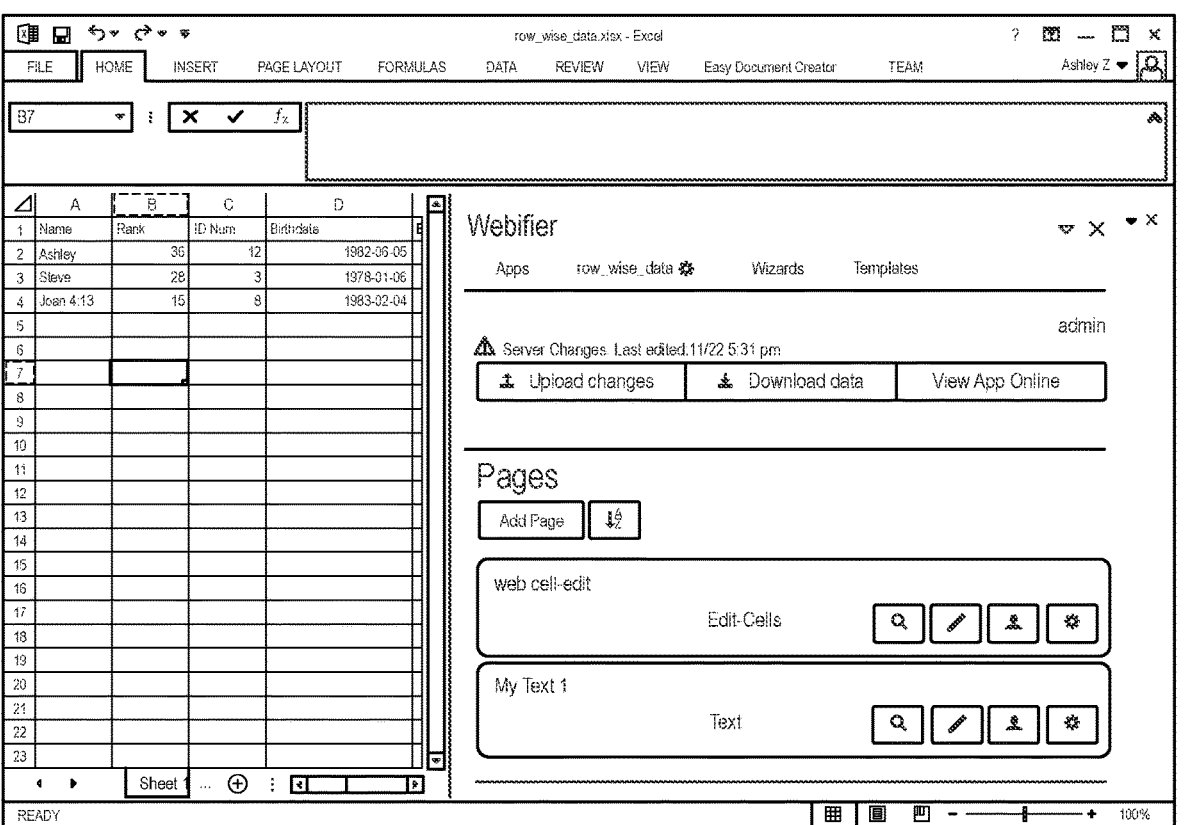

FIG. 53 is a screenshot of the Add-On being notified by the destination system that changes from visitors have been received and detected and will either be downloaded automatically or the designer is able to click download data to retrieve them at a desired time.

Figure 54:
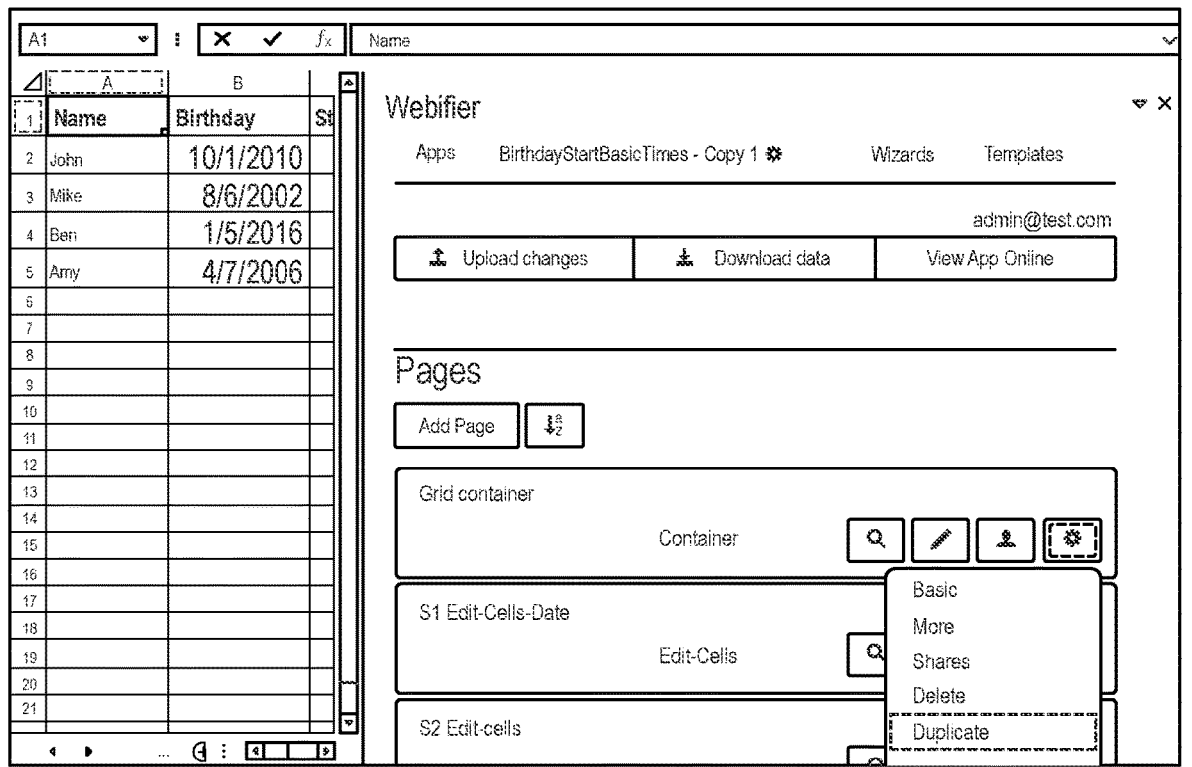

FIG. 54 is a screenshot of the page list where the designer has clicked the actions menu for a page and the Add-On is presenting supported manipulation options for the destination page, such as duplicating or deleting the page.

Figure 55:
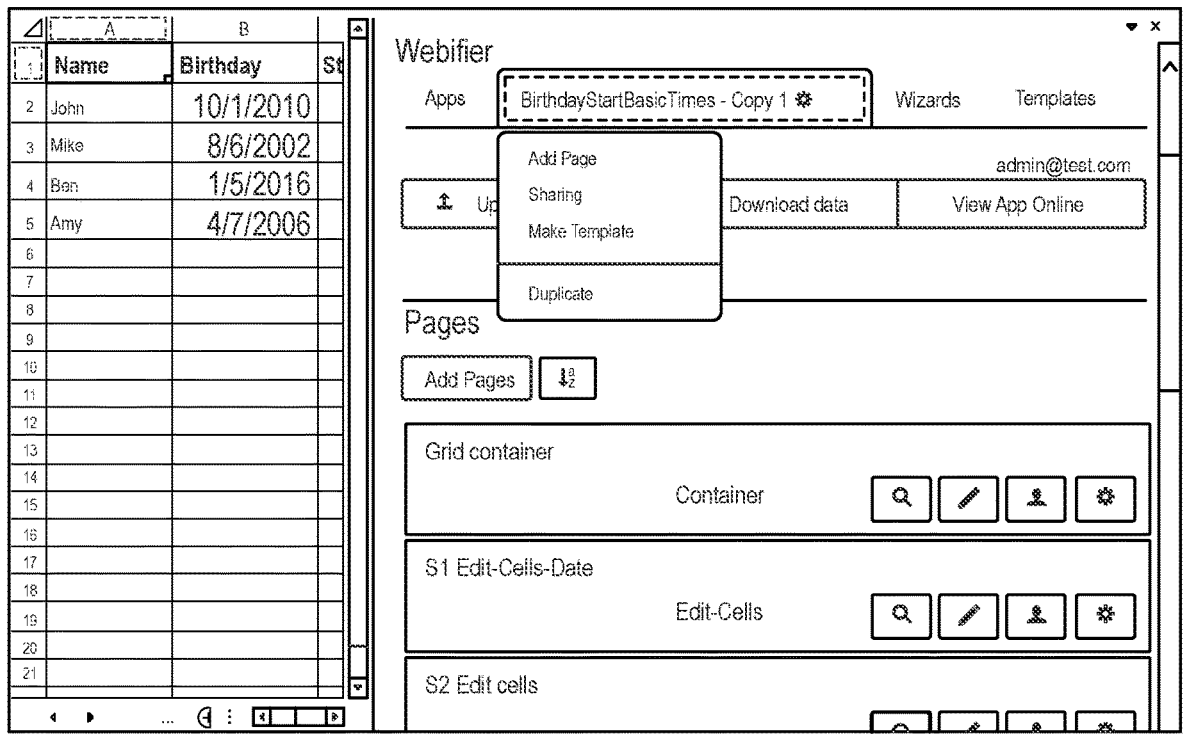

FIG. 55 is a screenshot of the Add-On displaying the web-app action menu from within the page listing, with various manipulation options for the entire web-app such as duplicating the web-app.

Figure 56:
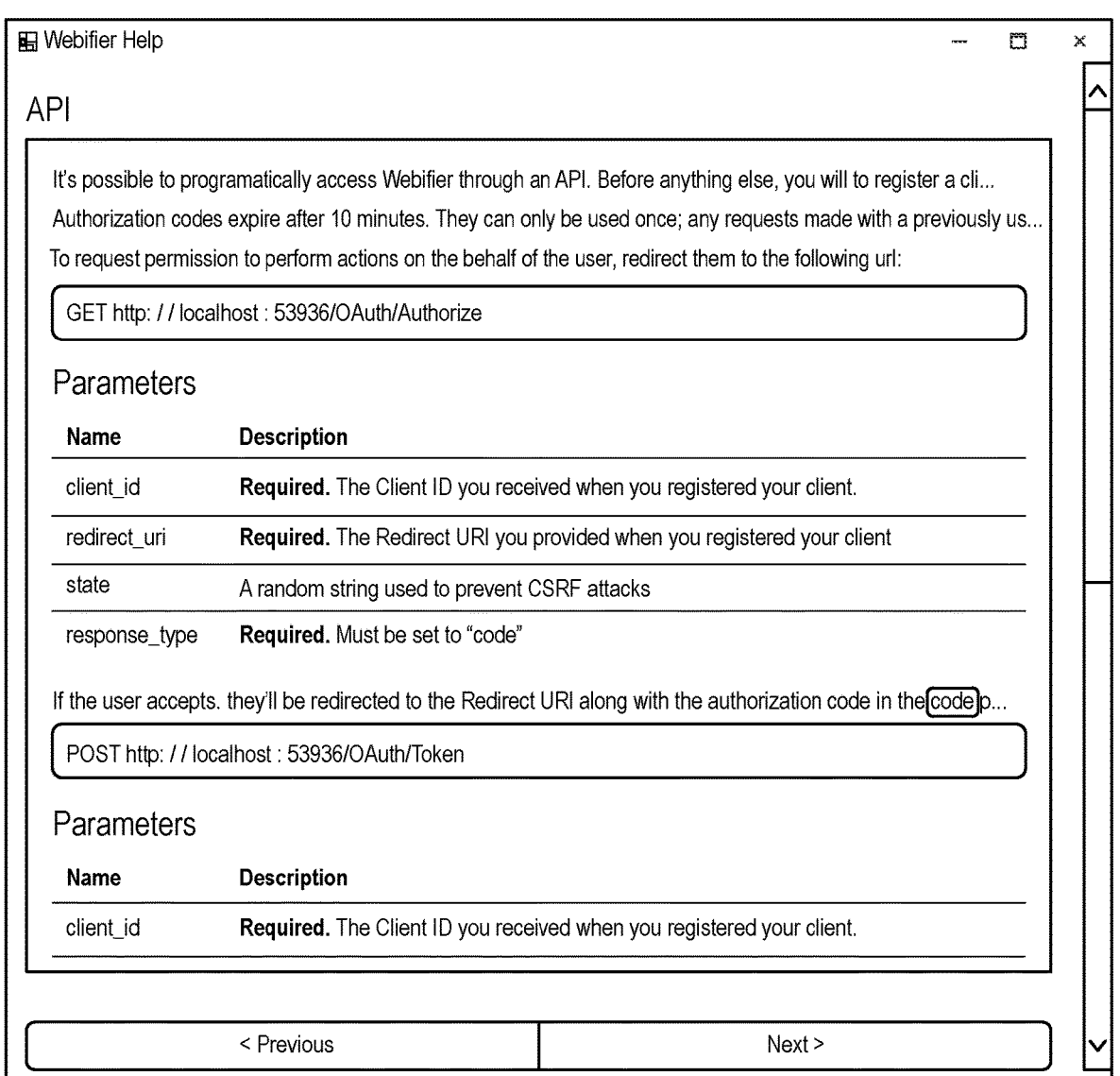

FIG. 56 is example documentation for a destination system web-service API function call available to external systems or the Add-On, demonstrating a typical usage and request format for the web-service API calls.

Figure 57:
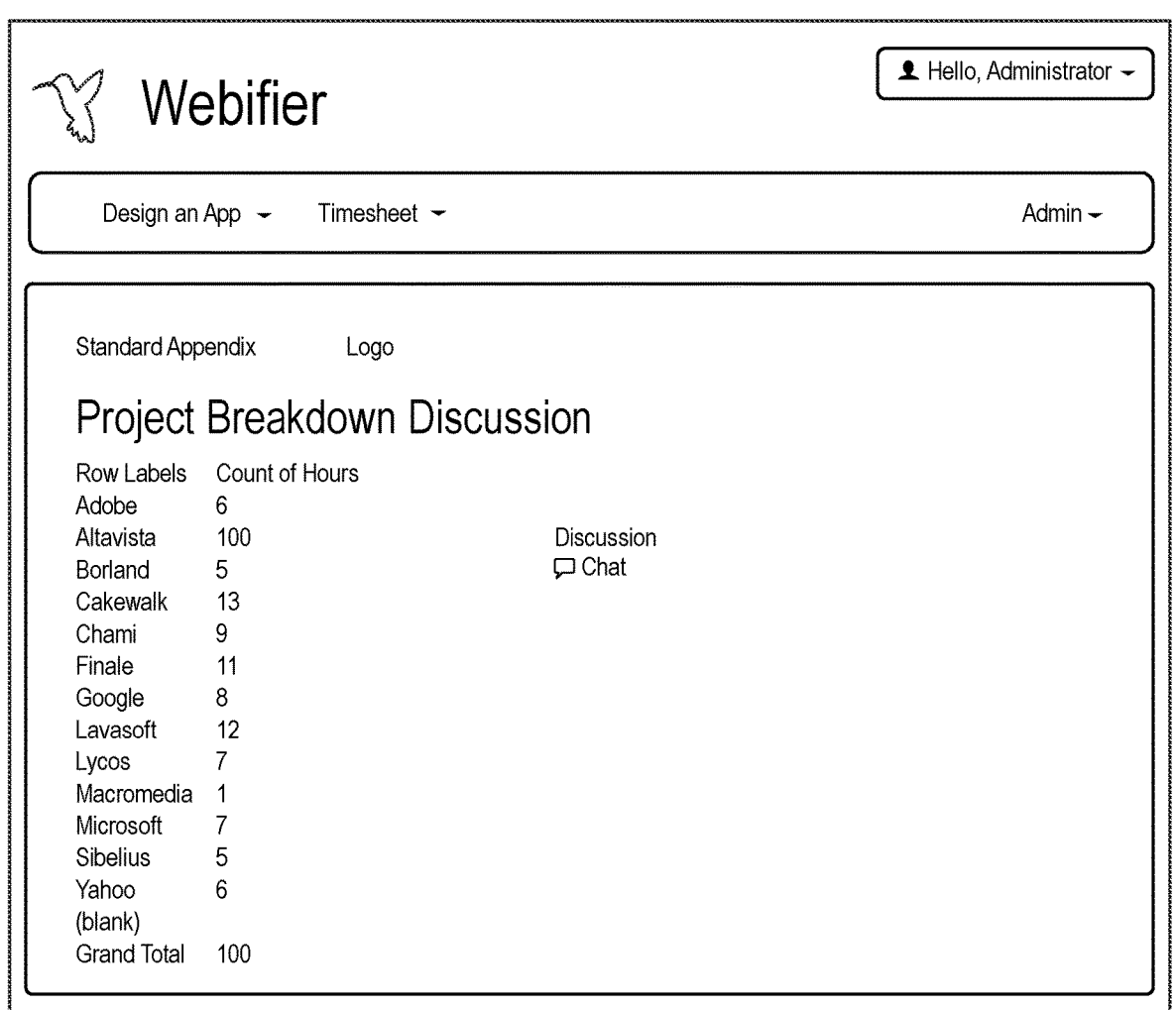

FIG. 57 is a screenshot of a destination report page, illustrating the result of a report page type being defined using a template sheet to define the layout to have row records listed on the left, some links at the top, and a clickable icon on the right to popup a chat.

Figure 58:
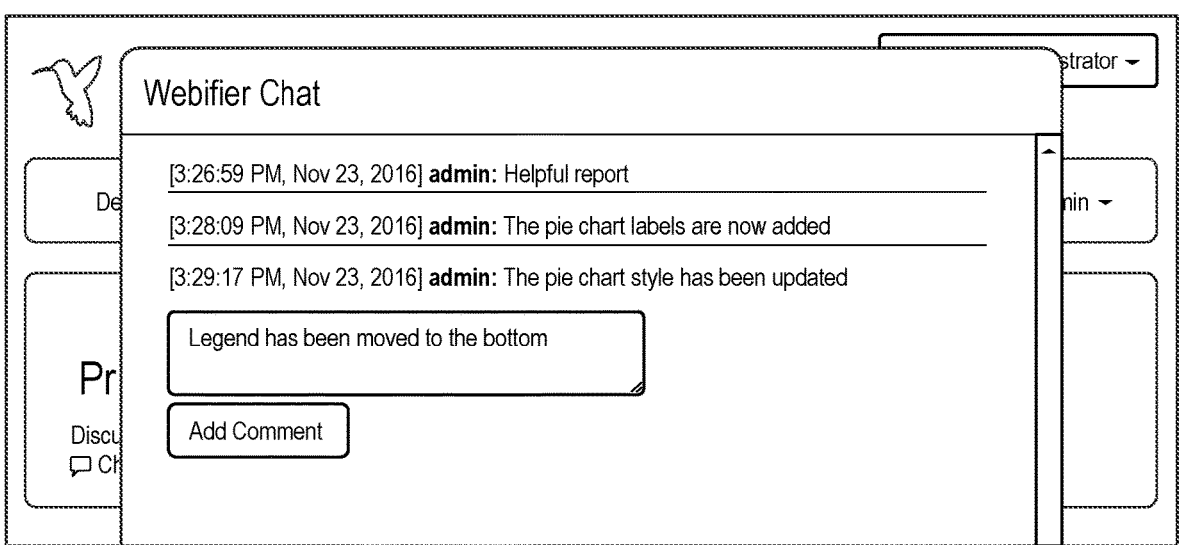

FIG. 58 is a screenshot of the destination system retrieving chat records and prompting visitors to input new chat, after a chat object has been accessed by a visitor.

FIG. 59 is a screenshot with an example spreadsheet, wherein a chat object is being created with the formula function and a GUID passed in as a parameter to indicate what group of chat records is associated with that chat object. In this example, the visible placeholder text shown in the cell during design-time is the GUID passed in.

FIG. 60 is a screenshot with an example spreadsheet, illustrating how several external supplementary data objects can be used within a spreadsheet: chat, file, and image objects. The screenshot illustrates how there may be placeholder text, as in the case of the GUID for the file or #None when no image is inserted, or other captions specified as parameters to the formula functions (e.g., FIG. 5), as in the case of "10 KB" for the file object showing a size. It also illustrates how two cells can refer to the same external data object, in this case E7 and F7.

Figure 61:
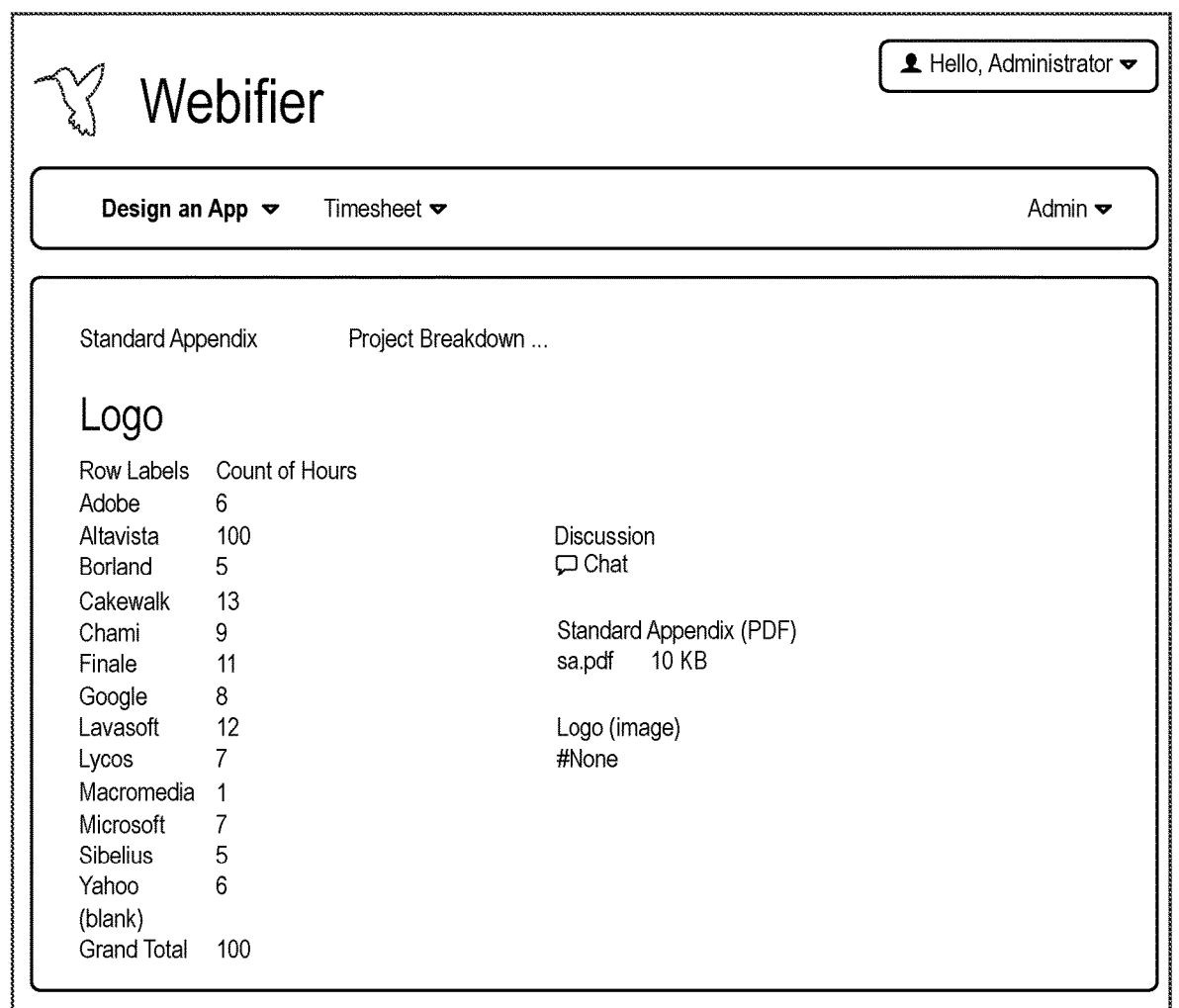

FIG. 61 is a screenshot of a destination report page as could be created from the spreadsheet in FIG. 60. The page illustrates how the placeholder text is replaced with an interactive chat object and that the cells E7 and F7 now allow the page to show multiple attributes of an external supplementary data object.

Figure 62:
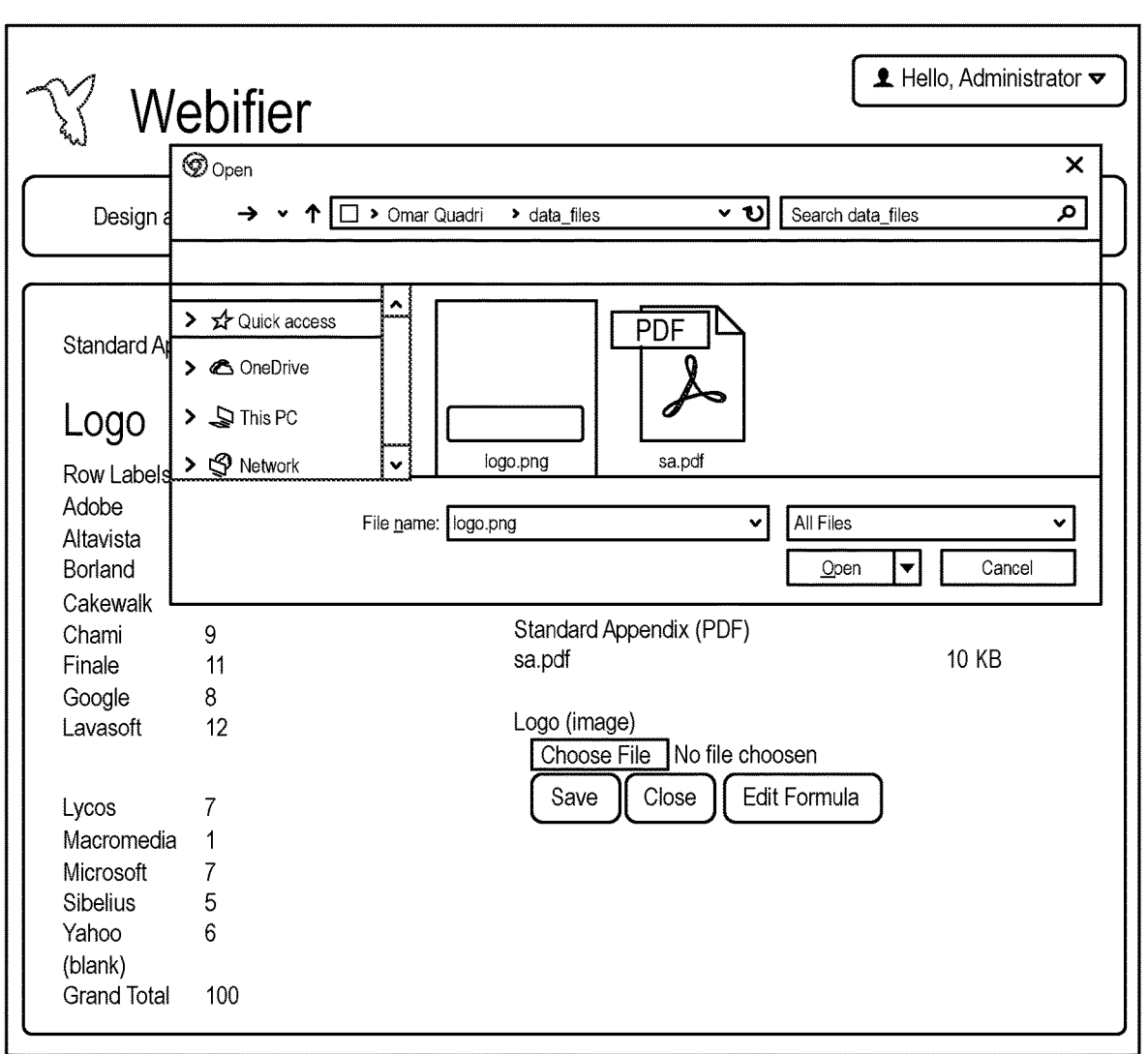

FIG. 62 is a screenshot of the destination report page in FIG. 61 having the ability to accept additional image files by way of an upload dialog from the browser. The screenshot also illustrates that interacting with the image object on the destination page caused the controls to change from a simple text label to those appropriate for choosing a file and that the system supports the designer specifying permissions for the visitor to change the formula of an image object, allowing the visitor to change what file bin the upload would go to.

Figure 63:
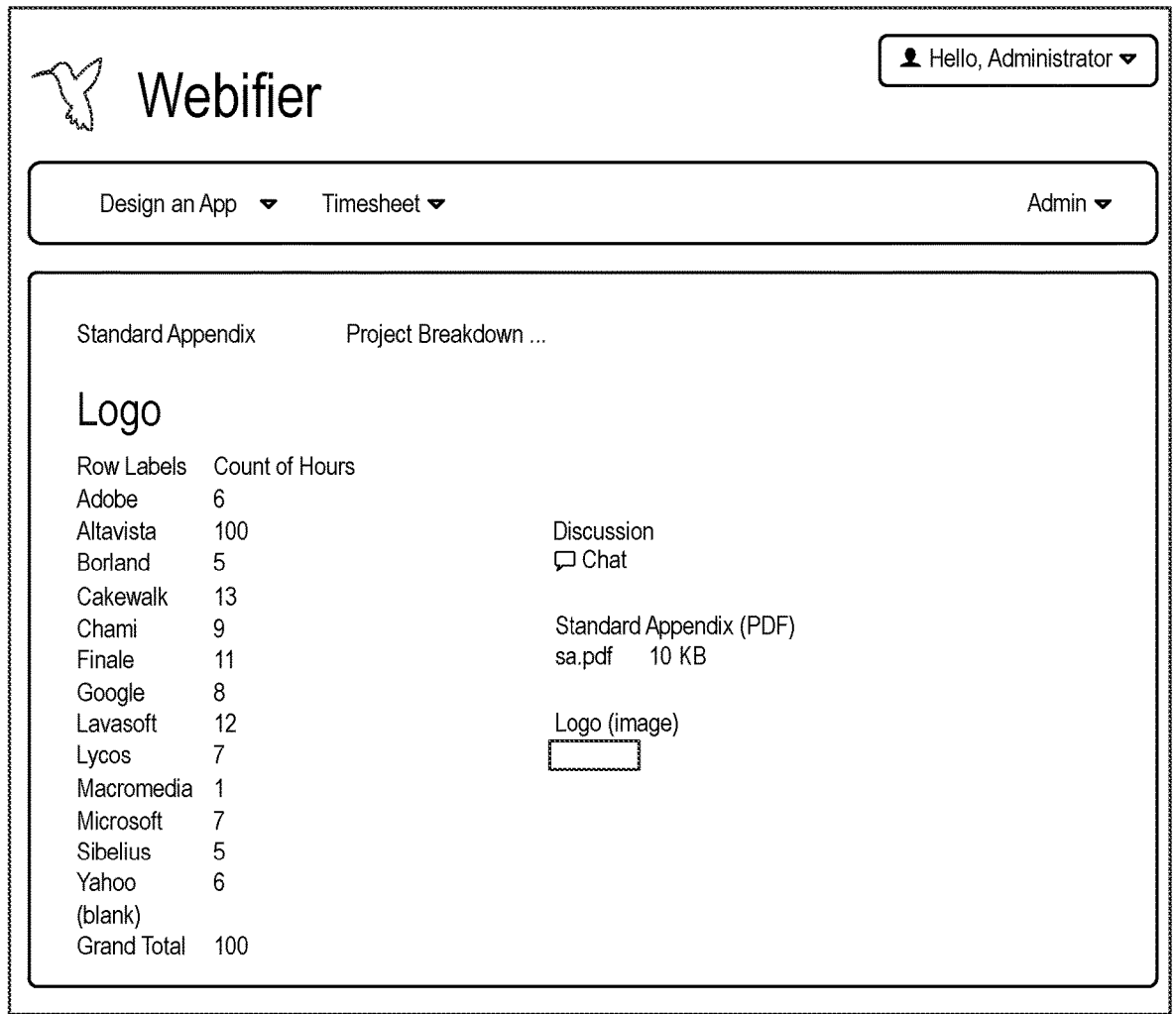

FIG. 63 is a screenshot of the destination report page in FIG. 61 displaying the currently stored image for that image object, after a visitor has uploaded the image to the image object via the destination page.

FIG. 64 is a screenshot of the example spreadsheet in FIG. 60 where the parameter to the formula function is an arbitrary text string rather an a GUID.

Figure 65:
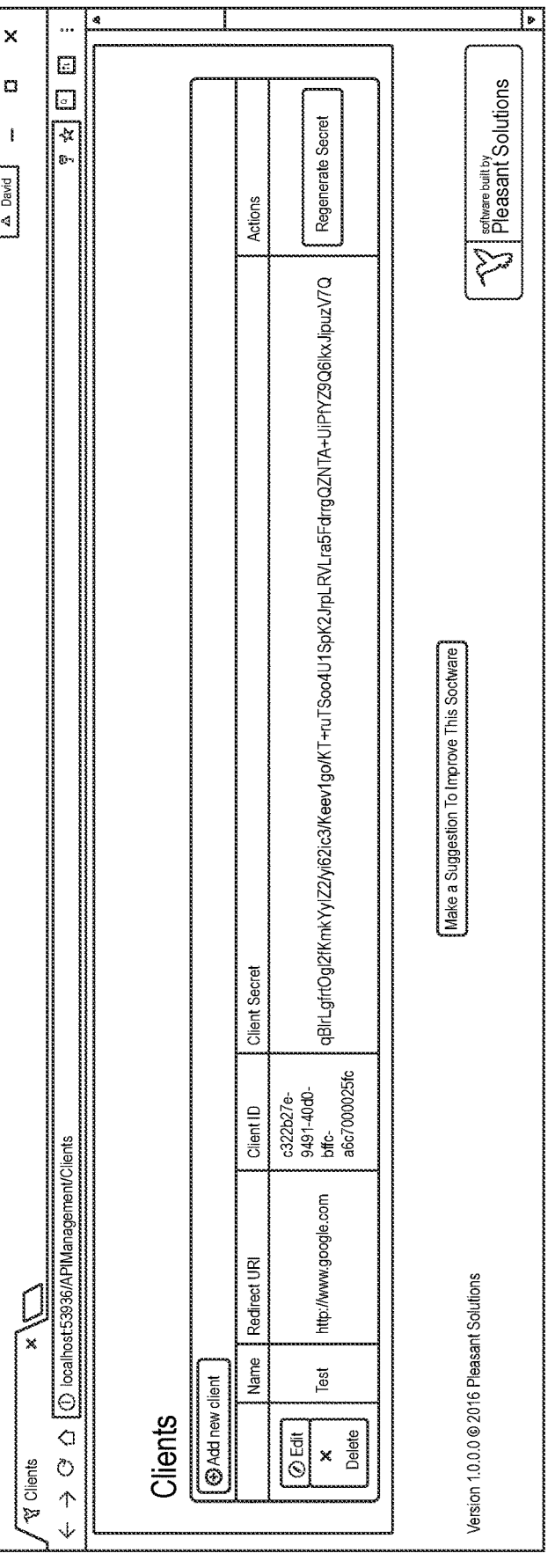

FIG. 65 is a screenshot of a destination system admin page that allows the designer to specify programmatic or automatic clients that are allowed to connect to the destination system and what authentication parameters are required for the client to do so.

Figure 66:
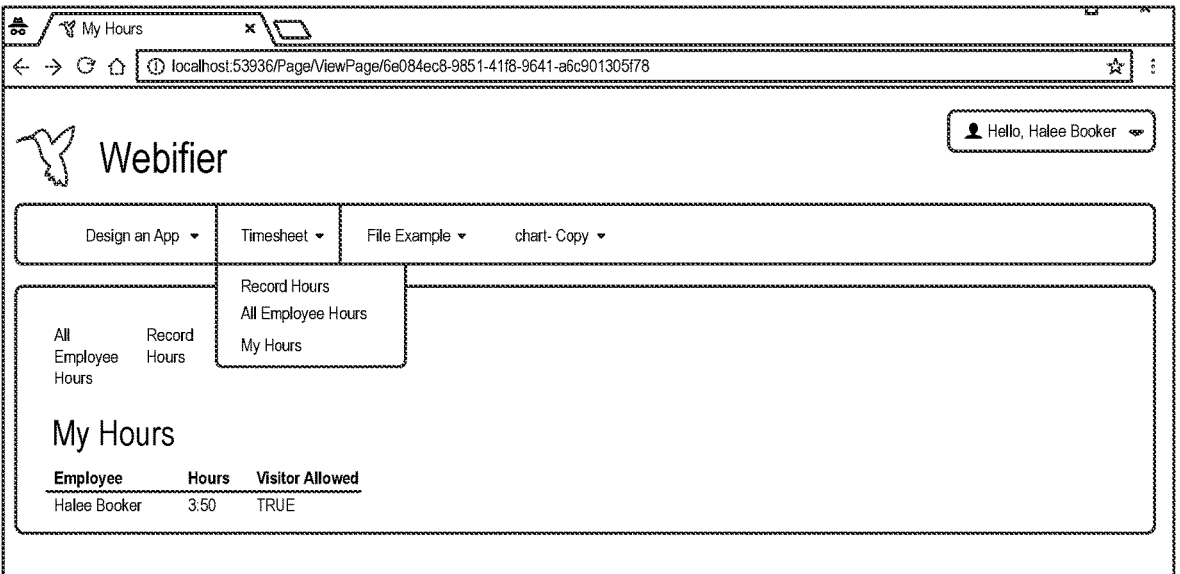

FIG. 66 is a screenshot of a destination system page which has a navigation menu of other pages dropping down from the web-app "Timesheet".

Figure 67:
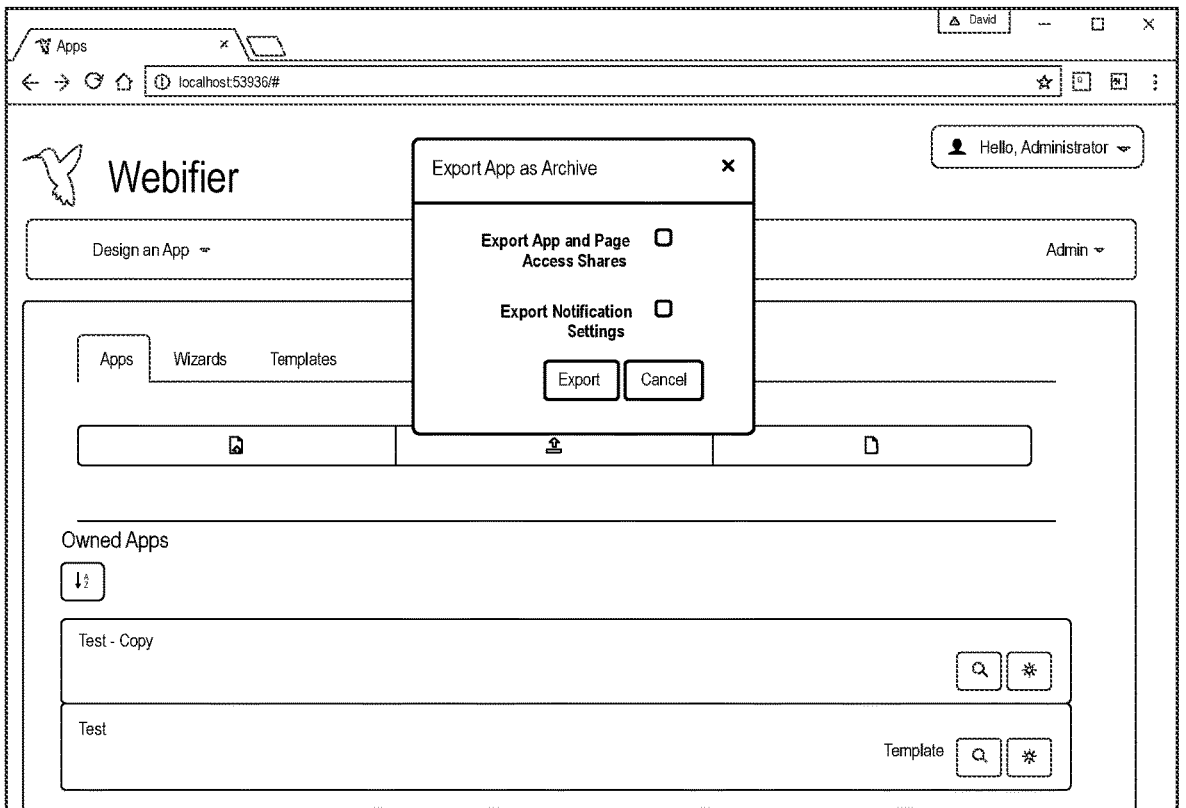

FIG. 67 is a screenshot of the destination system admin pages allowing a web-app to be exported as a single, self-contained, file containing the spreadsheet definition, both record sheets and template sheets, as well as the sharing and notification settings.

Figure 68:
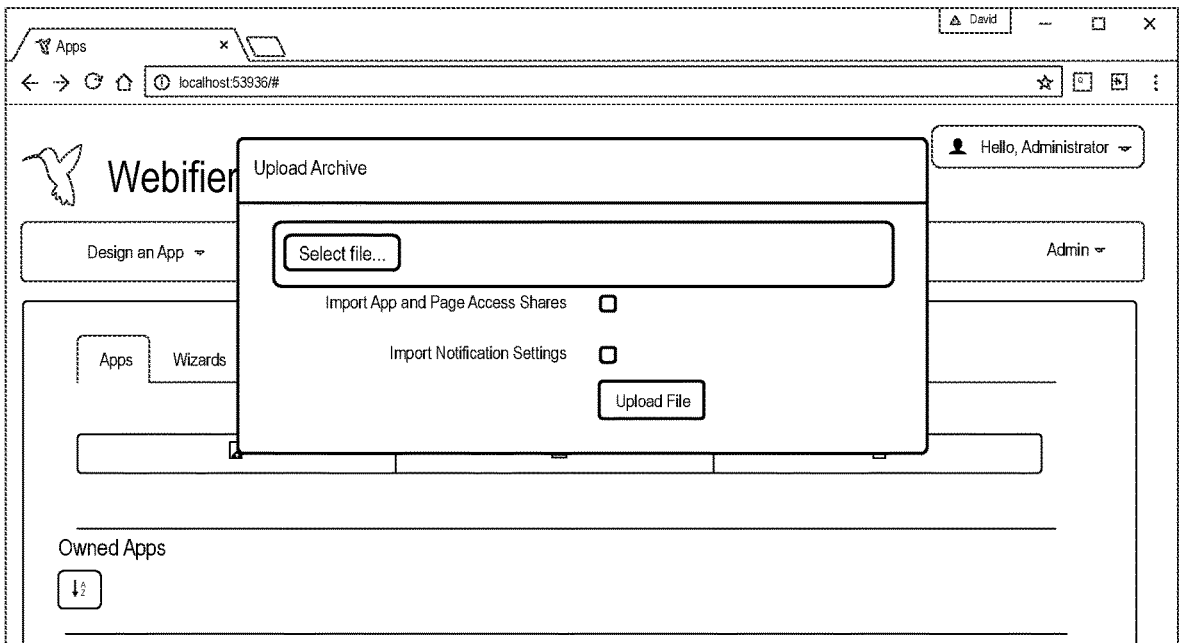

FIG. 68 is a screenshot of the destination system admin pages upload dialog which allows uploading of a spreadsheet definition, with the same options of importing information exported from FIG. 67.

Figure 69:
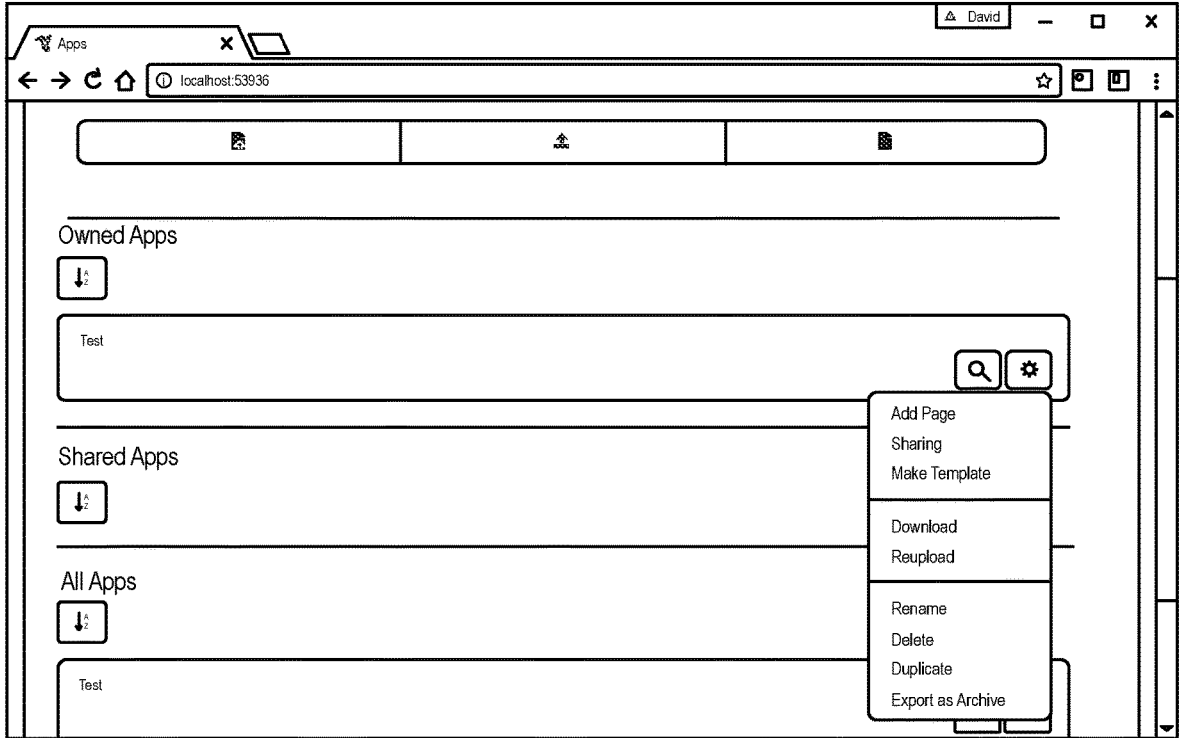
Figure 72:
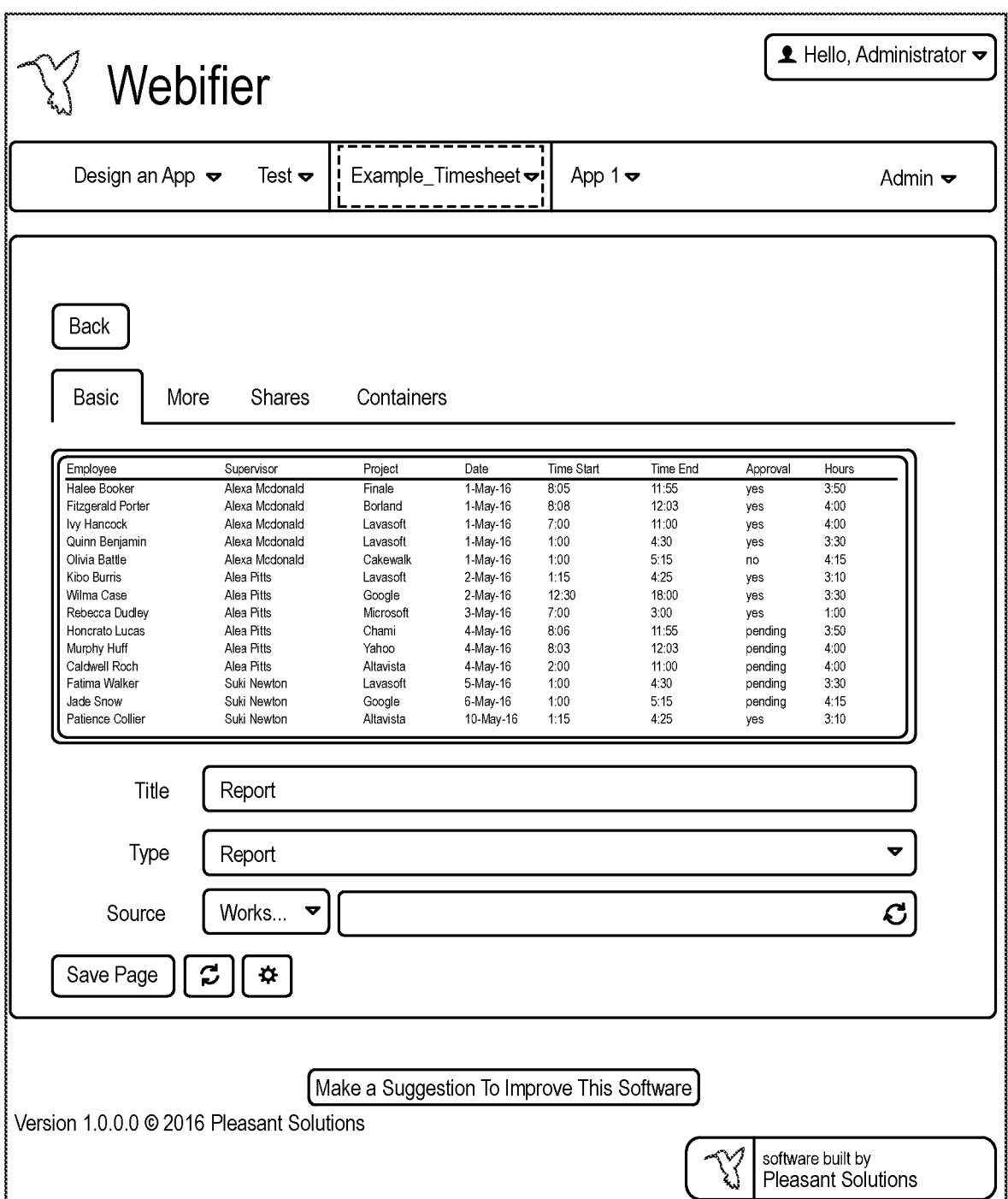

FIG. 69 is a screenshot of an activated actions menu for one app on the list of web-apps. Unlike FIG. 17, the webifier has provided access to additional manipulations such as "add page" because the designer has the appropriate permissions on the web-app.

FIG. 70-73 is a screenshot of a destination system admin page allowing a designer to define an Insert, Link, Report, and Text type of pages, much like FIGS. 43, 45, 47, and 50 respectively, but without the need for an Add-On or third-party spreadsheet tool.

FIG. 74 is a screenshot of a traditional spreadsheet table, illustrating the table can have controls to filter the spreadsheet records based on the values in column C, and illustrating additional filtering of spreadsheet records using a formula such as a date formula on column H.

FIG. 75 is a screenshot of a destination system admin page supporting a page type of webpage to an arbitrary external URL and allowing a variety of potential sources, not just necessarily URLs.

Figure 76:
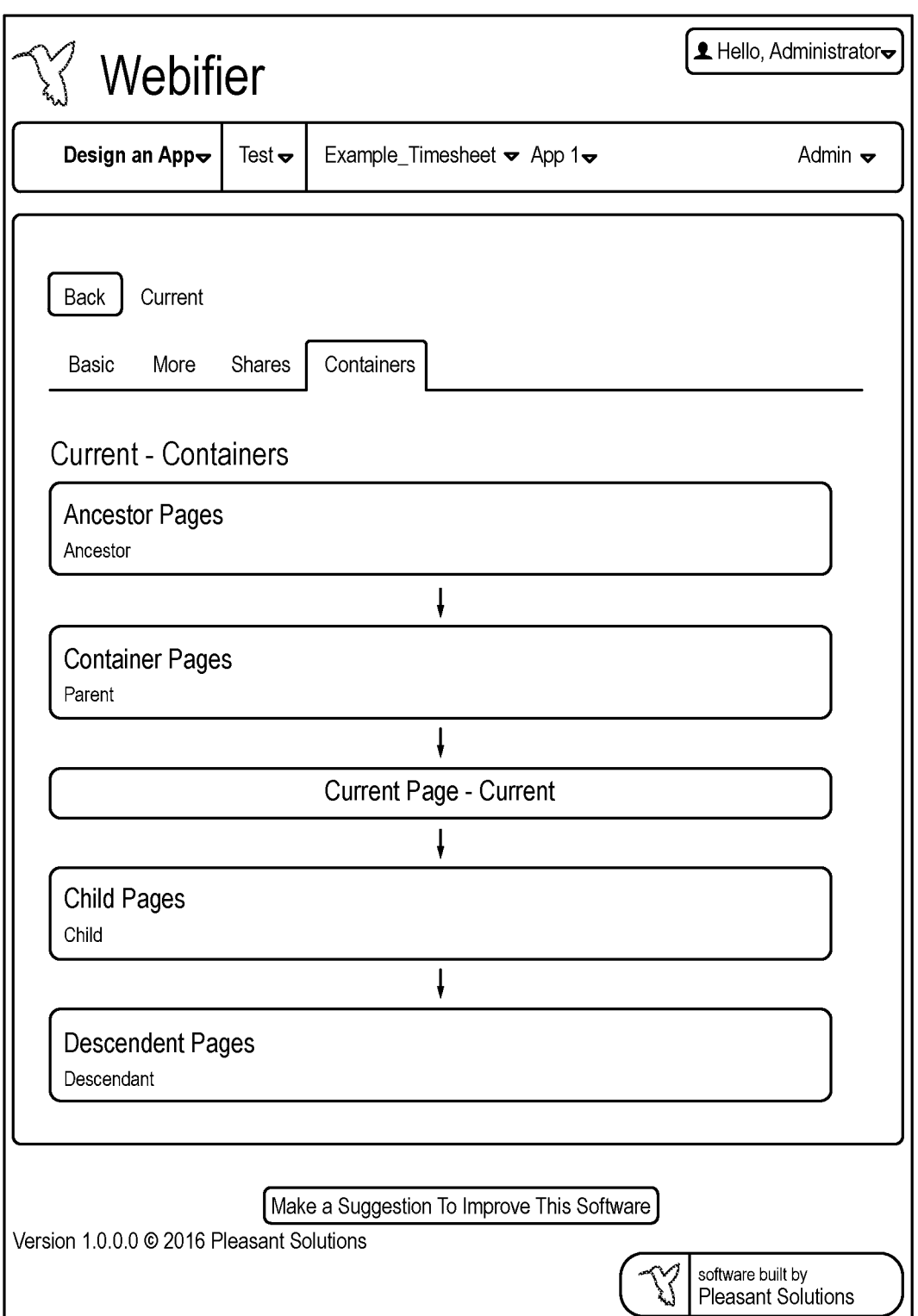

FIG. 76 is a screenshot of a destination system admin page illustrating the webifier's ability to have deeply nested containers.

Figure 77:
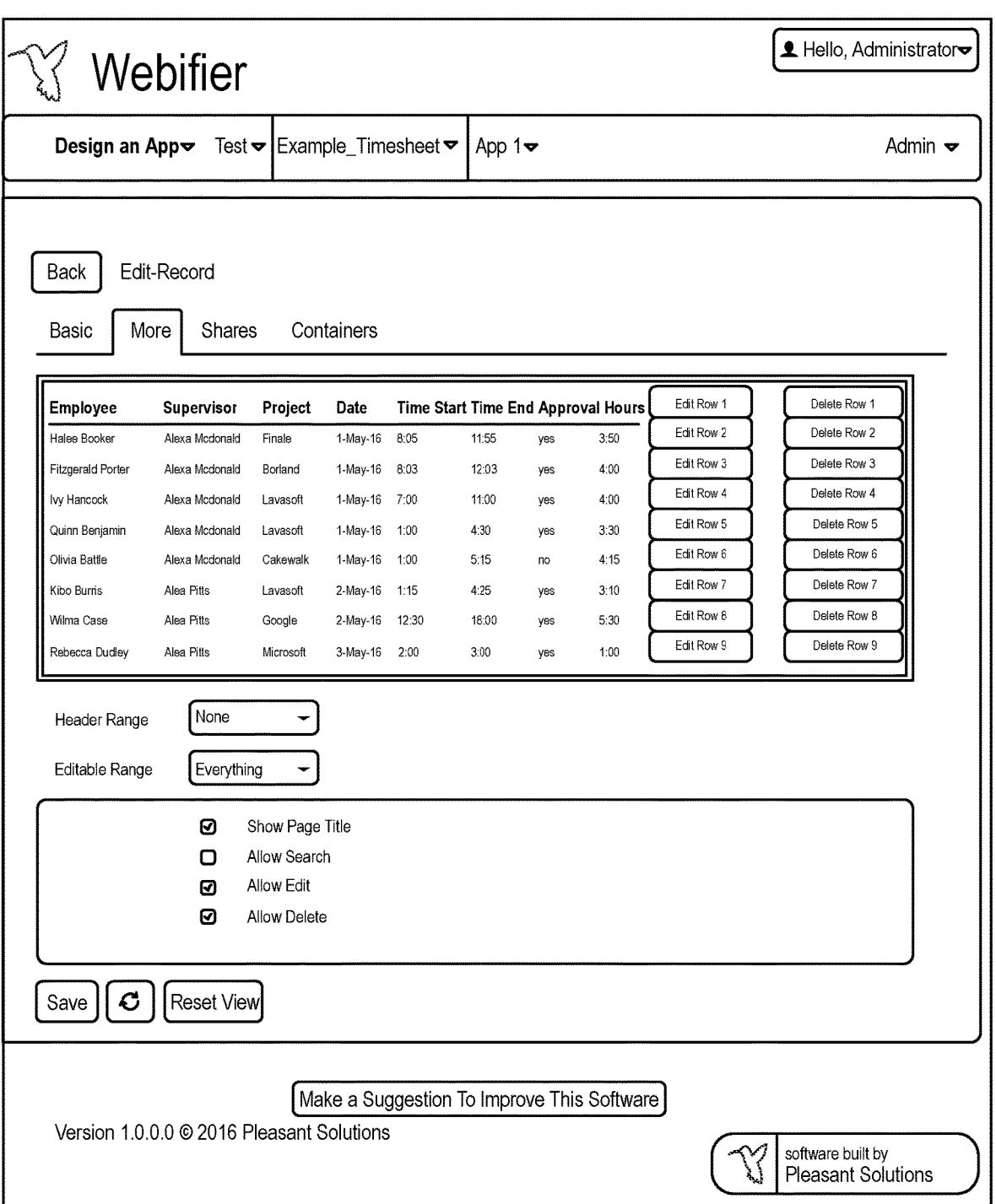

FIG. 77 is a screenshot of some additional options the destination system supports for an edit-record type of page, with editability from the destination system admin pages.

FIG. 78 is a screenshot of some additional options, similar to those seen in FIG. 44, the destination system supports for an insert type of page, with the ability to edit the options from the destination system admin pages rather than the Add-On.

FIG. 79 is a screenshot of illustrating the destination system providing options to restrict user input, otherwise known as data validation, and where the data validation rules can be specific to the type of data values being stored.

Figure 80:
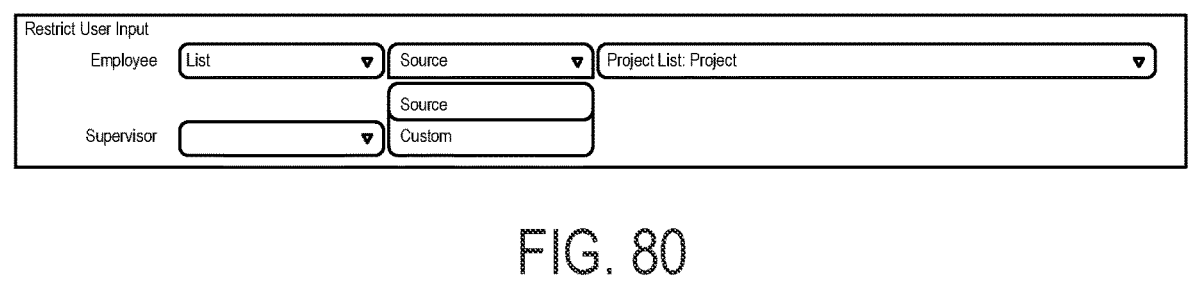

FIG. 80 is a screenshot of illustrating the destination system providing options to restrict user input with part of the data validation rule referencing a range of cells in the spreadsheet definition. In this example, the system supports an entire sheet or a custom range of cells within a sheet.

Figure 81:
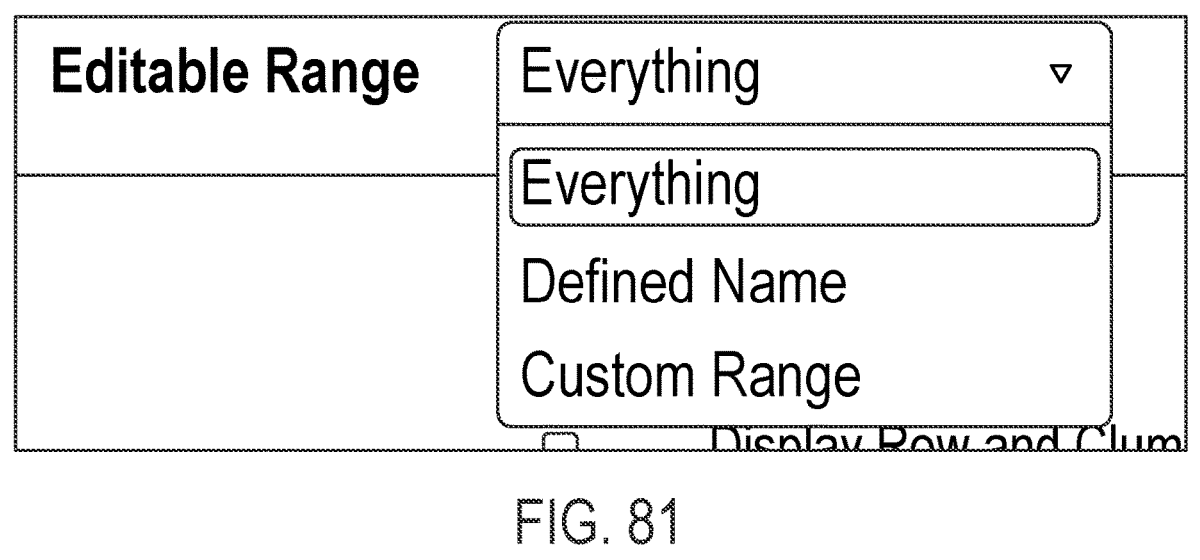

FIG. 81 is a screenshot of the destination system's support to modify the editable range within various types of pages, such that everything outside of the range is not editable. It illustrates support for aliases such as "Everything", using Named Ranges, as well as custom ranges specified by the designer.

FIG. 82 is an example of HTML code that the destination system can automatically generate in order to have an embedded destination page within any external site page.

FIG. 83 is a screenshot of the destination system's notification settings page, illustrating various options for notification settings, support for web-service API calls for notifications to external automated systems, and multiple types of notifications.

FIG. 84 is a screenshot of the destination system's configuration options for a particular notification. It illustrates its webhook ability by way of a URL specified by the designer, as well as email ability.

FIG. 85 is a screenshot of the destination system's configuration options for a particular notification's email template.

FIG. 86 is a screenshot of a destination CSV Import page, illustrating that the webifier accepts CSV files during the import, is able to make use of metadata about the record sheet it is linked to by analyzing the spreadsheets, and is able to report on the status of the request to insert into the record sheet.

Figure 87:
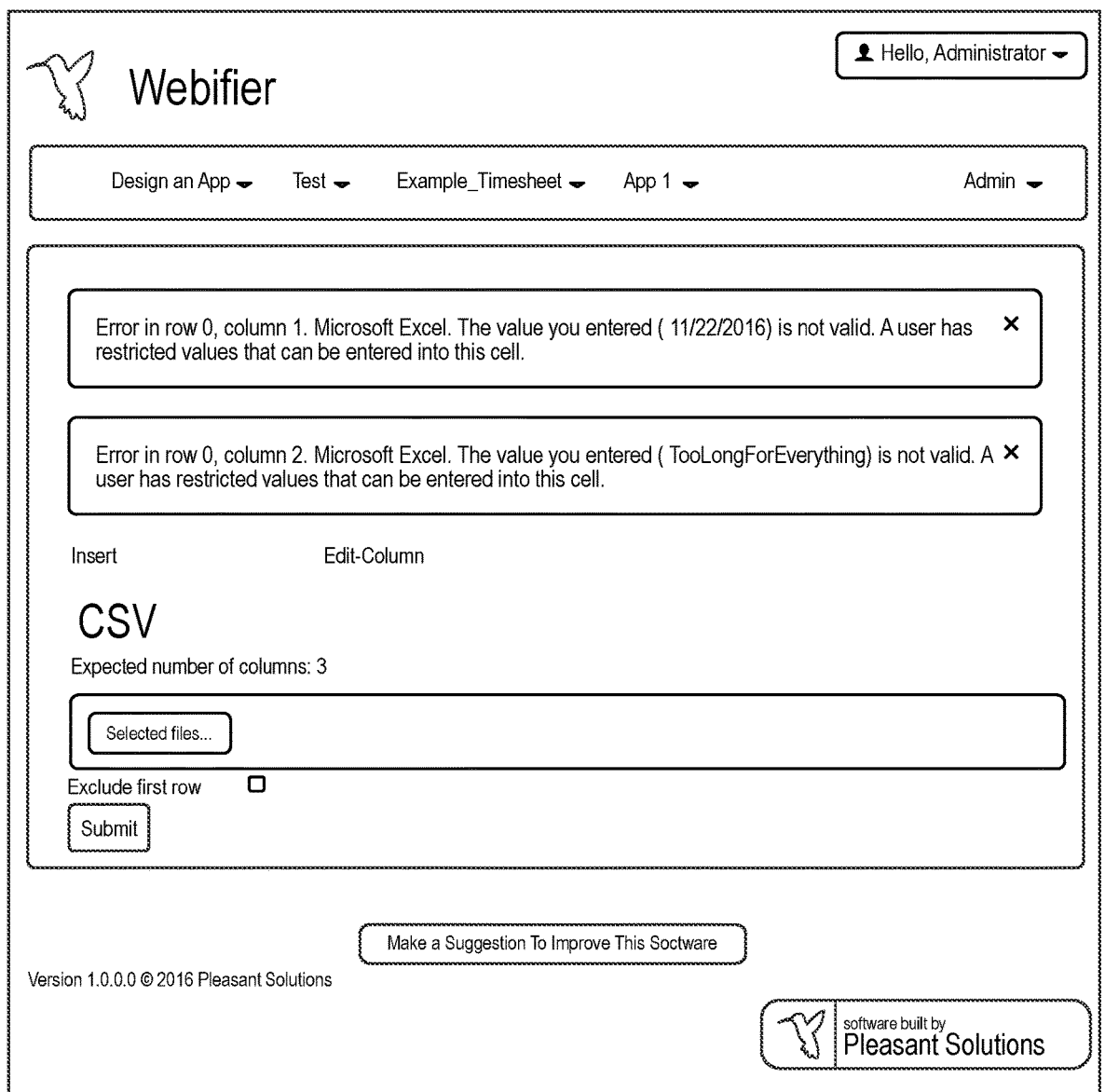

FIG. 87 is a screenshot of a destination CSV Import page as in FIG. 86, but illustrating that the system is able to enforce, and report on the failure of, data validation rules when data arrives via CSV Import forms.

Figure 88:
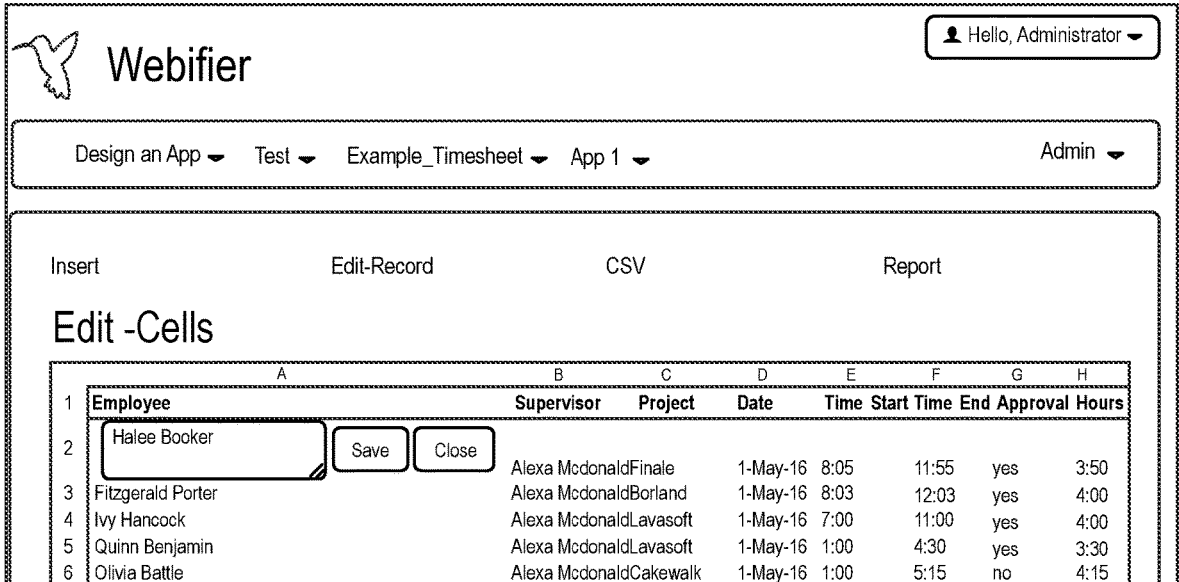

FIG. 88 is a screenshot of a destination Edit-Cells page, illustrating the result of an Edit-Cells page type being defined from the Add-On interface illustrated in FIG. 38, and the destination page's controls changing for any cell that switches to "edit mode" as a result of user interaction.

FIG. 89 is a screenshot of a destination Edit-Record page, illustrating the result of an Edit-Record page type being defined, the dynamic notification messages to the user as a result of deleting a row, and controls amending of the template sheet definition when the destination system determines the "Edit" and "Delete" permissions are enabled and the page definition has those options enabled.

FIG. 90 is a screenshot of a destination Edit-Record page when the "Edit Row" button in FIG. 89 has been clicked by a visitor, illustrating an automatically generated input form used when no template sheet has been defined and illustrating the input form can have controls such as dropdowns where the options are defined by the spreadsheet definition.

Figure 91:
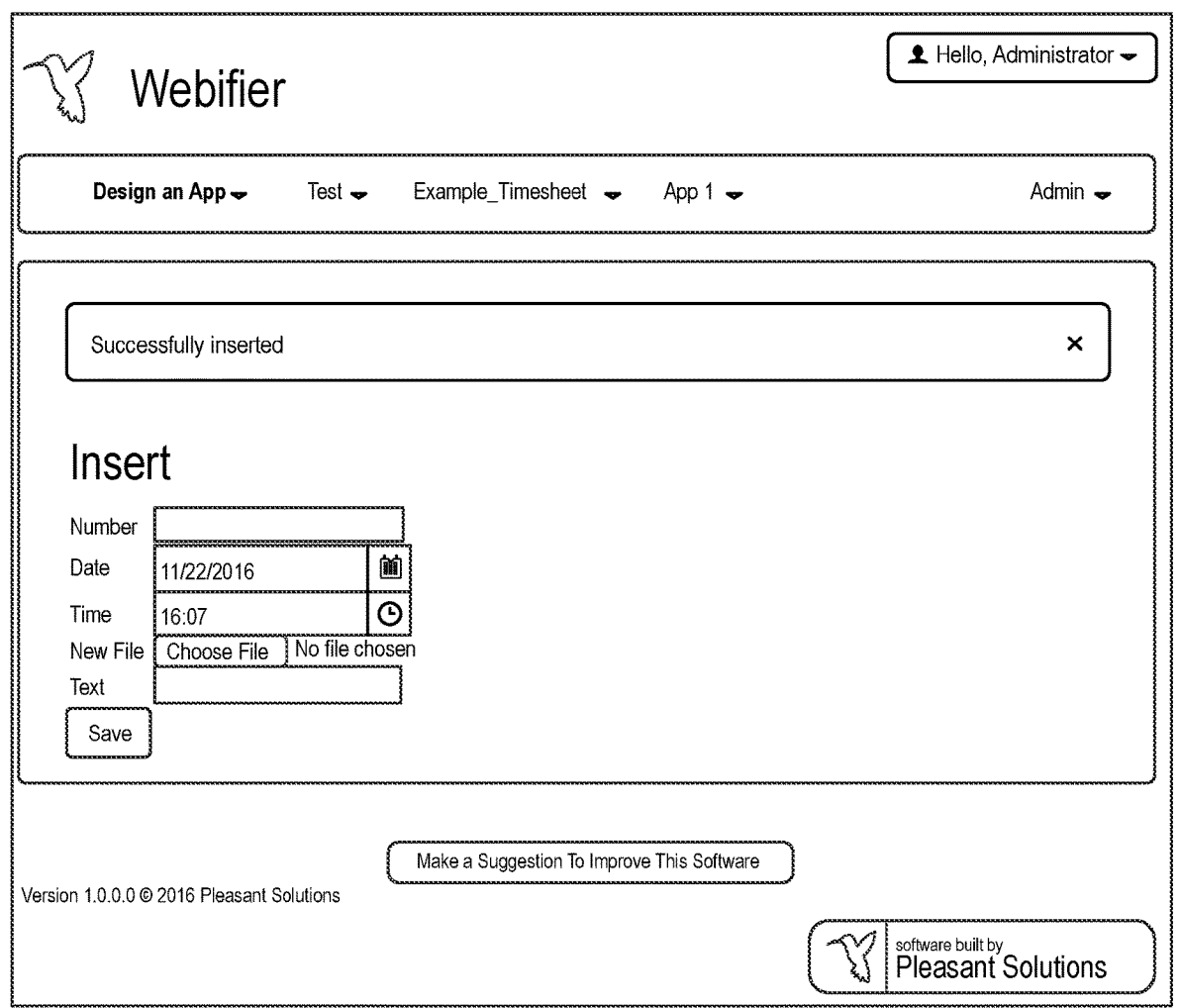

FIG. 91 is a screenshot of a destination Insert page before the visitor has filled out any fields in the form, illustrating notifications to the visitor confirming the submit has modified the record sheet and illustrating that the destination page may present fields with default values as well as uneditable fields, based on data validation rules.

Figure 92:
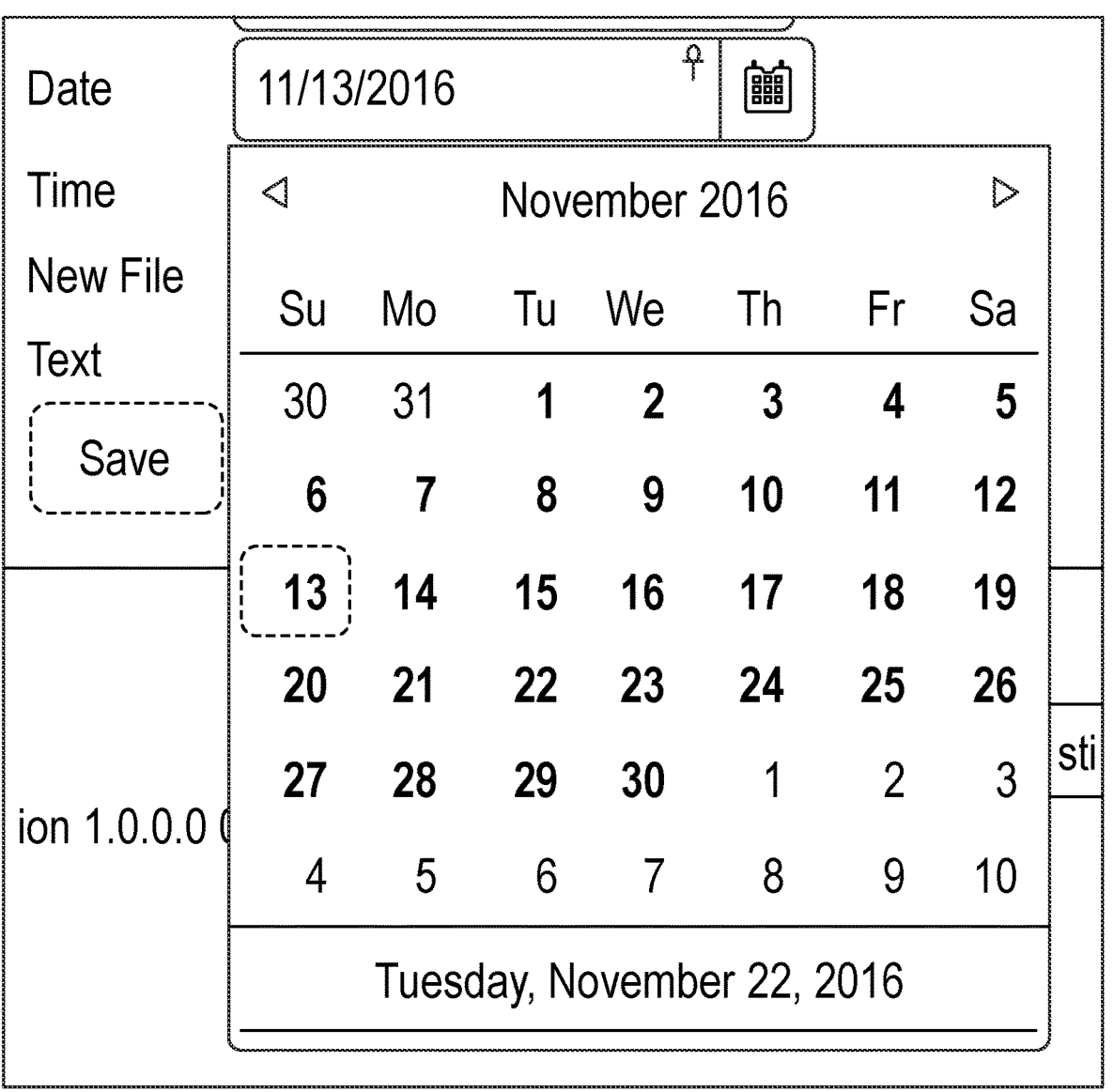

FIG. 92 is a screenshot of a complex interactive control being displayed to a visitor of the destination Insert page, as in FIG. 91, when the visitor inputs data for a field where the spreadsheet definition's associated cell datatype is set to a date.

FIG. 93 is a screenshot of a destination Insert page after a visitor has failed input data validation rules, illustrating a modification to the interface to inform the visitor of the failure.

Figure 94:
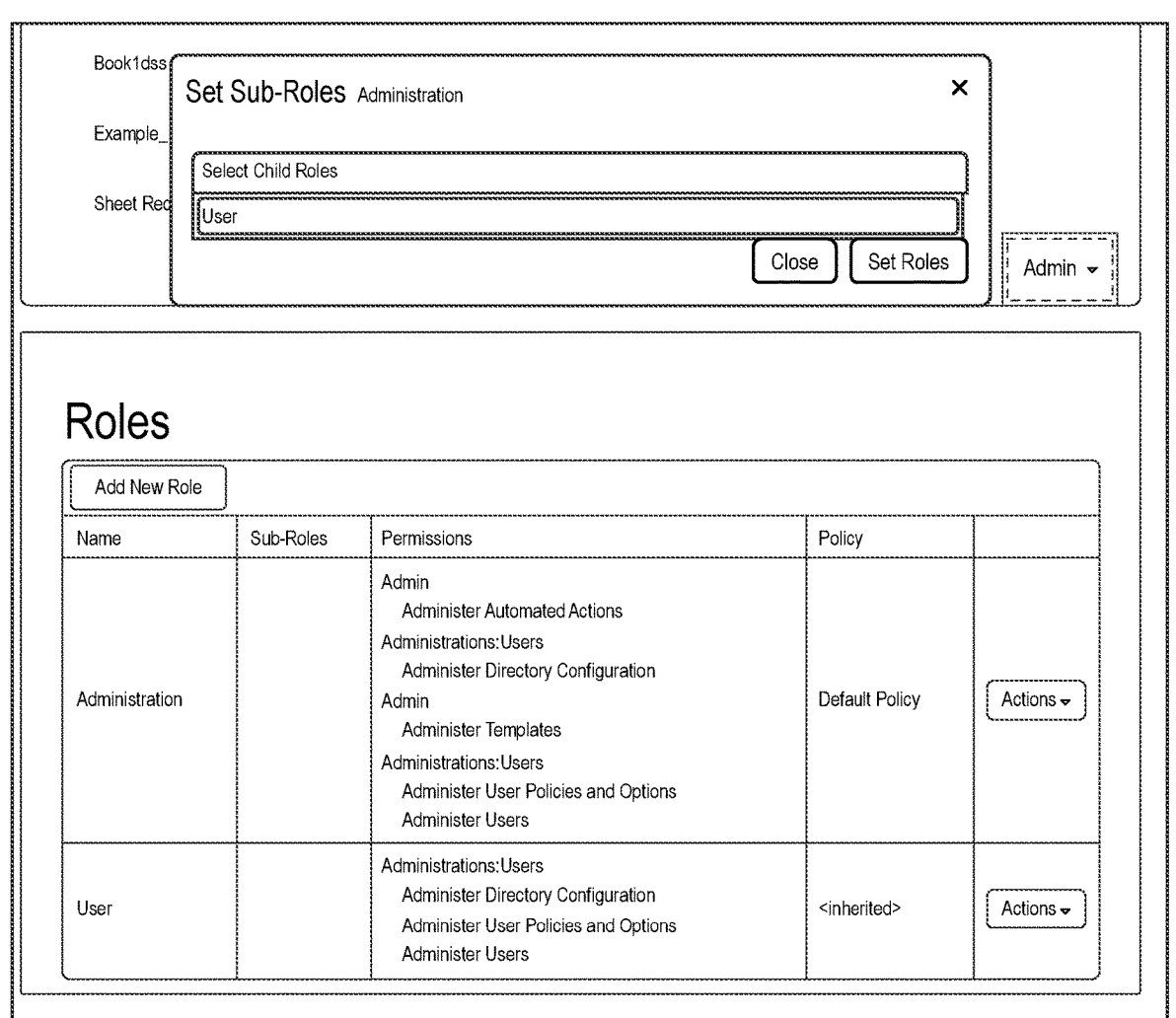

FIG. 94 is a screenshot of a destination system admin page allowing a designer with administrative permissions on the server to control access permissions pertaining to administrative features of the destination system, for a particular role, illustrating further the ability for roles to have sub-roles with cascading permissions.

Figure 95:
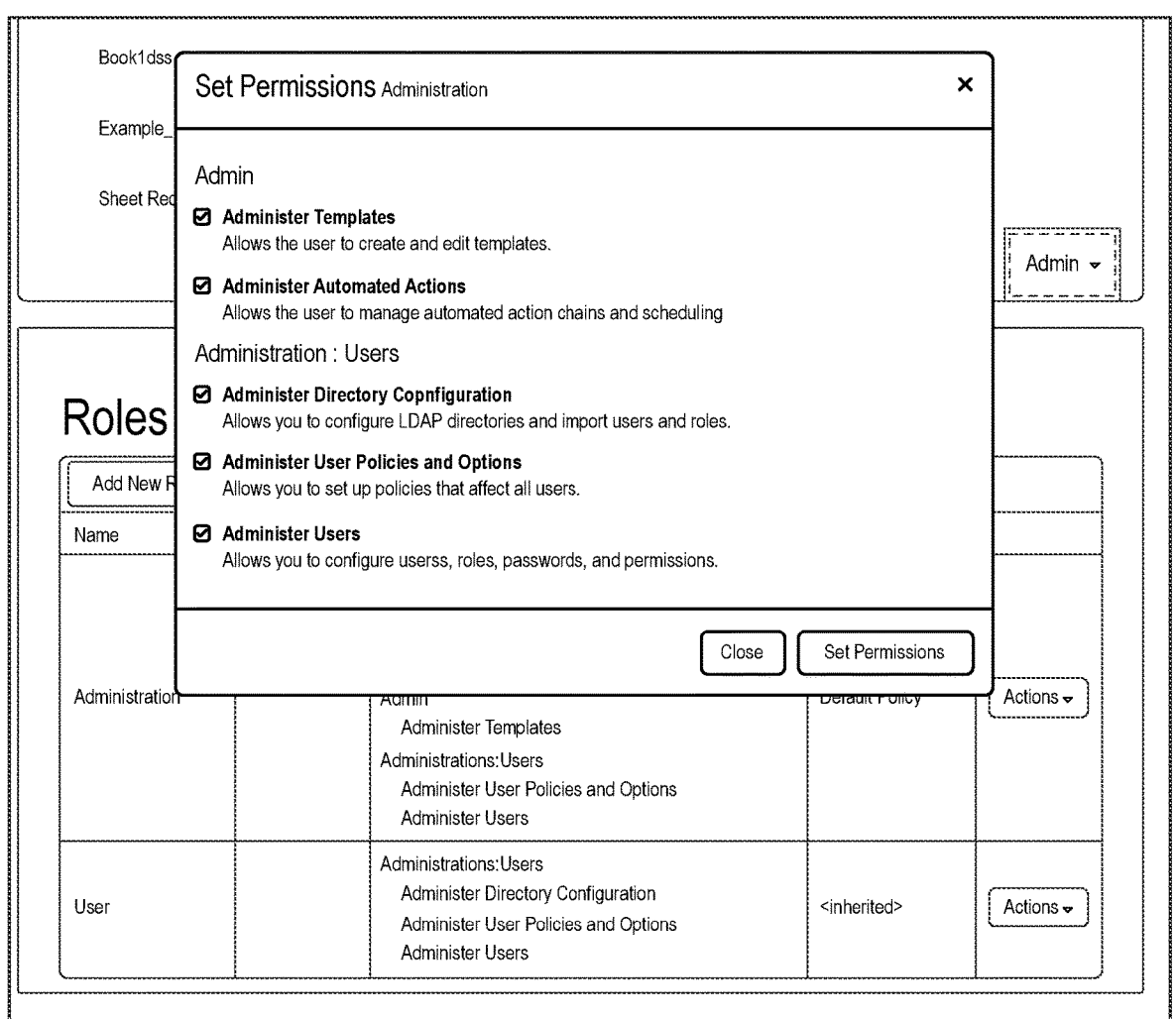

FIG. 95 is a screenshot of a destination system admin page, illustrating various granular administrative permissions of the destination system.

FIG. 96 is a screenshot of a destination system admin page, illustrating that complex password policies with numerous options are possible for visitors logging into, or creating accounts on, the destination system.

Figure 97:
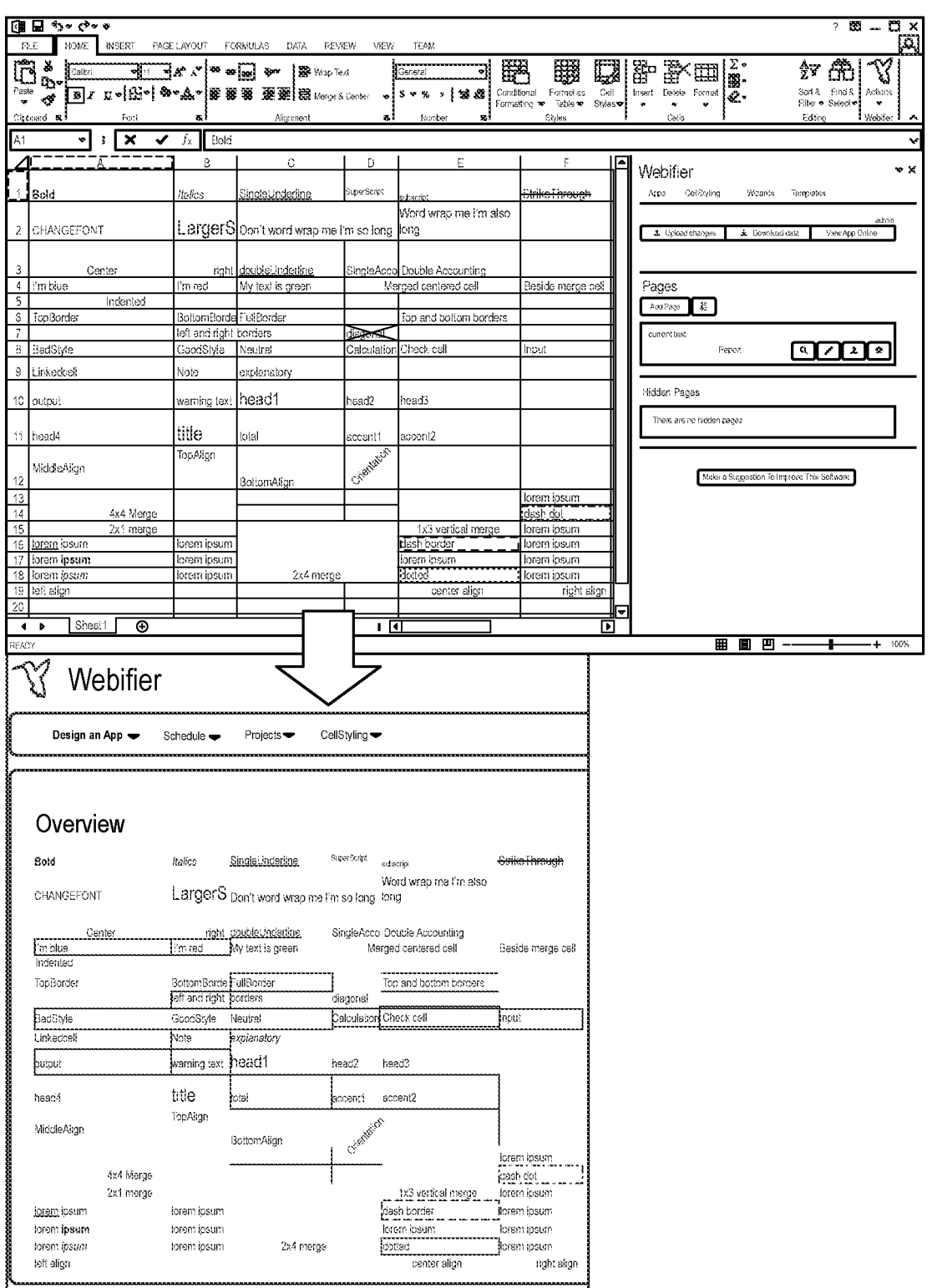

FIG. 97 is a diagram illustrating a source spreadsheet definition, designed in a spreadsheet and with numerous formatting options being specified by a designer, to define the formatting of content on a destination page generated for a visitor.

Figure 98:
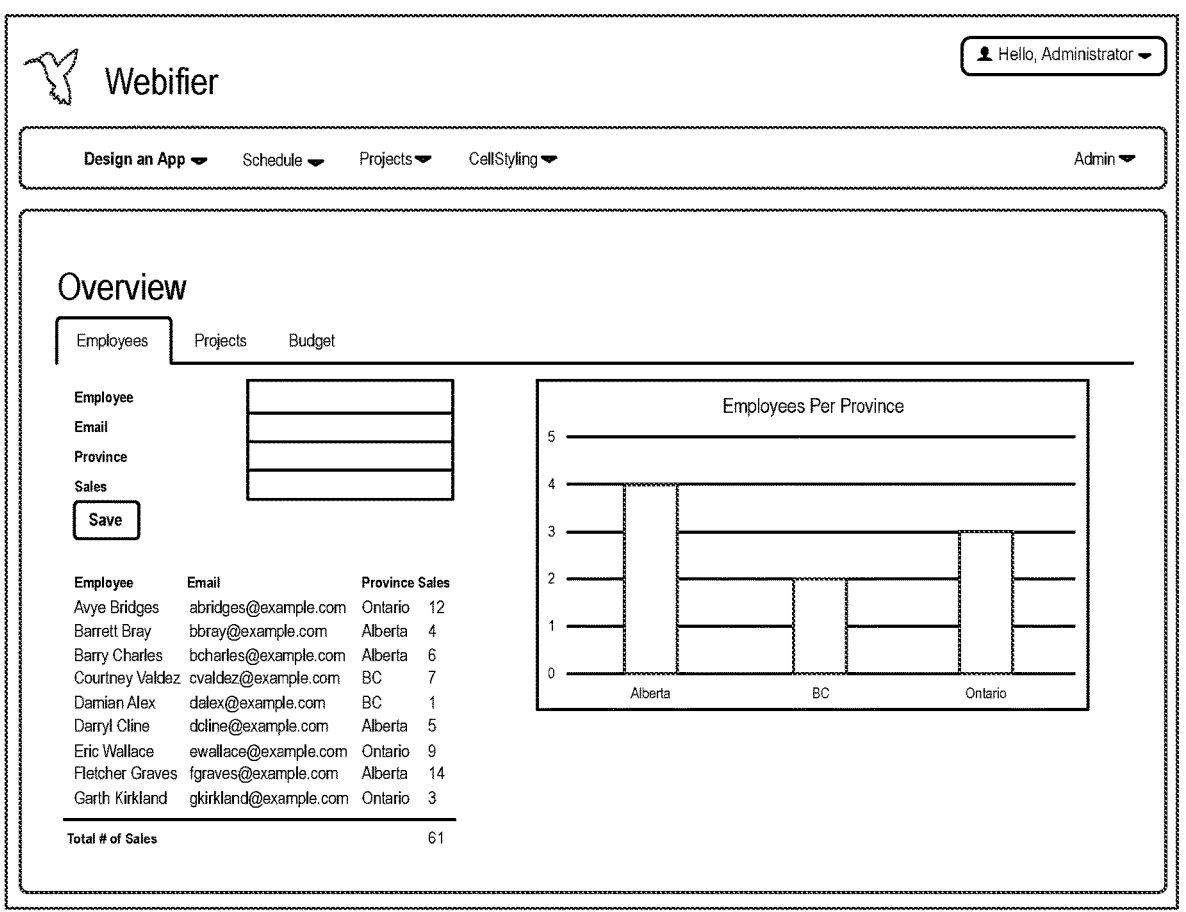

FIG. 98 is a screenshot of a complex destination page involving a tab container with three page tabs and with the first page tab having a nested container page with multiple nested pages including an automatically generated input form from an input page, a report page, and a report page whose source is a chart.

Spreadsheets and Records

For illustrative reference only, two usage styles of spreadsheets are referenced herein. Other styles may alternatively be used. The first are sheet-records, where each record comprises an entire sheet or an entire file compromising many sheets. For example, many companies save a new sales quote spreadsheet file for every sales quote they create. That file may have several sheets, such as one sheet for backend calculations and one sheet intending to have a printable quote, and the printable quote sheet would typically have many rows and columns that contain text, numbers, and formulas that result to text or numbers, all representing that single quote. They may also contain sufficient formatting to allow a fairly readable print out.

The second is a row-record and row record sheet, where many records are specified together, typically within a single sheet (e.g., FIG. 53, col. A-D). Spreadsheet files can have zero, one, and/or multiple row-record sheets. Row-record sheets may be confined to only part of a sheet (e.g., FIG. 60, col. A-B), which may have additional row-record sheets on it or unrelated data (e.g., FIG. 60, col. E), but for simplicity we refer to it still as a row-record sheet throughout. For example, many companies will have a client listing spreadsheet similar to the following. A sheet may have the top row 1 with some column names such as "Client" and "Industry" and "Client ID". Each row below may have data related to a single client. For example, row 2 may have "Pleasant Solutions" in column A, "Software Development Services" in column B, and "1" in column C. Row 3 may have "NewCo" in column A, "Consulting" in column B, and "2" in column C. Despite the name, row-record also represents a list with the purpose of rows and columns flipped so the records are listed left to right, as if a column-record.

During steps 201-203, above, either or both techniques may be used, thereby allowing the webifier software to be used to create complex, multi-user, completely custom destination software with no preordained or pre-implied purpose. Standalone, web or mobile applications (web and mobile may be collectively referred to as the "web-app" for convenience) may be created with no programming or database experience required. Some aspects described herein may be intended to replace the need to hire a custom software development company even for complex scenarios involving data, custom user interfaces, different viewing device capabilities, concurrent usage, data and user workflow, automatic notifications, scheduled events, business logic, and more.

Template Sheets

Steps 201 and 205 are now described in more detail with respect to user interface templates, with reference to an illustrative implementation. Regardless of whether done in a traditional spreadsheet application, a cloud and web based spreadsheet, or a simplified spreadsheet interface embedded within a web application, a spreadsheet tool may be used to make a spreadsheet that represents a desired user interface for the visitor or report layout. For example, the template could have one sheet which has many rows and columns that contain values and formulas that would be pertinent to a single quote: a large font text title of client near the top, followed by a row that has the first value as "Invoice Number" and a cell to the right of that which will be intended to display an actual invoice number. A few rows below may have a cell spanning multiple rows and columns and intended to display comments in italics. Near the bottom of the sheet, a cell that is labelled "Subtotal" and to the right of it a cell that has cell formatting to specify a currency with "$" symbols and intended to have a number representing the total for that particular invoice (with that cell having a location of C15 on the grid). The next rows may have cells related to taxes and totals after taxes, but rather than intending to have values located there later, the tax and total cells would have spreadsheet formulas that reference the subtotal cell locations, such as "=C15*10%", where it is intended that changes to C15 would affect the totals based on those formulas.

Template Sheets may be nested, such as in a many to many relationship between parent template and nested template, and/or to several levels of depth (FIG. 76). According to one aspect the webifier software may define a spreadsheet formula function such as "USETEMPLATE( )" that accepts a cell range reference or a template identifier for what template sheet should be used. The cell that the formula is used in may implicitly provide some information such as where to insert the nested template sheet based on the cell's location, or the width and height allocated to the nested template based on the cell's size. If the source record(s) for populating the template are not the same as the parent template, parameters could be passed in to the USETEMPLATE function that would allow the template to know what source data, in much the same way as a non-nested template sheet does for some page types (as further described below). This allows for scenarios such as an invoice template containing a list of "invoice items" within it that needs to be populated from records on different record sheets. Typically, such a nested template sheet would make use of the traditional spreadsheet "merge cells" feature to allow it sufficient width and height to display without affecting the parent template's row or column alignments, as well as the traditional table feature to provide record filtering (described below) to only those invoice items belonging to a particular invoice.

The webifier software may allow for Template Sheet cells to have formulas that reference other cells within the Template Sheet, cells within other Template Sheets, record sheet data, or a mix of all of the above within the same cell. The techniques described also allow one or more templates to be used for input functionality and one or more different templates to be used for output functionality to concurrently be made available to visitors of the destination system, even if the underlying source references are identical or overlap in part. The formulas are typically declarative in nature, but any formulas or equations supported by any spreadsheet tools, and/or new formats or syntaxes, may be used.

Sheet Templates Having Record Formulas (Template Indicators) or Referencing Sheet Data While designing the template sheet in a spreadsheet tool, the cells intending to represent a particular record or aggregation values derived from many records may evaluate to be blank and/or have placeholder values that have no effect on the system other than to indicate formatting to the designer. An external list or database may contain a cross reference of the cell locations, such as C15, and their intended purpose, such as displaying a subtotal of an invoice. Alternatively, if the record sheet cells are referenceable from the template sheet, formulas or placeholder formulas can be inserted in those cells that refer to the records. For example, the client title cell on the template may have a formula such as "=ClientList!A1" which would potentially be evaluated by the spreadsheet tool into the text "Client" during design time as a placeholder, or perhaps the formula would be "=ClientList!A2" which would potentially be resolved by the spreadsheet tool as "Pleasant Solutions" during design time as a placeholder. Additionally, the ref could be to "=ClientList!A:A" or "=ClientList!A1:A1000" resulting in blanks, errors, or unintended values. In each of the above case, the text that results during design time is merely a design time placeholder and is not as important as the formula itself which has the useful information of which column on the ClientList is to be used in filling out the template, to assist the webifier during actual evaluation at a later point, such as for visitors. For convenience, this concept can be generally referred to as Template Indicators.

The Template Indicator formula could be typed by a designer or derived from dragging and dropping from a list of available or relevant columns of data. The formulas can be typical to the spreadsheet tool's cell references ("=ClientList!A1" or "=ClientList!Client" in the case of a named table), typical function call syntax that triggers specialized actions for this purposes ("=GetRowRecordData ("Client")"), or they can be a specialized separate format, such as "[[Client]]". The formulas may be stored in a cell as is typical of spreadsheets, or they could be stored in a special external list of formulas along with information about what cells they are to be applied on.

Multiple Data Sources

When a designer desires to have a primary set of records in a row record sheet as well as one or many "secondary records" in another sheet (secondary data sources), many types of relationships between the record sets are possible. When the designer specifies one or more secondary data sources, the webifier may request additional information from the designer to determine the type of relationship in order to determine how to populate the references found within the template sheets.

If only a single record from the secondary data source is to be used by the template, potentially unchanging even if the selected primary record that populates the template can vary, the system may allow the designer to specify one or more criteria to select the single secondary record from the secondary data source, that is to be used by the template. For example, in the case of the primary set of records being a list of invoices and the template being a presentation of any specific invoice the visitor selects, a secondary data source from a "Logos" sheet may be specified by the designer to provide a company name and logo to decorate the template with the company issuing the invoice, with the criteria set to the secondary column A required to be "Invoicing Logo", such that only that one record will be used from the Logos sheet.

The criteria may be based on the selected primary record, either referencing data from the primary data source in the same way the template does, or indirectly by referencing a cell on the template which references the primary data source. For example an invoice template may have a secondary data source from a "Flags" sheet, where the criteria would be set to secondary column A being required to match "Customer Country", such that 1 secondary record will be used for the template but it will vary depending on the invoice selected.

If one or more records from the secondary data source are to be used by the template, the criteria may result in selecting multiple records from the secondary data source. References to a column of data on the secondary data source may be evaluated to a concatenation of several record values, just the first record value found, or the template may specify to populate multiple cells each with one of the secondary data values. The template may specify this by having the reference to the secondary data source within a cell that spans multiple rows or columns. Alternatively, the template may specify a nested template to use to define the presentation of the secondary data values. The specifying of the nested template could be by using a spreadsheet formula function such as "USETEMPLATE( )" within the template, by dragging and dropping a floating or anchored control onto the template, by utilizing options within webifier related to the template to specify the location within the template to insert the nested template, a combination of the above, and/or otherwise. The boundaries for the nested template can be specified by merging cells, as parameters to the USETEMPLATE function, specifying options outside of the sheet but within webifier related to the nested template or parent template, color coding the cells, drawing of a border around the cells, and/or selection a region of cells that is specified to represent a boundary for a nested template. The nesting of templates may result in the inserting of cells and shifting existing template cells down and/or to the left to provide the appropriate room to display all of the applicable secondary data values.

Autogen and Virtual Sheets

According to some aspects, the webifier may automatically generate sheets based on other sheets and/or templates to facilitate the designer's work. As noted above, row-record sheets may organize potentially many records in a single sheet. Row-record sheets that are automatically generated by the webifier, or otherwise by the spreadsheet application, may be referred to as "autogen" sheets. Although described herein with reference to the webifier, one of ordinary skill in the art will appreciate that autogen sheets having features described further below may find use in spreadsheet applications besides webifier.

The webifier may automatically generate row-record sheets (the "autogen" sheets) in response to a variety of designer actions including, but not limited to, the selection of multiple data sources when defining a page, the referencing of multiple data sources within a template or indirectly via nested templates, identification of relationships between row-record sheets, and/or by explicit request. In response to an appropriate designer action, the webifier may generate an autogen sheet in a variety of manners further explained below.

Designer defined and/or autogen sheets may be completely virtual, with each cell having the characteristics described below, or partially virtual, having only some of the characteristics and/or applying them to only some cells, columns, and/or rows. A traditional spreadsheet application typically allows two methods of usage of one cell in defining another cell. These typical methods may both be referred to as "non-virtual." In the first method, if cell A1 is defined as "=1+Z1" and B1 is to be based upon A1, the traditional spreadsheet tool would allow the user to copy and paste the definition of A1 to B1 (one-time use by definition) such that B1 will now have the definition "=1+Z1"; however, subsequent changes to A1 would not be reflected in B1 in this case. In the second type, the traditional spreadsheet tool would allow the user to input the formula "=A1" into B1 (use by reference) and subsequent changes to A1 would be reflected in B1; however, there are cases where the formula in B1 would become complicated for the user to declare, read, and maintain, such as where the selection of what cell to use varies depending on the results of a lookup, or relationships, in part because the entire selection and use of a cell is being defined within the formula of B1. In both non-virtual methods, any modifications to B1 do not automatically affect A1, and formatting changes are not reflected in either direction.

Aspects described herein may allow a third method of usage of a cell to define another, which may be referred to as "virtual view" or simply a "virtual" method of reference. In this virtual method of reference, a cell operating as a virtual view of another cell may be automatically synchronized to display content of a corresponding cell, and may identically reflect all changes to the corresponding cell (such as a change in that cell's formula, formatting, or an updated value in response to a change to a referenced cell). In the virtual method, subsequent changes to A1 may be reflected in B1, the user does not have as much complexity in maintaining B1, changes to B1 may be reflected in A1, and because changes to B1 may affect A1, there may be multiple virtual views where any number of views may be changed to affect all of the views automatically. Like autogen sheets, one of ordinary skill in the art will appreciate that virtual references and virtual sheets as described herein find use and application beyond the webifier exemplary implementation discussed here. In defining virtual sheets, the designer may specify options to control if all, some, or none of the formatting changes are reflected in virtual views, as well as options to control which direction changes are permitted to be reflected or overridden with direct data values or formulas such that an overridden cell is no longer virtual.

According to some aspects, designer defined and/or autogen sheets may be virtual sheets having cells that provide virtual views to other cells in the spreadsheet. Content of virtual sheets is automatically kept in sync to be identical with cell content of another sheet and/or the same sheet. Virtual sheets may be comprised of or consist of indirect views to other data sources such as one or more other row-record sheets, external database sources, and/or instances of sheet-records, and/or columns with direct data values and formulas. Virtual sheets may be persistently and/or temporarily stored independently of the other data sources as a fully redundant copy of the data, may be stored just as a definition of views together with any direct data, may be shown to the designer for convenience of reference and without being stored at all, or may be completely hidden from the designer until the designer indicates to view them, according to some aspects. Virtual sheets may exclude and/or hide columns that are duplicated across multiple data sources. Any redundant copy of source data in a virtual sheet may be static, periodically updated, or may be automatically updated in real-time as the other data sources are detected to have changed, using any number of common detection methods that will be apparent to those skilled in the area.

Autogen and/or virtual sheets may allow and/or disallow a number of modifications by a designer including adding new columns with data or formulas referencing the remainder of the sheet or other sheets, deleting columns, changing of formatting, adding new records, and/or overriding specific record values. They may be used as a basis for the designer to build on top of; that is, the cells may be referenced individually, as a region, or with aggregation, by other sheets, formulas, or by page definitions.

When autogen and/or virtual sheets have instances of sheet-records as their source data, the webifier may obtain from the designer a list of cells or regions from the sheet-record to be included in the new sheet. Additionally and/or alternatively, the webifier may also analyze the sheet-record to locate all cells of a designated color, such as those having an orange (or other color) background, typically suggested by spreadsheet tools as indicating an input cell, and then automatically select those cells for inclusion in the new sheet. The webifier may allow an import function where the designer may select and/or upload any number of spreadsheet files or select any number of specific sheets from one or more files, and where all imported sheets will have the selected cells represented on the new sheet. Without virtual views, the typical alternative to, for example, aggregate all the B10 cells of many instance of sheet-records, would be to manually create a potentially lengthy formula such as "=InstanceA!B10+InstanceB !B10+InstanceC !B10+InstanceD !B10." which could frequently risk becoming out of date if the number if instances changed. Virtual sheets or virtual columns may analyze or monitor the existence of instances of a data source to add or update additional virtual cells automatically.

The webifier may skip over import sheets or warn the user about import sheets where there are any inconsistencies or differences in content beyond the cells being converted to a virtual row-record sheet. The webifier may analyze inconsistencies and determine one or more do not have an impact on the import or the import may accommodate the inconsistency. For example, font size and row width may be an ignored inconsistency. The number of blanks rows varying between an expected 2 but actual 3 may result in the webifier removing or skipping the extra row such that the important can proceed, while an inconsistency between an expected 1 but actual 0 might not be ignored. Many standard spreadsheet diffing methods are commercially available, often involving the analysis of the location of many cells of content relative to another sheet: these standard methods may be used to accurately locate cell content that has changed absolute location, compared to previously imported sheets, but is still able to be reliably located and values extracted. In the use of such standard analysis, the webifier may ignore the difference in value for the cell in question and focus on the locating of nearby cells, such that the cell in question can still be located even if the value is always inconsistent.

Similarly, page definitions may also be automatically generated and/or virtual. The autogen and/or virtual pages may use templates defined by the designer or may use automatically generated templates, and the pages and templates may use manually defined, auto-generated, and/or virtual sheets as the source. The triggers for the generation of page definitions and/or templates may be similar to that of autogen sheets, or they can be triggered due to the creation of autogen and/or virtual sheets. Alternatively, when a designer creates a page associated with a record sheet, the webifier may present a list of previously defined templates ordered from the most relevant to the least. Relevance may be determined by analyzing whether a sheet is a template that has already been used with a different data source (indicating less relevance), whether a sheet is structured like a typical row-records sheet with minimal formatting and consistent types of values in columns rather than a template (indicating less relevance), and/or similarity of content of the prospective sheet with the selected record sheet for the page (such as the number of words that each appear both in the row-record sheet's column headers and the prospective template sheet's cells).

The auto-generation process for pages or sheets may or may not involve some human involvement such as confirming with the designer whether to perform auto-generation, requesting additional information from the designer, and/or explicit confirmation of results by the designer.

The webifier may provide a read-only virtual autogen sheet for current user information, such as the current visitor username, current visitor properties, roles, last login time, etc. including properties that are specific to a user or specific to a browser session, such as the brand of browser used. This would allow any formulas on other sheets to reference information about the current user. Similar approaches may be applied to other context that the destination system has available.

The webifier may provide a read-only virtual autogen sheet with a change history where each row within the virtual sheet represents a change, and each column represents any single cell on any sheet, and several cells may have their history available within the same virtual sheet. One of the columns may be a timestamp column to represent when that value for the cells occurred.

Template Indicators

As an example, a designer may create an insert template "InvTemplate" of an invoice in a spreadsheet tool, without any references to data sources but with indicators for where references to data sources will be added. The designer may create a details type of page, referencing that template. The webifier may identify all indicators in the template and may without further involvement from the designer automatically generate a virtual row-record sheet VirtInvSheet where each indicator is allocated a column with a column name such as "InvTemplate_A1" if the A1 cell of the template had the indicator. The webifier may also automatically generate a virtual report page using the VirtInvSheet as the data source and with a column of navigation links for a visitor to navigate to the details of any selected invoice. If the InvTemplate had a nested template for inputting invoice items, then webifier may automatically generate a second virtual row-record sheet VirtInvItemSheet, with columns that tie to the indicators on the InvTemplate which the designer previously indicated are unique for each invoice and can be treated as primary keys. The webifier may then also generate a virtual report page using the VirtInvItemSheet as the data source and with similar navigation links. The webifier could also automatically generate a template and page with aggregation formulas based on columns within VirtInvSheet or VirtInvItemSheet to have, in this example, an automatically generated page reporting on the frequency of sales for each invoice item and the monthly number of invoices inserted. The designer may then reference or modify all or a portion of the automatically generated and virtual sheets and reports to continue building additional sheets and pages.

For nested row-record sheets, as an alternative to identifying the primary key columns of the parent data sheet to be referenced by the nested data records, the webifier may have auto-generated and/or virtual columns in the nested sheets that correspond to every column of the parent data sheet, substantially every column, or every column that meets basic criteria such as data type or length, for potentially being part of a primary key. Parent templates that make use of nested sheets may automatically filter the nested records with criteria for all of those columns on the nested records to match the parent record being displayed by the parent template. As another alternative, when the designer provides criteria in the methods described earlier to reference and filter secondary data sources, including nested data sources, from a template, the columns specified in the criteria to filter secondary data sources may be used to indicate to the webifier which columns should be added to the nested sheets.

Designer defined, autogen, and/or virtual sheets may have additional automatically generated metadata associated with elements such as tables, columns, rows, or individual data values. The metadata may comprise or consist of unique identifiers for the elements, timestamps, identifiers of associated pages, or identifiers of related other sheets. The metadata may be used to identify the trigger or purpose for the creation of the element, to cascade the modification or deletion of other elements, to serve as a primary key of the elements for other elements, pages, and/or sheets to use as a foreign key, or as a basis for further analysis or reporting of the relationships between elements and other pages and/or sheets. Such metadata may be made visible to the designer as an additional column or row for convenience of reference and/or to be further used by spreadsheet formulas, page definitions, or in any way that other spreadsheet data values are used. Alternatively the metadata may be accessible to the designer by way of a "RESOLVER(cell reference)" spreadsheet formula. Such metadata may also be used to detect potential ambiguities in the relationships between records and/or trigger the collection of further information from designers or visitors.

As an extension to the earlier example, VirtInvItemSheet may have substantially all of the columns of VirtInvSheet such that no primary key columns need to be specified by the designer. The webifier may add a virtual column to VirtInvSheet with a GUID that serves as a primary key for the invoice, and a column to VirtInvItemSheet to serve as a foreign key to that primary key. When an invoice item is created by a visitor on a page using InvTemplate which in turn uses VirtInvSheet, the foreign key column of the VirtInvItemSheet would be automatically populated by the VirtInvSheet primary key. The webifier may then use the foreign and primary key columns in the ways typical known to those skilled in relational programming, or to selectively confirm that an invoice item is associated with an invoice, such as if two invoices exist that are identical for all of their values to the extent that the inclusion of substantially all of the columns of VirtInvSheet into VirtInvItemSheet is not sufficient to uniquely identify which invoice the invoice item belongs to. The webifier may then warn the designer that the invoices are lacking uniqueness due to data integrity issues or data structure reasons, and suggest various recommended best practices to the designer.

Autodetection of Relationships

The webifier may automatically detect the presence, type of, and/or specifics of relationships between record sheets as well as between data sources generally or data sources within a specific context such as one or more templates or page definitions. The webifier may use or analyze any combination of available information (which may be referred to as "clues") to aid in the automatic detection of relationships, including designer actions, visitor actions, record data input by the designer or visitor, record structure, formatting on record sheets, template structure and formatting, page definitions, global whitelists, static blacklists, relationships declared to spreadsheet tools which support it or spreadsheet tool plugins such as Microsoft PowerPivot, and/or otherwise. Multiple clues may be analyzed together using a variety of static or dynamic weighing algorithms or point systems to increase the reliability of the conclusions of the analysis. The reliability level may be measured by a number of characteristics of the clues, including the number of clues available and the consistency of each clue's conclusion. For example, clues may be combined to obtain a reliability level, such as by counting the number of clues suggesting a particular relationship minus the number of clues suggesting a different relationship and/or a lack of that particular relationship. The reliability level may be used to determine if the relationship should be silently accepted by webifier, the designer should explicitly confirm the conclusion as a recommendation among one or more recommendations ordered by reliability level, or the analysis should be ignored as insufficient to arrive at a conclusion.

Clues may include parameters provided to spreadsheet functions such as "VLOOKUP( )" or "COUNTIFS( )". For example, a template or row-record sheet which contains a formula of "=VLOOKUP(DetailSheet!C5, ParentSheet!B:F, 3, false)" may indicate that column C on DetailSheet is a foreign key to the primary key column B on a ParentSheet.

Clues may include the formatting of spreadsheet cells such as text or number formatting. For example, a value being formatted as a dollar sign typically would suggest the column containing the dollar sign is neither a foreign key nor a primary key, and indirectly suggest that neither are any columns that use those dollar value columns in ways such as aggregation. Clues may include column naming, even in the case of zero records on a record sheet. For example, a column named "uid" or "invoice number" is more likely to be a key than a blacklisted column name of "comment". Clues may include the uniqueness of data contained with a column. For example, if a column always has the same value, it may still be a foreign key but it is not a primary key and unlikely to be part of a compound primary key. Clues may include the length of data within a column. For example, a notes column that typically has numerous words is unlikely to be key even if every value is unique, as is a column that has blanks for some values. Clues may include the consistency of data within a column. For example, if one column has both number values and sometimes words, it is less likely to be a key column compared to a column with consistent data type and length. Clues may include the definition of a template as having a nested template or referencing a nested sheet. For example, if an invoice has a list of invoice items and the designer indicates to filter the invoice items shown by a nested column "BelongsToInvoice" matching an InvoiceID for the currently showing record, BelongsToInvoice is likely a foreign key and InvoiceId is likely a primary key, and the probability that there is a relationship between the invoice and invoice items is increased by the fact that one is used in a nested way relative to the other. Clues may include analyzing virtual primary keys and several non-auto-generated columns to identify the column that most closely correlates to the virtual primary key. Clues may include counting the occurrences of visitor searches specifying a particular column or specifying values that match the values within a particular column. For example, on a list report page, if a visitor frequently searches text such as "Inv0511" then the column that contains values such as Inv0511 is more likely to be a primary key column. Clues may include how sequential the data is. For example, a column with values 1 to 100 without any gaps, together with the present of a similar column on a different sheet where both sheets are used by the same template, suggests that both sheets have a relationship and that both columns have a relationship. Clues may include the distribution of values of a column on one sheet relative to a column on a second sheet. For example, if Sheet F column A always has a 1:1 distribution with values on sheet S column A, then the second sheet S is very likely a required detail record for records on sheet F. If it has a 1:0-1 distribution then it is an optional detail record for sheet F's records. If it has a 1:0 distribution along with all other columns, then sheet F and sheet S likely do not have a relationship between them. Clues may include positioning of a column. For example, the first column in a record sheet is more likely to be a primary key compared to middle columns, or columns immediately adjacent to each other are more likely to form a compound primary key than columns that are far apart.

Further Use of Relationships

Many traditional formula functions of spreadsheet tools can be used to reference information from secondary data sources. The webifier may use identified relationships, such as auto-detected relationships, to further simplify the functions and methods of accessing data from secondary data sources. As an extension of the earlier example with "=VLOOKUP(DetailSheet!C5, ParentSheet!B:F, 3, false)", if the relationship between the detail sheet and parent sheet is already defined, through any means, the webifier may allow a cell such as Z5 on the detail sheet to use a simplified function of "=WEBIFIERVLOOKUP(ParentSheet!D)" if called from within the detail sheet, because the relationship between the detail sheet and parent sheet is already known, as is the relationship between the foreign keys in column C of the detail sheet and the primary keys in column B of the parent sheet. The function name could be different as in this example, or it could be an overload, sharing the same VLOOKUP( ) function name but with alternate parameters.

Another example would be an alternate version of SUMIFS, especially more suited for compound primary keys. A traditional usage similar to "=SUMIFS(DetailSheet!F:F, DetailSheet!A:A, CONCAT('=', C5), DetailSheet!B:B, CONCAT('=', D5))", which in this example limits the aggregation of column F on the detail sheet to row records where the compound primary key at C5:D5 matches the compound foreign key at DetailSheet!A:B, may be replaced with an alternate version of "=SUMIFSWEBIFIER(DetailSheet!F:F)" achieving the same result.

Similarly, a function may be added which indicates to filter a parameter before passing on the data to a traditional function. For example, rather than SUMIFSWEBIFIER, the webifier may evaluate "=SUM(FILTER(DetailSheet!F:F))" as equivalent. To filter based on the keys but also based on additional criteria, the FILTER function could accept additional parameters such that "=SUM(FILTER(DetailSheet!F:F, DetailSheet!C:C, '>100'))" would still filter by the compound key but would also filter by column C having a value greater than 100. The format of the additional parameters could match the syntax traditionally seen, such as in SUMIFS( ), be a SQL-style query string, could be an alternate syntax used in other commonly available software, or a syntax specific to the webifier, such as "=SUM(FILTER(@F, @C>100))". Alternatively, as is the case throughout the webifier, the ranges may also be specified by traditional structured references such as "TableName[ColumnName]". The webifier may then process the syntax as part of a formula resolution engine, could convert the syntax to a traditional syntax before storing to the spreadsheet tool, could require quotation marks to make it partially compatible with the expected syntax of the spreadsheet tool, or use diffing techniques for processing within the spreadsheet tool for the designer to preview versus processing within the destination system.

In the case of a page type involving visitor input, such as an insert or edit page, relationships defined by any of the previously described methods can be used to allow flow-thru inserting or editing of records on secondary data sources, along with the automatic population of foreign key columns for records inserted into secondary data sources. Any indicator on an input page's template that contains a formula that makes use of relationships to reference specific records of a secondary data source, but is also specified to be presented on the page as an input control, may result in the referenced record sheet cell on the secondary data source being edited or a new record being inserted into the secondary data source. For example, in the case of a relationship between a record sheet InvSheet and a record sheet InvSheetExtended where each record on InvSheet has one corresponding record on InvSheetExtended, when an insert page's template that references both the InvSheet and InvSheetExtended is submitted by the visitor to the destination system, the webifier will cause one record to be inserted into InvSheet and one record to be inserted into InvSheetExtended, and any columns relating to keys that define the relationship between them would be automatically populated. Similarly, if an insert page's template referenced a virtual sheet InvSheetCombined that was comprised of both the InvSheet and InvSheetExtended columns, the webifier would resolve the virtual references such that one record would be inserted into InvSheet and one record into InvSheetExtended. In cases where both a flow-thru edit as well as an edit to what record a primary data source should reference on a secondary data source are possible, the webifier may obtain additional information from the designer by way of formula function parameters, page options, and/or by popping up a request for information to the designer. For example, on a InvItemTemplate details template used for an edit record page, if a cell has a formula "=WEBIFIERVLOOKUP (Invoices lInvNamel)" and appropriate relationships declared in the webifier, or a traditional VLOOKUP with the relationship explicitly described in the parameters to the function, a visitor editing the template's cell with that formula may intend either to change what parent invoice the invoice item belongs to or may be intending to flow-thru edit the invoice name. The webifier may then have an "allow flow-thru edits" option on the page which the designer may set to determine which change occurs when the corresponding input control of the template cell is edited. If edits change what record a primary data source references on a secondary data source, the webifier may change the type of input control that appears on the destination input page for convenience of input and/or to limit the values the control will accept to those which are valid given the relationship. Continuing the previous example, instead of a text control suitable for inputting an invoice name, the rendered control could be a dropdown with a list of all invoice names where selecting an invoice name would change the parent of the invoice item to the invoice associated with that name.

Spreadsheet Definition Goes into Destination System

Returning to FIG. 2, step 207 may further include, once the spreadsheet is configured as desired with the applicable data, the designer initiating the process to build the destination system using the webifier software, described here with respect to one or more illustrative embodiments. The user may login to the destination system (FIG. 13) and visit an admin webpage that accepts spreadsheets. For example, the webifier software may have an input form that accepts the uploading of a xlsx spreadsheet file (FIG. 68), e.g., data 129 (FIG. 1). Alternatively, the webifier may have integration to fetch the spreadsheet definition via a web-service API from a cloud and web based spreadsheet tool, either a group of sheets at a time, if the API allows it, or even cell by cell, if the API requires it. For brevity, all these methods are referred to herein as "uploading", or uploading of spreadsheet definitions or data files into the webifier data store, e.g., database 131 (FIG. 1). Notably, separate steps are not required for uploading records and uploading interface templates, they can occur with one step from the designer from one spreadsheet definition, or they may occur at separate times.

The webifier may store the spreadsheet definition temporarily, replacing it with an alternate and more efficient format, or an intermediary format that is or isn't considered a spreadsheet anymore. One example that achieves a balance of efficiency and simplicity of implementation is to convert the sheets into database entries whereby each cell within the sheet is one database record in a database table having 4 fields representing the location of the cell and the content:

sheet, column, row, content. The content may match the spreadsheet definition's original schema, but cells may be looked-up efficiently in the database. The system may also store it permanently in the format received whereby visitor inputs on the destination system's pages are persisted by modifying the spreadsheet definition directly, as described herein.

Creating Web Pages

As discussed above with respect to step 209 (FIG. 2), the resultant software may include a web application comprising one or more web pages, discussed here with respect to an illustrative implementation. The designer may select a "Add Page" feature in the webifier software's admin interface (FIGS. 18, 69, and 55) and select from a variety of pages types (FIG. 51) and configuration options (FIG. 52). It is possible that cell data or metadata within the spreadsheet definition, contains indicators or instructions to create new pages, what types of pages were intended by the designer, and their various configuration options; but absent this information the designer may be prompted. A wide variety of page types are possible to create on the destination server. Typically, a menu of all generated destination pages are displayed as a menu on all destination pages to allow for convenient navigation throughout the web app (FIG. 66, "Timesheet" web app menu lists all three destination pages for that particular example), and the destination pages may be grouped by "apps" which are typically grouped based on what spreadsheet definitions or files they came from and/or grouped by the designer who created them (the logged in designer, or from other designers who have shared spreadsheet definitions with the logged in designer, or other groupings) (FIG. 16). The ordering of destination pages within the destination system's menu can be modified by the designer dragging and dropping the pages to change their ordering from within the Add-On.

Add Page (Report Page)+Viewable Source Range

One illustrative type of web page that the webifier software may create is a "report" page type. A title for the report may be specified by the user, or generated from spreadsheet data or titles (FIG. 52). A source may also be specified. The source can be the sheet name within the spreadsheet definition (similar to the source control for a CSV_Import page type as shown in FIG. 33), a typical spreadsheet cell range reference such as "=B9:C12" (FIG. 36), name of a chart defined within the spreadsheet (FIG. 52), or a spreadsheet "named range" (sometimes known as "defined name") which is a cell range that is referable by a name such as "TotalColumn" or "PrintableArea" or "Employee List:Employee" (FIG. 36). In general, ranges do not have to be a continuous block, they may comprise several blocks and cells. For example, "A1:A8,A10,A30:B30". Many pages may reference the same source cells, the source cells may partially overlap with another page's source, or a page may have a series of sources to be combined. This may be sufficient configuration for the destination system to show an HTML web report or mobile screen to visitors based on the report the designer designed in a spreadsheet tool. For example, the ClientList sheet could be specified with all of the row-records in a list now becoming accessible to visitors. Numerous optional configurations may be specified such as "Show Page Title" (FIG. 28). Permission rules may also be specified on the app or page to control whether login is required to view the page (FIG. 24) what logged in users or groups of users or roles are allowed to view the page and from what devices, networks, or during what times of day. FIG. 25 illustrates a simplified example, showing what logged in users are allowed to view on the page. The end result is a web page displaying a report that looks similar to the original template spreadsheet that supplies the data, including the layout and formatting of the data (FIG. 97), without requiring the user to have knowledge of web design.

A destination page's Source data could, rather than a cell range, be linked to a specific element within the spreadsheet definition, such as a chart positioned to be floating overtop of the cells.

Some page types may have options that automatically add several preconfigured controls to the destination page. For example, an "allow search" (FIG. 48) or "allow PDF export" (not shown) option is available on some page types such as the calendar page type, which could result in the destination pages not only having the intended calendar but also multiple controls such as a search textbox and search submit button to draw the user's attention to particular data by methods such as scrolling and focusing the search result. Processing of search results may be performed client-side or server-side.

Add Insert Page+Default Form Generation

Another type of page that webifier can create is an "insert" page type, e.g., as may be used during step 211 (FIG. 2), above (FIG. 43), according to an illustrative embodiment. Similarly, a source of ClientList may be specified and an indicator if the designer intends for a row or a column to be insertable by visitors. A range of cells representing the header row(s) may be automatically identified or detected and presented to the user for override (FIG. 39). Detection can, for example, be based on location of cells (FIG. 40 demonstrating detection that the first item is a header), differences in formatting such as font boldness or underlining compared to listed rows below, or simply taking the first row of the sheet. The destination system can provide a list of other pages as options to redirect the visitor automatically after an insert is complete by a visitor (FIG. 44). The destination system may then show an automatically generated input form to visitors, having labels based on the columns in the header row beside their respective input controls, and allow visitors to insert data (FIG. 91). The cell formatting from the spreadsheet's ClientList may affect the html formatting of the cell labels and input controls on the automatically generated input form. The labels for each input field may be determined by the "Header Source" and are typically either the first row of the source range, a Defined Name or a range selected by the user.

In addition to specifying restrictions in the spreadsheet definitions, the types of inputs on the form can be manually specified or restricted further by the designer with the "restriction user input" options on the More Settings tab for each field from the Add-On or destination system admin pages (FIG. 78): "User of Page" and "Current Date" restrictions (FIG. 44), for example, may present uneditable fields with the name of the logged in user or the current date already filled out (FIG. 91); Some columns may have formulas that are copied down from previous records and are also uneditable; "Whole Number" and "Decimal" with present numerical inputs that only allow the selected type of number; "List" may present a dropdown input containing the values from the specified range; "Date" presents a calendar for selecting a date (FIG. 92); "Time" presents a 24-hour time picker; "None" and "Text Length" may present a text field.

Add Insert Page+Custom UI (Template Sources)

If the insert page has more complexity or custom requirements, the designer could also specify a "Template Source"

within a spreadsheet (FIG. 35) in addition to the first ClientList source within a spreadsheet, according to an illustrative embodiment. It would still perform the insert into the list of clients, but the input form user interface may be defined by the Template Source. Wherever a Template Indicator is found on that Template Source, the display of a cell may be substituted for an automatically generated input control, with formatting of the input control taken from the Template Indicator cells' formatting.

Add Details Page+List-to-Details Navigation

Another page type is a "details" page based on a specified record source and template source, according to an illustrative embodiment. The destination system may place controls above the result of rendering the templated report, that allows a visitor to select which record the template should be applied against. As an alternative, the details page may be used in combination with a report page. Both the report page and details page would have as a source a ClientList spreadsheet. The ClientList spreadsheet may have an added column called "Go. To Details" and each row would have a formula such as "=NAVIGATETO('DetailsPage', A3:Z3, Blue, LinkStyle)" that would indicate to the destination system that during the display of the main report page that lists all of the clients, a hyperlink style navigation control should be visible on each row that would take the visitor to the DetailsPage populated by row 3 or the respective row that was clicked on. As another alternative, a configuration option during report page creation may prompt the designer to specify the navigation links to be generated rather than having them specified right within the ClientList spreadsheet. The cell formatting of the evaluated record values on the details page may be a mix of the Template Indicators cell formatting combined with the formatting of any given row of cells populating the Template Indicators cells with record data, one overriding the other depending on destination system default behavior and designer selected preferences for which formatting takes priority if both cells have formatting that conflict versus formatting that is combinable (such as a color change on the record combined with a larger font size on the template). The destination system may also analyze the records to ensure the most common formats do not override the template formats, but some rare and therefore deliberate formatting changes may be permitted to override the template formats.

Add Edit Cells and Edit Record Pages

For a visitor to edit cells from within a destination page on the destination system, the designer can create an Edit Cells page (FIG. 38), or an Edit-Record (FIG. 41) page, according to an illustrative embodiment. From the page creation webpage, they may be created similarly, by entering a title and selecting page type "Edit-Cells" or "Edit-Record". An Edit-Cells page allows visitors to edit individual cells, but displays the page much like the report page, until the visitor begins interacting with visible elements (FIG. 88). An Edit-Record page may allow visitors to browse records (FIG. 89), edit and/or delete rows or columns and may be analogous to the insert page with default form generation (FIG. 90). The page source may be the range of cell values to be displayed on the page, and by default the second range that specifies what cells can be edited (FIG. 42) matches the page source such that all cells are editable. The ranges may be an entire worksheet, a defined name, and/or a custom range. The destination system consults the source range to display every cell with data and cells between those with data. Both edit pages may also have an additional row and/or column of empty space, to allow users to expand the record set by inserting. A defined name or custom range will only include the cells referenced by that range. The destination system may implement the custom range option by creating a defined name after a range is specified by the designer. The Edit-Record page type has an additional selection of Row or Column (FIG. 41), which may determine the edit buttons available on the page.

There are additional settings for both types of edit pages in the "More" section (FIGS. 39 and 42). The designer can specify a "Header Range", using either the first row/column, or using a defined name or custom range. If a header range is selected, the designer can specify whether those headers are editable by visitors or not. The headers will appear as the first column of the page (FIG. 90) or top row in the case of a column Edit-Record page. The designer can also select an editable range, which must be contained inside the main page source. This editable range may be all the cells that can be edited by a user. There are also options to show the page title, to allow searching the page, to display grid lines between cells, and to display row and column numbers/letters.

For Edit-Record type pages, there may be additional options to allow deletions and edits (FIG. 42). Both are allowed by default. This may cause additional controls to appear on the destination page beside each record (FIG. 89). A row/column may only be deleted from the page if "allow delete" is selected and all the cells in the row/column are in the editable range. A row/column may only be edited from the page if "allow edit" is selected and at least one of the cells in the row/column is in the editable range. In this case, only cells actually in the editable range may be edited, according to some aspects.

When viewing an edit-cells type destination system page, the user can click on any editable cell (editable cell range is defined when creating/editing a page) to edit, according to an illustrative embodiment. The contents of the table cell may be temporarily hidden and replaced with input elements that depend on the cell number format, with the cells' current contents as the default value (FIG. 88). Save and close buttons are made visible as well. Text cells will display a text field, number formats such as decimal or currency will display a number picker with the option of typing text, dates display a date picker, and times display a time picker. If a traditional spreadsheet data validation is set for the cell, this may also affect the input elements presented, with a list validation presenting a dropdown, and numbers showing a number picker. Destination system validations applied to pages also have the option of date, time, or map/GPS. Date and Time will display date and time pickers respectively. Map/GPS will allow the user to enter GPS coordinates, or click on a map to generate them. Changing these values and saving will change the value/formula of a cell in a spreadsheet definition in the same way it does in a spreadsheet tool. If the cell contains a file reference using the WEBIFIER-INSERTFILE formula function, the user will be given the option to upload a new file or image (FIG. 62). Upon selecting save, the new data is sent to the server, and a string value is returned to replace the contents of the edited cell. The save and close buttons may be hidden, and the cell displays its value as usual. If a file was uploaded, the page is refreshed. After clicking the save button the following may be sent to the server: the page id, new cell value, row and column of the cell, cell type describing the type of data, and a Boolean indicating whether or not the Destination system page is embedded in another webpage. If a file is uploaded, the file key, file id, and file data are sent as well.

After the server processes the edit request, a JSON object is sent back to the client, specifying the new text to be displayed in the cell.

Add Calendar Pages

Calendar Pages may be created in the Add-On (FIG. 27), but they can also be created through the website, according to an illustrative embodiment. To create a Calendar Page, three pieces of data may be used: the Event Date (required, date formatted cells), the Event Time (optional, time formatted cells), and the Event Title (required). The user selects the Add Page button and then selects Calendar as a page type. Two options are available for how to input the cell range for each of the parameters: Defined Name and Custom Range. The defined name allows for the user to choose from a list of Defined Name options extracted from the attached Workbook. Custom Range allows for the user to specify a range either by pressing a "Use current selection" button or manually entering in the selector. After these parameters have been specified the page can be saved. The Date of the events may be the only required field, events without a title may default to "Event" and events without a time may default to "All Day". After uploading changes to the server, the calendar page view displays a Calendar widget that includes the specified Events. The three specified parameter sources are extracted and used to construct event objects consisting of Title, Date, and Time properties. These objects are then displayed on a calendar widget, typically as a Title list within their appropriate date. The thumbnail on the design page reflects and matches the rendered calendar widget.

Add Nested Container Pages

Container pages are pages that can contain one or more instances of another page. They are created by selecting 'Container' from the Type dropdown during page creation. There may be at least three different modes that can be used to create a container page: Easy, Advanced, and Graphic Designer, that can be selected via buttons in the UI (FIG. 29).

Easy mode may render the subpages in a grid layout. Two pieces of data may be required: the number of columns and the subpages that will be included in the container (FIG. 29). The number of rows in the final layout will depend on how many pages are selected for the container.

Each subpage is selected via a dropdown menu during Easy mode creation. The dropdowns are laid out in a grid that reflects where each subpage will appear on the rendered page. As pages are added, a new blank row of dropdowns may be appended so more additional pages can be added. There may also be an option to create a new page and add it to the container, which may be saved when the container itself is saved. Likewise, if the number of columns is changed, dropdowns may be added or removed to reflect the new column count. The number of columns in a container created in Easy mode might be limited to some number, e.g., three.

Advanced Mode may use a WISYWYG—"What you see is what you get"-rich text editor, allowing for more control over display of the container page (FIG. 30). The editor allows for advanced formatting like font size and color, bold text, bulleted lists, etc. The user can include whatever textual data they want in the container. When saved, the textual data is saved as an HTML template.

Including subpages within a container created via Advanced mode may be done by typing in the page name surrounded by the text "{{"and"}}", according to an illustrative embodiment. For example, typing the phrase "{{DataPage}}" would include the page named "DataPage"

in the container. When the container page is rendered, the template is searched for phrases in between the "{{"and"}}" markers. If the phrase matches a valid page name in the system, the phrase is replaced with an HTML rendering of the matching page. The advantage of Advanced mode is that several pages can be laid out with text intertwined, without having to create several Text type pages. It also allows greater control over the final appearance of the container page.

Graphic Designer mode is similar to Advanced mode, but a full HTML text editor and preview function may be included (FIG. 31). The editor in Graphic Designer can switch between "Edit HTML", "Preview", and "Editor" views by using tabs located at the top of the editor.

The "Editor" tab contains the same editor as the Advanced mode editor. The HTML editor is located under the "Edit HTML" tab. Using the HTML editor, the user can input arbitrary markup allowing for even more control over the final appearance of the container page. The "Preview" tab function takes the current markup and renders it, so the user can quickly see the appearance of the rendered template without needing to save and view the page normally.

Advanced and Graphic Designer both feature a list of current pages on the right hand side. When a page is clicked from this list, the page may be automatically inserted into the template at the current cursor position.

Advanced and Graphic Designer modes may also have a button to "Import From Easy Mode". Data may be required to be input using Easy mode first to use this function. When pressed, the Advanced and Graphic Designer editor will become prefilled with a template that matches the original appearance when the container was in Easy mode.

For all container modes, one or more rules may limit creation. One is that a container page cannot contain the same Insert type page more than once. A second is that the container cannot contain itself or another container page that would cause an infinite loop (Example of a container loop: Page 'A' includes Page but Page 'B' also contains 'A'). These rules are checked at the time of save and if violated, the container's creation may be prevented.

The webifier allows for both a record list and a user interface for visitor actions such as insert, to be largely defined by a non-technical designer within a spreadsheet tool, according to an illustrative embodiment. All these report types may have as sources or Template Sources spreadsheets that have formulas that represent aggregate data of the records, charts representing aggregate data, or essentially anything that is visible on a spreadsheet (FIG. 98). For example, the insert page could have reference information as to the previously inserted record, or a graph of all records thus far to aid the visitor in inputting the next record. The nature of the relationships between data and interface is left very broadly definable by the designer. The amount of flexibility the combination of using spreadsheets for source data and spreadsheets again for user interface layout and design is unexpectedly powerful, giving new capabilities to millions of users who previously have no software development experience or training.

A container page type may also be a tabs container type (FIG. 49). Rather than positioning multiple subpages on the same page, in multiple columns for example, each sub-page would be displayed as a separate tab when the destination page is loaded to the visitor (FIG. 98).

Nested Container Pages by Formula

The container pages may have an additional mode whereby the definition of the container, for example the number of columns of sub-pages to display and what sub-pages to show, may be defined by a container template sheet. The cells of the container template sheet may be simply the names of a sub-page or other unique identifier, and the number of columns utilized in the sheet would represent the number of columns of sub-pages to display on the container page according to some aspects. This allows considerable flexibility to the designer. For example, a designer may merge cells across multiple columns, such as cells A1:A3, put a border around it, and set the cell content to the text "Header Page" to indicate that the header sub-page will have a border and span 3 columns in a familiar way consistent with how data and other templates are defined. A designer may also use a formula to indicate what sub-page should be shown to a visitor. A formula such as "=IF(Items.Count(A:A)>50, 'Line Graph Page', 'Bar Chart Page')" would change the sub-page that is shown so that when there are many items in the count a line graph is shown but a bar chart is shown when there are few items. A formula such as "=IF(Item.A1<EDATE(NOW( ), −1), 'Readonly Page', 'Editable Page')" could allow editing of records until they are a month old, after which time that page would present a read-only view as opposed to edit controls.

The webifier may allow the cells of any various types of templates, including container pages, to contain HTML markup text which would be delivered by the destination system to visitor browsers as HTML markup as opposed to text. The designer may specify which pages should be rendered with HTML markup detected and delivered as markup, such as through page configuration options. Additionally and/or alternatively, the designer may specify which specific cells should be rendered by indicating to the webifier that a particular cell or region should be allowed HTML markup rendering, and the webifier may store such preferences as metadata and/or separately from the sheet.

Add Csv Import Pages

CSV Import pages (FIG. 86) allow a visitor to insert multiple rows into a spreadsheet at once from a CSV file, according to an illustrative embodiment. A designer can select a worksheet, defined name, or custom range as a source for a CSV import page (FIG. 33). This source designates where on the page the new data will be entered. It may or may not restrict the number of columns allowed in imported CSV files. For example, a defined name source covering a range of $A$1:$C$1 would only allow CSV files with 3 columns, and the data would be inserted in the highest available row spanning columns A, B, and C. Alternatively it may ignore the extra columns.

When using the page, the visitor may be told the expected number of columns to be inserted. They may also have the option to exclude the first row of the CSV file. The visitor then selects a CSV file using a standard file upload control, and submits the page. The page may limit the upload control to only accept .csv extensions. If the page contains no data, or improperly formatted data, an error is returned (FIG. 87).

Each row may be inserted one at a time in the columns designated by the source, in the same way as an Insert Record page. Data validations, as described below, still apply, so if any value does not meet restrictions placed on a cell, the import will be rejected, limited, or otherwise modified and the visitor alerted. If the insert is successful, the visitor may receive a success message displaying the number of rows inserted.

Add Embedded-Spreadsheet Pages

Another page type that may be specified with a title and source range is an Embedded-Spreadsheet page, according to an illustrative embodiment. This page type displays an embedded spreadsheet interface to the visitor, and allows the visitor to edit the values and formulas of a designer specified portion of a spreadsheet in the same way the designer does. The implementation of the spreadsheet control need not be comprehensive nor does it require the visitor to have any ability to reference data outside of the spreadsheet. The implementation can make use of one of many commercially available spreadsheet web controls, that accept data in a spreadsheet definition format and, upon the visitor saving, produce a result in spreadsheet definition format where the cells formulas or cell values may be readily copied one by one to and from a temporary sheet provided to the spreadsheet control.

Additional Page Types

The webifier can support a multitude of other page types in similar fashion, according to an illustrative embodiment. For example, similar to the "report" page type described above, but the destination system may use a commercially available converter or print to PDF library to perform an additional step of converting or printing the report page's html into a PDF document which gets downloaded and opened by a browser or mobile application when a visitor accesses that PDF Page's URL.

Another example page type is the embedding of an external webpage into a frame on the destination page, where the URL of the frame is specified in the page configuration when creating the page, or is obtained by dereferencing a specified cell in the spreadsheet definition which allows it to be provided by a static value or by a formula. This may be particularly useful in scenarios where the spreadsheet record data should define the webpage that a visitor is directed towards.

Extracting Spreadsheet Definition

Once the spreadsheet is defined, the webifier may generate the destination system pages based on the spreadsheet definitions, according to an illustrative embodiment. In the example where the spreadsheet definition is persistently stored on the destination system, the process begins with extracting and making available the definition of the cells that fall within the applicable source ranges (step 207, FIG. 2). If the spreadsheet definition is starting out in xlsx file format, the file may be unzipped to obtain the inner content which is in XML format. A variety of XML parsing options, from rudimentary string parsing to sophisticated parsing typically done by calling functions in an XML parsing library, are used to provide convenient access to iterate through all of the individual data items, including cells, and their attributes as well as to load them into an alternate or intermediary format such as to in-memory object-oriented classes and instances. Alternatively, a commercially available spreadsheet file format parser that is compatible with xlsx, MS-XLSB, SpreadsheetML, ODS formats, and similar schemas may be used to expose the data of the spreadsheet in object-oriented classes conveniently specialized to the attributes and format typically found in spreadsheet data.

In the example where the spreadsheet definition was not persistently stored, and instead was persisted in an intermediary, or database, format, some of the above steps still apply but they may be performed for all sheets on the system at an earlier stage, shortly after the designer provides the spreadsheet definition, rather than performed on-demand as requests for destination system pages are received by the system. Intermediary formats may include partially following these steps at the earlier stage and partially on a per-request basis. For example, the early stage may accept an xlsx file, unzip it, and convert the necessary files into database records representing an entire sheet, yet not parse it further. In that case, the steps during each page request to the destination system are fewer.

Conversion of Formatting and Attributes

During steps 207 and/or 209 (FIG. 2), the data may be converted to an intermediary format, which may make relevant data attributes more conveniently accessible in classes that more closely resemble CSS or HTML classes rather than spreadsheet classes, according to an illustrative embodiment. For example, the property names on the classes may match the property names of CSS, or there may be methods on the class such as "ObtainCSSDefinition( )". The convenience of an intermediary format is not required however, as alternatively the webifier may store data according to the destination page's output format of CSS and HTML, or may store data in the original spreadsheet format and later stream straight to the output form with no intermediary storage. For example, to process the width of a column, one could read the value of the "width" attribute of the XML snippet "<col min="1" max="2" width="11.8">", convert to units supported by CSS, and store the result in a column class's "csswidth" property or stream it out as "width: 100px;" as part of a CSS output streaming function.

Conditional formatting entries found within the spreadsheet definition, which are common to traditional spreadsheets, may cause the destination system to perform formula evaluation on the formula that the designer specified is associated with the formatting definition of a cell. If the formula evaluates to true when the destination system responds to a visitor request for a destination system, the formatting contained within the conditional formatting entry will be converted to css as well such that the destination page will have elements with different formatting.

Varying Output by Page Type

As part of serializing an object's properties into a stream for the CSS text definition that will be sent to the visitor, the destination system may take into account factors such as what kind of page type and what type of visitor device characteristics are applicable to a given target page, according to an illustrative embodiment. For example, if the page is of "report" type, the webifier may output a cell with a border as an html TD cell as follows "<td>Cell Text</td>" and some related CSS such as "td {border: 1px solid black;}". However, if the page is of type "edit details" and a cell falls within a range specified as cells that can be edited, webifier may instead output the same cell as "<td><input type=text value="Cell Text"/></td>" and different CSS depending on the style of input controls desired.

Other types of output may be far more specialized. For example, a page type of calendar may, instead of trying to render the cells, render to a string format that can be accepted by a third-party widget such as a calendar control (FIG. 27, within thumbnail), to be display in interactive ways with features like browsing the months or switching to weekly or agenda views as the visitor specifies on the client-side. The destination system may also string render a sheet that has a name column and GPS coordinate columns, to a comma delimited list that is accepted by a third-party mapping application widget that interacts with a third-party server to render the map with the specified locations.

Data Validation

Sometimes spreadsheet tools include data validation capabilities. For example, a data validation rule can be specified in the spreadsheet tool where the cell should only allow whole numbers, only allow decimal numbers, only allow numbers within a specified min and max range, only allow dates or times perhaps within a min and max range, limit the max number of characters allowed, or limit the min number of characters required, among others. A data validation can also be set to only allow the cell to contain one of the values specified in a list. The list can be provided during the data validation definition as a simple text list of values, or it can specify a reference to a range of cells on the spreadsheet where the tool would get the list of acceptable values from and it can cause a dropdown control to appear within the spreadsheet tool for that cell. The data validation can also be set to allow only values that would result in a typical spreadsheet formula return true. For example, for the cell B1, the formula could specify "=OR(B1>=0, AND (A1=0, A2<40))" in which case B1 can be a positive number or it can be a negative if the cell A1 is zero and A2 is small number. Some tools allow specifying an exception to allow blank values to pass the validation. The destination system can read all of the above data validation types and options that the designer has specified from the spreadsheet and spreadsheet cell definitions, according to an illustrative embodiment. The data validation could be on the cell definition XML, or the data validation rules could be defined elsewhere as a group in the spreadsheet definition along with a list of cells the rules are applied against. The destination system may extract and process that information from the spreadsheet definition. During input such as an insert or edit of a value from the destination system that corresponds to the cell which had the data validation rule applied on it within the spreadsheet, the destination system would then evaluate the visitor's input value as compared to these validation rules. The evaluation could be done on the server or it could be done by passing the rule to client-side JavaScript for example which would evaluate the input of the user without requiring a request being sent to the server. If the data validation fails, a label or popup warning may be shown to the visitor to give them the opportunity to correct the value. If the data validation rule involved cell references from which to get the list of acceptable values or if the data validation rule involved a formula that needs to evaluate to true, the system may dereference the other cell values required to evaluate the formula or that are required for the system to know the list of acceptable values, which in turn would allow or disallow the visiting user's input. If the spreadsheet definition specifies a date based rule, the destination system may modify the controls output onto an insert or edit form such that the user has a popup calendar control to choose a date from and optionally typing into the textbox control itself would be disabled to prevent invalid values from being specific to begin with rather than allowing invalid values to be typed with a warning but not submitted to the server.

To go beyond a spreadsheet styles of validation such as "A1=0", the destination system has additional options during the page creation where a designer can add validations such as "Current User" or "Current Date", that set the value of the cell automatically with information retrieved from the server. It is also possible to specify a map or GPS coordinates restriction, where the user could either input GPS coordinates or select somewhere on a map to generate the coordinates, and they would also be validated to be the correct GPS formatting for values. Deeper validation of GPS coordinates is also possible, by have min and max regions specified to the destination system that providing a bounding rectangle, by having polygons specified as the boundary, or pre-defined polygons like "Europe". Other convenience data validators are also available, even if they have the same effect as the traditional spreadsheet tool validators. For example, a validator that allows the designer to specific a list of valid values (FIG. 80) is available and results in a dropdown control being rendered on insert pages. A second example is a date validator that can limit what dates are selected (FIG. 79).

The destination system may enforce the data validation rules regardless of the method of visitor input, including input methods such as input forms (FIG. 93), CSV import pages (FIG. 87), or externally automated webifier API calls.

Transient Data

With the webifier, sheets of all types may contain transient data that is concurrent versions of sheet data that are not consistent between all users over the long term. There are a number of types of transient data, including for example data that is specific to a single destination page being delivered, data that is per visitor browser session, data that is periodic such as per day, data that is per visitor but persistent across browser sessions, data that is per role or group of users but is permanent, and/or a combination of the above such as per visitor per day. The destination system may ask visitors to continue using or to reset transient data upon the start or end of a visitor browser session, such that the transient data applies to a group of browser sessions. For all types of transient data, the data may be stored within the destination system, accesses logged, available to the designer user for viewing and modification, and available to the other components of the webifier system to utilize just as non-transient data is.

Data may be declared as transient by the designer at a variety of levels of granularity including per app, per page, per sheet, per column or row, per range, and/or per cell. The declaration can be provided by the designer using a variety of methods such as configuration options presented on the destination system admin pages such as the app or page configuration options, automatically such as for autogen sheets, by a configuration sheet with an editable list of all transient ranges, and/or by the designer selecting a sheet, range, or component of a sheet to indicate its transience type. The declaration may be stored in a variety of methods, including together with the destination system's configuration options and/or as metadata on sheets or sheet contents.

For example, the designer of a mortgage calculator app for a bank which allows visitors to input their financial parameters into a webpage to see a graph of their mortgage repayment, may set the entire app to be transient via the destination system's app options and indicate that the transience is scoped to individual browser sessions. The resultant app could have every visit start with the original data and all changes done by visitors would not affect other visitors nor future visits by the same visitor. Another example would be a "to-dos" page where the underlying record sheet is transient and the transience is scoped to per user, such that each user has their own persistent, permanent list of their to-dos on edit-cells or report page types which they can access from multiple devices, while other users visiting the same page would have a separate list with no sharing of the to-dos across users. Another example is a app that shares a page between all employees to indicate if each employee is in or out of the office today, with the in/out column being transient and scoped to the date, such that each day the employees would indicate to all other users that they have arrived by setting themselves to "in" each morning, and where an employee forgetting to mark himself as "out" the previous day would not result in it mistakenly indicating he was in the next day before he has even arrived because the value would could reset to blank in-between days.

Another example demonstrates a technique for building additional navigation on a destination page for visitors, where a visitor can specify a country from a dropdown list and the data particular for that country would be shown. The designer creates a page container with two sub-pages, one being a report page, and the other being an edit page with a dropdown that is used as a navigation control for the report page. The edit page's template has the country dropdown reference a spreadsheet cell A1 that is set to be transient with a scope of each page delivery, and the report page's template has a column with a spreadsheet formula with conditional logic that references the cell A1 and varies the result of the formula dependent on the value of A1. For example, if the formula were "=IF(A1='Canada', 'north', IF(A1='US', 'south', 'unknown')" then a visitor setting the dropdown to "Canada" would see the report page show "north" and changing the dropdown to "US" would show "south". Numerous cells of the report could vary depending on the transient value in the dropdown to provide a full report about the country, but many concurrent visitors to the page would each see the values corresponding to their own navigational country selection and would be unaffected by the other users' navigational selection or their own selections in previous browser sessions. Nonetheless, in this example, the destination system may still store the transient navigational selections.

Similarly, the transient data may be referenced by formulas which dynamically compute a cell range, which may in turn be used by a page's source configuration to specify what ranges to show and edit, such that visitors would see and edit values that only affect the country that the visitor has currently selected but the edited values themselves would be non-transient. In general, the ability to combine both transient and non-transient user interfaces and/or data, using spreadsheets as the primary methodology, has value and flexibility that is greater than the sum of the parts.

The webifier may provide transient functionality via the simplified approach of duplicating entire apps for each transient scope in some implementations. Additionally and/or alternatively, for higher performance, the webifier may make use of a SQL database to store each spreadsheet cell's content stored within separate records in a table. A simplified example database record format that would support storage of several types of transient data, may include the following columns among other columns: guid ID, int row, int column, guid userScope, guid SessionScope, text content, text formatting, DateTime createdTimestamp, and DateTime lastModifiedTimestamp. Such a database record format may support multiple concurrent versions of any given cell. To get the primary non-transient version of any cell, the SQL query could include "userScope is null and SessionScope is null" in the where clause, for example. If there are several layers of transient options enabled, a SQL query could obtain the most relevant cell value in a single nested query that returns any record with a SessionScope set, otherwise if none found, then a record with userScope set, otherwise if none found, the primary non-transient version. With such SQL database storage, if a designer inserts a row above the cell in question, a SQL update query could increment the row of all cells below the inserted cell but also all transient versions of the cell with the same single query.

The webifier may make the transient versions of data accessible to the designer to view, create reports on, use in formulas for aggregation, create edit pages that allow editing of each user's transient values, and/or utilize in every way that non-transient cells can be used. The webifier may allow the designer to specify any instance of a scope when opening any sheet which has transience. For example, if the designer indicates to open sheet ABC which has per user scope, webifier may ask the designer if the non-transient version should be viewed and modified or to select a user from a provided list to open up the user's transient version of ABC. The webifier may also allow access to the designer by using the method of providing an autogen and/or virtual sheet to the designer where the sheet has a row for each transient version, and a column for each cell address. For example, in the case of a transient range of cells in B aseRecord-Sheet!A1:B2 where the transient scope is per user, a column header on the autogen sheet AutoGenTransientSheet may identify the columns with the labels "user", "cellA1", "cellA2", "cellB1", "cellB2", followed by a row with a blank user to indicate the non-transient value, followed by a row for each user that has a transient value. The values, formulas, or even formatting may vary for each value in columns like the cellA1 column. A designer may then create a new sheet with a label "Highest Value" and a traditional spreadsheet formula "=MAX(AutoGenTransientSheet!B3: B1000)" which excludes the non-transient row, and may create an associated report page which would display the maximum value that all users have set for the cell Record-Sheet!A1. The designer may then also create an edit-cells page which has a data source of the entire AutoGenTransientSheet, allowing visitors to a destination page to modify the transient values for other users.

The webifier may also allow access to the designer by extending the traditional sheet! startcell: endcell syntax for range references to transientScope!!!app!!sheet!startcellbendcell, where transientScope may be a concatenation of scope keywords such as "user" and a scope identifier such as a username or GUID and where the app may be a simple name or a GUID. For example, a cell may have the formula "=AVERAGE(group-employees ! ! !Forecast! !projects !B1: B1000)". The destination system would parse the syntax to evaluate the formula in the usual manner, and the Add-On may cause the spreadsheet tool to display placeholder values to the designer or the Add-On may do an API call to the destination system to provide actual values to the spreadsheet tool. Alternatively, additional overloaded versions of spreadsheet functions may be provided with parameters such as "=AVERAGEEX(transient scope text, app text, sheet-!startcell:endcell)".

The webifier may allow portability of transient versions of sheet data, from one scope to another. For example, in the case of a page with a per user transient scope, the webifier may provide a URL link to visitor John that may be shared with other visitor Jane, such that Jane's visit to the page will show the transient view belonging to John rather than her own. The URL link may have limited access to the transient view, such as read-only or the inability to navigate to other pages showing other transient data scoped to John. The webifier may also provide the option for Jane to adopt John's transient data, and proceed to make modifications within Jane's own transient scope. The webifier may also allow transient scopes to be bookmarked, or URL links to be re-used, so that a visitor is able to access maintain and selectively resume one of the several transient scopes.

Even if the designer does not specify any transience, the webifier may provide an option to visitors to enter or exit sandbox mode and options for a choice of transient scopes. The result would be similar to a designer specifying transience. If a visitor indicates they desire to sandbox a single value, a page of values, or an entire app, the destination system may create a transient version of the associated data and allow the visitor to edit the data without affecting the non-transient version of the data. If the visitor then indicates they wish to exit sandbox mode, the transient data may be discarded and the visitor's view will return to the normal where further edits affect the non-transient data, or the visitor may be given the option to apply their sandbox changes to the non-transient data, effectively providing the visitor a staging area for changes. A similar sandbox mode can also be provided by the webifier to the designer to serve as a staging area for changes.

When a reference to a cell, region, and/or otherwise does not explicitly specify transience nor non-transience, the destination system may automatically attempt to use a transient version with a narrow scope that matches that of the current request context, such as visitor browser session, and in absence of any narrow scope may attempt to use a transient version with a broader scope such as visitor, and so forth until in absence of any applicable transient version may fall-back to the non-transient version.

Concurrency and Formula Engine

Many visitors could log in to the destination system and request read-only pages concurrently. For requests that involve editing, the server may serialize all of the incoming requests or the requests' core code that modifies the records, into a queue which would effectively seem concurrent given today's processing power, according to an illustrative embodiment. Applicable to many different page types, the destination system may resolve the cell references and formulas that originated from the spreadsheet definition into simple text and numeric values to be displayed to the user or recursively used in yet other formulas in the spreadsheet definition or within other areas of the destination system. The resolving of the formulas may be completed in a number of ways. The same core processing engine or libraries as a spreadsheet tool may be reused or a custom parsing and formula processing engine may be built to be embedded into the destination system. In any case, the engine may have one or more callbacks that resolve cell references based on row and column index values, or it could be passed the spreadsheet definition or access to a database that stores the cell definitions. The spreadsheet definition that is passed in may be a simplified or otherwise modified re-generated definition that is not the same as the original spreadsheet definition that was passed in, or the original spreadsheet definition may be passed in. In case of any collision between edits, the system may select or designate an accepted edit based on time (e.g., last man wins) or any other desired heuristics.

Workflows and Filtering Results

The webifier may allow some forms of workflow to be defined with variations of the report page type and other page types, according to an illustrative embodiment. On a row-record sheet, a column could be added by the designer intended to affect visitor permissions on a per-row, and therefore per-record, basis, where the result of a particular column's cell formulas cause the destination server to include that row in the output results or not. For example, imagine an employee timesheet spreadsheet where column A includes the employee name and column B includes a number of hours, and a report page type with a source region of that sheet. The added column C may have a formula, for each row representing a record, that resembles "=IsLoggedInUser(A1)" where A1 would change to A2 for the second row and so forth. Although it would not be able to resolve during design-time to show the designer a value, the destination system would evaluate the column of formulas when a visitor visits the timesheet listing report page. During iteration, the destination system would skip over rendering of rows for the visitor if the employee specified in that row's column A was not the visitor. Rows would continue to be rendered if it matched the visitor in column A. The net result is that an employee could visit a timesheet webpage, based on a spreadsheet definition, that would only show the rows of time records that relate to that employee (FIG. 20). Similarly, if the sheet had a column specifying a supervisor, a supervisor timesheet overview page might list only the time records under that supervisor's purview.

If the page type were to be an edit page, the same evaluation of formulas may skip rows, thereby not only hiding information but also preventing input controls from being provided to prevent the user from editing some rows while allowing the editing of other rows. The unexpected effect of putting these components together is the ability to allow the user to define a workflow such as an employee seeing only their own timesheet on a timesheet page and being able to change a "ready to submit" column to true for one or more records, having a supervisor see those records show up on a page that had formulas to limit row viewing based on the "ready to submit" column, having a supervisor able to change an "approved" value for only the employees they are supervising, and finally having a manager see only approved records and an aggregate total of approved time. In short, aspects described herein allow creation of custom and complex workflow that previously required the assistance of an experienced software developer.

Buttons

For visitor convenience, metadata may be specified on a cell, for example a cell comment using a spreadsheet tool's comment feature, that includes a tag that the destination system sees as a signal to change text editing of values into a button control, according to an illustrative embodiment. For example, if the designer desired an "approved" value on each data record, it may be preferred by the designer that the visitor is able to click a button to indicate approval of a record by changing the value of a cell from false to true, rather than presenting a textbox to the visitor to type the string "true" and where the visitor may change to put a "true" back to "false". This results in an easier to use system as well as aids in cases where a change to a value is one-directional (e.g., from false to true but the designer does not feel it valid for the record to ever change back to false).

For insert pages, even the destination system's default submit form button may have appearance and location defined by a cell with a webifier-defined or webifier understood formula function such as "=SubmitButton(Done, Green)" placed somewhere within the spreadsheet template. Drag and drop floating controls could also be used to position a floating button if the spreadsheet tool supports it, which the destination system would use as a basis for the position of a submit button on the destination pages. In this way, the destination system's actual "hard-coded" interface, that is the interface not defined by a spreadsheet, is minimized on the destination pages.

Security+Indirect (Cascading) Filtering

The preventing of input can involve disabling or hiding of controls for pages where the designer has specified the source is the record sheet, or having the server refrain from sending the controls to the visitor at all. For security, the server may also confirm whether submitted inputs posted using a HTTP POST request are allowed based on the same logic, whether or not the controls were presented to the user, as the visitor could be a malicious end-point rather than a normal browser, according to an illustrative embodiment. Other destination pages making use of other template spreadsheets, intended to be populated with a variety of row-records, also evaluate allowance using the same logic. For example, if an invoice details report page with a Template Source of an invoice details template is being accessed by a destination system visitor, and it is being populated with invoice 205 on row 2 on the invoice record listing sheet, the destination system can check the invoice record sheet for a column that specifies if row 2 has a formula that restricts access to row 2. If so, the destination system would also restrict access to the invoice details report page for invoice 205. In the case of nested templates or where multiple source sheets are used in a single template and other such complex scenarios, part of the destination page may be populated or rendered and part not, but the underlying method of cascading remains.

Single Formula Rather than Entire Column

An alternative to adding a column with per-record formulas is to have a separate single formula entered in a specified or referenced location on the sheet or external to the sheet and stored within the destination system, according to an illustrative embodiment. In this alternative, the destination system would then iterate through each row and apply the formula relative to the current row or record it is iterating on. Other areas of webifier may make use of the same centralizing of formulas alternative.

For example, in the earlier example relating to permissions per-row, this document gave the example of a column C with formulas such as "=IsLoggedInUser(A1)" within C1, a formula such as "=IsLoggedInUser(A2)" for row 2, and so forth. The designer may then copy the formula down for all records, with the parameter to logged in user referring to column A for each respective row. This functions, but can be cumbersome. An example of an alternative is to have "=IsLoggedInUser(A)", or a different syntax rather than the usual spreadsheet formula syntax, defined separate to the sheet as an option during the creation of a page that refers to source records. The destination system may then understand the "A" parameter, which refers to a column in general, to be equivalent to the "value in column A for the row representing the record currently in question". In other words, it may understand the formula to be the equivalent of having the column C above. As another example alternative, the "=IsLoggedInUser(A)" formula may be placed in a single cell somewhere on the same sheet as the row records, perhaps to the far right of the row record information in cell "Z1", and a field may exist during the page definition steps that specifies what single cell represents the formula for permissions per-row and may be set to "Z1" in such an example.

Overlay Sheets

Sometimes a single record sheet is the basis of many destination system pages which have different permissions and different intended visitors. In such a case, several columns could be used to contain different formulas to affect the permissions of the respective destination pages, according to an illustrative embodiment. As an alternative, the destination system may add an Overlay Sheet to the spreadsheet definition. The Overlay Sheet may initially be a duplicate of the row-record sheet with all of the same values. It may be flagged by the destination system as an Overlay Sheet, with metadata on the sheet's spreadsheet definition, as a sheet intended to be based on the row-record sheet and intended to have page-specific modifications. The designer may then add the column C to an Overlay Sheet, the destination system may use that column C in much the same way as above, but it may evaluate the formula as if it were added to the row-record sheet instead, which allows it to work on the latest list of row records in case the list has changed since the Overlay Sheet was created. Different Overlay Sheets for different destination pages may have different column C formulas. The Overlay Sheets may be updated whenever the row-record sheet was changed, to keep the base content in sync but with only the intended new column C persisting as an example difference.

It is possible for Overlay Sheets to have no changes to the cell positions or any new cells inserted, but rather include only visual formatting changes to the cells. For example, the overlay sheets may change font colors, font sizes, or use a spreadsheet tool's traditional "hide columns" feature to also hide the respective content from the destination pages. To avoid confusion with regular sheets, Overlay Sheets may be indicated to the user as Overlays in a variety of ways. For example, the spreadsheet background can be set to a designated color, e.g., light blue, throughout the sheet (FIG. 39).

Sometimes the template or overlay sheets can be "hidden sheets" if the spreadsheet tool supports hiding a sheet from the list of sheets, or otherwise the template sheets can be listed separately from other types of sheets. When a designer is viewing a particular page, those additional sheets would automatically be unhidden until viewing is complete.

Traditional Spreadsheet Tables

Rather than the destination system having a field during page creation to indicate that column C specifies row-based permissions, an alternative is to have the spreadsheet definition imply this, according to an illustrative embodiment. Spreadsheets may have traditional "spreadsheet tables", which typically comprise a region of cells and can cause the spreadsheet tools to be colorized, have filter and sort options on the header row, and other features to manage the display of the rows within a sheet when viewed within the traditional spreadsheet tool (FIG. 74). The webifier can check for the presence of a traditional spreadsheet table in the spreadsheet definition of a source row-record sheet used for a page or in the Overlay Sheet used for a page, and if the table is present the webifier may look at the table's persisted state for filtering, sorting, and otherwise. If the designer sorted the table's cells by column A, then the destination system will sort the output by column A as well. For the earlier example of choosing row-based filtering permissions based on a formula in column C, the designer could set the table to filter on column "C=true" and the destination system would filter the result output with the same logic. In this way, the creator of the page indicating that column C has row-based permissions that need to evaluate to true to see the row, is not needed.

Applicable to any situation or method described herein where permissions are filtering records, including the traditional tables method above as an example, the destination server can optionally render report pages and other page types that depend on the row-record sheet with the aggregation functions within the spreadsheet formulas excluding the disallowed records. With this method, per-record permissions would also affect report pages with an aggregate graph for example. The designer could also disable this on a per-page basis, to have aggregate graphs unaffected by underlying row-record permissions, which effectively gives visitors aggregate information but continues withholding granular per-record information.

Extraction of Updated Spreadsheet Definitions

After the destination system has already made use of the designer's spreadsheet definition to provide visitors of the destination system with read only and/or input capable forms and content, and after visitors of the destination system have potentially modified or input records, the destination system can provide the designer an updated, unified or multi-part, representation of all of the data and templates, in spreadsheet format fully compatible with spreadsheet tools, according to an illustrative embodiment. For convenience, this can be called Extraction, as may be performed in step 215 (FIG. 2). Extraction can be provided as a file download or by way of updating the spreadsheet tool, using the destination system Add-On or plugin that receives the information from the destination system and updates the sheets within the spreadsheet tool (FIG. 54, "Download data" button). In most cases, the designer would then have received a spreadsheet that not only has the updated records, but also has the reports displaying actual data based on the record sheets, all without further involvement from the destination system.

Extraction may be performed similarly to how the spreadsheet definition first was put into the destination system, but in reverse. In one example, if the destination system persisted the spreadsheet definition and did all modifications per-request, the destination system need only do the reverse of the designer's original upload a file; that is, offer the xlsx data as a file for download by the browser. In another example, if the destination system persisted the spreadsheet definition after unzipping the xlsx data and storing each contained unzipped file in the database, then the system may reverse the steps by creating an unzipped file for each record, zipping all of the data into an xlsx file, and then offering the file as a download to the designer. As a third example, if a database table was storing one record per cell but without changing the schema of the cell content stored in the database, then the reverse may include iterating through all database entries and serializing the cell content into XML, and reintroducing per-sheet definitions that were stored in other database tables to generate the unzipped sheet file, and then proceeding with the steps noted in the other examples. As a fourth example, if the source spreadsheet definition was provided by way of web-service API calls fetching the definition, the reverse may include API calls delivering the new spreadsheet definition to replace the other one.

On some occasions, the designer, or other users, can perform extraction where the designer obtains one or more spreadsheet files or one or more spreadsheet sheets with one or more sheet templates populated with one or more records. For example, this kind of extraction may result in a spreadsheet with 100 sheets and where each sheet is an invoice displayed in the form of one of the sheet templates. The steps and examples to package the extraction for the designer may be similar, with some differences being that the destination system would need to follow the steps of populating a template sheet, as it does in early stages of generating a report page, but then redirecting the result to the extraction steps provided above rather than converting the cells into other formats, and then iterating with other records populating the template sheet.

The Add-On (plugin) may, via typical push notification or polling methods, provide real-time reloads and updates to the designer as the destination system makes them available. Typically, this means extraction steps are limited to being performed on whichever sheets or cells have changed due to visitors, and the Add-On updates only those sheets or cells while leaving the remaining untouched. The Add-On may take a hybrid approach of having real-time checks for updates but downloading and saving any new spreadsheet definition as a local file on the hard drive and then triggering the spreadsheet tool to open it, all with minimal or no user involvement.

Continued Editing of Spreadsheet Definition

Whether extracted as a file or into the spreadsheet tool via the Add-On or otherwise, the designer is now able to perform further modifications to the template sheets and/or the record sheets as they did before the using the destination system, according to an illustrative embodiment. In fact, the designer may have chosen to put into the destination system an empty or nearly empty spreadsheet definition and then start building the spreadsheet only after it is extracted, to leverage any destination system features that are relevant at design-time. As a simple example, having the other designers aware for coordination purposes that a particular new spreadsheet, indicating a particular new web-app, is being designed by that user due to the destination system displaying this new web-app in the list of apps.

The destination system may have an option to lock or block all access, only have read access, or only have read and insert access, from visitors during the times that a designer has indicated they are editing the spreadsheet or where the Add-On informs the destination system server that the designer is editing. Such blocking is typically restricted to only sheets related to what the designer is currently editing, by determining if a visitor's page needs a sheet originally from the same file as the sheet the designer is editing, or perhaps by determining if it's from the same file or there is the presence or absence of any direct or recursively seeking for indirect references from the visitor's sheet to the designer's sheet being edited. This prevents unexpected collisions between changes by a visitor and changes by a designer, or from a visitor seeing a page derived from an in-progress and incomplete set of changes by a designer. Another technique to help avoid those situations is that the designer indicating they are going to be making changes to the spreadsheet definition, again either manually specifying or automatically via Add-On detecting it, causes the destination system to copy the representation it stores to a staging area, where the designer's changes only affect the staging area until the designer indicates they have completed a group of changes and are ready for the changes to go live, at which time the staging area is copied back over the live web-app. During that time, either the live web-app is blocked entirely, is set to read-only, or is allowed to proceed but the changes the designer did while operating on the staging area are merged in, as a group, to the live app while retaining the live app's by the same methods that individual designer edits can be merged in with a live web-app's records or a new spreadsheet definition can be uploaded and merged in with a live web-app's records.

The merging of the web-app's latest changes from visitors, with the merging of the designer's changes can employ a number of popular and common methods for merging data, as it can be done when both sides are in spreadsheet definition form. Commercially available libraries and tools may be used to identify the differences between spreadsheets and allow iterating through those differences to accept or deny each change, as well as libraries and tools that compare 3 spreadsheets: the original, changed version A, and changed version B. They iterate through and process changes that are not in conflict, and either reject conflicts entirely or present the user the conflict information to make a decision as to which version wins.

One method of merging is to combine several other techniques, in a way that is most conducive to expected uses of the webifier software. For example, a designer may be allowed to start making changes to the template sheets and the destination system would not block visitor changes to the record sheets. It is rarer that the destination system has visitors that change the template sheets although certainly possible because the destination system can treat all sheets generically when the designer selects what sheets to report on, among other reasons. Nonetheless, the destination system may block by default only changes to the template sheets, which it could know are exclusively template sheets by iterating through how the designer has referenced that sheet during the creation of pages, whether it was referenced as a Template Source sheet or not. If the designer wanted to preview the effect of their proposed changes, the destination system may automatically setup a staging area. If the designer was detected as modifying a record sheet, the webifier system may prompt the designer to block additional related parts of the web-app from concurrent input. In this approach, conflict resolution prompts to the designer can be avoided, and the designer is still able to update the destination system's user interface via template sheet changes and have the destination system not discard any previous or new records it contains.

In the case of inserts and some other types of edits, even insert type of edits to the records is possible concurrently on the destination system and the designer's tool without prompting for conflict resolution. A simple approach is to keep a copy of the original spreadsheet definition that was sent to the designer at the start of their session or after they have indicated intent to do design work, and when uploading next to compare the designer's changes to the original to determine which records are new and to cause the destination system to add each of them, with short locking to allow the destination pages to continue operating and inserting while these newly inserted records from the designer are merged. In a similar fashion, a pre-designing original could be saved and compared to the designer's next upload to determine which records are missing and therefore intended to be deleted, or modified and intending to be updated. Additionally, the same method of comparing to pre-designing originals could reveal adding or removing columns from the record sheets, and corresponding template sheet changes to match and indicating the designer's changes to the structure of the web-app. In all cases, both the old records as well as newly visitor added or visitor modified records on the destination system remain intact and the end result is a sensible merger between designer and visitor changes to records, while simultaneously being able to have updated the interfaces the destination system sends visitors as well as the structure of the records, e.g., in one step.

A challenge in allowing the continued editing of spreadsheet definitions is that the designer may make changes to columns or rows such that any references to ranges that the destination system stores may become out of date. One solution to this is having the Add-On watch for changes to the location, the rows and column indices, of the spreadsheet cells that are referenced, and to update the destination system accordingly in real-time on an per event or per event-group basis. For example, if the destination system has a range reference of "A5:A10" and a row is inserted at the top, then the webifier Add-On which is hooked into the appropriate event listeners, notifies the destination system to shift any ranges below row 1 down, e.g., to "A6:A11" in this case.

To allow further flexibility to the designer to be able to modify the spreadsheet definition offline and on a computer that has no Add-On installed (referred to as "Disconnected" designing), basically a computer with only the unmodified third-party spreadsheet tool and a copy of the spreadsheet definition, that challenge is extended and the above solution might not suffice. In this case the destination system may piggy back off of a spreadsheet's traditional named ranges feature because spreadsheet tools update named ranges based on designer changes, and such changes to the named ranges can be observed by the webifier system. This approach allows this desirable flexibility of modifying spreadsheet definitions that affect the destination system while Disconnected.

Notably, separate steps are not required for uploading records and uploading interface templates, they can occur with one step, by the designer or automatically, and with one spreadsheet definition being provided to the destination system. Of course, separate steps may also be used, if desired.

The designer may be notified, such as with a "Server Changes as of <date>" popup, that the destination system has received additional changes, from designers or visitors (FIG. 53). Common push notification or polling of the destination system may be used to accomplish this. This allows the designer to reduce concurrent edit conflicts after the designer is done editing.

Named Ranges

When done through the Add-On, the webifier system may retrieve the Named Ranges from the spreadsheet (e.g., via a COM Interop library, as described below) or from the destination system server, and pass the names to the Add-On's web-based user interface using JavaScript, according to an illustrative embodiment. The webifier may create new Named Ranges in order to capture the currently selected cells for data Sources when creating or editing destination pages, or in any other field or situation that the destination system requires a reference to the spreadsheet cell(s) and that reference needs to be accessible to the destination system for visitor requests to be processed. The names for theses ranges may be "WebifierCustomRange" and appended with a randomly generated number from 0 to 2,147,483,647, for example. If a range with that name already exists, a new random number may be generated until the created name is not attached to an existing range. Alternatively, incremental numbers may be used. If a custom range for the selected cells already exists, the system may opt to use the existing name rather than create another one. Operations executed in the spreadsheet tool such as insert row or insert column expand the named range as per normal spreadsheet tool use. If a record is inserted via an Insert or CSV Import Page with a Named Range as its source, it will extend that Range to include the inserted records. If a Named Range referenced by any webifier web page is deleted from the spreadsheet definition, when the sheet is uploaded the system will mark the affected Pages having invalid Sources and they will be inaccessible until the Sources are edited or the deleted Named Range is restored. Named Ranges may be used to define the boundaries of Insert, Edit-Cells, Edit-Record, CSV Import, Report, Webpage, Calendar, and Details Report pages. Named Ranges may also be used to define header ranges for Insert, Edit-Cells, and Edit-Record pages and to set the editable range for Edit-Cells and Edit-Record pages (FIG. 81). Using an Edit-Record page, named ranges may be automatically deleted if all cells in the range are deleted.

As an example, an insert page with automatically generated form interface needs a source range that typically refers to a row-record sheet. If the designer adds a column to the row-record sheet while Disconnected but later uploads the updated definition, the destination system will be able to see the updated Named Range that includes the newly inserted column. In this example, the insert page would now generate an additional label and html input control when that page sends the form to the visitor and visitors would, with no further action needed by the designer in this case, start generating new records that include the new column of information.

Per-Cell Tracking

If the volume of cells to track is very high, named ranges can be combined with, or replaced entirely by, having an additional attribute, containing unique cell IDs generated by the destination system, inserted into every cell of the extracted spreadsheet definition, according to an illustrative embodiment. Many spreadsheet tools will keep this attribute in place as metadata even as cells are modified or moved or copied in the spreadsheet tool, despite the spreadsheet tool having no understanding of the attribute's purpose. This affords much of the same benefits of the named ranges but is not likely to be visible to the designer in the spreadsheet tool's user interface. The destination system then extracts the unique ID in much the same way as other cell attributes, to obtain knowledge of what changes a user made while Disconnected. That knowledge can then be used to update the references on the destination system to those cells, or alternatively, those unique cell IDs could in some cases be sufficient as the method the destination system uses to refer to cells rather than using the traditional row and column indexing. Even ranges could be specified as UID:UID representing the top-left corner and bottom-right corner of a range.

In similar fashion, other metadata can be stored in other parts of the spreadsheet definition that are hidden to the designer. For example, links to destination pages that require a sheet could be stored in an attribute within the XML definition of a sheet. If the spreadsheet tool supports a schema where there are ranges that get automatically updated like named ranges do but where the ranges are not visible to the user, that feature may also replace named ranges.

Configuration Sheets for Destination System

An alternate approach to named ranges, referred to as "Configuration Sheets" can also be substituted in the place of named ranges, according to an illustrative embodiment. The approach may include an additional sheet named "DestinationSystemRanges", potentially hidden if the spreadsheet tool supports hidden sheets, where the sheet has the 2 columns of name and range. The destination system would then iterate through that sheet during uploading or at each visitor request, and find the range that the destination system is seeking to resolve, by the value in the first column. For example, "Page1_SourceRange" may be one of the names. The destination system may then obtain the cell's value or formula in the second column and use it in much the same way as the named range definition. The advantage of this approach is that the value may actually be a traditional spreadsheet formula and therefore even the range definition could be affected by other elements of the spreadsheet definition. This affords an unexpected amount of power and flexibility. For example, one could specify a formula where if an invoice total is >$5000, then the details page should include an extra 5 rows in its page source configuration that perhaps has additional fine print which is desirable to show visitors but only for that invoice. At the same time, the spreadsheet tool will automatically keep the ranges in sync in much the same way as named ranges. This allows a designer to effectively modify the configuration of custom reports, among other things, with minimal or no additional effort or training.

Data and metadata information that is required for the destination system to serve destination pages, such as the page title, may be stored in a database separate from the spreadsheet definition. In much the same way as a configuration sheet can replace named ranges, all data that is specific to the destination system is able to be included in the spreadsheet definition and, importantly, editable by the designer in the familiar spreadsheet interface and approach. Another example is the page title being defined in a Configuration Sheet, which would allow for page titles to be a result of any formulas a designer chooses. Page titles like "Profit/Loss Report" can be "Profit Report" if a cell is >=$0 and the title would be "Loss Report" if a cell is <=$0. Another example is the entries into the notification system. Formulas such as "=IF(OtherSheet!A1>10, "Thomas","Patrick")" could change the destination of a notification based on a value within a record sheet. It could also change the time of delivery or any other notification attribute based on formulas the designer specifies and leveraging, in a somewhat cyclical way, the underlying concept of this invention in order to have itself configured by the designer. Some spreadsheet tools are able to accept cell metadata where a cell is read-only when accessed within the tool. In such a case, Configuration Sheets may have some cells marked read-only to reduce the potential of accidental or incompatible designer modifications to the Configuration Sheet. For example, the Configuration Sheet may have all cells read-only except the second column on the DestinationSystemRanges sheet described above.

Ultimately, implementing this approach consistently throughout, the entire definition of the destination system's web-app may be portable and configurable while Disconnected. At the same time, the entire definition of the web-app may be formula driven, arbitrarily definable, depend on other parts of the definition, and otherwise have unlimited and unpredictable connections to the record sheets, template sheets, itself, function results like current dates, and otherwise.

External Supplementary Data: Files

Files may be uploaded to the destination system using the WEBIFIERINSERTFILE function (FIG. 7), according to an illustrative embodiment. When a field containing the WEBIFIERINSERTFILE column is encountered while building the form for an Insert or Edit-Record page, a File Upload control may be presented for that field (FIG. 62). Similarly, when editing a Cell that contains a WEBIFIERINSERTFILE function on an Edit-Cell page, the designer may have the choice of editing the formula or uploading a new file. When WEBIFIERINSERTFILE is encountered in a spreadsheet tool with the Add-On, it may display a key that can be used to retrieve information about the file using the WEBIFIERFILEATTRIBUTES function (FIG. 64).

If WEBIFIERINSERTFILE is encountered in a Report or Edit-Cell page, the file may be displayed on the destination page. Visitors can view these uploaded files in different ways, depending on the file type. If it is an image, it may be displayed within the cell (FIG. 63). If it is an audio file, visitors can listen to it using the HTML5 audio player. If it is a video, visitors can watch it using the HTML5 video player. If it is any other type of file, a link is displayed that visitors can follow to download it (FIG. 61).

Designers, from the destination system's admin pages, may be able to view and sort files on the system, and get details such as file keys, size, and which web-app each file belongs to. Files may also be viewed by web-app, to get an easy view of what files are associated with an web-app. Permissions may also be applied to files, so only specific users or groups of users can access a file. The destination system may obtain these permissions based on the visitor having access to any cell that references that set of files in the formula, or alternatively the destination system may have a separate configuration interface that lists the file groups, allows modification of their sharing settings, and specified a default set of permissions for new sets of files.

Uploaded files may be stored in an actual file directory, or a database virtual file listing, fashion and associated with the web-app to which the file was uploaded, in a directory named after the key that was or supplied to or generated by the webifier. The type of file being stored may be determined by the MIME content type of the file and recorded for displaying the file. Multiple files may be stored under the same key and can be accessed by the index parameters of the Webifier file functions.

The WEBIFIERINSERTFILE function may allow zero, one, or two parameters consisting of values or formulas (FIG. 7). The first parameter is an optional string parameter which is a key that can later be used retrieve the upload files. If no key is specified, then a globally unique identifier (GUID or guid) may be generated and used as the key. If the key is specified, the user can also include an optional integer parameter that may be the index of the file under that key to be shown. If no index is specified, or the index is larger than the amount of files, the function may show the most recently uploaded file when displayed. When a file is uploaded in an insert page, the newly inserted cell may be auto-filled with the function WEBIFIERINSERTFILE. The first parameter in the formula may be the same key as the previous cell. If the previous cell key parameter was a cell reference, it may be auto incremented to refer to the cell below. The second parameter may be the new number of files so that when the cells is viewed on the website it may display the newly uploaded file.

The WEBIFIERFILEATTRIBIUTES function may allow one, two or three parameters consisting of values or formulas (FIG. 5). The first parameter is the string key for the file; the second parameter, which may be optional (not shown), is the index of the file stored under the key to get the attributes of; and the final parameter, also optional, is the name or number of the attribute to be retrieved. "Name" or 0 for the name of the file, "Size" or 1 for the size of the file in KB, "DateUploaded" or 2 for the date the file was uploaded, and "Link" or 3 for a URL to view the file on the website. If no index is specified, or the index is larger than the amount of files, the function may get the attribute of the most recently uploaded file. If no attribute is specified, the function may default to showing the name of the file.

All of the above variants and features of the external supplementary file system can apply for single file per cell variations or multiple file and file folders per cell variations.

External Supplementary Data: Signatures

Signatures may be uploaded to the destination system using largely the same methodology that the file based external supplementary data described above uses for visitors uploading images. However, in this case of signatures being the form of external data, the file upload dialogs and controls may be replaced with controls that allow a user to input a signature. For example, a record sheet may have a column with formulas on every row record resembling "=WEBIFIERINSERTSIGNATURE(A2, 'thumbnail')" where the column "A" has data that can serve as a unique identifier, such as an employee name, and "2" in A2 changes to the appropriate row and where "presence" indicates that the cell shows a thumbnail of the signature, if available, or the text "n/a" if no signature is available yet. During design time, the Add-On may fetch such thumbnails for each record in order to display them within the cells. For visitors of a report page with the source is set to the entire record sheet, the signature thumbnails may appear beside every record row displayed on the destination page. The thumbnails may be clickable to open up a largely popup view of the captured signature together with metadata such as the date and time the signature was captured. On an insert or edit destination page, the large popup view may also have a large canvas area whereby the user's movement of a mouse, inkless pen on a digital tablet, or a finger on a touch-screen would cause the canvas area to treat the movement as a pen and draw a corresponding line onto the canvas. There are commercially available modules for capturing motion such as for signatures into an image file by way of such a canvas, commonly using JavaScript code to do so and provide an html input form with image data to be uploaded to the server on the form submission. Continuing this example, the destination system may store the image file representing the signature in the database, to be retrieved on subsequent requests to view signature data for a record on a report page. As an alternative to visual signatures, data representing digital signatures may be obtained by client-side JavaScript from one of numerous third-party issuers of PGP signed signatures and a text summary or token artificial signature, using a handwriting-like font, of such a digital signature may be displayed in the place of a signature image. The visitor may be required to input authentication information, such as a username and password pair or a thumbprint on a mobile device's thumb scanner using commercially available integration points for such hardware, in order for the third-party issuer to issue a digital signature.

External Supplementary Data: Chat

The chat object feature allows a stream of chat discussions to be embedded or associated with one or more cells of a spreadsheet, according to an illustrative embodiment. The chat object allows visitors to add messages to a cell that other visitors can then view, and to view messages left by others or themselves on a cell (FIG. 58). The chat object represents a list of message objects, with each message object typically consisting of at least three parts: the message text, a timestamp indicating when the message was submitted and the username of the user who submitted the message. Each chat object may also have a unique identifier, i.e., an identifier distinct from other chat objects (e.g., FIG. 59, "6ea6cc . . . ". The identifier may be user-assigned or system-assigned. The identifier of a chat object may be used by the webifier to refer to the chat object and to distinguish it from other chat objects.

A chat object can be created by entering the insert-chat formula function, called WEBIFIERINSERTCHAT, which is a custom formula function defined by the webifier system (FIG. 6). To enter this function into a cell, the user may be required to have permissions to set the formula for that cell. This can be done in various ways, including through a webifier API call that allows it or through the spreadsheet tool with the webifier Add-On installed.

To create a chat object in a cell, the designer may set the cell's formula to the insert-chat function with no parameters (i.e. '=WEBIFIERINSERTCHAT( )'), to the insert-chat function with the standard hyphen-separated string representation of a Globally Unique Identifier (GUID) as the only parameter (e.g. '=WEBIFIERINSERTCHAT("DC40FCA2-D72A-4AFD-80E4-76782B47D960")'), or to a formula that that is evaluated to a unique identifier whether or not the identified is a GUID or a string such as "Pleasant Solutions" which would represent a chat stream related to the record for that company. Several cells, on different sheets or the same sheet, may pass the same parameter to WEBIFIERINSERT-CHAT, allowing several destination pages or locations within the pages to refer to the same shared chat stream.

When the user sets the insert-chat formula for a cell and saves it to destination system (e.g., by uploading the spreadsheet definition changes to the destination system if they are using a spreadsheet tool and the Add-On), the webifier performs several steps. First, it may replace every instance of the parameterless version of the insert-chat formula with the version containing a single GUID parameter. It may generate each instance of the GUID parameter using the Version 4 (IETF RFC 4122) algorithm, which means that the generated parameter is in practice distinct from the GUID parameter of the insert-chat function in any other cell. Then it uploads the updated spreadsheet definition to the destination system.

A chat object can be used by a visitor on a page that allows the visitor to view the cell in which the chat object is embedded (FIG. 57). For example, if the chat object is embedded in a cell on a particular sheet of a spreadsheet, and a visitor has access to a report page whose source is that sheet, then the visitor can interact with that chat stream through the destination pages.

When the destination system renders a page containing a cell whose formula is the insert-chat function, it parses the GUID parameter of that function and checks its database to see whether there exists a chat object whose unique identifier matches the parsed GUID. If there is no match, it creates a new chat object whose identifier is the parsed GUID and whose list of message objects is empty, saves it to its database and uses this new chat object as the chat object for the cell. If there is a match, it uses the matching chat object as the chat stream for the cell. In either case, the destination system displays inside the cell a chat-bubble icon and the word 'Chat'. If the visitor clicks the icon, it displays a modal window on that page showing the past message objects for that chat object (if any) in chronological order. Each past message object is shown with the full date and time it was posted, followed by the username of the user who posted it, followed by the message text. Below the list of past messages, it shows a text box in which the visitor can write a new message and a button to submit the new message.

If the visitor writes a new message in the text box below the list of past messages of a chat object (FIG. 58) and submits this message, the destination system creates a new message object, sets its timestamp to the system time, sets its username to the username of the visitor and sets its message text to the text submitted in the text box. It then associates the chat object with the message object and saves the message object and association information in the database. Finally, it returns the new message object to the client, which may use JavaScript to display the new message object below the list of past message objects but above the text box in the modal window and clears the text box, all without refreshing the page. The visitor can write further messages in the text box, and submitting these further messages may trigger the same steps again. If the visitor does not wish to enter any more messages, they may click anywhere outside the modal window, which may close the modal window and reveal the page behind it through which they accessed the chat object.

Since the GUID parameter of the insert-chat formula is used as the unique identifier of the chat object, if the insert-chat formulas of several different cells have the same GUID parameter, a message object added to the chat object embedded in one cell may show in the list of message objects of the chat object embedded in the other cells, since the embedded chat objects of these cells are all the same chat object.

There are several External Supplementary Data systems possible. The two described above are merely examples of the approach, and many of the features described for one of the above examples are applicable to the other example.

According to another aspect, a video chat module may also or alternatively be used. A video chat object may be created by entering an insert-video-chat formula function, called WEBIFIERVIDEOCHAT, which is a custom formula function defined by the webifier system. To enter this function into a cell, the user may be required to have permissions to set the formula for that cell. This can be done in various ways, including through a webifier API call that allows it or through the spreadsheet tool with the webifier Add-On installed.

To create a video chat object in a cell, the designer may set the cell's formula to the insert-video chat function with no parameters (e.g., '=WEBIFIERVIDEOCHAT( )'), to the insert-video-chat function with a standard hyphen-separated string representation of a Globally Unique Identifier (GUID) as the only parameter (e.g. '=WEB IFIERVIDEOCHAT ("GC40FCA2-D73A-4AFD-80E4-76782B47D960")'), or to a formula that that is evaluated to a unique identifier whether or not the identified is a GUID or a string such as "Pleasant Solutions" which would represent a video chat related to the record for that company. Several cells, on different sheets or the same sheet, may pass the same parameter to WEBIFIERVIDEOCHAT, allowing several destination pages or locations within the pages to refer to the same video chat. In some aspects, a WEBIFIERVIDEOCHAT function may also require as input at design time a destination to connect to upon initiation of the video chat by the end user.

When generating a destination page, the webifier logic may then include, incorporate, or reference a video chat module on the web page which, when activated by a user, establishes a video chat between the end user and a predefined endpoint, e.g., the destination identified by the designer at design time. Video chat modules are readily available, e.g., Drupal Video Chat, AVChat, Big Blue Button, etc.

Effects of Visitor Input

The following describes the process and effects of visitor input on the destination system, in one illustrative use case scenario. When the Insert page form generated by the webifier system is submitted by a visitor, the destination system may first confirm that the Page is public or that the user has been give the appropriate permission to use it. If the user is permitted, the destination system will retrieve the spreadsheet definition associated with the App containing the Page and start the insert process. If the user is not permitted to use the Insert Page, their submission may be discarded and the system may notify the user.

Before inserting the record into the spreadsheet definition, date, time and GPS coordinate data may be converted to string representations that are appropriate for spreadsheet tools, and uploaded external supplementary files may be represented by a formula that references the WEBIFIERIN-SERTFILE function. When viewed in a spreadsheet tool, the function may return a key that can be used to retrieve the file from the destination system at a later time with the WEBI-FIERFILEATTRIBUTES function.

Once all the data is in an appropriate format to be saved, the destination system will find the row or column immediately after the source range or the next empty row or column if the entire worksheet is being used as the source and inserts the new data into the spreadsheet. At this point the spreadsheet definition validations may be evaluated, followed by validations that have been created in the destination system separately. If any of the validations fail, the user may be notified and given a chance to correct their submission. If any rows or columns containing Webifier formulas are present in the range, they may be auto-filled with the appropriate formula even if they have been hidden by the Overlay Sheet.

After the data has been successfully inserted, all references to the range of cells constituting the data set which the new data was inserted into will need to be updated. This may include the source of the Page if is a named range, the sort and filter ranges saved in the Overlay Sheet, and any Chart Series that display the range of data that was extended. Once all the updates are complete, the modified spreadsheet may be saved back to the database along with any newly uploaded files. The ranges are converted to the R1C1 string format so that they can be parsed to get a numerical representation of which rows and columns are currently included. The range values are then incremented by one row for a row insert or one column for a column insert, converted back to the R1C1 string and saved back to the spreadsheet.

The destination system updates any Page thumbnails to be shown in the destination system admin pages or within the Add-On, dependent on the data from the Insert Page and Raises the Insert and Page Changed events used by the Notification system to send email alerts. If there is a 'Next Page' configured for the Insert Page, the user will be redirected to it.

Dynamic Page Selection

As described herein, multiple templates and multiple pages can exist for the same records and for a similar or the same purpose, concurrently. The purpose can be any purpose or page type, including both read only and visitor input pages. The destination system may utilize information from the browser or mobile client to help determine which template to display, according to an illustrative embodiment. For example, the information may include any number of device attributes or capabilities such as screen size, screen resolution, OS version, browser brand and version, manually specified preferences from the visitor as to which set of templates are preferred, and whether it is primarily a mouse, keyboard, or touch screen device. In the case of a web app, much of this information can be obtained from the http "User Agent" header or by having JavaScript execute on the browser that transfers in-band or out-of-band to the destination server this information that is stored as session information temporarily by the web server. In the case of a mobile app, the app can be designed to collect and transmit this information upon first login authentication to the destination system.

The designer may specify a set of rules on the pages to specify what criteria each page requires to become accessible to the visitor, as well as a fall-back default. The destination system may allow the designer to group such pages as a way of indicating they have a common purpose, to achieve a single URL or page identifier and have requests to that single location trigger destination system selection of which template to choose. In the case of such grouping, the destination system would have the ability for the designer to order the list along with the rules so the system know the priority order of each page, with the last one being default.

Gamification of Creating Sheet-Software

The building of complex software using sheets, as described herein, is far easier for non-technical individuals than by other means. Nonetheless, the webifier system and/or Add-On (plugin) may watch for various actions or groups of actions on the part of a designer that can be considered achievements, according to an illustrative embodiment. If those actions meet various criteria, a visual popup may be displayed briefly to the designer to indicate they have reached an achievement (FIG. 15). The popup may relay the value of what they have just created, such as "Your web-app is now ready to receive new records" or "You are done making your first web-app report". The criteria can include a multitude of criteria such as being only one of the first 2 times the designer has taken those actions, the designer not having completed such an action in the past few months, a visitor has also visited the destination page related to the designer's actions, the user has completed some actions in less time than the previous time such steps were timed, or the user has tried a different workflow or different way of accomplishing something. The actions may involve not only interactions with the destination system's or Add-On's user interface, or that of visitor's associated with the destination pages the designer creates, but it may also be based on analysis of the designer's spreadsheets. For example, the gamification system may look at whether the designer has created a traditional spreadsheet table, whether they used traditional conditional formatting on their template sheets, or even whether they used basic aggregation functions in a formula like "=SUM(A1:A10)".

The designer may have points, or several types of points, associated with their user account that get incremented based on these achievements. Accumulating sufficient points over time may allow the designer to make use of new features within the destination system or Add-On. Various actions or levels of points may trigger the destination system's or Add-On's user interface to be modified to "advanced mode". This may involve adding additional controls, removal of hint labels, changing controls for more complex ones such as a text box with validation rather than a dropdown, or changing its workflow by changing the ordering of pages and location of buttons that the designer will be presented such that it allows for more rapid sheet-software development. Reaching certain point levels may also change the licensing permission rules surrounding the use of the webifier, for example to allow a great number of visitors, either anonymous or with user accounts created, to access destination pages created by the designer.

Notifications

In the destination system, notification rules provide a facility whereby the occurrence of certain events can trigger specified actions (FIG. 83), according to an illustrative embodiment. Regular users can set up notifications for themselves. Administrative or designer users can set up notifications themselves and for users within their administrative domain. To handle multiple events and/or perform multiple actions, a user may set up multiple notifications. The setup of each notification rule requires the user to specify details about the event which should trigger the notification and details about the action which should be performed when the notification is triggered (FIG. 84). A notification rule can be disabled while preserving all its other details so that when it needs to be re-enabled, it can be without having to re-enter the settings.

A notification can be triggered when an event is propagated to the server, based on operations wholly inside the spreadsheet tool Add-On/plugin or the web browser could trigger notification requests sent to the server, but might not until the action itself has been propagated or persisted to the server. Example events include when data is inserted into a page, when data on a page is edited, when the configuration of a page is changed, and when the configuration of an app is changed. For clarity, example events can be in the category of visitor high level-event triggered (insert page's submit button pushed), designer high level events (new page created), cell-event triggered (a cell has changed), region-event triggered (at least one cell within a group of cells has changed), sheet-event triggered, and can be both direct (a cell's formula changed) or indirect (the result of a cell's formula has changed even though the cell formula itself has not). When such actions occur, the action may raise a domain event corresponding to that action.

The same domain events that may be used for notifications may also serve as the basis of a logging facility. Administrators may choose to log more events than people are interested in being notified about, such as all CRUD (create, read, update, delete) operations concerning sheet data, page configuration, or app configuration, and events such as refused accesses. These logs may be sorted, filtered, or used for statistical analysis. The destination system contains a notification service that handles these events.

The webifier services may filter the list of notification rules to the ones that are currently enabled, whose settings specify that they should be triggered by the type of event matching the action that occurred and the particular page or app on which the action was performed. For each such notification rule, the destination system carries out the actions specified by the rule. Possible actions include email action and the webhook action (one notification rule may specify more than one action), as further described below.

To carry out the email action, the destination system may first determine whether email should be sent for that rule. If it should not, it does not proceed with the rest of the email action steps. If an email should be sent, the system uses the template specified by the rule to build the various parts (subject, body, etc.) of an email message, substituting information about the event into any corresponding placeholders that might be present. If the event specifies a destination page and the rule specifies that a PDF copy of the page should be sent with the email, it may generate a PDF copy of the associated page and add it as an attachment to the email message. Alternatively, the destination page html may be embedded into the email, including any insert or edit forms that the page contains. The HTML may or may not have modifications to account for its viewing within an HTML capable email client, such as removal of page navigation menus, removal of background images, removal of JavaScript references, or using more standard and simplified controls for input fields rather than specialized ones, such as a standard text box rather than a popup calendar to select a date. Submitting the embedded form would result in an http post request to the destination system. The URL of the post request may differ from the same destination page when rendered without embedding into an email, and may trigger different user authentication whereby login is not required because an authorization token is embedded in the form and the http post, or different data validation rules which may take into account the input controls being more unpredictable freeform input. The webifier then sends the message to the email recipients listed in the rule.

The content of the email can be specified in an email template form, which includes options for subject line, WYSIWYG editing of a rich text template, a fallback for email systems that don't handle HTML, multiple recipients (including cc and bcc), reply-to, and attachments (FIG. 85). Alternatively, commercially available email templating modules may be used. Additionally, the email content itself could be specified using a sheet template where the destination system would output in HTML format as it does for destination pages, but also would output in a fallback, simplified, text-only format for email clients that don't handle HTML.

To carry out the webhook action, the destination system may first determine whether a webhook should be called for that rule. If it should not, it does not proceed with the rest of the webhook action steps. If it should, it sends an HTTP POST request to the webhook URL specified by the rule, with information about the event sent in the body of the POST request. Webhook information may be, but is not limited to, JSON format.

All notification operations may go into a queue and may be processed asynchronously so that the event that triggered an action can carry on, and the user who triggered it can proceed to perform other functions on the system, even if the email or webhook action fails or takes an extended time to complete. Because they are asynchronous, notifications can also be stored for batch processing (for instance, a user may prefer to receive a daily or weekly digest of all events, rather than a continuous stream of notifications).

Procedural Actions

Possible actions on a notification event (e.g., with respect to buttons and notifications described above, among others) may include the procedural action of inserting, deleting, and setting values on cells on any kind of sheet (such as record sheets, template sheets, virtual sheets, transient sheets, configuration sheets, and all other types of sheets within the webifier). The specifics of these procedural actions may be declared with a syntax similar to a traditional declarative spreadsheet formula as in "=SetValues(source, destination, params)", nested within other traditional formula functions as in "=IF(A1=100, SetValues(A1:A2, B1:B2, false)", and/or syntax common to procedural programming as in "dest=source". The source and/or destination may be a mix of an entire sheet, a sheet range including named ranges, a formula which references other sheet data, or a reference to controls on an insert page which would have the same effect as referencing the underlying cells that would be affected by that insert page control. In the case of the source, it may also be static values such as 1, "hello", or 1+1. If the source is a static value while the destination is a range, the static value may be set for each cell in the destination range. When inserting values, parameters to the procedural function SetValues may specify whether to overwrite existing values, insert and shift down existing values, insert and shift left, and the like. The procedural function DeleteValues may specify whether to delete and shift up, delete and shift left, leave empty, and the like. Parameters may also specify whether any formulas within the source cells should be resolved to values, which may be referred to as copy as value, or whether the destination copy should retain the formula definitions of the source cells, which may be referred to as copy by formula.

Possible actions on a notification event also include more complex procedures, such as looping or complex conditionals, which can be specified by the designer using VBA script syntax familiar to spreadsheet users, with procedural programming languages such as C #, and/or a variety of common or custom scripting languages. For example, a designer may associate the following code with the insert event of a sheet named VentureCapital: "for(int x=0; x<10; x++) {SetValues(Offset(DepartmentSizes !A1, x, 0), Offset(Dep artmentS izes !A1, x, 0)*2, SetValueParams.Overwrite|SetValueParams.CopyByValues);}". As new venture capital records are inserted, the associated action would double the department size values in A1 thru A10, and if any of the cells originally had formulas, they would have instead a simple numeric value afterwards. The webifier may limit the script's execution time, limit features or functions available, and take other security measures typical to systems that allow scripting logic. The webifier may execute the scripts only on the destination system, and may avoid and/or preclude execution of scripts within the Excel Add-On. The webifier may allow the scripts a number of capabilities such as accessing metadata of the sheets, modifying off-sheet webifier data like page options, sending web HTTPS requests, performing API calls, connecting to SQL database to perform SQL queries, and/or triggering other webifier notification event actions such as sending an email (e.g., by executing script functions such as ExecEvent(guid)). The changing of sheets with these procedural actions may in turn indirectly trigger additional notifications due to events previously associated with such changes.

Possible other triggers for notification events include date or time rollovers, such as midnight or an interval specified by the designer in the form of a cron expression, or a button click where a button is defined in a cell with the formula "=ButtonEvent(buttonLabelText, wait or queue)" and wait or queue specifies to the destination system whether a visitor clicking the button should be made to wait for the associated events to all complete execution or whether the event should be queued and the visitor should be allowed to continue using the webifier in the meantime. The notification event list would uniquely identify which specific button is referred to, by the cell location it is found in, such as "Button Labelled Reset at FirstSheet!A1".

Immutability

Users of the webifier may desire building an app where some data is declared using spreadsheet formulas, but where the data does not change after initially being created or is frozen after some point in the future, which may collectively be referred to as immutability.

Immutability may be achieved by the webifier's procedural capabilities already described. For example, a designer may create an invoice row-record sheet InvRecords and associated invoice insert template and details-report template. The row-record sheet may have several columns that are composed of calculated formulas such as tax and total calculations, and the tax formulas may reference a single value on a second sheet named GlobalVariables which is set to the static 6%. In order to allow the tax rate to be updated to 4%, without changing the taxes and totals of all of the historic invoices, the designer may have a notification event setup to be triggered by the insert page executing which executes a script with "SetValues(InvRecords, InvRecords, SetValueParams.CopyByValues|SetValueParams.Overwrite)" or the simplified equivalent "FreezeValues(InvRecords)". The result is that every time any invoice is inserted, all formulas from past invoices would resolve to static values due to the CopyByValues parameter, including those cells with formulas that were not directly visible or editable on either template.

The ability to combine spreadsheet representations of records with inputting of records using a user interface template and an event model with procedural sheet change capability, allows the webifier to be used effectively in a significant number of additional scenarios and with flexibility that is greater than the sum of these parts, such that fewer separate workflows and functionalities are required. Nevertheless, the webifier may provide an alternate method of specifying immutability using a "make values immutable" page option on insert or edit pages, which would resolve all formulas to static values after the visitor has submitted data using that page.

Mobile Considerations

The destination system is preferably responsive and fully compatible across all device platforms and integrates with several standard browser features such as HTML and file transfer, according to an illustrative embodiment. The destination system may also be integrated directly into a native app through standard web-service API access methods to the destination system, such that data contained within the destination system is accessed by the user in a native app experience. The presentation of data in such a method is enabled by the destination system through additional coding in a native SDK environment or other development framework, for example Android Studio, Apple Xcode, Xamarin, or Cordova.

Further, the destination system may integrate with mobile devices through the use of webviews for accessing functions and displaying data. This can access the destination pages in entirety within the app or can be used to display smaller segments of data or access specific functions.

The destination system may execute fully interactive modules and other code fragments (which may be scripted or compiled) that allow for all of the inclusion of destination system elements on other pages. For example, the destination system may support HTML iframe elements to display any of the page types on a 3rd party hosted website.

The destination system may also operate in a mode whereby file uploads are accepted from a cloud-based file storage app that may or may not be running on the same mobile device. This transfer may be accomplished by direct file access or through an internet accessible API.

Although the descriptions throughout this document refer to web-pages and browsers, they are largely unchanged in the case of mobile end-points such as above being a substitute for browser. Illustrative changes may be summarized as first having an app installed on the mobile device which is designed and built to operate in a way fairly similar to a web browser, whether it is done largely as a browser for a page or many requests getting many pieces that are put together with some user interface elements that make it consistent for the mobile platform. A second change, the destination system server may in some cases generate a different output format rather than the CSS and HTML for the resultant destination page, using one of the multitude of formats and methods typical to the software development industry. Lastly, the mobile app may have a few hard-coded user interface elements, such as a menu of pages, that may be specific and consistent for the mobile platform, as opposed to an HTML menu. Such hard-coded user interface elements may be a combination of web-service API calls to fetch data lists and hard-coded user interface code within the mobile app to process those data lists.

Auto-Conversion to Flow Layout

Many devices, such as mobile phones, have small screens of a wide variety of resolutions. Modern flow-based layouts can improve the user experience in such cases. The webifier may use a variety of methods to fully or partially convert template sheet to a flow layout to optimize the visitor experience and/or use of screen space whether the visitor is using a browser, a native mobile application, or otherwise.

In generating a page based on a template, the webifier may analyze the template formatting, template content, template usage, content of the data source of the template, data source usage, and even the other templates associated with the data source, in order to determine how to convert to a flow layout. Converting to a flow layout may involve identifying optimal modifications to the layout, such as cells to wrap a particular row on, modifications to spacing, additions of formatting such as borders or background colors to aid with visual grouping, and/or modifications to the width of cells. The webifier may analyze a number of factors, such as those described below, and combine use of them in a variety of methods to determine the modifications to the layout. For example, the webifier may weigh each factor by a static value of that factor's importance and the factor with the most importance will determine the most important modification, count the number of factors in favor of each modification, do a weighed sum of the factors in favor of each modification, or a number of other approaches that will be readily apparent to those skilled in the area.

The webifier may have affinity towards wrapping on an empty cell rather than between two cells that have no empty column between them. In this case, much like word wrapping typically skips rendering whitespace at the end of a line when wrapping to a new text line, the empty cell might not be rendered. The webifier may have greater affinity, for all or most rows, towards wrapping on a column that is entirely empty. When a row of the template is wrapped, webifier may increase the vertical spacing before or after that row, such that the visitor can more readily identify the group of rendered rows as a single template row or, in the case a template row represents a single record, as a single record. The webifier may then also increase the vertical space between all other template rows to provide consistency. Alternatively, the webifier may identify a vertical section, for example, by locating the first lower or higher template rows around the wrapped template row which are entirely empty, and only increase the vertical space between template rows within that section; allowing for a balance between consistency for clarity and efficient use of space especially in templates with many sections. The webifier may analyze the template content as well as formatting and determine that a number of rows are very similar and may identify it as a vertical section and may further have affinity towards wrapping on the same column for all rows within that section. The webifier may analyze borders to identify vertical or horizontal sections; for example, if a border is around 3 horizontally adjacent cells, webifier may have affinity towards not wrapping between them and may increase the vertical space before and/or after those cells. The webifier may determine that a template row have one or more empty cells to the left starting from the first column, and may skip rendering those empty cells so that the first cells with content on that row will render closer to the left edge of the screen. The webifier may determine that several rows are within a vertical section and have differing numbers of empty cells to the left of the content, and may skip an equal number of empty cells to the left for all rows in that section.

The webifier may analyze the metadata for a data source, such as a record sheet, to help with the automatic conversion to a flow layout. For example, if a template has two cells and one cell references record sheet column A, the second cell references record sheet column B which has a formula such as "=A*2", whereas the third cell references a record sheet column C which has no formula references to A nor B, then webifier may have affinity to breaking between the second and third cells so that the first and second cells are visually more grouped.

The webifier may determine that a template's data source is used by a second template which has additional information which may be analyzed to determine the optimal way to render a flow layout. For example, a ReportInvoice template may have a data source of "InvoiceRecords", which is also used by an "InsertInvoice" insert template. The webifier may determine that InsertInvoice has a number of empty rows and borders around cells that reference InvoiceRecord's column D and column L data. Even if on the ReportInvoice being rendered there are no indications, such as borders or empty rows, that the cells that reference the same InvoiceRecords' columns D and L are closely related, the webifier may have affinity towards not wrapping between them or otherwise visually grouping them. The webifier may treat a region of cells with a different background or text color compared to surrounding cells, in the same way as borders.

Defining Relationships

In some demanding usage scenarios, a designer may desire to have a primary set of records in a record sheet as well as one or many "secondary records" in another sheet for each primary record, where the designer intends to identify secondary records as belonging to a primary record by way of a "primary key", as in the traditional database software sense, of the primary set of records, according to an illustrative embodiment. In short, the designer may intend to have relationships expressed between the record sets in order to have template sheets populated with not only primary record data but also secondary record data. For example, one record sheet may have columns "company ID" and "company name", and one row having "1" and "Pleasant Solutions" for values. A second record sheet may have columns "company ID" and "specialization", and one row having "1" and "Software Development Consultants". If the designer wishes to display a details page based on a template sheet that makes mention of both "Pleasant Solutions" and "Software Development Consultants", the webifier system supports such use, according to an illustrative embodiment.

For example, the destination system could request, in an advanced mode or section, that the designer select a column or row on one sheet and another on another sheet, to indicate a primary key relationship between them as a primary and secondary record set. Alternatively, the specification of this relationship could be done in a Configuration Sheet. Afterwards, the destination system may allow the designer to specify in the source input controls not only one range or sheet, but a list of them; or the destination system can have the additional inputs automatically implied based on the first range or sheet specified and the primary key relationships that tie it to secondary sheets. The methods described elsewhere for referencing record data from within template sheets may at that point be applicable. The designer may use a cell formula reference to either of the record sheets and, by parsing that formula reference, it would be clear whether it was the primary or secondary record set that the designer was intending to obtain data from. The destination system populating with the referenced data from the secondary record set would be done in the same fashion as populating from the primary record set.

Library of "App Templates"

Entire App Templates including predesigned and/or pre-configured spreadsheet definitions, with or without additional information from the destination system such as the list of pages and their sharing permissions, may be available from a community of designers to other designer users to copy and use as a starting point for their own web-app (FIG. 22), according to an illustrative embodiment. These could be listed separately and searchable by purpose, category, industry, or smart searching based on the page types within the app, column names on the record sheets, keywords from any cell content, cell format such as date fields being present, as well as association to what designers are using that App Template web-app or what industry the employers of designers are in.

The smart searching could also check if any other App Templates have been used from the same other designers, to associate the two designers as more similar. Alternatively, the destination system could compare a set of multiple spreadsheet definitions for one designer to that of another, based on presence of keywords from cell content or any of the search parameters noted above, to determine the level of similarity between the two designers. The search could then order the search results based on one or more of the above factors, frequency of the factors occurring, and the importance of the factors. The system could then make use of common commercially known techniques and commercially available libraries for optimizing the search experience for the user.

Add-on Integration and Communication

The plugin or Add-On within the spreadsheet tool may communicate with the destination system server and display its user interface in a number of ways typical to the software development industry for a client-server application model. For example, some of the diagrams illustrate the result of the Add-On using web-service API calls the destination system to obtain a predominantly HTML interface, a traditional webpage, and illustratively shows the web page in a frame that operates like an embedded browser window. This allows for many of the Add-On user interface elements to be reused and to be largely consistent with their respective counter-parts on the destination system's admin pages for designers who do not have the Add-On installed. Some functionality within the Add-On, such as the ability to use a mouse to select a range of cells, may be limited, removed, or altered in order to limit the designer to typing in ranges or, alternatively, may be performed on an embedded spreadsheet tool with the destination system admin pages. For brevity, attached figures representing Add-On user interface or destination system admin pages, should be assumed to have their respective counter-parts even if not attached.

The integration of the Add-On to the spreadsheet tool may vary depending on the spreadsheet tool into which the plugin is integrated. For example, integration with Excel may be done using Excel's COM Interop library (development usage documentation publicly available at https://msdn.microsoft.com/en-us/library/microsoft.office.interop.excel (v=office. 15).aspx) or the JavaScript API for Office (development usage documentation publicly available at https://dev.office.com/docs/add-ins/develop/understanding-the-javascript-api-for-office). Cloud based spreadsheet tools such as Google Sheets may be integrated with using web services, such as the Google Sheets API (development usage documentation publicly available at https://developers.google.com/sheets/) which has readily accessible and understandable web-service API functions, such as retrieval of sheet ranges using "spreadsheets.get(ranges, includeGridData)".

If allowed by the spreadsheet tool's integration facilities, the system can integrate to the right click menu, for areas such as the cells or the sheet tabs, to allow a modified process of the user indicating their intent to perform an action related to the item such as adding a page. For example, instead of choosing to add a page and then specifying a source, the user could right click on a group of cells and select "add page", whereby the add page screen would already know the source being intended and would not need to prompt the user for that information (FIG. 14).

Additional Designer Navigation

The webifier may operate with a large number of sheets and may simultaneously act on many types of sheets, and thus additional organization and navigation of sheets may be beneficial to the designer. The webifier may have a destination system with an embedded spreadsheet tool and may also have an Add-On integrated with an external spreadsheet tool. The below aspects may be applied similarly to either.

Spreadsheet tools commonly have a single row of tabs where each tab represents a single sheet within a workbook. The webifier may group tabs automatically by their type; for example with autogen sheets, virtual sheets, and/or designer-built sheets each grouped together, and may group based on sub-types such as virtual template sheets and virtual record sheets, or autogen record sheets unmodified by the user and autogen record sheets modified by the user. The webifier may record metadata for each sheet indicating how the sheet was first created to aid with ongoing grouping. Changes to the sheets may result in a tab moving from one group to another, such as a user modifying a sheet in the "autogen record sheets unmodified by the user" group. The tab groupings can be done in a familiar menu style where only the group name appears, but by clicking on the group name a list of sub-groups or list of sheets appears. The webifier may automatically color code and/or otherwise change the appearance of tabs based on the type of sheet or group it represents.

When a designer is in the process of inputting a formula into a cell, spreadsheet tools typically allow the user to select a range of cells by clicking on the cells as opposed to typing out a range definition, and the tool may allow the user to click on another sheet's tab, select one or more cells from that sheet, and still retain focus on the cell formula text being input such that the selected range is automatically typed into the formula. Similarly, the webifier may allow clicking on the tab as well as the group and sub-group without losing focus. When a specific sheet within a group or sub-group is clicked and that sheet becomes visible, webifier may also temporarily move or duplicate the sheet's tab to be at the top-level of the tabs alongside the groups. The webifier may move back or remove the sheet's top-level tab after the user selects a different sheet, or may keep the tab as a recently used tab until a limit on the number of recent tabs to show as top-level has been reached, at which time the top-level tab used least recently would be removed.

There are typically numerous possible autogen and/or virtual sheets that could be made available to the designer, but which may not have been accessed yet. For example, a different virtual row-record sheet could be created for each different region of cells selected as the basis. In such cases, one tab under the group may be dynamic and result in a dialog requesting additional information from the designer as to what sheet is intended, such as what region of cells it is based on. Once selected, that sheet would show up as a recently accessed virtual sheet directly, without having to provide input into a dialog again, and if the designer was in the process of typing a formula then the focus would have been retained and the designer can proceed to select a region from the sheet without indicating to the tool that formula editing is being continued.

Tight Integration with a Spreadsheet Tool

The webifier need not be a separate application from the spreadsheet tool and it need not be limited to communication with the spreadsheet tool via means made accessible to external applications. The webifier may instead have a tight relationship whereby it may have a deeper and/or more back-end based integration and communication channel with the spreadsheet tool. This also may be referred to herein as "tight integration."

According to some embodiments, the spreadsheet tool may be a web-based spreadsheet system with a spreadsheet control that is embedded within the destination system server's pages and that allows editing the spreadsheet definition in any familiar manner of traditional spreadsheets tools when the designer visits the destination system's admin pages. Alternatively, the reverse is possible, whereby webifier may be a control that is embedded within a cloud spreadsheet tool's web interface. In either case, the user interface presented to the designer is able to be even more tightly integrated and streamlined for the designer than that of a spreadsheet tool being a separate application which allows limited integration points. For example, navigating with the browser would have a unified history of both spreadsheet and destination system URLs, and the menus may be organized such that both spreadsheet tool menu links and destination system menu links are grouped in logical groups rather than being partly separated by application boundaries.

Whether or not the user interface is implemented to be more tightly integrated as noted above, the data transfer, synchronization, and other back-end processes between the spreadsheet tool and the webifier may or may not have tight integration as well. For example, rather than web-service API calls, webifier may use, in part or as a complete replacement for web-service API calls, function calls to a DLL library of the spreadsheet tool, or conversely, the spreadsheet tool may use common functions calls to a DLL library of webifier. This may provide performance advantages for the webifier as well as allow integration to make use of additional programming techniques, known to those skilled in the art, such as shared memory access, low-level coordination objects such as mutexes and semaphores, accessing shared files, shared access to underlying data-bases, and shared use of DLL libraries. Such flexibility can, for example, be advantageous for real-time change notifi-cations between the two components, where the two com-ponents refer to webifier and the spreadsheet tool.

Alternatively, the tight integration may allow webifier more direct access to the underlying database data of the web-based spreadsheet tool, or conversely, allowing the web-based spreadsheet tool more direct access to the under-lying database data of the webifier, or having an entirely shared database with a design schema designed specifically to allow the data of each component to reference the data of the other directly such as by way of database foreign keys referenced from one component's database table to another component's database table or having data for one compo-nent in a column on the same database table as a column containing the data from the other component. The direct access may provide significant performance advantages and may reduce implementation complexity. For example, the tight integration may allow a single SQL query to confirm whether a destination page's record data has changed, and where the query is evaluated efficiently within the database. An example of such a query may involve joining a database table pertaining to the definition of a destination page's source data, to a database table which has a change log of the specific cells within a spreadsheet that have changed. With-out this tight integration at the database level, the webifier system might, for example, fetch large amounts of cell data from a spreadsheet tool's web-service API which in turn might have the web-based spreadsheet tool fetch the data from its database; compare it cell data obtained earlier by fetching that from the webifier database, and map back the list of cells that have changed to all of the destination page's that make use of a cell reference to that page.

Additionally, rather than the webifier and spreadsheet tool communicating in a schema common for spreadsheet defi-nitions, the tight integration may use an entirely different schema for database data, where the schema is more efficient for one or both components to process. For example, a typical spreadsheet definition may have XML data organized by sheets, with all the cells for that sheet nested within each sheet's definition, and with the various cell attributes such as formatting and formulas and values nested within each cell's XML definition. With tight integration at the database level, the example may be non-XML and may have database records that are normalized rather than nested, such as a database table having the columns "sheetId", "rowId", "col-umnId", and "cellContents" where the ID's refer to other database tables. Further, the database schema need not even have cell contents grouped together. The cell contents may instead be divided such that one database table has all of the cell formatting, a different database table has the cell for-mulas, and a third database table has the cell's cached values from evaluated the formulas. Further, the cells might not need to be organized in rows and columns because the database schema may have one or more database tables with a list of "units", defined simply by a unique ID and the formula, and the schema may also have a separate table or tables that allow the units to be mapped back as rows and columns in select situations such as when the data is to be presented to the designer as a familiar spreadsheet or the designer is interacting with the data temporarily in spread-sheet form.

The tight integration may also allow the destination system and spreadsheet tool to not only reside on the same single server or group of servers, but also to coordinate the most effective use of distributed cloud computing processes. For example, if an additional distributed server needs to be spun up to support an increased load, the additional server may be delegated all designer and visitor requests relating to a specific web-app and may be provided with an instance of both components along with all data for that particular web-app. Such delegation across web-app boundaries would allow the additional server to remain an efficient unit in regards to the web-app, with minimum transfer required to other servers. In contrast, without tight integration, it becomes more complicated to ensure a particular server hosting a web-app and the associated webifier instance, is the same server or even geographically near the server hosting the spreadsheet tool for the same web-app; therefore the communication between the components is either more complicated or is less efficient.

Overall, with tight integration, the spreadsheet tool and the webifier do not need to be separate applications, the communication between the two does not need to be in the form of a spreadsheet definition nor through APIs, the storage of the data need not be in spreadsheet definition form, but the designer is nonetheless able to manipulate the records and/or the UI templates while they are represented in the user interface in spreadsheet form, and the visitor is still able to interact with the data from destination pages not in spreadsheet form.

FIG. 3B shows an illustrative software architecture using tight integration as described above. In FIG. 3B, the com-bined Tight System 450 comprises the spreadsheet tool logic 452 and the webifier logic 453, both sharing a common memory 451 and both of which are integrated with com-munication mechanisms 410, shared libraries, and the like.

As further illustrated by FIG. 3B, a designer may create or make record sheet and template sheet changes to one or more worksheets using a browser 454 and the data changes are transferred 401*a* as http post requests with either a partial spreadsheet definition or as change events, to the Tight System's spreadsheet logic 452. The spreadsheet logic 452 may convert the data to an alternate "Efficient Format" before storing 402 the designer's changes, or may store the data in a native spreadsheet format. The designer may create or make changes to destination page configuration using the same or a different browser 455, which get transferred 401*b* to the webifier logic controller 453 as http post requests, and afterwards get stored 402 in memory 451.

Responsive to an http get request 403*b* from a visitor's browser 456 to the webifier logic 453 to provide a destination page, the webifier logic 453 retrieves 404 the required data from memory 451. The webifier logic may convert data into an html destination page by evaluated and referencing values and formatting from the template sheet and evaluating and referencing values from the record sheet identified based on the template sheets. The destination page may be sent 405*b* to the visitor's browser 456. As FIG. 3B illustrates, the visitor sees a page having text labels found only in the template sheet and not in the record sheet, text labels originating from RecordSheet!A1, values of "100" from evaluating RecordSheet!C2, and html input controls defined by the template sheet with values from the RecordSheet, RecordSheet!A2 for the checkbox and RecordSheet!B2 for the textbox. FIG. 3B further illustrates the ability of a visitor to check the checkbox and submit in the browser 456 resulting in the browser sending an http post request 406*b* to the webifier logic controller 454. The webifier logic 453 processes the post request and updates the memory 451 with new data, optionally storing the Efficient Format or whatever format the system uses. If the designer's browser 454 still has an active session, the spreadsheet logic controller 452 may obtain the updated data 408 from memory 451, or alternatively through integrated communication mechanisms 410, and convert the data into one or more spreadsheet definitions or change events sufficient to update the spreadsheet definition presented in the designer browser 454, and sends 409 them to the designer's browser 409 such that the designer's worksheet would then display "true" in cell A2.

As further illustrated by FIG. 3B, a web-service API call 403*m* from a visitor's mobile device 457 running a mobile application (e.g., as opposed to a browser), may be a substitute for an http get request 403*b*. In this case, the webifier logic 453 may send 405*m* the mobile application a response to the web-service API call, potentially in XML format, which is processed by the mobile application together with device or operating system specific design information, to generate an interface for the visitor. As in this example, the mobile device's 457 rendering of the destination page may differ from the visitor browser's 456 rendering of the destination page in terms of having a different layout, different control types, and/or absence of some record data. FIG. 3B illustrates the ability of a visitor to also change the textbox value to true and clicking submit on the mobile device 457 resulting in the mobile application sending a web-service API call 406*m* to the Webifier logic controller 453. The Webifier logic 453 processes the data received from by the web-service and updates the memory 451 with new data. The remaining steps may be similar to those resulting from the visitor browser. As illustrated by FIG. 3B, the destination page may be sent 405*m* to the visitor's mobile device 457 running a mobile application (e.g., as opposed to a browser), or may be served to a browser executing on the mobile device, but altering the appearance of the destination page based on one or more characteristics of the mobile device (e.g., screen size, hardware functionality, etc.).

Other Features

The system can use the same methods of template sheets as a "list item template". For example, a page type of "list" could be created, where the inputs and outputs would be identical to the "details" page type except that instead of requiring the user to select a row to view its details, all row-records would be displayed one after another in a list form where each record on the list is displayed according to the item template. This, for example, allows for a row-record list to be displayed to visitors where several rows of information are needed per record but not enough to warrant a full details page or because navigating to a details page repeatedly is undesirable.

Throughout the interface, the designer may be presented with thumbnails depicting what the destination pages will look like to visitors. The thumbnails may be inline in the user interface (e.g., as shown in FIG. 28) and/or be depicted as a popup upon hover over portions of the screen or specific controls (e.g., as shown in FIG. 11). As illustrated in many of the figures included herein (including at least FIGS. 28 and 11), the thumbnails may depict the destination page result from the figure's depicted spreadsheet definition.

Page types can have auto-refresh options, specified in a period of time, that would automatically have the client application or browser refresh that destination page periodically for visitors (FIG. 48), according to some aspects. Alternatively, the same approach for notification and logging can be used to push notify open client sessions that a page or portion of a page has new information and either the notification would provide the client the necessary information to update the page or the client would send a new request to refresh the page. The use of either approach may benefit a usage scenario of unmanned wall dashboards, such as those powered by browsers that can visit a webpage and honor the refresh requests such that new information is always visible without viewer interactivity.

The destination system's permission system may also have rules to limit designer permissions, rather than just visitor or page permissions, according to some aspects. Designer permissions may include access types such as read-only, read and share, or read and share and update, (FIG. 21) with a per-app, per-sheet, or per-page level of granularity. For example, read-only permissions on app ExampleApp would disallow the designer from modifying the spreadsheet definition for any sheets used within ExampleApp, disallow changes to page configuration for pages within ExampleApp, but allow the designer to view the spreadsheet definitions as well as their underlying formulas and settings.

The destination system can support, as do many spreadsheet tools, cell formatting that make one or more cells a clickable hyperlink to a specified URL, according to some aspects. This can be done using an attribute on the cell text that specifies the URL, where the presence of the URL may imply other formatting changes such as underlining and a blue color.

The webifier may allow a designer to provide a list of data sheets and/or regions and specify security permissions on them, similar to the security permissions on pages. The webifier may then use these rules as a second layer of security in addition to the per-page security. The webifier may then block access to entire pages or parts of a page if requests for those pages result in disallowed access to the underlying data. The webifier may log the access violations and/or send notifications to administrators or designers.

The webifier may detect that a nested template is nested to the second degree. The webifier may display any such second degree nested template, within a popup, such that clicking on the area that the most deeply nested template was specified to be embedded in, will bring up a popup for that most deeply nested template. For example, if an invoice template had a nested template of an Invoice item, and the Invoice item template had a deeper nested template of a history of the past purchases of that invoice item which may not be feasible to display in the space allocated to the history template invoice item template, webifier may automatically display an invoice page with invoice items where clicking on part of the invoice item will pull up the popup history. A similar example of deeply nested input formats would apply, where the most deeply nested template may utilize popups to provide second degree input details.

As noted earlier, the webifier may allow a designer to specify permissions of various granularity for other designers to modify an app. The webifier may also allow a designer to specify permissions of various granularity for visitors to be able to provide formulas during their input and edit and to specify restrictions on whether the formulas are only mathematical, they can reference other cells available for editing on the same page using formulas, or they can reference cells outside of those editable or visible on the same page. In this way, the webifier may allow visitors to be constrained sub-designers.

Illustrative Use-Case Scenario.

According to an illustrative use-case, a design may open a Windows desktop version of a spreadsheet application, e.g., MICROSOFT EXCEL, with the webifier Add-On already installed. The Add-On may include a "Sidebar" as the main Add-On user interface embedded into the spreadsheet application. The designer may be requested to login (FIG. 13). Successful login takes the designer to FIG. 12 with a list of web-apps previously made. The design may create a new spreadsheet file in the usual manner made available by the spreadsheet application and then may click the upload arrow (upload to server) as seen in FIG. 12. The designer may set a name for the app (FIG. 23) and the nearly empty spreadsheet (in this example) gets sent to the server, becoming a nearly empty web-app. The designer next sees an empty list of pages on FIG. 18, and clicks on the web-app action menu to see the menu in FIG. 69 or the web-app tab's action menu to see the menu in FIG. 55. The user clicks add page from that menu and goes to a form as in FIG. 51 that may display properties common to all page types such as page "Title" and may also display a dropdown to choose a desired destination page type. The designer will next see a primarily blank form requesting to define the page type settings and configuration which, depending on the designer's choice of page type, which may resemble FIG. 26 (API), 27 (calendar), 29 (container), 33 (CSV import), 35 (details report), 38 (edit-cells), 41 (edit-record), 43 (insert), 45 (link), 46 (PDF), 47 (report), 49 (tabs container). The designer may repeat this process to create as many pages as desired, each incorporating one or more features described herein.

Any feature described above may be used with any particular aspect or embodiment of the invention. Many combinations, modifications, or alterations to the features of the above aspects and embodiments will be readily apparent to the skilled person and are intended to form part of the invention. Any of the features described specifically relating to one embodiment or example may be used in any other embodiment or example. In addition, although the subject matter has been described in language specific to structural features and/or methodological acts, it is to be understood that the subject matter defined in the appended claims is not necessarily limited to the specific features or acts described above. For example, the use of specific software applications, formulas and function names is not intended to be limiting of alternative applications, formulas and/or function names that can be used, unless the claims recite such specificity. Rather, the specific features and acts described above are disclosed as illustrative forms of implementing the claims.

What is claimed is:

1. A computer implemented method for generating an interactive web application comprising at least one web page, the method comprising:

determining one or more data sources within a spreadsheet, wherein the data sources each comprise one or more records;

receiving, by a spreadsheet application, first user input defining at least one user interface template within the spreadsheet, wherein the at least one user interface template corresponds to a particular web page of the interactive web application and references at least one first cell of the first data source;

receiving, by the spreadsheet application, second user input indicating that the at least one first cell of a first data source of the one or more data sources has a transient scope, wherein an indication that the at least one first cell of a first data source of the one or more data sources has a transient scope is stored within the spreadsheet;

generating the interactive web application based on the at least one user interface template defined within the spreadsheet;

generating a web data store corresponding to the interactive web application and comprising data records from the one or more data sources within the spreadsheet;

responsive to a first request for a first presentation of the particular web page of the interactive web application, generating the first presentation of the particular web page including first data retrieved from the web data store and corresponding to the at least one first cell of the first data source based on the transient scope, wherein the first data is formatted according to the at least one user interface template corresponding to the particular web page; and responsive to a second request for a second presentation of the particular web page of the interactive web application, generating the second presentation of the particular web page including second data retrieved from the web data store and corresponding to the at least one first cell of the first data source based on the transient scope, wherein the first data and second data comprise different content determined based on the transient scope of the at least one first cell.

2. The method of claim 1, wherein the transient scope is a per user scope.

3. The method of claim 2, wherein:

the first data comprises information corresponding to a first user, and the second data comprises information corresponding a different second user.

4. The method of claim 3, further comprising:

storing, within the web data store, the first data and an indication that the first data is associated with the first user; and storing, within the web data store, the second data and an indication that the second data is associated with the second user.

5. The method of claim 1, wherein the transient scope is a per session scope.

6. The method of claim 5, wherein:

the first data comprises information corresponding to a first browser session associated with the first presentation, and the second data comprises information corresponding a different second browser session associated with the second presentation.

7. The method of claim 1, wherein the transient scope is a periodic scope.

8. The method of claim 7, wherein:

the first data comprises information corresponding to a first time or date associated with the first presentation, and the second data comprises information corresponding a different time or date associated with the second presentation.

9. The method of claim 1, wherein:

the one or more data sources comprise a second data source that has a non-transient scope, the at least one user interface template references a second record of the second data source, the first presentation of the particular web page includes third data retrieved from the web data store and corresponding to the second record of the second data source, and the second presentation of the particular web page includes the third data retrieved from the web data store and corresponding to the second record of the second data source.

10. The method of claim 1, wherein:

the first data source comprises a second record that has a non-transient scope, the at least one user interface template references the second record, the first presentation of the particular web page includes third data retrieved from the web data store and corresponding to the second record, and the second presentation of the particular web page includes the third data retrieved from the web data store and corresponding to the second record.

11. The method of claim 1, wherein the spreadsheet comprises a first formula used in generating the particular web page of the interactive web application, the method further comprising:

evaluating, in association with the first presentation of the particular web page, the first formula using the first data to generate a first result, wherein the first result is included in the first presentation of the particular web page; and evaluating, in association with the second presentation of the particular web page, the first formula using the second data to generate a second result, wherein the second result is included in the second presentation of the particular web page.

12. The method of claim 1, wherein:

the first data is determined based on the transient scope and contextual information included in the first request, and the second data is determined based on the transient scope and contextual information included in the second request.

13. The method of claim 12, wherein the first request comprises a URL, the method further comprising:

identifying, based on the URL, the contextual information included in the first request.

14. The method of claim 1, wherein the second user input indicating that the at least one first cell has a transient scope comprises user input indicating a range of cells of the first data source.

15. The method of claim 1, wherein the second user input indicating that the at least one first cell has a transient scope comprises user input indicating a column or row of the first data source.

16. The method of claim 1, wherein the second user input indicating that the at least one first cell has a transient scope comprises user input indicating that:

the at least one first cell has a transient scope, and at least one second cell of the first data source has a non-transient scope.

17. The method of claim 1, further comprising:

storing, within the at least one user interface template, information indicating that the at least one first cell has the transient scope.

18. The method of claim 1, further comprising:

storing, within the first data source, information indicating that the at least one first cell has the transient scope.

19. A computing device configured to generate an interactive web application comprising at least one web page, the computing device comprising:

one or more processors; and memory storing instructions that, when executed by the one or more processors, cause the computing device to:

determine one or more data sources within a spreadsheet, wherein the data sources each comprise one or more records;

receive, by a spreadsheet application, first user input defining at least one user interface template within the spreadsheet, wherein the at least one user interface template corresponds to a particular web page of the interactive web application and references at least one first cell of the first data source;

receive, by the spreadsheet application, second user input indicating that at least one first cell of a first data source of the one or more data sources has a transient scope, wherein an indication that the at least one first cell of a first data source of the one or more data sources has a transient scope is stored within the spreadsheet;

generate the interactive web application based on the at least one user interface template defined within the spreadsheet;

generate a web data store comprising data records from the one or more data sources within the spreadsheet;

responsive to a first request for a first presentation of the particular web page of the interactive web application, generate the first presentation of the particular web page including first data retrieved from the web data store and corresponding to the at least one first cell of the first data source based on the transient scope, wherein the first data is formatted according to the at least one user interface template corresponding to the particular web page; and responsive to a second request for a second presentation of the particular web page of the interactive web application, generate the second presentation of the particular web page including second data retrieved from the web data store and corresponding to the at least one first cell of the first data source based on the transient scope, wherein the first data and second data comprise different content determined based on the transient scope of the at least one first cell.

20. The computing device of claim 19, wherein the transient scope is a per user scope, and wherein:

the first data comprises information corresponding to a first user, and the second data comprises information corresponding a different second user.

21. The computing device of claim 20, wherein the instructions further cause the computing device to:

store, within the web data store, the first data and an indication that the first data is associated with the first user; and store, within the web data store, the second data and an indication that the second data is associated with the second user.

22. The computing device of claim 19, wherein the transient scope is a per session scope, and wherein:

the first data comprises information corresponding to a first browser session associated with the first presentation, and the second data comprises information corresponding a different second browser session associated with the second presentation.

23. The computing device of claim 19, wherein the transient scope is a periodic scope, and wherein:

the first data comprises information corresponding to a first time or date associated with the first presentation, and the second data comprises information corresponding a different time or date associated with the second presentation.

24. The computing device of claim 19, wherein:

the one or more data sources comprise a second data source that has a non-transient scope, the at least one user interface template references a second record of the second data source, the first presentation of the particular web page includes third data retrieved from the web data store and corresponding to the second record of the second data source, and the second presentation of the particular web page includes the third data retrieved from the web data store and corresponding to the second record of the second data source.

25. The computing device of claim 19, wherein:

the first data is determined based on the transient scope and contextual information included in the first request, and the second data is determined based on the transient scope and contextual information included in the second request.

26. One or more non-transitory computer-readable media storing instructions that, when executed by one or more processors, cause a computing device to generate an interactive web application comprising at least one web page, by causing the computing device to perform steps comprising:

determining one or more data sources within a spreadsheet, wherein the data sources each comprise one or more records;

receiving, by a spreadsheet application, first user input defining at least one user interface template within the spreadsheet, wherein the at least one user interface template corresponds to a particular web page of the interactive web application and references at least one first cell of the first data source;

receiving, by the spreadsheet application, second user input indicating that the least one first cell of a first data source of the one or more data sources has a transient scope, wherein an indication that the at least one first cell of a first data source of the one or more data sources has a transient scope is stored within the spreadsheet;

generating the interactive web application based on the at least one user interface template defined within the spreadsheet, wherein the at least one user interface template is defined within the spreadsheet and references the at least one first cell of the first data source;

generating a web data store comprising data records from the one or more data sources within the spreadsheet;

responsive to a first request for a first presentation of the particular web page of the interactive web application, generating the first presentation of the particular web page including first data retrieved from the web data store and corresponding to the at least one first cell of the first data source based on the transient scope, wherein the first data is formatted according to the at least one user interface template corresponding to the particular web page; and responsive to a second request for a second presentation of the particular web page of the interactive web application, generating the second presentation of the particular web page including second data retrieved from the web data store and corresponding to the at least one first cell of the first data source based on the transient scope, wherein the first data and second data comprise different content determined based on the transient scope of the at least one first cell.

27. The computer-readable media of claim 26, wherein the transient scope is a per user scope, and wherein:

the first data comprises information corresponding to a first user, and the second data comprises information corresponding a different second user.

28. The computer-readable media of claim 27, wherein the instructions further cause the computing device to:

store, within the web data store, the first data and an indication that the first data is associated with the first user; and store, within the web data store, the second data and an indication that the second data is associated with the second user.

29. The computer-readable media of claim 26, wherein the transient scope is a per session scope, and wherein:

the first data comprises information corresponding to a first browser session associated with the first presentation, and the second data comprises information corresponding a different second browser session associated with the second presentation.

30. The computer-readable media of claim 26, wherein the transient scope is a periodic scope, and wherein:

the first data comprises information corresponding to a first time or date associated with the first presentation, and the second data comprises information corresponding a different time or date associated with the second presentation.

* * * * *